US012438769B2

(12) United States Patent
Subramani Jayavelu et al.

(10) Patent No.: US 12,438,769 B2
(45) Date of Patent: Oct. 7, 2025

(54) DYNAMICALLY UPDATING RAN APPLICATIONS IN A RAN SYSTEM

(71) Applicant: Vmware LLC, Palo Alto, CA (US)

(72) Inventors: Giridhar Subramani Jayavelu, San Francisco, CA (US); Gauresh Dilip Vanjare, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 449 days.

(21) Appl. No.: 18/101,549

(22) Filed: Jan. 25, 2023

(65) Prior Publication Data

US 2024/0205865 A1  Jun. 20, 2024

Related U.S. Application Data

(60) Provisional application No. 63/433,757, filed on Dec. 19, 2022.

(51) Int. Cl.
*H04L 41/0803* (2022.01)
*G06F 9/445* (2018.01)
(Continued)

(52) U.S. Cl.
CPC ........ *H04L 41/0803* (2013.01); *G06F 9/4451* (2013.01); *G06F 16/211* (2019.01);
(Continued)

(58) Field of Classification Search
CPC .............. H04L 41/0803; H04L 41/024; H04L 41/0806; H04L 41/0816; H04L 41/0886;
(Continued)

(56) References Cited

U.S. PATENT DOCUMENTS 6,504,818 B1   1/2003 Levine
7,417,947 B1   8/2008 Marques et al.
(Continued)

FOREIGN PATENT DOCUMENTS

CN   114449459 A   5/2022
JP   2017516424 A   6/2017
(Continued)

OTHER PUBLICATIONS

Balasubramanian, Bharath, et al., "RIC: A RAN Intelligent Controller Platform for AI-Enabled Cellular Networks," Apr. 16, 2021, 11 pages, IEEE.
(Continued)

*Primary Examiner* — Farid Seyedvosoghi
(74) *Attorney, Agent, or Firm* — Quarles & Brady LLP

(57) ABSTRACT

Some embodiments of the invention provide a method for providing automated admission control services for a RAN system. The method receives a trigger alert that includes an application identifier for an application, a dRIC identifier associated with a dRIC to which the application is to be deployed, and a set of configurations for the application that are in a first format. The method converts the set of configurations from the first format to a second format and sends the set configurations in the second format to an FCAPS management pod deployed to the dRIC. Upon receiving positive acknowledgment indicating successful implementation of the set of configurations from the FCAPS management pod, the method updates a configuration table stored in a database of the RAN with a set of admissions control information for the application. The method sends a notification to an API server for the RAN indicating the set of configurations have been successfully implemented for the application.

19 Claims, 88 Drawing Sheets

(51) Int. Cl.

| | |
|---|---|
| *G06F 16/21* | (2019.01) |
| *G06F 16/28* | (2019.01) |
| *H04L 9/40* | (2022.01) |
| *H04L 41/02* | (2022.01) |
| *H04L 41/08* | (2022.01) |
| *H04L 41/0806* | (2022.01) |
| *H04L 41/0816* | (2022.01) |
| *H04L 41/28* | (2022.01) |
| *H04L 69/08* | (2022.01) |
| *H04W 16/10* | (2009.01) |
| *H04W 24/02* | (2009.01) |
| *H04W 28/16* | (2009.01) |
| *H04W 48/16* | (2009.01) |
| *H04W 48/18* | (2009.01) |
| *H04W 60/04* | (2009.01) |
| *H04W 76/27* | (2018.01) |
| *H04L 67/02* | (2022.01) |
| *H04W 84/04* | (2009.01) |
| *H04W 88/18* | (2009.01) |

(52) U.S. Cl.
CPC .......... *G06F 16/288* (2019.01); *H04L 41/024* (2013.01); *H04L 41/0806* (2013.01); *H04L 41/0816* (2013.01); *H04L 41/0886* (2013.01); *H04L 41/28* (2013.01); *H04L 63/101* (2013.01); *H04L 69/08* (2013.01); *H04W 16/10* (2013.01); *H04W 24/02* (2013.01); *H04W 28/16* (2013.01); *H04W 48/16* (2013.01); *H04W 48/18* (2013.01); *H04W 60/04* (2013.01); *H04W 76/27* (2018.02); *H04L 67/02* (2013.01); *H04W 84/04* (2013.01); *H04W 88/18* (2013.01)

(58) Field of Classification Search
CPC ..... H04L 41/28; H04L 41/0895; H04L 41/14; H04L 41/16; H04L 41/082; H04L 41/0866; H04L 63/101; H04L 69/08; H04L 67/02; G06F 9/4451; G06F 16/211; G06F 16/288; H04W 16/10; H04W 24/02; H04W 28/16; H04W 48/16; H04W 48/18; H04W 60/04; H04W 76/27; H04W 84/04; H04W 88/18

See application file for complete search history.

(56) References Cited

U.S. PATENT DOCUMENTS

| | | | |
|---|---|---|---|
| 9,124,538 | B2 | 9/2015 | Koponen et al. |
| 9,280,319 | B2 | 3/2016 | Badawy et al. |
| 9,438,491 | B1 | 9/2016 | Kwok et al. |
| 9,772,822 | B2 | 9/2017 | Narayanan et al. |
| 10,111,163 | B2 | 10/2018 | Vrzic et al. |
| 10,243,835 | B2 | 3/2019 | Wang et al. |
| 10,447,597 | B1 | 10/2019 | Kim et al. |
| 10,459,754 | B2 | 10/2019 | Liu |
| 10,461,421 | B1 | 10/2019 | Tran et al. |
| 10,555,134 | B2 | 2/2020 | Shaw et al. |
| 10,609,530 | B1 | 3/2020 | Patil et al. |
| 10,708,143 | B2 | 7/2020 | Zhang et al. |
| 10,708,189 | B1 | 7/2020 | Agrawal et al. |
| 10,735,331 | B1 | 8/2020 | Li et al. |
| 10,824,483 | B2 | 11/2020 | Gino et al. |
| 10,834,669 | B2 | 11/2020 | Bordeleau et al. |
| 10,856,217 | B1 | 12/2020 | Young et al. |
| 10,939,369 | B2 | 3/2021 | Bordeleau et al. |
| 11,009,372 | B2 | 5/2021 | Klimenko |
| 11,012,288 | B2 | 5/2021 | Kommula et al. |
| 11,024,144 | B2 | 6/2021 | Bordeleau et al. |
| 11,108,643 | B2 | 8/2021 | Kommula et al. |
| 11,146,964 | B2 | 10/2021 | Bordeleau et al. |
| 11,178,016 | B2 | 11/2021 | Kommula et al. |
| 11,240,113 | B2 | 2/2022 | Kommula et al. |
| 11,246,087 | B2 | 2/2022 | Bordeleau et al. |
| 11,483,762 | B2 | 10/2022 | Bordeleau et al. |
| 11,522,764 | B2 | 12/2022 | Kommula et al. |
| 11,540,287 | B2 | 12/2022 | Singh et al. |
| 11,704,148 | B2 | 7/2023 | Singh |
| 11,743,131 | B2 | 8/2023 | Yang et al. |
| 11,750,466 | B2 | 9/2023 | Singh et al. |
| 2003/0026205 | A1 | 2/2003 | Mullendore et al. |
| 2005/0278501 | A1 | 12/2005 | Taguchi |
| 2006/0146712 | A1 | 7/2006 | Conner et al. |
| 2007/0100981 | A1 | 5/2007 | Adamczyk et al. |
| 2008/0162637 | A1 | 7/2008 | Adamczyk et al. |
| 2010/0322255 | A1 | 12/2010 | Hao et al. |
| 2011/0202634 | A1 | 8/2011 | Kovvali et al. |
| 2013/0125230 | A1 | 5/2013 | Koponen et al. |
| 2013/0279504 | A1 | 10/2013 | Gulati et al. |
| 2014/0233385 | A1 | 8/2014 | Beliveau et al. |
| 2014/0342712 | A1 | 11/2014 | Madhavan et al. |
| 2015/0074264 | A1 | 3/2015 | Izhak-Ratzin et al. |
| 2015/0163117 | A1 | 6/2015 | Lambeth et al. |
| 2015/0358654 | A1 | 12/2015 | Zhang et al. |
| 2015/0381486 | A1 | 12/2015 | Xiao et al. |
| 2015/0381493 | A1 | 12/2015 | Bansal et al. |
| 2016/0335107 | A1 | 11/2016 | Behera et al. |
| 2016/0344565 | A1 | 11/2016 | Batz et al. |
| 2016/0353465 | A1 | 12/2016 | Vrzic et al. |
| 2016/0360408 | A1 | 12/2016 | Senarath et al. |
| 2017/0054595 | A1 | 2/2017 | Zhang et al. |
| 2017/0085628 | A1 | 3/2017 | Mahindra et al. |
| 2017/0093633 | A1 | 3/2017 | Chang et al. |
| 2017/0111187 | A1 | 4/2017 | Zanier et al. |
| 2017/0142591 | A1 | 5/2017 | Vrzic |
| 2017/0250893 | A1 | 8/2017 | Duda |
| 2017/0250906 | A1 | 8/2017 | MeLampy et al. |
| 2017/0264483 | A1 | 9/2017 | Lambeth et al. |
| 2017/0289791 | A1 | 10/2017 | Yoo et al. |
| 2017/0330245 | A1 | 11/2017 | Guermas et al. |
| 2017/0332212 | A1 | 11/2017 | Gage |
| 2017/0332421 | A1 | 11/2017 | Sternberg et al. |
| 2018/0088972 | A1 | 3/2018 | Kubota et al. |
| 2018/0183866 | A1 | 6/2018 | Gunda et al. |
| 2018/0219762 | A1 | 8/2018 | Wang et al. |
| 2018/0220276 | A1 | 8/2018 | Senarath et al. |
| 2018/0220277 | A1 | 8/2018 | Senarath et al. |
| 2018/0248770 | A1 | 8/2018 | Regmi et al. |
| 2018/0262365 | A1 | 9/2018 | Lee et al. |
| 2018/0270713 | A1 | 9/2018 | Park et al. |
| 2018/0270743 | A1 | 9/2018 | Callard et al. |
| 2018/0295036 | A1 | 10/2018 | Krishnamurthy et al. |
| 2018/0332441 | A1 | 11/2018 | Shaw et al. |
| 2018/0368060 | A1 | 12/2018 | Kedalagudde et al. |
| 2019/0044755 | A1 | 2/2019 | Takajo et al. |
| 2019/0053104 | A1 | 2/2019 | Qiao et al. |
| 2019/0058508 | A1 | 2/2019 | Yiu |
| 2019/0075082 | A1 | 3/2019 | Adam et al. |
| 2019/0104458 | A1 | 4/2019 | Svennebring et al. |
| 2019/0114197 | A1 | 4/2019 | Gong |
| 2019/0123963 | A1 | 4/2019 | Tang et al. |
| 2019/0124704 | A1 | 4/2019 | Sun et al. |
| 2019/0150080 | A1 | 5/2019 | Davies et al. |
| 2019/0158364 | A1 | 5/2019 | Zhang et al. |
| 2019/0159117 | A1 | 5/2019 | Kuge et al. |
| 2019/0174573 | A1 | 6/2019 | Velev et al. |
| 2019/0187999 | A1 | 6/2019 | Lu et al. |
| 2019/0191309 | A1 | 6/2019 | Kweon et al. |
| 2019/0200286 | A1 | 6/2019 | Usui et al. |
| 2019/0245740 | A1 | 8/2019 | Kachhla |
| 2019/0268633 | A1 | 8/2019 | Jayawardene et al. |
| 2019/0268973 | A1 | 8/2019 | Bull et al. |
| 2019/0280976 | A1 | 9/2019 | Wang |
| 2019/0287146 | A1 | 9/2019 | Maitland et al. |
| 2019/0289470 | A1 | 9/2019 | Vaidya et al. |
| 2019/0320494 | A1 | 10/2019 | Jayawardene et al. |
| 2019/0364475 | A1 | 11/2019 | Chandramouli |
| 2019/0370376 | A1 | 12/2019 | Demmon et al. |
| 2019/0373520 | A1 | 12/2019 | Sillanpää |
| 2020/0007445 | A1 | 1/2020 | Anwer et al. |

(56) References Cited

U.S. PATENT DOCUMENTS

| | | |
|---|---|---|
| 2020/0053531 A1 | 2/2020 | Myhre et al. |
| 2020/0053545 A1 | 2/2020 | Wong et al. |
| 2020/0067831 A1 | 2/2020 | Spraggins et al. |
| 2020/0077327 A1 | 3/2020 | Duan et al. |
| 2020/0106536 A1 | 4/2020 | Bedekar |
| 2020/0120721 A1 | 4/2020 | Lau et al. |
| 2020/0120724 A1 | 4/2020 | Vaidya et al. |
| 2020/0134620 A1 | 4/2020 | Aiello et al. |
| 2020/0137621 A1 | 4/2020 | Yang et al. |
| 2020/0213360 A1 | 7/2020 | Ojha et al. |
| 2020/0235990 A1 | 7/2020 | Janakiraman et al. |
| 2020/0252142 A1 | 8/2020 | Bedekar |
| 2020/0273314 A1 | 8/2020 | Bordeleau et al. |
| 2020/0275281 A1 | 8/2020 | Bordeleau et al. |
| 2020/0275357 A1 | 8/2020 | Bordeleau et al. |
| 2020/0275358 A1 | 8/2020 | Bordeleau et al. |
| 2020/0275359 A1 | 8/2020 | Bordeleau et al. |
| 2020/0275360 A1 | 8/2020 | Bordeleau et al. |
| 2020/0280615 A1 | 9/2020 | Andersson et al. |
| 2020/0314029 A1 | 10/2020 | Gopinath et al. |
| 2020/0314622 A1 | 10/2020 | Tofighbakhsh et al. |
| 2021/0014912 A1 | 1/2021 | Song et al. |
| 2021/0029580 A1 | 1/2021 | Gupta et al. |
| 2021/0037390 A1 | 2/2021 | Tofighbakhsh et al. |
| 2021/0051490 A1 | 2/2021 | Yanover et al. |
| 2021/0064407 A1 | 3/2021 | Kommula et al. |
| 2021/0064451 A1 | 3/2021 | Kommula et al. |
| 2021/0067416 A1 | 3/2021 | Kommula et al. |
| 2021/0067439 A1 | 3/2021 | Kommula et al. |
| 2021/0224145 A1 | 7/2021 | Warmack |
| 2021/0234803 A1 | 7/2021 | Parekh et al. |
| 2021/0297347 A1 | 9/2021 | Xu et al. |
| 2022/0012645 A1 | 1/2022 | Ying et al. |
| 2022/0014963 A1 | 1/2022 | Yeh et al. |
| 2022/0038902 A1 | 2/2022 | Mueck |
| 2022/0038934 A1 | 2/2022 | Kumar et al. |
| 2022/0104077 A1 | 3/2022 | Jarschel et al. |
| 2022/0159522 A1 | 5/2022 | Cui et al. |
| 2022/0167236 A1 | 5/2022 | Melodia et al. |
| 2022/0167259 A1 | 5/2022 | Cui et al. |
| 2022/0210706 A1 | 6/2022 | Parekh et al. |
| 2022/0210708 A1 | 6/2022 | Parekh et al. |
| 2022/0216600 A1 | 7/2022 | Kumar et al. |
| 2022/0225264 A1 | 7/2022 | Song et al. |
| 2022/0232423 A1 | 7/2022 | Thyagaturu et al. |
| 2022/0237049 A1 | 7/2022 | Wiggers et al. |
| 2022/0240085 A1 | 7/2022 | Long |
| 2022/0253293 A1 | 8/2022 | Pontecorvi et al. |
| 2022/0279421 A1 | 9/2022 | Sivakumar et al. |
| 2022/0279535 A1 | 9/2022 | Tsui |
| 2022/0283832 A1 | 9/2022 | Singh et al. |
| 2022/0283839 A1 | 9/2022 | Srinivasan et al. |
| 2022/0283840 A1 | 9/2022 | Jayavelu et al. |
| 2022/0283841 A1 | 9/2022 | Jayavelu et al. |
| 2022/0283842 A1 | 9/2022 | Singh et al. |
| 2022/0283843 A1 | 9/2022 | Singh |
| 2022/0283882 A1 | 9/2022 | Singh et al. |
| 2022/0286536 A1 | 9/2022 | Singh et al. |
| 2022/0286837 A1 | 9/2022 | Yang et al. |
| 2022/0286840 A1 | 9/2022 | Singh |
| 2022/0286914 A1 | 9/2022 | Gudipati et al. |
| 2022/0286915 A1 | 9/2022 | Gudipati et al. |
| 2022/0286916 A1 | 9/2022 | Yang et al. |
| 2022/0286939 A1 | 9/2022 | Gudipati et al. |
| 2022/0287038 A1 | 9/2022 | Singh et al. |
| 2022/0303831 A1* | 9/2022 | Song .................... H04L 5/0035 |
| 2022/0321414 A1 | 10/2022 | Kim et al. |
| 2022/0342732 A1 | 10/2022 | Subramani Jayavelu et al. |
| 2022/0345417 A1 | 10/2022 | Kasichainula et al. |
| 2022/0407664 A1 | 12/2022 | Wang et al. |
| 2022/0417117 A1 | 12/2022 | Tayeb et al. |
| 2023/0041056 A1 | 2/2023 | Bordeleau et al. |
| 2023/0054483 A1 | 2/2023 | Lee et al. |
| 2023/0069604 A1 | 3/2023 | Subramani et al. |
| 2023/0094120 A1 | 3/2023 | Basur Shankarappa et al. |
| 2023/0100276 A1 | 3/2023 | Basur Shankarappa et al. |
| 2023/0104129 A1* | 4/2023 | Miriyala ................. H04L 69/03 709/220 |
| 2023/0112127 A1 | 4/2023 | Lee et al. |
| 2023/0112534 A1 | 4/2023 | Chen |
| 2023/0144337 A1 | 5/2023 | Kumar et al. |
| 2023/0189317 A1 | 6/2023 | Swamy et al. |
| 2024/0193021 A1* | 6/2024 | Pateromichelakis ... H04L 43/10 |

FOREIGN PATENT DOCUMENTS

| | | |
|---|---|---|
| JP | 2018518927 A | 7/2018 |
| JP | 2018125837 A | 8/2018 |
| WO | 2016159192 A1 | 10/2016 |
| WO | 2016206742 A1 | 12/2016 |
| WO | 2017150642 A1 | 9/2017 |
| WO | 2019129374 A1 | 7/2019 |
| WO | 2019229492 A1 | 12/2019 |
| WO | 2020171957 A1 | 8/2020 |
| WO | 2020242987 A1 | 12/2020 |
| WO | 2021040935 A1 | 3/2021 |
| WO | 2022011862 A1 | 1/2022 |
| WO | 2022156887 A1 | 7/2022 |
| WO | 2022177333 A1 | 8/2022 |
| WO | 2022186883 A1 | 9/2022 |
| WO | 2022186912 A1 | 9/2022 |
| WO | 2022194359 A1 | 9/2022 |

OTHER PUBLICATIONS

Schmidt, Robert, "RAN Engine: Service-Oriented RAN Through Containerized Micro-Services," IEEE Transactions on Network and Service Management, Mar. 2021, 14 pages, vol. 18, No. 1, IEEE.

Non-Published Commonly Owned U.S. Appl. No. 18/244,239, filed Sep. 9, 2023, 64 pages, VMware, Inc.

Non-Published Commonly Owned Related International Patent Application PCT/US2023/033374 with similar specification, filed Sep. 21, 2023, 205 pages, VMware, Inc.

Author Unknown, "5G RIC—RAN Intelligent Controller," Jun. 26, 2020, 4 pages, retrieved from http://www.techplayon.com/5g-ric-ran-intelligent-controller/.

Author Unknown, "Open RAN 101—Role of RAN Intelligent Controller: Why, what, when, how?," Jul. 30, 2020, 8 pages.

Author Unknown, "O-Ran Operations and Maintenance Architecture," O-RAN WG1 OAM-Architecture-v04.00, Month Unknown 2021, 55 pages, O-RAN Alliance.

Blenk, Andreas, et al., "Survey on Network Virtualization Hypervisors for Software Defined Networking", IEEE Communications Surveys & Tutorials, Jan. 27, 2016, 32 pages, vol. 18, No. 1, IEEE.

Bonati, Leonardo, et al., "Open, Programmable, and Virtualized 5G Networks: State-of-the-Art and the Road Ahead," Aug. 25, 2020, 32 pages, retrieved from https://arxiv.org/abs/2005.10027v3.

Czichy, Thoralf, 5G RAN Optimization Using the O-RAN Software Community's RIC (RAN Intelligent Controller), Open Networking Summit Europe, Sep. 23, 2019, 23 pages, The Linux Foundation, Antwerp, Belgium.

Non-Published Commonly Owned U.S. Appl. No. 17/827,032, filed May 27, 2022, 27 pages, VMware, Inc.

Non-Published Commonly Owned U.S. Appl. No. 17/976,788, filed Oct. 29, 2022, 62 pages, VMware, Inc.

Non-Published Commonly Owned U.S. Appl. No. 18/084,466, filed Dec. 19, 2022, 131 pages, VMware, Inc.

Non-Published Commonly Owned U.S. Appl. No. 18/084,473, filed Dec. 19, 2022, 132 pages, VMware, Inc.

Non-Published Commonly Owned Related U.S. Appl. No. 18/101,544 with similar specification, filed Jan. 25, 2023, 204 pages, VMware, Inc.

Non-Published Commonly Owned Related U.S. Appl. No. 18/101,545 with similar specification, filed Jan. 25, 2023, 204 pages, VMware, Inc.

Non-Published Commonly Owned Related U.S. Appl. No. 18/101,546 with similar specification, filed Jan. 25, 2023, 204 pages, VMware, Inc.

(56) References Cited

OTHER PUBLICATIONS

Non-Published Commonly Owned Related U.S. Appl. No. 18/101,551 with similar specification, filed Jan. 25, 2023, 203 pages, VMware, Inc.
Non-Published Commonly Owned Related U.S. Appl. No. 18/101,552 with similar specification, filed Jan. 25, 2023, 204 pages, VMware, Inc.
Non-Published Commonly Owned U.S. Appl. No. 18/101,554, filed Jan. 25, 2023, 204 pages, VMware, Inc.
Non-Published Commonly Owned U.S. Appl. No. 18/101,556, filed Jan. 25, 2023, 205 pages, VMware, Inc.
Non-Published Commonly Owned U.S. Appl. No. 18/101,557, filed Jan. 25, 2023, 205 pages, VMware, Inc.
Non-Published Commonly Owned U.S. Appl. No. 18/101,559, filed Jan. 25, 2023, 204 pages, VMware, Inc.
Non-Published Commonly Owned U.S. Appl. No. 18/101,560, filed Jan. 25, 2023, 204 pages, VMware, Inc.
Non-Published Commonly Owned U.S. Appl. No. 18/101,561, filed Jan. 25, 2023, 203 pages, VMware, Inc.
Non-Published Commonly Owned U.S. Appl. No. 18/101,563, filed Jan. 25, 2023, 203 pages, VMware, Inc.

\* cited by examiner

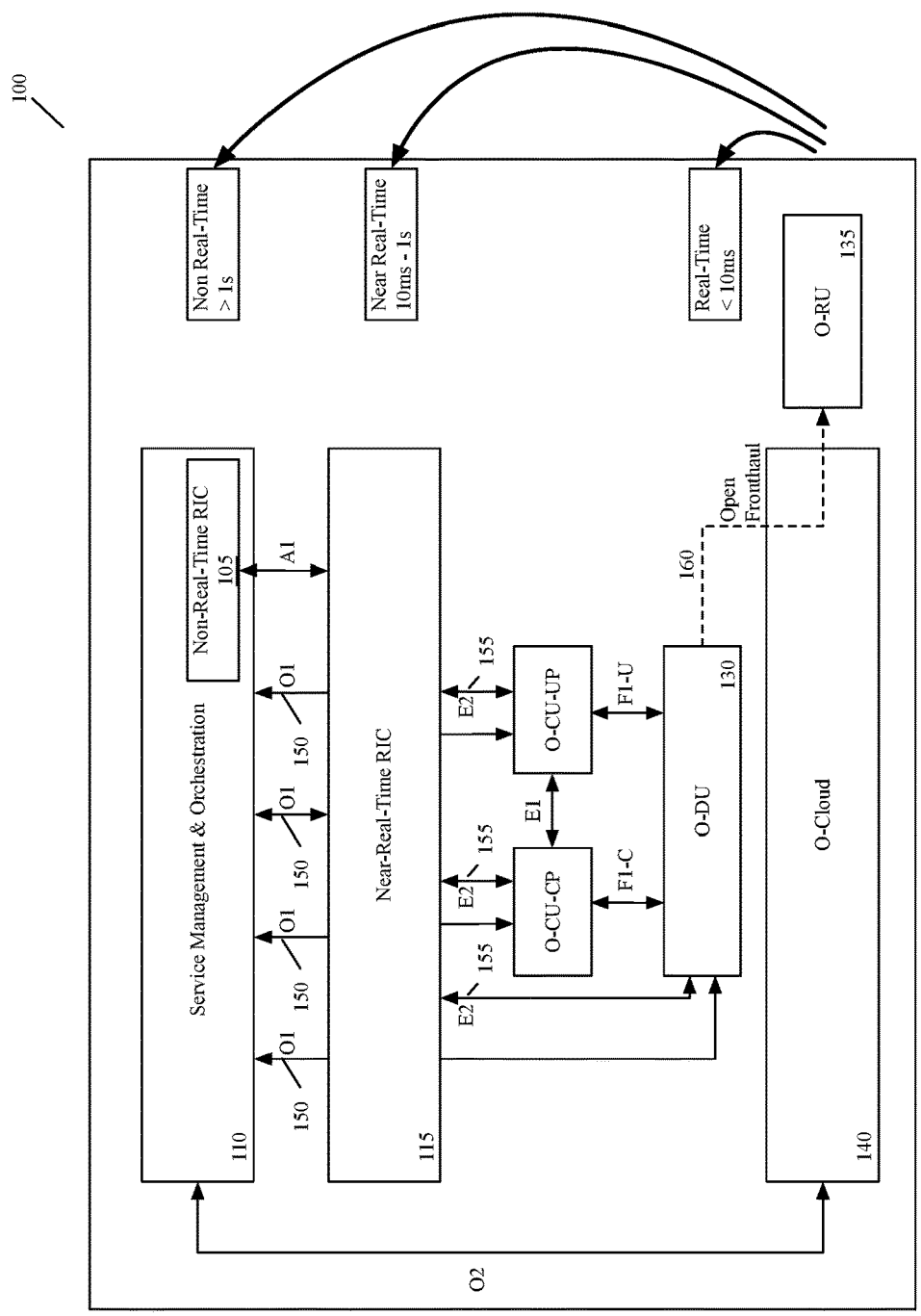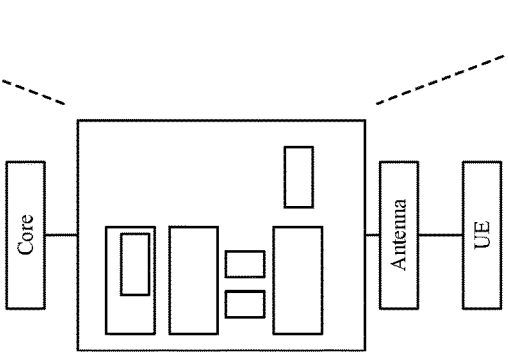
Figure 1

```
enum CONFIG_STATE {
    WRITE = 1,
    READ  = 2,
} class ConfigObject {
    CONFIG_STATE state_;
    metrics_proto::ConfigurationsResponse response_; //grpc protobuf response
} class ConfigurationFacilitator {
    map <int, ConfigObject*> client_info_; // key is the unique global_id
id
}
```

```
module dric-admission-control {
    namespace "uri:ietf:params:xml:ns:yang:dric-admission-control";
    prefix dp;
    organization "VMware";

revision 2022-03-03 {
        description
            "Initial Revision";
    } revision 2022-10-30 {
        description
            "Revision to update few fields";
    } container records {
        leaf-list global-ids {
            type uint64;
            description
                "List of Managed Element unique (Global) IDs at a RIC
platform";
        } leaf transaction-id {
            type uint64;
            description
                "A incremental counter to keep track on last applied
configs";
        }
    } container xapp-provisioning {
        list xapp-ids {
            key "name";
            unique "id";
            description "A list of xapp objects";
            leaf id {
                mandatory true;
                description "Unique Identifier for an xApp";
                type uint32;
            }
            leaf vendor-name {
                default "VMware";
                description "Vendor name for an xApp";
                type string;
            }
            leaf software-version {
                default "2.0.0";
                description "Software Version for an xApp";
                type string;
            }
            leaf name {
                mandatory true;
                description "Unique Name for an xApp";
                type string;
            }
        }
```

*Figure 32*

```xml
<records xmlns="uri:ietf:params:xml:ns:yang:dric-admission-control">
    <transaction-id>1234</transaction-id>
    <global-ids>1</global-ids>
</records>

<xapp-provisioning xmlns="uri:ietf:params:xml:ns:yang:dric-admission-
control">
    <xapp-ids>
        <id>1237</id>
        <name>xapp_demo</name>
        <vendor-name>VMware</vendor-name>
        <software-version>0.13.0</software-version>
    </xapp-ids>
    <xapp-ids>
        <id>1238</id>
        <name>xapp_perf_1</name>
        <vendor-name>VMware</vendor-name>
        <software-version>0.13.0</software-version>
    </xapp-ids>
</xapp-provisioning>

<e2node-provisioning xmlns="uri:ietf:params:xml:ns:yang:dric-admission-
control">
    <e2node-ids>
        <plmn-id>
            <id1>12</id1>
            <id2>12</id2>
            <id3>12</id3>
        </plmn-id>
        <gnb-id>
            <id1>13</id1>
            <id2>13</id2>
            <id3>13</id3>
            <id4>13</id4>
        </gnb-id>
        <cu-id>1234</cu-id>
        <du-id>1235</du-id>
        <name>e2node1</name>
        <vendor-name>VMware</vendor-name>
        <software-version>0.13.0</software-version>
    </e2node-ids>
</e2node-provisioning>
```

```
package configurations;

service ProvisoningServices {
    rpc RegisterComponent(ComponentRegisterRequest) returns
(ComponentRegisterResponse);
    rpc FetchConfiguration(ConfigurationRequest) returns
(ConfigurationResponse);
}
/*
* This proto can be used in other classes by importing this file name
* with .grpc.pb.h extension
* package defined below can be used as namespace i.e
metrics_proto::MetricDefinition
*/ syntax = "proto3";

package configurations_proto;

enum ConfigurationCapabilities {
    INVALID_CAPABILITY                                          = 0;
    DRIC_ADMISSION_CONTROL_CAPABILITY                           = 1;
} enum ServiceComp {
    SERVICE_COMP_INVALID = 0;
    SERVICE_COMP_DRIC    = 1;
    SERVICE_COMP_E2NODE  = 2;
    SERVICE_COMP_XAPP    = 3;
    SERVICE_COMP_SDK     = 4;
} message ComponentRegisterRequest {
    uint32                              global_id           = 1;
    uint32                              request_id          = 2;
    uint32                              instance_id         = 3;
    ServiceComp                         service_comp        = 4;
    repeated ConfigurationCapabilities  capabilities        = 5;
} enum ComponentRegisterResponseCode {
    COMPONENT_REGISTER_RESPONSE_INVALID                          = 0;
    COMPONENT_REGISTER_RESPONSE_SUCCESS                          = 1;
    COMPONENT_REGISTER_RESPONSE_FAILURE_NO_GLOBAL_ID             = 2;
    COMPONENT_REGISTER_RESPONSE_FAILURE_NO_REQUEST_ID            = 3;
    COMPONENT_REGISTER_RESPONSE_FAILURE_NO_CAPABILITY_PROVIDED   = 4;
    COMPONENT_REGISTER_RESPONSE_UNKNOWN_CAPABILITY               = 5;
    COMPONENT_REGISTER_RESPONSE_CLIENT_ALREADY_REGISTERD         = 6;
    COMPONENT_REGISTER_RESPONSE_FAILURE_UNKNOWN                  = 7;
    COMPONENT_REGISTER_RESPONSE_SERVER_UNREACHABLE               = 8;
} message ComponentRegisterResponse {
    uint32                          global_id          = 1;
    uint32                          request_id         = 2;
    ComponentRegisterResponseCode   component_response = 3;
}
```

*Figure 34*  3400

```
enum ConfigurationModeFlag {
    CONFIGURATION_MODE_INVALID                       = 0;
    CONFIGURATION_MODE_REPLAY                        = 1;
    CONFIGURATION_MODE_POLLING                       = 2;
} message ConfigurationRequest {
    uint32                      global_id            = 1;
    uint32                      request_id           = 2;
    ConfigurationModeFlag       config_mode_flag     = 3;
}
```

```
/* AckTransaction is sent as a request in the next iteration (y+1) after
receiving the configs (y) by clients. Making this approach a two stage
commit.
 * last_successful_trx_id : This is an in memory number that client maintains
of last successful transaction.
 * config_accepted: This indicates whether the config as a whole as applied
successfully or not.
 * errors: If there are any errors while accepting these configs.
 *
 */
enum ConfigStateMachine {
    CONFIG_STATE_INVALID      = 0;
    CONFIG_STATE_READ         = 1;
    CONFIG_STATE_WRITE        = 2;
    CONFIG_STATE_TEST         = 3;
    CONFIG_STATE_ACK_ACCEPT   = 4;
    CONFIG_STATE_ACK_REJECT   = 5;
    CONFIG_STATE_COMMIT       = 6;
    CONFIG_STATE_IGNORE       = 7;
    CONFIG_STATE_ACK_COMMIT   = 8;
    CONFIG_STATE_ACK_IGNORE   = 9;
}

// Have a per capability map consisting of following format
// map[CAPABILITY_ENUM] = trx_id1
message AckSuccessfulRecord {
    map<string, uint64>            last_successful_config_records = 1;
} message AckTransaction {
    AckSuccessfulRecord            ack_successful_record          = 1;
    uint64                         ack_trx_id                     = 2;
    string                         errors                         = 3;
} message ConfigurationRequest {
    uint32                         global_id                      = 1;
    uint32                         request_id                     = 2;
    ConfigurationModeFlag          config_mode_flag               = 3;
    AckTransaction                 last_ack_status                = 4;
    ConfigStateMachine             config_state                   = 5;
}

/* Only one kind of Configuration Capability can be operated in one request,
hence
 * we are using oneof value in the message.
 * TODO: Add support to operate on multiple capabilities in one request.
 *       eg: Send admission control configs and log-level changes in one
request from RMS.
 *
 * ConfigurationCapabilities is the yang module used.
 */
message ConfigurationResponse {
    uint32                                         global_id      = 1;
    uint32                                         request_id     = 2;
```

*Figure 40*  4000

```
# Start with ConfigurationFacilitator which holds all our configs and states
for them
class ConfigurationFacilitator:
    config_client_map = {}
    is_available = False
    global_id_list = []
    ack_accepted_counter = 0
    ack_commit_counter = 0 def add_new_client(global_id):
        # We have following map defined as a part of initial registration
process and this is shared across all the threads in FCAPS SMA process
        config_client_map[global_id] = obj(state=READ, protobuff_message)

def change_client_state(global_id, state):
        config_client_map[global_id].state(state)
        if state == ACK_ACCEPT:
            ack_accepted_counter += 1
         if state == ACK_COMMIT:
            ack_commit_counter += 1 def get_current_client_state(global_id):
        return config_client_map[global_id].state def reset_config_state():
        is_available = False
        global_id_list = []
        ack_accepted_counter = 0
        ack_commit_counter = 0

# A top level entity that will hold config
class NetconfMessageHandler:
    def __init__(self, config_obj):
        self.config_obj = config_obj sysrepo_watcher_thread will feed us with a list of global_ids which needs
to be handled in the conflict_watcher_thread
<Not shown> class ConflictWatcherThread(NetconfMessageHandler):
    def cwt_main():

while 1:
            # should be set by the sysrepowatcher thread after processing all
configs module by module basis
            if NetconfMessageHandler.config_obj.is_available == False:
                sleep(1)
                continue

# Load all the objects whose state is MARK and change it to TEST
            for global_id in NetconfMessageHandler.config_obj.global_id_list:
                if
NetconfMessageHandler.config_obj.get_current_client_state() == MARK:

NetconfMessageHandler.config_obj.change_client_state(TEST)

# Sleep for some fixed time to gather response from clients
```

*Figure 41*    4100

```
class MainProcess:
def init():
    config_obj = ConfigurationFacilitator()
    netconf_handler = NetconfMessageHandler(config_obj)
class GrpcThread:
    def rpc_RegisterComponent(request):
        netconf_handler.config_obj.add_new_client(request.global_id)
        return True
    def rpc_FetchConfiguration(request):
        if request.config_state == READ:
            return netconf_handler.config_obj.get_client_config()
        else:
            netconf_handler.config_obj.change_client_state(request.config_state(request.config_state()))
```

```
@startuml
alt Provisioning Procedure
    Note over RMS_Configurations: Operator will provide other parameters.
    RMS_Configurations -> gRPC_netconf_thread: xApp(s)<glb_id, sw_version,
name, vendor_name> and request_id=1
    Note over gRPC_netconf_thread: Netconf Session terminated over ssh/tls
transport XML.
    gRPC_netconf_thread -> SYSREPO_DATASTORE: Store in Candidate Datastore.

Note over gRPC_Client_thread_s: share configs.
    gRPC_netconf_thread -> gRPC_Client_thread_s: Parse the configs and send
it encoded in protobuf.

gRPC_Client_thread_s -> E2T_CP: xApp<glb_id, sw_version, name,
vendor_name> add to the allow list. request_id=1
    Note over E2T_CP: gRPC Termination
    gRPC_Client_thread_s -> xLCM_CP: xApp<glb_id, sw_version, name,
vendor_name> add to the allow list. request_id=1
    Note over xLCM_CP: gRPC Termination
    E2T_CP -> gRPC_Client_thread_s: ACK request_id=1
    xLCM_CP -> gRPC_Client_thread_s: ACK request_id=1 gRPC_Client_thread_s -> gRPC_netconf_thread: ACK for each request_id.
    gRPC_netconf_thread -> SYSREPO_DATASTORE: copy from Candidate datastore
to Running datastore.
    gRPC_netconf_thread -> RMS_Configurations: ACK end
@enduml
```

| GET | /config (Returns configuration) | ◁ |

Optional extended description in CommonMark or HTML

Parameters [ Try it out ]

| Name | Description |
|---|---|
| UUID of the ric/app *required<br>integer<br>(query) | [ UUID of the ric/app ] |

Responses

| Code | Description | Links |
|---|---|---|
| 200 | A JSON array of user names<br><br>Media type<br>[ application/json ▽ ]<br>Controls Accept header<br><br>Example Value \| Schema<br><br>{<br>  "loglevel": "Debug",<br>  "lot": -16.92<br>} | No links |

| POST | /config (Updates/Creates new) | ▷ |

| DELETE | /config (Deletes configuration) | ▷ |

Schemas

Config > ◁

*Figure 47*

```
<records xmlns="uri:ietf:params:xml:ns:yang:dric-admission-control">
    <transaction-id>1234</transaction-id>
    <global-ids>1</global-ids>
</records>

<e2node-provisioning xmlns="uri:ietf:params:xml:ns:yang:dric-admission-
control">
    <e2node-ids>
        <plmn-id>
            <id1>12</id1>
            <id2>12</id2>
            <id3>12</id3>
        </plmn-id>
        <gnb-id>
            <id1>13</id1>
            <id2>13</id2>
            <id3>13</id3>
            <id4>13</id4>
        </gnb-id>
        <cu-id>1234</cu-id>
        <du-id>1235</du-id>
        <name>e2node1</name>
        <vendor-name>VMware</vendor-name>
        <software-version>0.13.0</software-version>
    </e2node-ids>
    <e2node-ids>
        <plmn-id>
            <id1>11</id1>
            <id2>11</id2>
            <id3>11</id3>
        </plmn-id>
        <gnb-id>
            <id1>12</id1>
            <id2>12</id2>
            <id3>12</id3>
            <id4>12</id4>
        </gnb-id>
        <cu-id>12342</cu-id>
        <du-id>12351</du-id>
        <name>e2node2</name>
        <vendor-name>VMware</vendor-name>
        <software-version>0.13.0</software-version>
    </e2node-ids>
</e2node-provisioning>
```

*Figure 56*

```
module generic-key-value {
    namespace "uri:ietf:params:xml:ns:yang:generic-key-value";
    prefix gkv;
    organization "VMware";

revision 2022-06-11 {
        description
            "Generic Key Value Config Management v1.0.
             This schema will allow users to configure simple key-value
             parameters at a RIC instance";
    } revision 2022-11-04 {
        description
            "Generic Key Value Config Management v2.0.
             Define concrete data types for values and change from
             service-id to global-id";
    } typedef decimal64_ {
        type decimal64 {
            fraction-digits 15;
        }
    } grouping config-parameters {
        leaf global-id {
            mandatory true;
            type uint32;
            description
                "Managed Element unique ID";
        }
        list parameters {
            key "key_";
            leaf key_ {
                mandatory true;
                type string;
                description
                    "key holds the string data without dictionay lookup
                     eg:
                     max_allowed_errors = 6 allowed
                     counters.max_allowed_errro = 6 is not allowed";
            } choice val_type {
                mandatory true;
                case uint32_type {
                    leaf uint32_val_ {
                        type uint32;
                    }
                }
                case uint64_type {
                    leaf uint64_val_ {
                        type uint64;
                    }
                }
                case int32_type {
```

*Figure 58*

```
module vmware-sdk-param {
    namespace "uri:ietf:params:xml:ns:yang:vmware-sdk-param";
    prefix vspc;
    organization "VMware";

revision 2022-07-23 {
        description
            "VMware SDK parameters v1.0.
             This schema will allow users to change sdk parameters";
    } container records {
        leaf-list global-ids {
            type uint64;
            description
                "List of Managed Element unique (Global) IDs at a RIC
platform";
        } leaf transaction-id {
            type uint64;
            description
                "A incremental counter to keep track on last applied
configs";
        }
    } container config-container {
        list sdk-configs {
            key "global-id";
            leaf global-id {
                mandatory true;
                type uint64;
            }
            leaf log_level {
                type string;
            }

```
{
    "$schema":"http://json-schema.org/draft-06/schema#",
    "$ref":"#/definitions/GenericKeyValueRoot",
    "definitions":{
        "GenericKeyValueRoot":{
            "type":"object",
            "additionalProperties":false,
            "properties":{
                "generic-key-value@2022-11-04":{
                    "type":"object",
                    "additionalProperties":false,
                    "properties":{
                        "config-container":{
                            "type":"object",
                            "additionalProperties":false,
                            "properties":{
                                "sdk-configs":{
                                    "type":"array",
                                    "minItems": 1,
                                    "maxItems": 1,
                                    "items":{
                                        "$ref":"#/definitions/Configs"
                                    }
                                },
                                "xapp-configs":{
                                    "type":"array",
                                    "minItems": 1,
                                    "maxItems": 1,
                                    "items":{
                                        "$ref":"#/definitions/Configs"
                                    }
                                },
                                "e2t-configs":{
                                    "type":"array",
                                    "minItems": 1,
                                    "maxItems": 1,
                                    "items":{
                                        "$ref":"#/definitions/Configs"
                                    }
                                }
                            }
                        },
                        "-xmlns":{
                            "type":"string",
                            "default":"uri:ietf:params:xml:ns:yang:generic-key-value",
                            "description":"Please don't edit this field"
                        }
                    },
                    "required":[
                        "-xmlns",
                        "config-container"
                    ]
                }
            },
            "required":[
                "generic-key-value@2022-11-04"
```

*Figure 60*    6000

```
{
    "$schema":"http://json-schema.org/draft-06/schema#",
    "$ref":"#/definitions/VmwareSDKParamRoot",
    "definitions":{
        "VmwareSDKParamRoot":{
            "type":"object",
            "additionalProperties":false,
            "properties":{
                "vmware-sdk-param@2022-07-23":{
                    "type":"object",
                    "additionalProperties":false,
                    "properties":{
                        "config-container":{
                            "type":"object",
                            "additionalProperties":false,
                            "properties":{
                                "sdk-configs":{
                                    "type":"array",
                                    "items":{
                                        "$ref":"#/definitions/SDKConfig"
                                    }
                                }
                            },
                            "required":[
                                "sdk-configs"
                            ]
                        },
                        "-xmlns":{
                            "type":"string",
                            "default":"uri:ietf:params:xml:ns:yang:vmware-sdk-param",
                            "description":"Please don't edit this field"
                        }
                    },
                    "required":[
                        "-xmlns",
                        "config-container"
                    ]
                }
            },
            "required":[
                "vmware-sdk-param@2022-07-23"
            ],
            "title":"VmwareSDKParamRoot"
        },
        "SDKConfig":{
            "type":"object",
            "additionalProperties":false,
            "properties":{
                "global-id":{
                    "type":"integer",
                    "minimum":1,
                    "maximum":18446744073709551615
                },
                "log-level":{
                    "type":"string"
                }
```

*Figure 61*  6100

```
{
    "$schema": "http://json-schema.org/draft-06/schema#",
    "$ref": "#/definitions/DricAdmControl",
    "definitions": {
        "DricAdmControl": {
            "type": "object",
            "additionalProperties": false,
            "properties": {
                "dric-admission-control@2022-10-30": {
                    "$ref": "#/definitions/DricAdmissionControl"
                }
            },
            "required": [
                "dric-admission-control@2022-10-30"
            ],
            "title": "DricAdmControl"
        },
        "DricAdmissionControl": {
            "type": "object",
            "additionalProperties": false,
            "properties": {
                "xapp-provisioning": {
                    "$ref": "#/definitions/XappProvisioning"
                },
                "e2node-provisioning": {
                    "$ref": "#/definitions/E2NodeProvisioning"
                },
                "-xmlns": {
                    "type": "string",
                    "default": "uri:ietf:params:xml:ns:yang:dric-admission-control",
                    "description": "Please don't edit this field"
                }
            },
            "required": [
                "-xmlns",
                "e2node-provisioning",
                "xapp-provisioning"
            ],
            "title": "DricAdmissionControl"
        },
        "E2NodeProvisioning": {
            "type": "object",
            "additionalProperties": false,
            "properties": {
                "e2node-ids": {
                    "type": "array",
                    "items": {
                        "$ref": "#/definitions/E2NodeID"
                    }
                }
            },
            "title": "E2NodeProvisioning"
        },
        "E2NodeID": {
            "type": "object",
            "additionalProperties": false,
```

*Figure 62*  6200

```
enum ServiceComp {
    SERVICE_COMP_INVALID = 0;
    SERVICE_COMP_DRIC    = 1;
    SERVICE_COMP_E2NODE  = 2;
    SERVICE_COMP_XAPP    = 3;
    SERVICE_COMP_SDK     = 4;
} enum OperationType {
    OPERATION_TYPE_INVALID                                          = 0;
    OPERATION_TYPE_ADD                                              = 1;
    OPERATION_TYPE_MODIFY                                           = 2;
    OPERATION_TYPE_DELETE                                           = 3;
}

// Option 1: Well defined proto
message GenKeyValPair {
    ServiceComp                           service_comp              = 1;
    string
        description      = 2
    string                                key                       = 3;
    oneof value {
        uint32                            uint32_value              = 4;
        uint64                            uint64_value              = 5;
        int32                             int32_value               = 6;
        int64                             int64_value               = 7;
        float                             float_value               = 8;
        double                            double_value              = 9;
        bool                              bool_value                = 10;
        string                            string_value              = 11;
    }
    OperationType                         operation_type            = 12;
} message LabelledgenericKeyVal{
        repeated          GenKeyValPair        gen_key_val_pair     = 1;
} message LabelledSDKParams {
    string                                log_level                 = 1;
} message ConfigurationResponse {
    uint32                                global_id                 = 1;
    uint32                                request_id                = 2;
    uint32                                transaction_id            = 3;
    ConfigurationCapabilities             capability                = 4;
    ConfigurationResponseCode             config_response           = 5;
    ServiceComp                           service_comp              = 6;
    oneof value {
        // We can have well defined proto structures for modules defined for
our platform
        LabelleddRICAdmissionControl      admission_control         = 7;
        LabelledSDKParams                 sdk_params                = 8;
        LabelledgenericKeyVal             generic_key_val           = 9;
    }
```

*Figure 63*  6300

| VMware RIC | Dashboard | Applications | System | | John Doe ⌄ |
|---|---|---|---|---|---|
| | | | | | INSTANCE: DRIC 2.1 ⌄ |

Applications / xApps / VoNR Traffic Steering
VoNR Traffic Steering (xApp)

Algorithm Performance   Connected Cells   Activity Log   Configuration xApp Configuration (Last updated: 13 September 2022 at 16:44:13 GMT-4)    ⚙ EDIT   ↻ REFRESH Modules 🔍 Search ⌄ ⌂ generic-key-value-cm @
   ⌄ ☐ config-container
      ☐ sdk-configs
      ☐ xapp-configs xapp-configs ⊙

| Attribute | Value | Description |
|---|---|---|
| vonr_arfcn | 151600 | Absolute Radio Frequency channel number for xApp VONR TS |
| vonr_ctrl_req_timeout | 15 | Control Request Timeout in seconds |

*Figure 64*

| VMware RIC | Dashboard | Applications | System | | | John Doe ⌄ |
|---|---|---|---|---|---|---|
| Entities « | | | | | | |
| 🔍 Search | dRIC 2.1 Details (Healthy) | | | | | |
| ⌄ ☐ Centralized RICs | Health  Topology  Hosted Apps  Connected Cells  Activity Log  Configuration | | | | | |
| ☐ CRIC 1 | dRIC Configuration (Last updated: 13 September 2022 at 16:44:13 GMT-4) | | | ⚙ EDIT | ⟳ REFRESH | |
| ☐ CRIC 2 | Modules | xapp-porto ⓘ | | | | |
| ☐ CRIC 3 | 🔍 Search | Attribute | Value | Description | | |
| ☐ CRIC 4 | ⌄ 🏠 dric-admission-control | id | 1233 | Unique global ID of an xApp | | |
| ⌄ ☐ Distributed RICs | ⌄ ☐ xapp-provisioning | vendor_name | VMware Inc. | Name of the xApp vendor | | |
| ˃ ☐ DRIC Cluster 1 | ☐ xapp_ids | name | xapp_porto | Name of the xApp | | |
| ⌄ ☐ DRIC Cluster 2 | ☐ xapp_porto | software_version | 1.12.0 | Current software version | | |
| ☐ DRIC 2.1 | ☐ xapp_vonr | | | | | |
| ☐ DRIC 2.2 | ☐ e2node-provisioning | | | | | |
| ☐ DRIC 2.3 | | | | | | |
| ☐ DRIC 2.4 | | | | | | |
| ☐ DRIC 2.5 | | | | | | |
| ☐ DRIC 2.6 | | | | | | |
| ☐ DRIC 2.7 | | | | | | |
| ☐ DRIC 2.8 | | | | | | |
| ˃ ☐ DRIC Cluster 7 | | | | | | |
| ˃ ☐ DRIC Cluster 8 | | | | | | |
| ˃ ☐ DRIC Cluster 9 | | | | | | |

*Figure 65*

| VMware RIC | Dashboard | Applications | System | | John Doe ⌄ |
|---|---|---|---|---|---|

Entities «

🔍 Search

∨ ☐ Centralized RICs

☐ CRIC 1
    ☐ CRIC 2
    ☐ CRIC 3
    ☐ CRIC 4

∨ ☐ Distributed RICs

> ☐ DRIC Cluster 1
  ∨ ☐ DRIC Cluster 2
    ☐ DRIC 2.1
    ☐ DRIC 2.2
    ☐ DRIC 2.3
    ☐ DRIC 2.4
    ☐ DRIC 2.5
    ☐ DRIC 2.6
    ☐ DRIC 2.7
    ☐ DRIC 2.8

> ☐ DRIC Cluster 7
> ☐ DRIC Cluster 8
> ☐ DRIC Cluster 9

--- dRIC 2.1 Details (Healthy)

Health  Topology  Hosted Apps  Connected Cells  Activity Log  Configuration dRIC Configuration  Last updated: 13 September 2022 at 16:44:13 GMT-4    ⚙ EDIT   ⟳ REFRESH Modules 🔍 Search ∨ 🏠 dric-admission-control
  ∨ ☐ xapp-provisioning
    ☐ xapp_ids
      ☐ xapp_porto
      ☐ xapp_vonr
  ☐ e2node-provisioning xapp-porto ⓘ — global-id: 4213487

| Attribute | Value | Description |
|---|---|---|
| id | 1233 | Unique global ID of an xApp |
| vendor_name | VMware Inc. | Name of the xApp vendor |
| name | xapp_porto | Name of the xApp |
| software_version | 1.12.0 | Current software version |

| VMware RIC | Dashboard | Applications | System | | | John Doe ⌄ |
|---|---|---|---|---|---|---|
| Entities « | dRIC 2.1 Details (Healthy) | | | | | |
| Q Search | Health  Topology  Hosted Apps  Connected Cells  Activity Log  Configuration | | | | | |
| ⌄ ☐ Centralized RICs | dRIC Configuration (Last updated: 13 September 2022 at 16:44:13 GMT-4) | | | | ⚙ EDIT | ⟲ REFRESH |
| ☐ CRIC 1 | Modules | e2node_test_1 ⓘ | | | ⊞ Import Config | |
| ☐ CRIC 2 | | | | | ⇨ Export Config | |
| ☐ CRIC 3 | Q Search | Attribute | Value | Description | | |
| ☐ CRIC 4 | ⌄ 🏠 dric-admission-control | plmn_id | | Public Land Mobile Network (PLMN) Ids | | |
| ⌄ ☐ Distributed RICs | ⌄ ☐ xapp-provisioning | id1 | 23 | | | |
| › ☐ DRIC Cluster 1 | ☐ xapp_ids | id2 | 23 | | | |
| ⌄ ☐ DRIC Cluster 2 | ☐ xapp_porto | id3 | 23 | | | |
| ☐ DRIC 2.1 | ☐ xapp_vonr | gnb_id | | gNB identifier | | |
| ☐ DRIC 2.2 | ⌄ ☐ e2node-provisioning | id1 | 13 | | | |
| ☐ DRIC 2.3 | ☐ e2node_ids | id2 | 13 | | | |
| ☐ DRIC 2.4 | | id3 | 13 | | | |
| ☐ DRIC 2.5 | ☐ e2node_test_1 | id4 | 13 | | | |
| ☐ DRIC 2.6 | ☐ e2node_test_2 | cu_id | 1233 | Centralized unit identifier | | |
| ☐ DRIC 2.7 | | du_id | 18446744073709552000 | Decentralized unit identifier | | |
| ☐ DRIC 2.8 | | vendor_name | VMware Inc. | Name of the node vendor | | |
| › ☐ DRIC Cluster 7 | | name | e2node_test_1 | Name of the node | | |
| › ☐ DRIC Cluster 8 | | software_version | 1.12.0 | Current software version | | |
| › ☐ DRIC Cluster 9 | | | | | | |

VMware RIC

Dashboard | Applications | System

INSTANCE: DRIC 2.1 ⌄    John Doe ⌄

Applications / xApps / VoNR Traffic Steering
VoNR Traffic Steering  (xApp)

Review Configuration

Please review configuration parameters before applying them.

xapp-configs ⊙

Modules

Search

- generic-key-value-cm
  - ∨ config-container
    - ☐ sdk-configs
    - ☐ xapp-configs

| Attribute | Value | Description |
|---|---|---|
| vonr_arfcn | 151600 | Absolute Radio Frequency channel number for xApp VONR TS |
| vonr_ctrl_req_timeout | 15 | Control Request Timeout in seconds |

⚠ Warning: all existing data will be overwritten. This action cannot be undone.

BACK   APPLY

| VMware RIC | Dashboard | Applications | System | | John Doe ∨ |
|---|---|---|---|---|---|

Applications / xApps / VoNR Traffic Steering

INSTANCE: DRIC 2.1 ∨

VoNR Traffic Steering (xApp)

Algorithm Performance    Connected Cells    Activity Log    Configuration xApp Configuration (Last updated: 13 September 2022 at 16:44:13 GMT-4)    Refresh  ⚙ EDIT  ⟳ REFRESH ⓘ Updating config...

Modules

🔍 Search

∨ 🏠 generic-key-value-cm @
  ∨ ☐ config-container
    ☐ sdk-configs
    ☐ xapp-configs xapp-configs ⊙

| Attribute | Value | Description |
|---|---|---|
| vonr_arfcn | 151600 | Absolute Radio Frequency channel number for xApp VONR TS |
| vonr_ctrl_req_timeout | 15 | Control Request Timeout in seconds |

```
{
    "generic-key-value@2022-11-04": {
        "config-container": {
            "xapp-configs": [
                {
                    "global-id": 41378,
                    "parameters": [
                        {
                            "key_": "vonr_arfcn",
                            "uint32_val_": 151600,
                            "description": "Absolute Radio Frequency channel number for xApp VONR TS"
                        },
                        {
                            "key_": "vonr_ctrl_req_timeout",
                            "uint32_val_": 11,
                            "description": "Control Request Timeout in seconds"
                        }
                    ]
                }
            ]
        }
    }
}
```

*Figure 74*

```
{
    "generic-key-value@2022-11-04": {
        "config-container": {
            "xapp-configs": [
                {
                    "global-id": 1212,
                    "parameters": [
                        {
                            "key_": "max_cells_per_cluster",
                            "uint32_val_": 6,
                            "description": "max cells per cluster for xApp Porto"
                        }
                    ]
                }
            ]
        }
    },
    "vmware-sdk-param@2022-07-23": {
        "config-container": {
            "sdk-configs": [
                {
                    "global-id": 3233,
                    "log-level": "DEBUG"
                }
            ]
        }
    }
}
```

*Figure 75*

```
@startuml skinparam maxMessageSize 400
group Connection Procedure
    SMO -> FCAPS: Netconf connection with required endpoint, user and
password to establish ssh session
    FCAPS -> SMO: ACK by sending capabilities i.e supported YANG models
end group Configuration at a RIC site with syncronous API which is transaction
oriented.

SMO -> FCAPS: SEND Configs XML modeled from yang schema intended for
running store only
    FCAPS -> RIC_components: Validates the configs and configures the
components.
    RIC_components -> FCAPS: ACK
    FCAPS -> SMO: ACK, Success or failure.
end group Disconnect Procedure
    SMO -> FCAPS: Call Disconnect
    FCAPS -> SMO: ACK by terminating the connection
end
@enduml
```

*Figure 81*

```xml
<records mlns="uri:ietf:params:xml:ns:yang:generic-key-value">
    <global-ids>12345</global-ids>
    <global-ids>3233</global-ids>
    <global-ids>55640</global-ids>
    <transaction-id>139849384398</transaction-id>
</records>
<config-container mlns="uri:ietf:params:xml:ns:yang:generic-key-value">
    <sdk-configs>
        <global-id>12345</global-id>
        <parameters>
            <key_>buff_size</key_>
            <uint32_val_>12355</uint32_val_>
            <description>buffer size in bytes</description>
        </parameters>
        <parameters>
            <key_>network_latency</key_>
            <decimal64_val_>12.44</decimal64_val_>
            <description>network latency in ms</description>
        </parameters>
    </sdk-configs>

<sdk-configs>
        <global-id>3233</global-id>
        <parameters>
            <key_>buff_size_min</key_>
            <uint32_val_>1235</uint32_val_>
            <description>buffer size min in bytes</description>
        </parameters>
    </sdk-configs>

<xapp-configs>
        <global-id>3233</global-id>
        <parameters>
            <key_>replay_enabled</key_>
            <bool_val_>false</bool_val_>
            <description>is replay of messages enabled for the
xApp</description>
        </parameters>
        <parameters>
            <key_>config_file_path</key_>
            <string_val_>/etc/config/data.yaml</string_val_>
            <description>Config File path for xApp</description>
        </parameters>
    </xapp-configs>

<e2t-configs>
        <global-id>55640</global-id>
        <parameters>
            <key_>max_reset_counter</key_>
            <uint64_val_>123434354554</uint64_val_>
            <description>Max counter to reset the count</description>
        </parameters>
        <parameters>
            <key_>decay_coeff</key_>
            <decimal64_val_>-23.23</decimal64_val_>
            <description>Coeff multiplier</description>
        </parameters>
```

*Figure 82*  8200

```
<records xmlns="uri:ietf:params:xml:ns:yang:vmware-sdk-param">
    <global-ids>12345</global-ids>
    <global-ids>3233</global-ids>
    <transaction-id>39849384398</transaction-id>
</records>

<config-container xmlns="uri:ietf:params:xml:ns:yang:vmware-sdk-param">
    <sdk-configs>
        <global-id>12345</global-id>
        <log_level>INFO</log_level>
    </sdk-configs>

<sdk-configs>
        <global-id>3233</global-id>
        <log-level>DEBUG</log-level>
    </sdk-configs>
</config-container>
```

```
{
    "name": "",  // This should be unique and will include the revision
date
    "vendor": "",
"version": "",
    "schema": {
        "json": base64(""),  // This will be json.schema from JSONSchema
        "yang": base64("")  // equivalent yang version
    }
}
```
— 8410

```
{
    "uuid": "",  // auto generated
    "name": "",
    "vendor": "",
"created_at": "",
"update_at": "",
"schema": {
    "json": base64(""),  // This will be json.schema from JSONSchema
    "yang": base64("")// equivalent yang version
    }
}
```
— 8415

```
[
    {
            "uuid": "",   // auto generated
            "name": "",
            "vendor": "",
            "schema": {
            "json": base64(""),  // This will be json.schema from
JSONSchema
            "yang": base64("")  // equivalent yang version
        }
    },
    {
            "uuid": "",
            "name": "",
            "vendor": "",
            "schema": {
            "json": base64(""),  // This will be json.schema from
JSONSchema
            "yang": base64("")  // equivalent yang version
        }
    },
]
```
— 8420

```
{
    "uuid": "",  // auto generated
    "name": "",
    "vendor": "",
    "schema": {
    "json": base64(""),  // This will be json.schema from JSONSchema
    "yang": base64("")  // equivalent yang version
    }
}
```
— 8425

*Figure 84*

```
{                                                                    8510
    "global_id": "",
    "name": "",
    "vendor": "",
    "software_version": "",
    "state": "",
    "app_class": "",
    "health_metrics": [],
    "metrics": [],
    "connected_cells": [],
    "supported_schemas": [ // supported_schemas is the the name of
model/schema used without the extension
                "generic-key-value@2022-11-04",
        "vmware-sdk-param@2022-07-23"
        ],
    "generic_key_value": {
        {"key_": "vonr_arfcn", "uint32_val_": 1247577, "description": "arfc
parameter"},
        {"key_": "ctrl_req_timeout", "uint32_val_": 1, "description":
"ctrl_req_timeout parameter"}
        }
}
```

```
{                                                                    8515
    "uuid": "",
    "global_id": "",
    "name": "",
    "vendor": "",
    "app_class": "",
    "dric": {
        "uuid": "",
    }
    "software_version": "",
    "health_metrics": [
        { "name":,
          "metric_type":,
          "source_type":,
          "source_id":,
          "source_vendor":, },
    ],
    "metrics": [
        { "name":,
          "metric_type":,
          "source_type"",
          "source_id":, "source_vendor":, },
    ],
    "connected_cells": [],
    "created_at": "",
    "last_updated": "",
    "supported_schemas": [
                "generic-key-value@2022-11-04",
        "vmware-sdk-param@2022-07-23"
        ],
    "generic_key_value": {
        {"key_": "vonr_arfcn", "uint32_val_": 1247577, "description": "arfc
parameter"},
        {"key_": "ctrl_req_timeout", "uint32_val_": 1, "description":
"ctrl_req_timeout parameter"}
        }
}
```

*Figure 85*

```
http_header:
    'Content-Type: multipart/form-data'
"file": @config_file
```
8610

```
{
    "config": <JSON data mentioned in below link for xApp which is modelled
after the schema>,
    "status": PENDING/PROCESSING/SUCCESS/FAILED
    "created_at":
    "last_updated":
    "status_message":
}
```
8615

```
{
    "config": <JSON data mentioned in below link for xApp which is modelled
after the schema>,
    "status": PENDING/PROCESSING/SUCCESS/FAILED
    "created_at":
    "last_updated":
    "status_message":
}
```
8620

```
http_header:
    'Content-Type: multipart/form-data'
"file": @config_file
```
8625

```
{
    "config": <JSON data mentioned in below link for xApp which is modelled
after the schema>,
    "status": PENDING/PROCESSING/SUCCESS/FAILED
    "created_at":
    "last_updated":
    "status_message":
}
```
8630

```
{
    "status": PENDING/PROCESSING/SUCCESS/FAILED
}
```
8635

*Figure 86*

```
typedef enum _s2x_config_operation_s {
        S2X_CONFIG_OPERATION_INVALID = 0x00,
    S2X_CONFIG_OPERATION_ADD,
        S2X_CONFIG_OPERATION_MODIFY,
        S2X_CONFIG_OPERATION_DELETE,
        S2X_CONFIG_OPERATION_MAX
} s2x_config_operation_e;

typedef struct _s2x_generic_keyvalue_config_s {
        union {
                uint32_t   uint32_val;
        uint64_t   uint64_val;
        int32_t    int32_val;
        int64_t    int64_val;
        float      float_val;
        double     double_val;
        bool       bool_val;
        char       *string_val;
        } value;
        char                           *key;
        char                           *description;
        s2x_config_operation_e    op_type;
} s2x_generic_keyvalue_config_t;

typedef struct _s2x_config_update_s {
        s2x_generic_keyvalue_config_t    *keyvalue_list;
        uint32_t                         keyvalue_list_cnt;
        uint32_t                         transaction_id;
} s2x_config_update_t;

typedef enum _s2x_config_update_result_s {
        S2X_CONFIG_UPDATE_RESULT_INVALID = 0x00,
        S2X_CONFIG_UPDATE_RESULT_SUCCESSFUL,
        S2X_CONFIG_UPDATE_RESULT_FAILURE_KEY_UNKNOWN,
        S2X_CONFIG_UPDATE_RESULT_FAILURE_VALUE_INCOMPATIBLE,
        S2X_CONFIG_UPDATE_RESULT_FAILURE_UNKNOWN,
        S2X_CONFIG_UPDATE_RESULT_MAX
} s2x_config_update_result_e;

typedef struct _s2x_config_update_response_s {
        s2x_config_update_result_e    *result_list;
        uint32_t                      result_list_cnt;
        uint32_t                      transaction_id;
} s2x_config_update_response_t;
```

*Figure 87*

```
@startuml skinparam maxMessageSize 400 group RMS upgrade: bootstrap schemas (new/updates)
    group New schemas (vmware_sdk_cm@2020-02-03)
        RMS_bootstrapper -> RMS_API: Add new schema.
        RMS_API -> Arango_DB: Make an entry in the DB for new schema.
    end
    group Upgrade existing schema by using versioning (vmware_sdk_cm@2020-02-
03) to (vmware_sdk_cm@2022-06-09)
        RMS_bootstrapper -> RMS_API: Onboard as new schema with name field
containing the version date. Do not delete the older version to maintain
compatibility with RICs running older version.
        RMS_API -> Arango_DB:  Make an entry in the DB for
vmware_sdk_cm@2022-06-09.
    end
end group RIC Upgrade [rollout]
    FCAPS -> FCAPS: Clear sysrepo Datastore and load new modules/ upgrade
modules corresponding to new schemas.
    LCM -> RMS_API: Reregister RIC but now with upgrade flag enabled.
    RMS_API -> RMS_CM: Invoke the dynamic configuration workflow. Invoke
translate(migration) DB to convert existing config data to format/structure
mentioned in the new version of schema. Thus removing older config data.
    RMS_CM -> FCAPS: Push new configs modeled using new schema
    FCAPS -> RIC_COMPONENTS: Propogate the configs
    RMS_CM -> Arango_DB: Modified configs are saved in the DB.
end @enduml
```

*Figure 91*

DYNAMICALLY UPDATING RAN APPLICATIONS IN A RAN SYSTEM

BACKGROUND

In telecommunications networks, the Radio Access Network (RAN) performs more and more functions with each iteration of the telecommunications standards. That is, in order to enable the advantages of 5G over previous standards, the 5G RAN performs various additional functions. These RAN functions are situated between user devices and the core network and are thus often performed at the base stations (e.g., cell towers) where computing power can be limited. Additionally, static provisioning is used for configuration management of managed elements during deployment. Current dRIC use cases include adding E2 nodes and xApps in allow lists of E2T control (dric-control), as well as tweaking payload size, periodicity, etc. parameters for xApps. Such solutions, however, are not scalable and adding new entries require component-level restarts. Accordingly, such solutions can be good for a proof of concept, but are not useful in production. Moreover, an operator might want to tweak certain parameters depending on the site. Hence, RICs lack the capability of configuring parameters during run time.

BRIEF SUMMARY

Some embodiments of the invention provide a method for providing automated admission control services for a RAN (Radio Access Network) system. The method is performed, in some embodiments, by a configuration management pod that is deployed as part of a RIC management system (RMS) that manages one or more RICs (e.g., cRICs and dRICs) deployed in the RAN system. The method receives a notification (e.g., a message) that includes an application identifier for a particular application, a dRIC (distributed RAN intelligent controller) identifier associated with a particular dRIC to which the particular application is to be deployed, and a set of configurations for the particular application that are in a first format.

The method converts the set of configurations from the first format to a second format and sends the set configurations in the second format to an FCAPS (fault, configuration, accounting, performance, and security) management pod deployed to the particular dRIC. Upon receiving positive acknowledgment indicating successful implementation of the set of configurations from the FCAPS management pod, updating a configuration table stored in a database of the RAN with a set of admissions control information for the particular application. The method then sends a notification to an API server for the RAN indicating the set of configurations have been successfully implemented for the particular application.

In some embodiments, the first format is JSON and the second format is XML. Configurations for applications are accepted in a JSON format, in some embodiments, because JSON is easy to operate and understand for users of various skill levels, while XML is more verbose and can be more difficult to understand for such users. Additionally, JSON is easier to review by, e.g., a network operator. The JSON configurations are converted to a format of telephony-based standards body communications (e.g., XML) before forwarding to the dRIC, in some embodiments.

The notification, in some embodiments, is received from the API server. The API server and the database that stores configurations are also deployed with the configuration management pod as part of the RMS, according to some embodiments. In some embodiments, the RMS also includes an RMS UI through which new and/or updated configurations can be received. The RMS API server also accepts configurations, in some embodiments. As mentioned above, the RMS of some embodiments manages multiple RICs including both cRICs and dRICs.

Each of the RICs managed by the RMS includes a respective FCAPS management pod, in some embodiments. When an FCAPS management pod receives a set of configurations for an application, the FCAPS management pod validates the request against an admission control schema that is in a third format (e.g., Yang), and sends the set of configurations to a datapath pod that interfaces with one or more application pods that each execute one or more applications.

When the FCAPS management pod receives an acknowledgement (e.g., a positive acknowledgement indicating the configurations have been accepted, or a negative acknowledgement indicating the configurations have been rejected) from the datapath pod, the FCAPS management pod sends the acknowledgement back to the configuration management pod of the RMS. When the configuration management pod receives a negative acknowledgement (i.e., when the configurations are rejected), the configuration management pod does not save the configurations in the database, and sends the negative acknowledgement to the API server, according to some embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 1 illustrates an example of O-RAN architecture according to some embodiments.

FIG. 29 illustrates a basic skeleton of code of some embodiments for implementing a sequence of operations and interactions between the sysrepo watcher thread and the provisioning gRPC service thread.

FIG. 32 illustrates an example of a portion of code (i.e., dric-admission-control@2022-03-03.yang) of the Yang module that describes data type and structure and is used for dRIC admission control in some embodiments.

FIG. 33 illustrates an example of the XML-encoded format (i.e., dric-admission-control@2022-03-03.xml) of some embodiments.

FIG. 34 illustrates an example of an admission control use case of some embodiments.

FIG. 35 illustrates a procedure used by a client in some embodiments to call the above RPC with a request containing an enum (i.e., enumerator).

FIG. 40 illustrates an example of the code used in some embodiments for the proto schema.

FIG. 41 illustrates an example of this algorithm in some embodiments.

FIG. 42 illustrates an example of gRPC worker thread logic of some embodiments.

FIG. 46 illustrates an example of the code used in some embodiments to perform the provisioning sequence.

FIG. 47 illustrates an example a UI in some embodiments through which an API
endpoint is exposed.

FIG. 56 illustrates an example of an XML configuration file of some embodiments.

FIG. 58 illustrates an example of a portion of a generic-key-value Yang schema of some embodiments.

FIG. 59 illustrates an example of a VMware SDK parameter Yang schema of some embodiments.

FIG. 60 illustrates an example of a portion of the generic key-value CM JSON schema of some embodiments.

FIG. 61 illustrates an example of a portion of the VMware SDK parameter JSON schema of some embodiments.

FIG. 62 illustrates an example of a portion of the dRIC admission control JSON schema of some embodiments.

FIG. 63 illustrates an example of code used on the FCAPS side of some embodiments.

FIG. 64 illustrates a first example UI display of some embodiments presenting information associated with a selected xApp configuration.

FIG. 65 illustrates a second example UI display of some embodiments presenting information associated with an xApp provisioned by a selected dRIC.

FIG. 66 illustrates a third example UI display of some embodiments presenting a global identifier associated with the xApp provisioned by the selected dRIC of FIG. 65.

FIG. 67 illustrates a fourth example UI display of some embodiments presenting information associated with an E2 node provisioned by a selected dRIC.

FIG. 68 illustrates a fifth example UI display of some embodiments presenting selectable UI items for importing and exporting configuration data associated with the E2 node provisioned by the selected dRIC.

FIG. 71 illustrates an eighth example UI display of some embodiments that includes a pop-up window for reviewing a configuration after a user has successfully uploaded the configuration.

FIG. 72 illustrates a ninth example UI display of some embodiments that includes an error message in the pop-up window for reviewing the configuration after a user has selected to apply the configuration.

FIG. 73 illustrates a tenth example UI display of some embodiments that includes a notice indicating a configuration for a selected xApp is being updated.

FIG. 74 illustrates an example of a JSON xApp VONR (voice over new radio) configuration file, in some embodiments.

FIG. 75 illustrates an example of a JSON xApp Porto configuration file of some embodiments.

FIG. 81 illustrates an example of UML sequence code of some embodiments that corresponds to the workflow.

FIG. 82 illustrates an example of a generic key-value XML configuration in some embodiments using a Yang module.

FIG. 83 illustrates an example of an sdk-param XML configuration using a Yan module, in some embodiments.

FIG. 84 illustrates examples of requests and responses using the above APIs, in some embodiments.

FIG. 85 illustrates examples of requests and responses associated with these xApp registration APIs, in some embodiments.

FIG. 86 illustrates examples of requests and responses associated with these APIs, in some embodiments.

FIG. 87 illustrates an example of SDK APIs that are exposed to developers, in some embodiments.

FIG. 91 illustrates an example of code for a UML sequence corresponding to the workflow, in some embodiments FIG. 92 conceptually illustrates an electronic system with which some embodiments of the invention are implemented.

DETAILED DESCRIPTION

Figure 2:
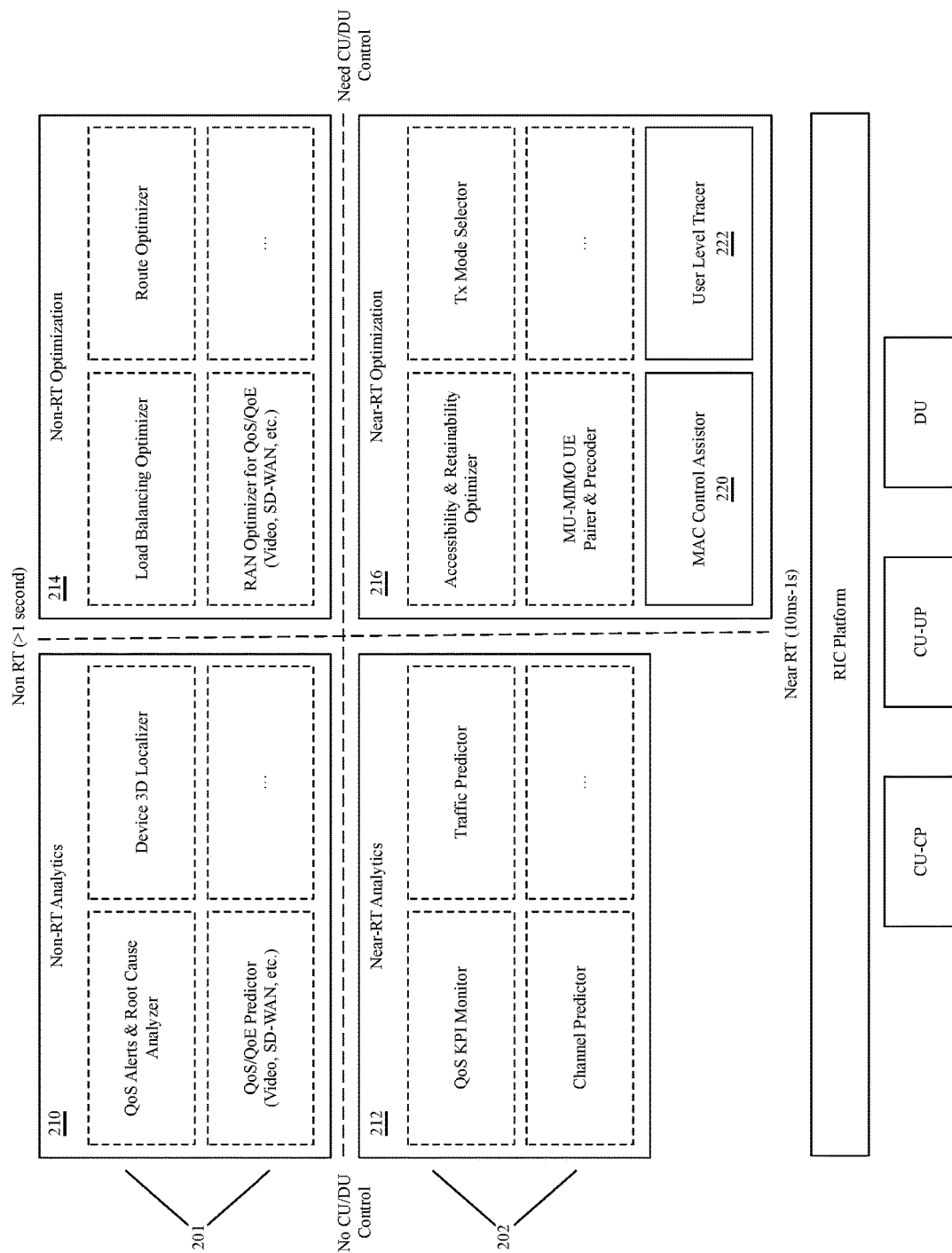
FIG. 2 illustrates an in-depth view of the components of both a non-real-time RIC and a near real-time RIC according to some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for providing automated admission control services for a RAN (Radio Access Network) system. The method is performed, in some embodiments, by a configuration management pod that is deployed as part of a RIC management system (RMS) that manages multiple RICs (e.g., cRICs and dRICs) deployed in the RAN system. The method receives a notification (e.g., a message) that includes an application identifier for a particular application, a dRIC (distributed RAN intelligent controller) identifier associated with a particular dRIC to which the particular application is to be deployed, and a set of configurations for the particular application that are in a first format.

The method converts the set of configurations from the first format to a second format and sends the set configurations in the second format to an FCAPS (fault, configuration, accounting, performance, and security) management pod deployed to the particular dRIC. Upon receiving positive acknowledgment indicating successful implementation of the set of configurations from the FCAPS management pod, updating a configuration table stored in a database of the RAN with a set of admissions control information for the particular application. The method then sends a notification to an API server for the RAN indicating the set of configurations have been successfully implemented for the particular application.

In some embodiments, the first format is JSON and the second format is XML. Configurations for applications are accepted in a JSON format, in some embodiments, because JSON is easy to operate and understand for users of various skill levels, while XML is more verbose and can be more difficult to understand for such users. The JSON configurations are converted to a format of telephony-based standards body communications (e.g., XML) before forwarding to the dRIC, in some embodiments.

The notification (e.g., message), in some embodiments, is received from the API server. The API server and the database that stores configurations are also deployed with the configuration management pod as part of the RMS, according to some embodiments. In some embodiments, the RMS also includes an RMS UI through which new and/or updated configurations can be received. The RMS API server also accepts configurations, in some embodiments. As mentioned above, the RMS of some embodiments manages multiple RICs including both cRICs and dRICs.

Each of the RICs managed by the RMS includes a respective FCAPS management pod, in some embodiments. When an FCAPS management pod receives a set of configurations for an application, the FCAPS management pod validates the request against an admission control schema that is in a third format (e.g., Yang), and sends the set of configurations to a datapath pod that interfaces with one or more application pods that each execute one or more applications.

When the FCAPS management pod receives an acknowledgement (e.g., a positive acknowledgement indicating the configurations have been accepted, or a negative acknowledgement indicating the configurations have been rejected) from the datapath pod, the FCAPS management pod sends the acknowledgement back to the configuration management pod of the RMS. When the configuration management pod receives a negative acknowledgement (i.e., when the configurations are rejected), the configuration management pod does not save the configurations in the database, and sends the negative acknowledgement to the API server, according to some embodiments.

Today, there is a push to have the Radio Access Network (RAN) of a telecommunication network (e.g., a cellular network) implemented as O-RAN, a standard for allowing interoperability for RAN elements and interfaces. FIG. 1 illustrates an example of O-RAN architecture 100, according to some embodiments. The O-RAN architecture 100 includes a service management and orchestration framework (SMO) 110 with a non-real-time RIC 105, a near real-time RAN intelligent controller (RIC) 115, open control plane central unit (O-CU-CP) 120, open user plane central unit (O-CU-UP) 125, open distributed unit (O-DU) 130, open radio unit (O-RU) 135, and the O-Cloud 140. The O-CU-CP 120, the O-CU-UP 125, and the O-DU 130 may be collectively referred to as the managed functions 120-130 below.

As defined in the standard, the SMO 110 in some embodiments includes an integration fabric that allows the SMO to connect to and manage the RIC 115, the managed functions 120-130, and the O-Cloud 140 via the open interfaces 150. Unlike these elements, the O-RU 135 is not managed by the SMO 110, and is instead managed by the O-DU 130, as indicated by the dashed line 160, in some embodiments. In some embodiments, the O-RU 135 processes and sends radio frequencies to the O-DU 130.

In some embodiments, the managed functions 120-130 are logical nodes that each host a set of protocols. According to the O-RAN standard, for example, the O-CU-CP 120, in some embodiments, include protocols such as radio resource control (RRC) and the control plane portion of packet data convergence protocol (PDCP), while the O-CU-UP 125 includes protocols such as service data adaptation protocol (SDAP), and the user plane portion of packet data convergence protocol (PDCP).

The two RICs are each adapted to specific control loop and latency requirements. The near real-time RIC 115 provides programmatic control of open centralized units (O-CUs) and open distributed units (O-DUs) on time cycles of 10 ms to 1 second. The non-real-time RIC (non-RT RIC) 105, on the other hand, provides higher layer policies that can be implemented in the RAN either via the near-RT RIC or via a direct connection to RAN nodes. The non-RT RIC is used for control loops of more than 1 second. Each RIC 105 or 115 serves as a platform on which RAN control applications execute. These applications can be developed by third-party suppliers that are different from the RIC vendors. These applications are referred to as "xApps" (for the near-RT RIC 115) and "rApps" (for the non-RT RIC). In some embodiments, these applications are referred to more generally as RAN applications.

The near real-time RIC 115, in some embodiments, is a logical aggregation of several functions that use data collection and communications over the interfaces 155 in order to control the managed functions 120-130. In some embodiments, the non-real-time RIC 105 uses machine learning and model training in order to manage and optimize the managed functions 120-130. The near RT RIC in some of these embodiments also uses machine learning.

In some embodiments, the O-Cloud 140 is responsible for creating and hosting virtual network functions (VNFs) for use by the RIC 115 and the managed functions 120-130. In some embodiments, the DU is in charge of per-slot decisions of user scheduling and includes RAN scheduler that performs MAC control assistance and user-level tracing. In order to increase computing power available in the cloud (i.e., compared to base stations that typically execute the RAN functions), the RIC is implemented in one or more public and/or private cloud datacenters and implements an improved cloudified RAN scheduler in the cloud, thereby offloading these MAC control assistance and user-level tracing functions from the DU to the RIC. The interfaces 155 in some embodiments enable the RAN to provide inputs to the functions at the RIC, and, at least in some embodiments, receive outputs that have been computed by these functions at the RIC.

FIG. 2 illustrates an in-depth view of the components of both a non-real-time RIC 201 and a near real-time RIC 202. Each of the RICs 201 and 202 includes a respective set of analytics functions 210 and 212, and a respective set of optimization functions 214 and 216, which are each illustrated with dashed lines to indicate they are existing components. In addition to these existing components, the near real-time optimization functions 216 includes two new components, the MAC control assistor 220 and user-level tracer 222, illustrated with solid lines to visually differentiate them from the existing components. In some embodiments, these components are part of a larger MIMO component (e.g., along with the MU-MIMO UE pairer and precoder).

In some embodiments, the MAC control assistor 220 can include various functions such as (1) User Equipment (UE)-specific beamforming weight calculation based on UL SRS channel signal reception, (2) UE Radio Frequency (RF)

condition prediction, and (3) Multi-User, Multiple Input, Multiple Output (MU-MIMO) pairing suggestion for the MAC scheduler based on the UE-specific beams. For each of these functions, some embodiments expose a report interface (that provides input data for the function to the RIC from the DU) and a control interface (that provides output data for the function to the DU from the RIC).

The user-level tracer 222, in some embodiments, produces L1/L2/L3 level information related to user configuration and traffic performance. This tracing data can be used as inputs to various control algorithms, including the MAC scheduler, parameter setting, etc. The user-level tracer 222 can include tracing operations that can (i) track user behavior in a cell, (ii) track user RF condition, (iii) track user data traffic performance in different layers (MAC, Radio Link Control (RLC), Packet Data Convergence Protocol (PDCP)), and (iv) track user RF resource consumption.

Figure 3:
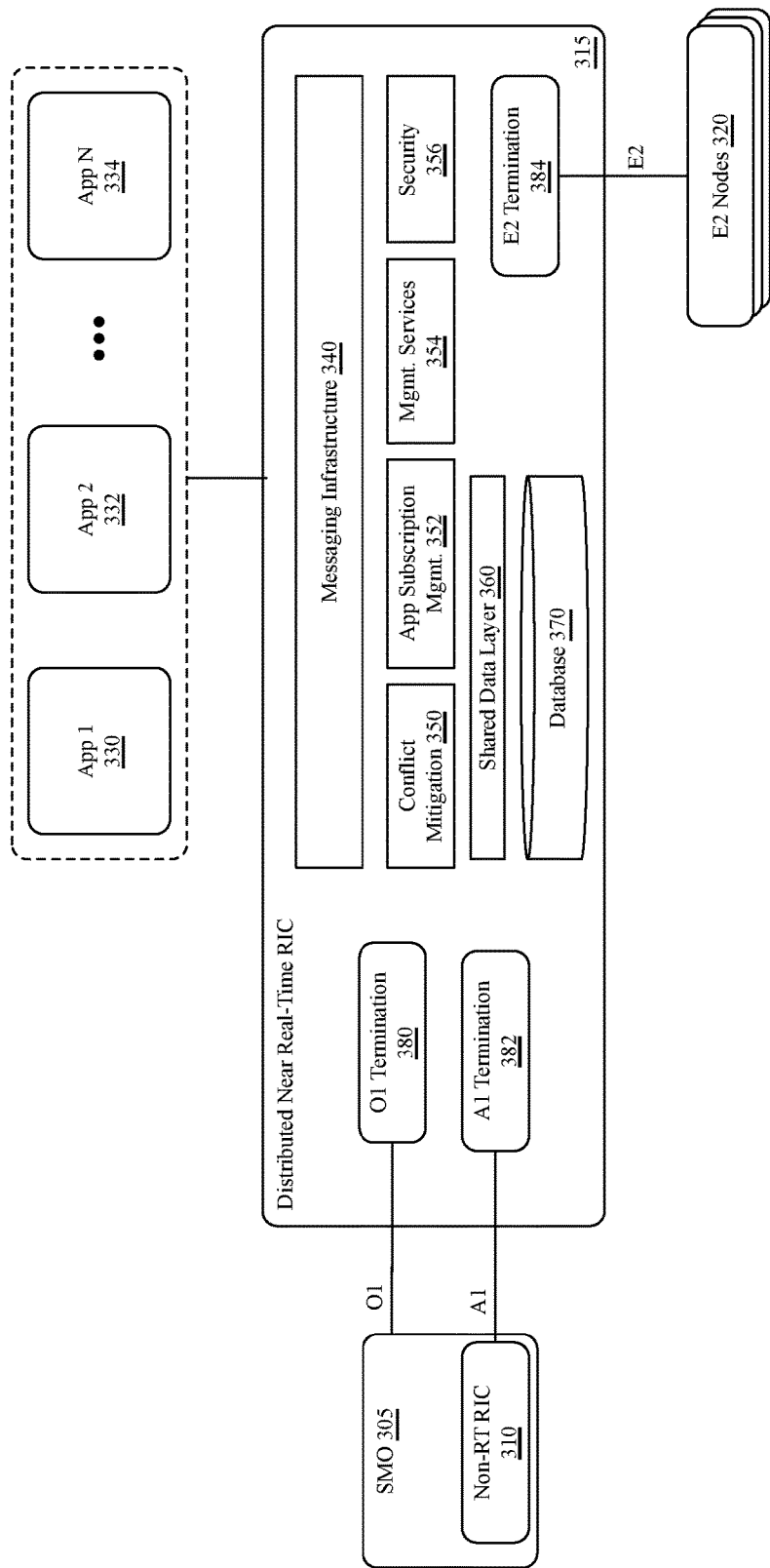
FIG. 3 illustrates another view of the O-RAN architecture of some embodiments, with a more in-depth view of the near real-time RIC.

FIG. 3 illustrates another view of the O-RAN architecture of some embodiments, with a more in-depth view of the near real-time RIC. The architecture 300 includes an SMO 305 with a non-real-time RIC 310, a distributed near real-time RIC 315, and E2 nodes 320 (e.g., O-DU and/or O-CU nodes). The distributed near real-time RIC 315 includes messaging infrastructure 340, a set of services (e.g., 350, 352, 354, and 356), a shared data layer 360, a database 370, and a set of termination interfaces (e.g., 380, 382, and 384). As shown, a set of embedded apps (e.g., 330, 332, and 334) uses this distributed near RT RIC. As further described below, the distributed near RT RIC 315 is implemented by multiple RICs executing on multiple host computers in some embodiments.

As shown, the set of services include conflict mitigation services 350, app subscription management services 352, management services 354, and security services 356. Additionally, the set of termination interfaces include O1 termination interface 380 connecting the SMO to the near real-time RIC, A1 termination interface 382 connecting the non-real-time RIC to the near real-time RIC, and E2 termination interface 384 connecting the E2 nodes to the near real-time RIC. Each of the apps, in some embodiments, is representative of the various functions of the RIC that use data sent from the E2 nodes 320.

In some embodiments, the objective of the framework 300 is to offload near real-time functions that are computation-intensive and provide results back to the O-DU (e.g., via the E2 interface with E2 nodes 320). The results, in some embodiments, can be used to assist or enhance the real-time decision in the MAC layer. Three example use-cases for the MAC control assistance framework, each example specific to a different component of the MAC control assistor (e.g., the UE-specific BFWC, the UE RF condition predictor, and the MU-MIMO pairing suggestor), and one use-case example for the user-level tracer, will be described below.

The first example use-case is specific to the UE-specific beamforming weight calculation based on UL SRS signal reception component of the MAC control assistance framework. In some embodiments of this use-case, the input metrics can include multiple options based on UL SRS, such as raw SRS received data, and an SRS channel responses matrix from a channel estimate.

The algorithm for producing output metrics, in some embodiments, evaluates the optimal beam-forming weights to reach the user. Some embodiments use traditional signal processing algorithms that are based on channel models. Alternatively, or conjunctively, machine-learning based algorithms that utilize raw data inputs are used, which require feedback from the DU in the E2 nodes 320.

In some embodiments, the output metrics resulting from the algorithm include a beam-form weight (BFW) matrix for the user. In some embodiments, the BFW could also be mapped to a beam index from a pre-designed beam set. The DU in some embodiments uses the matrix to control the MIMO antenna array gain/phasing in the RU (e.g., the O-RU 135 in the architecture 100) for user data transmission and reception.

The second use-case example is specific to the UE RF condition predictor component of the MAC control assistance framework. For this second use-case, the input metrics include at least a channel report from the UE, such as Wideband or Subband CQI/PMI/RI for DL, or SRS for UL, according to some embodiments. The input metrics of some embodiments can also opt to include supportive information such as UE distance, UE positioning, etc.

In some embodiments, the app algorithm for this second use-case is meant to predict the UE's RF condition based on the observation. Some embodiments utilize traditional signal processing algorithms based on channel and mobility models. Alternatively, or conjunctively, some embodiments also use machine learning based algorithms using data inputs and potentially other factors, such as site layout (which requires feedback from the DU).

The output metrics for this use-case, in some embodiments, include the predicted channel condition of the user for the next scheduling window, as well as predicted downlink and uplink SINR, a precoding matrix (e.g., if applicable), and SU-MIMO layers. In some embodiments, these output metrics are used by the DU for the user link adaptation on PDCCH/PDSCH/PUSCH transmissions.

The third use-case example is specific to the MU-MIMO pairing suggestor to MAC scheduler component. The input metrics for this example use case, in some embodiments, include at least the UE-specific BFW matrix and the UE RF condition estimate. Some embodiments may also include supportive metrics such as user data demand, etc., as input metrics in addition to the UE-specific BFW matrix and the UE RF condition estimate.

The app algorithm for this use-case, in some embodiments, is meant to identify users that can be paired for MU-MIMO operations. For example, some embodiments of the third use-case use traditional signal processing algorithms based on information theory and cross-channel covariance evaluation. Alternatively, or conjunctively, some embodiments use machine learning based algorithms using the data inputs, which again requires feedback from the DU.

In some embodiments, the output metrics of this third use-case can include UE pairing suggestions and an impact assessment on SINR and SU-MIMO layers. Additionally, the DU in some embodiments uses the output metrics to select users for RF scheduling, and to determine the transmission efficiencies.

An example use-case for the user-level tracer can include QoS scheduling optimization with the goal of adjusting a user's scheduling priority for an RF resource to optimize the service quality. The input for some embodiments of this use-case can include a service quality target from a user subscription. In some embodiments, the user-level tracing includes (1) tracking the user RF condition, (2) tracking the user data traffic performance in different layers (e.g., MAC/RLC/PDCP), and (3) tracking the user RF resource consumption.

In some embodiments, the app algorithm is based on the QoS target and observed user traffic performance, and can be used to determine that a user's resource allocation is insufficient. The algorithm format, in some embodiments, can be logic-based or machine learning-based. In some embodiments, the output can include a recommendation issued to the MAC scheduler to adjust the traffic priority or link adaptation in order to improve performance.

On each machine (e.g., each VM or Pod) that executes a control plane application, some embodiments configure a RIC SDK to serve as an interface between the control plane application on the machine and a set of one or more elements of the RAN. In some embodiments, the RIC SDK provides a set of connectivity APIs (e.g., a framework) through which applications can communicate with the distributed near real-time (RT) RIC implemented by two or more near real-time RICs. Examples of such applications include xApps, and other control plane and edge applications in some embodiments. In O-RAN, xApps perform control plane, monitoring and data processing operations. The discussion below regarding FIGS. 4 and 6-H refers to control plane applications (e.g., 415, 615, 620, 715, 720, etc.). These control plane applications are xApps in an O-RAN system in some embodiments.

Figure 4:
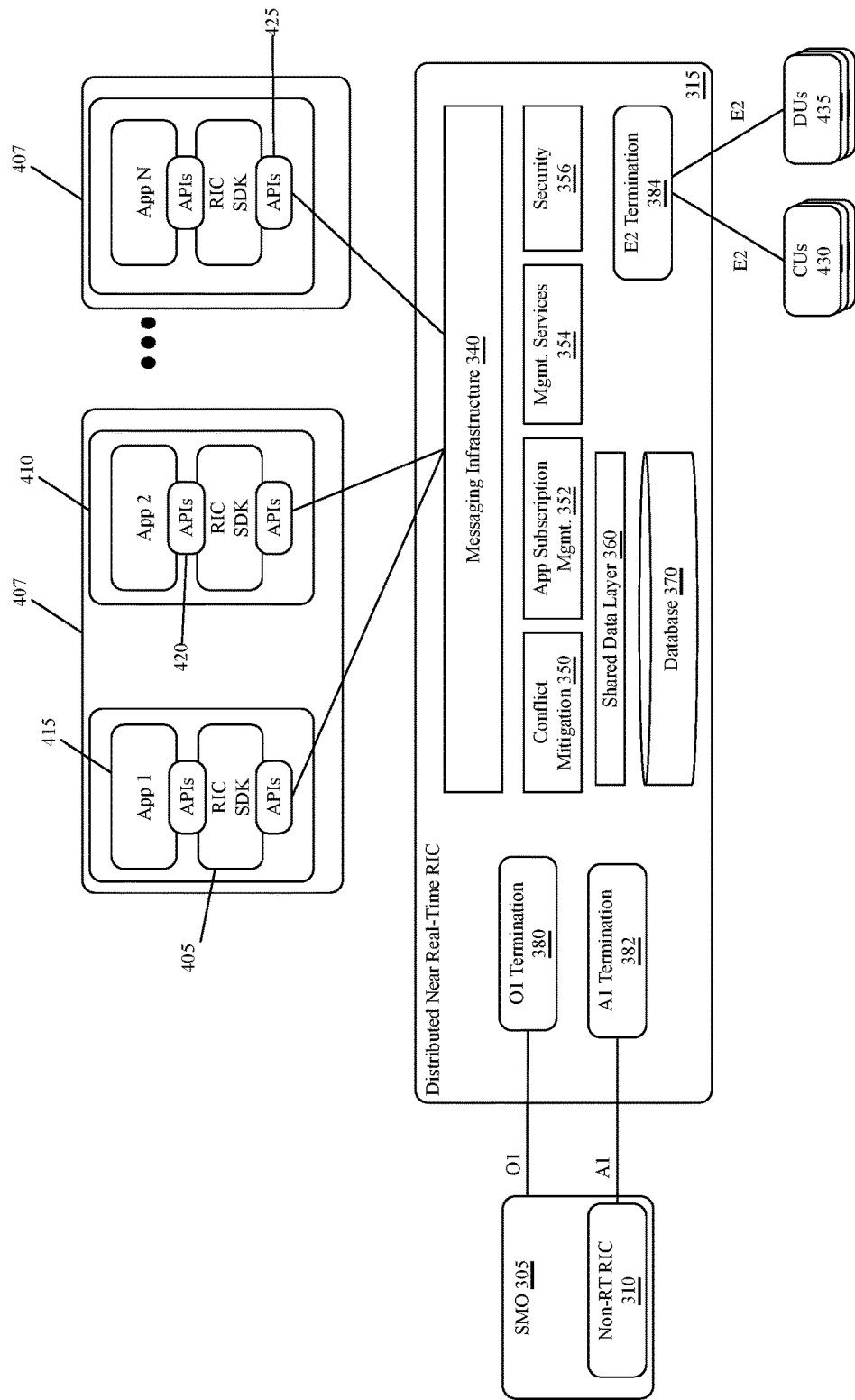
FIG. 4 illustrates deployment of RIC SDKs on machines that execute control plane applications in some embodiments.

FIG. 4 illustrates deployment of RIC SDKs 405 on machines 410 that execute control plane applications 415 in some embodiments. As shown, one or more machines 410 execute on each of several host computers 407 in one or more datacenters. In some embodiments, the RIC SDK 405 on each machine 410 includes a set of network connectivity processes that establish network connections to the set of RAN elements (e.g., E2 nodes 320, shared data layer 360, management services 354, SMO 305, etc.) for the control plane application. The RIC SDK processes allow the control plane application on their machine to forego performing network connectivity operations. In some embodiments, the set of network connectivity processes of each RIC SDK of each machine establishes and maintains network connections between the machine and the set of RAN elements used by the control plane application of the machine, and handles data packet transport to and from the set of RAN elements for the control plane application.

The control plane application on each machine communicates with the set of RAN elements through high-level APIs 420 that the RIC SDK converts into low-level APIs 425. In some embodiments, at least a subset of the low-level API calls 425 are specified by a standard specifying body. Also, in some embodiments, the high-level APIs 420 are made in a high-level programming language (e.g., C++), while the low-level API calls comprise low-level calls that establish and maintain network connections and pass data packets through these connections.

The set of RAN elements that the RIC SDK connects with the control plane application on its machine in some embodiments include RAN elements that are produced and/or developed by different RAN vendors and/or developers. These RAN elements include CUs 430 and DUs 435 of the RAN in some embodiments. Also, this SDK communicates with the CUs and DUs through the low-level, standard-specified E2 interface, while the control plane application on the machine uses high-level API calls to communicate with the CUs and DUs through the RIC SDK. In some embodiments, the high-level API calls specifying E2 interface operations at a high-level application layer that do not include low-level transport or network operations.

Figure 5:
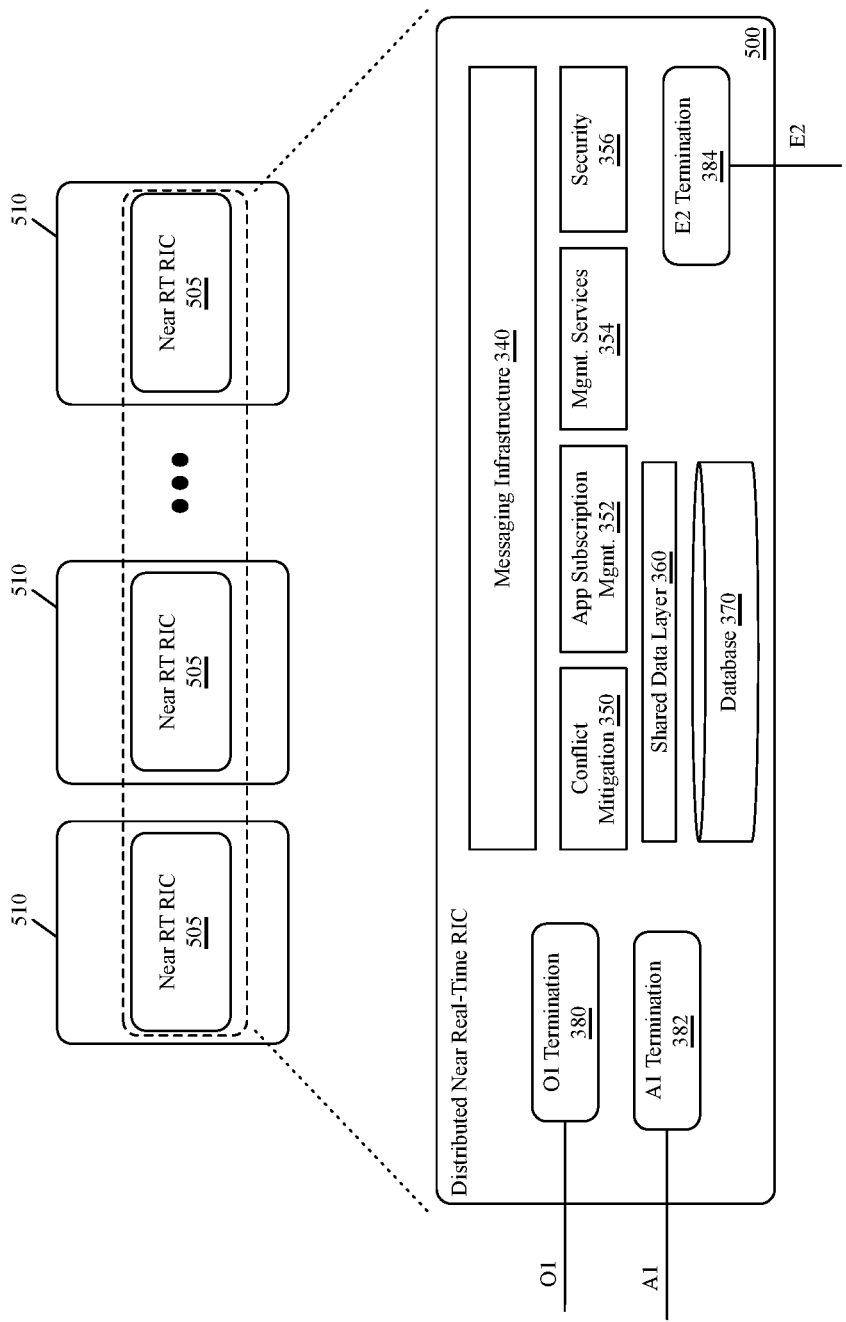
FIG. 5 illustrates that some embodiments deploy several RICs to execute on several host computers to implement a distributed near RT RIC that includes the RIC components illustrated in FIGS. 3 and 4.

Conjunctively, or alternatively, the set of RAN elements that the RIC SDK connects with the control plane application 415 on its machine 410 include network elements of the RIC. Again, these network elements in some embodiments include RAN elements that are produced and/or developed by different RAN vendors and/or developers. These RIC elements in some embodiments include shared data layer (SDL) 360, datapath input/output (I/O) elements, and application and management services 352 and 354 in some embodiments. FIG. 5 illustrates that some embodiments deploy several near RT RICs 505 to execute on several host computers to implement a distributed near RT RIC 500 that includes the RIC components illustrated in FIGS. 3 and 4. In some embodiments, one RIC 505 executes on each host computer that also executes a control plane application 415. In other embodiments, a control plane application 415 can execute on a host computer that does not execute a RIC. For instance, in some embodiments, one or more control plane applications execute on one or more host computers that have graphics processing units (GPUs), while RICs do not execute on such host computers as they do not need the processing power of the GPUs.

Through the distributed near RT RIC, the RIC SDK also connects its control plane application to other control plane applications executing on other machines. In other words, the RIC SDK and the distributed near RT RIC in some embodiments serve as communication interface between the control plane applications. In some embodiments, the different control plane applications are developed by different application developers that use the common set of RIC APIs to communicate with each other through the distributed near RT RIC. In some of these embodiments, the distributed near RT RIC adds one or more parameters to the API calls as it forwards the API calls from one control application to the other control application.

Figure 6:
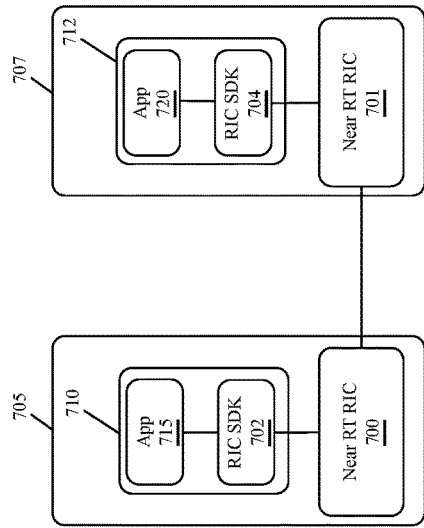
FIG. 6 illustrates a RIC that executes on one host computer along with two machines on which two control plane applications execute.

FIGS. 6-9 illustrate several examples of RIC architectures in which the RIC SDK and the distributed near RT RIC establish the communication interface between control plane applications. These architectures are mutually exclusive in some embodiments, while in other embodiments two or more of these architectures are used conjunctively. FIG. 6 illustrates a RIC 600 that executes on one host computer 605 along with two machines 610 and 612 on which two control plane applications 615 and 620 execute. Through the RIC SDKs 602 and 604 executing on the machines 610 and 612, the RIC 600 receives API calls from the CP application 615 and forwards the API calls to the CP application 620, and passes responses to these API calls from the second CP application 620 to the first CP application 615. It also passes API calls from the second CP application 620 to the first CP application 615, and responses from the first CP application 615 to the second CP application 620.

Figure 7:
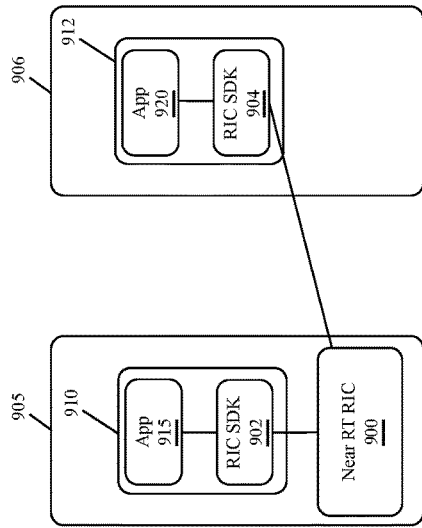
FIG. 7 illustrates two RICs that execute on two host computer along with two machines on which two control plane applications and two RIC SDKs execute.

FIG. 7 illustrates two RICs 700 and 701 that execute on two host computer 705 and 707 along with two machines 710 and 712 on which two control plane applications 715 and 720 and two RIC SDKs 702 and 704 execute. As shown, API calls from the first CP application 715 to the second CP application 720 are forwarded through the first RIC SDK 702, the first RIC 700, the second RIC 701 and the second RIC SDK 704. The second CP application's responses to these API calls to the first CP application 715 traverse the reverse path, from the second RIC SDK 704, the second RIC 701, the first RIC 700, and the first RIC SDK 702.

The API calls from second CP application 720 to the first CP application 715 are forwarded through the second RIC SDK 704, the second RIC 701, the first RIC 700, and the first RIC SDK 702, while responses to these API calls from the first CP application 715 to the second CP application 720 are forwarded through the first RIC SDK 702, the first RIC 700, the second RIC 701 and the second RIC SDK 704.

Figure 8:
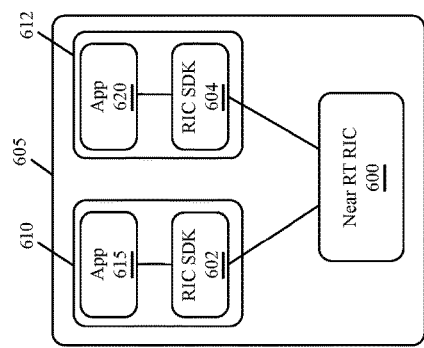
FIG. 8 illustrates a RIC that executes on a first host computer to connect two control plane applications that execute on two machines operating on two other host computers.

FIG. 8 illustrates a RIC 800 that executes on first host computer 805 to connect two control plane applications 815 and 820 that execute on two machines 810 and 812 operating on two other host computers 806 and 807. Through the RIC SDKs 802 and 804 executing on the machines 810 and 812, the RIC 800 receives API calls from the CP application 815 and forwards the API calls to the CP application 820, and passes responses to these API calls from the second CP application 820 to the first CP application 815. It also passes API calls from the second CP application 820 to the first CP application 815, and responses from the first CP application 815 to the second CP application 820.

Figure 9:
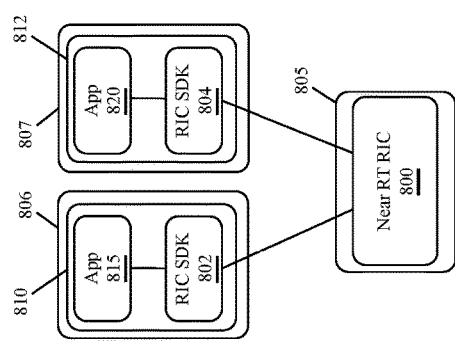
FIG. 9 illustrates a RIC that executes on a first host computer to connect two control plane applications that execute on two machines, one of which operates on the first host computer while the other operates on another host computer.

FIG. 9 illustrates a RIC 900 that executes on first host computer 905 to connect two control plane applications 915 and 920 that execute on two machines 910 and 912 one of which operates on host computer 905 while the other operates on host computer 906. Through the RIC SDKs 902 and 904 executing on the machines 910 and 912, the RIC 900 receives API calls from the CP application 915 and forwards the API calls to the CP application 920, and passes responses to these API calls from the second CP application 920 to the first CP application 915. Through these SDKs 902 and 904, the RIC 900 also passes API calls from the second CP application 920 to the first CP application 915, and responses from the first CP application 915 to the second CP application 920.

Figure 10:
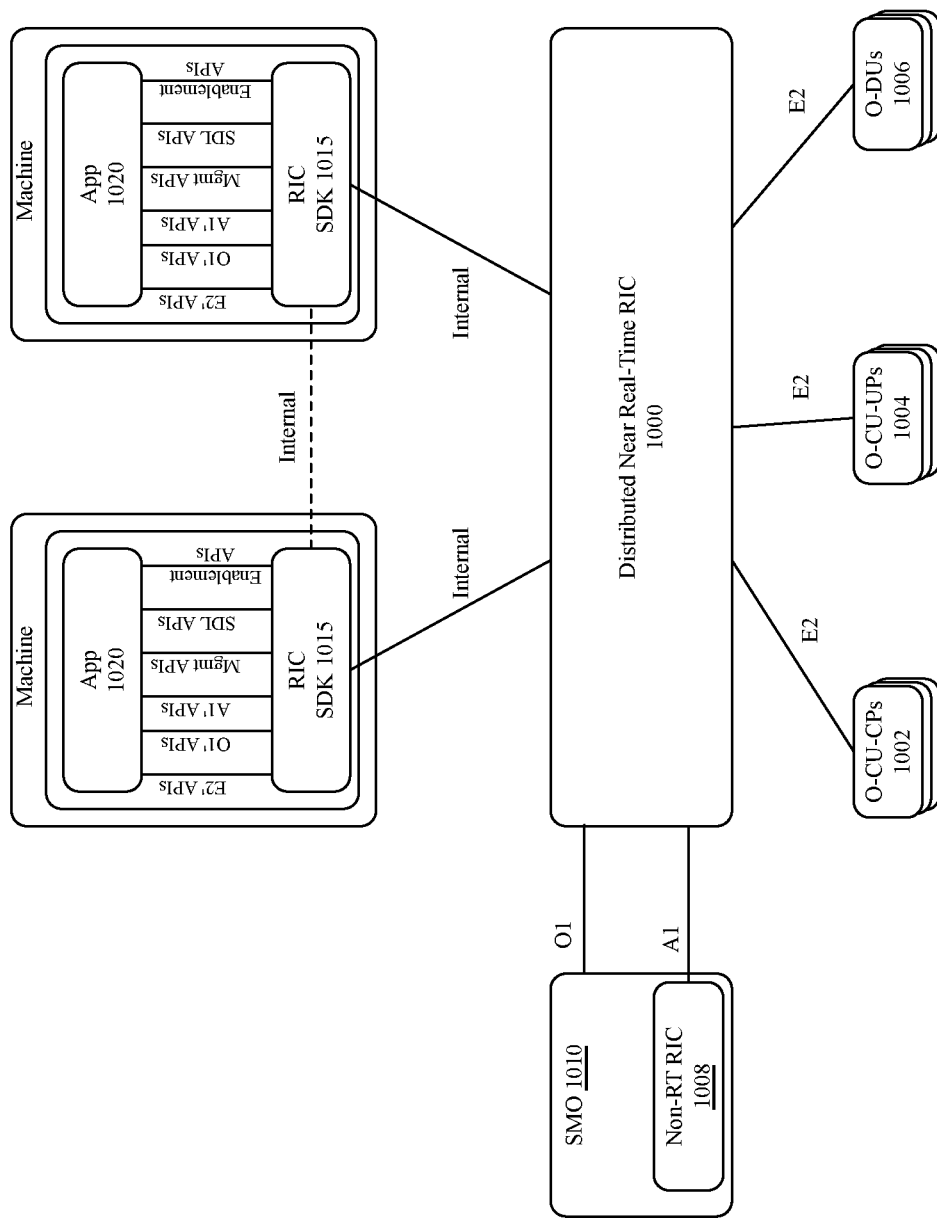
FIG. 10 illustrates examples of the different standard specified APIs that the distributed near RT RIC platform of some embodiments supports.

FIG. 10 illustrates examples of the different standard specified APIs that the distributed near RT RIC platform of some embodiments supports. As shown, the distributed near RT RIC platform 1000 in some embodiments uses the E2, O1, and A1 interfaces specified by the O-RAN standard specifying body. It uses the E2 APIs to communicate with the E2 O-RAN nodes, such as the O-CU-CPs 1002, O-CU-UPs 1004, and O-DUs 1006. It also uses the A1 APIs to communicate with the non-real-time RIC platform 1008, and uses the O1 APIs to communicate the SMO 1010.

For each of these E2, A1, and O1 APIs, the RIC SDKs 1015 provide high-level counterpart APIs for the control plane applications 1020 that use the RIC SDKs and the distributed near RT RIC platform to communicate with the E2 nodes 1002-1006, the non-real-time RIC platform 1008 and the SMO 1010. FIG. 10 designates these high-level counterpart APIs for the E2, O1, and A1 interfaces with a prime sign as the E2' API calls, O1' API calls and A1' API calls. These high-level counterpart APIs are not specified by a standard body, but are APIs that the RIC SDK and/or distributed near RT RIC convert into standard specified API calls.

FIG. 10 also shows several internal-RIC APIs for allowing the control plane applications 1020 to communicate with each other through the RIC SDKs and the distributed near RT RIC, and to communicate with one or more elements of the distributed near RT RIC (e.g., shared data layer (SDL) 360, datapath input/output (I/O) elements, and application and management services 352 and 354).

Enablement APIs are the APIs that are used in some embodiments to allow the control plane applications 1020 to communicate with each other. As described above by reference to FIGS. 6-9, these APIs are passed through the distributed near RT RIC in some embodiments. In other embodiments, these APIs allow the RIC SDKs of the control plane applications to directly communicate with each other without traversing through any other components of the distributed near RT RIC. For this reason, FIG. 10 includes a dashed bi-directional arrow between the RIC SDKs 1015 of the two control plane applications 1020 to indicate that in some embodiments the RIC SDKs 1015 of these applications communicate directly with each other.

The enablement APIs in some embodiments include registration APIs, service discovery APIs as well as inter-app communication APIs. Registration APIs are used by the applications 1020 (e.g., xApps) to introduce themselves to other applications 1020 by providing their network identifiers (e.g., their network address and available L4 ports) and providing their functionality (e.g., performing channel prediction). Service discovery APIs allow control plane applications 1020 (e.g., xApps) to query the service directory (e.g., of the distributed near RT RIC) for other control plane applications (e.g., other xApps) that provide a particular service. The inter-app communication APIs allow the control plane applications to communicate with each other to pass along data and/or request certain operations.

Some embodiments deploy an SDL cache on the same host computer as a control plane application, and use this cache to process at least a subset of the SDL storage access requests of the control plane application. In some embodiments, the control plane application and the SDL cache operate on a machine that executes on the host computer. In other embodiments, the SDL cache operates on the same host computer but outside of the machine on which the control plane application executes. In some of these embodiments, multiple control plane applications executing on the same host computer use a common SDL cache on that host computer.

The SDL cache is part of a RIC that executes on the same host computer as the control plane application in some embodiments. In other embodiments, the SDL cache is part of the RIC SDK that executes on the same machine as the control plane application. In either of these embodiments, a synchronizing process of the RIC or the RIC SDK synchronizes the data stored in the SDL cache with the data stored in the SDL storage.

In some embodiments, the SDL storage operates on a different host computer than the host computer on which the control plane application executes, while in other embodiments at least a portion of the SDL storage operates on the same host computer on which the control plane application executes. Also, in some embodiments, the RIC or the RIC SDK forwards SDL access requests from the control plane application to the SDL storage when the RIC SDK cannot process the SDL access requests through the SDL cache. For instance, the RIC or the RIC SDK cannot process SDL access requests through the SDL cache when the SDL cache does not store data requested by the control plane application.

Some embodiments provide various methods for offloading operations in an O-RAN (Open Radio Access Network) onto control plane (CP) or edge applications that execute on host computers with hardware accelerators in software defined datacenters (SDDCs). For instance, at the CP or edge application operating on a machine executing on a host computer with a hardware accelerator, the method of some embodiments receives data, from an O-RAN E2 unit, for which it has to perform an operation. The method uses a driver of the machine to communicate directly with the hardware accelerator to direct the hardware accelerator to perform a set of computations associated with the operation. This driver allows the communication with the hardware accelerator to bypass an intervening set of drivers executing on the host computer between the machine's driver and the hardware accelerator. Through this driver, the application in some embodiments receives the computation results, which it then provides to one or more O-RAN components (e.g., to the E2 unit that provided the data, to another E2 unit or to another xApp).

In some embodiments, a Pod is a small deployable unit of computing that can be created and managed in Kubernetes.

A Pod includes a group of one or more containers with shared storage and network resources, and a specification for how to run the containers. In some embodiments, a Pod's contents are always co-located and co-scheduled, and run in a shared context. A Pod models an application-specific logical host computer; it contains one or more application containers that are communicate with each other. In some embodiments, the shared context of a Pod is a set of an operating system namespaces (e.g., Linux cgroups). Within a Pod's context, the individual applications may have further sub-isolations applied.

One of ordinary skill will realize that the passthrough access for the O-RAN control or edge application is used in other deployment settings in other embodiments. For instance, instead of operating on Pods, the applications in other embodiments operate on containers. These embodiments then use the hardware accelerator drivers of their Pods or VMs to have passthrough access to the hardware accelerators for the control or edge application. In some of these embodiments, the control or edge application communicates with the hardware accelerator through its associated RIC SDK, and communicates with other O-RAN components (to receive data and to provide results of its processing of the data) through its associated RIC SDK and the distributed near RT RIC connecting the O-RAN components and the application.

Direct, passthrough access to hardware accelerators is quite beneficial for O-RANs. The RIC is all about decoupling the intelligence that used to be embedded within the RAN software (CU and DU) and moving it to the cloud. One benefit of this is to use more advanced computing in the cloud for the xApp and edge operations (e.g., for ML, deep learning, reinforcement learning for control algorithms, etc.). A DU close to a cell site typically cannot run advance computations because it would not be economically feasible to put GPUs at each cell site as network cap X will be very high.

By using the hardware accelerator (GPU, FPGAS, eASICs, ASICs) in the SDDC, some embodiments run complex control algorithms in the cloud. Examples of such xApps include Massive MIMO beam forming and Multi-user (MU) MIMO user pairing, which were described above. Generally, any xApp whose computations can benefit from massive parallelization would gain the benefit of GPU or other accelerators. The use of ASICs is beneficial for channel decoding/encoding (turbo encoding, LDPC encoding, etc.). In some embodiments, the RIC is typically on the same worker VM as xApps. However, in other embodiments, the RICs executes on a different host computer so that more xApps that need GPUs and other hardware accelerators can run on the hosts with the GPUs and/or other hardware accelerators.

Some embodiments have the hardware accelerator drivers of the O-RAN control or edge applications communicate with virtualized hardware accelerators that are offered by an intervening virtualization application (e.g., hypervisor) that executes on the same host computer as the application. For instance, the method of some embodiments deploys a virtualization application on a host computer for sharing resources of the host computer among several machines executing on the host computer. This computer has a first set of one or more physical hardware accelerators.

The method deploys several applications on several machines to perform several O-RAN related operations for a set of O-RAN components. Through the virtualization application, the method defines a second set of two or more virtual hardware accelerators that are mapped to the first set of physical hardware accelerators by the virtualization application. The method assigns different virtual hardware accelerators to different applications. The method also configures the applications to use their assigned virtual hardware accelerators to perform their operations.

In some embodiments, the deployed machines are Pods, and the applications are deployed to execute on the Pods. At least two Pods execute on one VM that executes above the virtualization application. This VM includes a hardware accelerator driver that is configured to communicate with two different virtual hardware accelerators for the two applications executing on the two Pods. In other embodiments, multiple Pods execute on one VM that executes above the virtualization application, and each Pod has a hardware accelerator driver that is configured to communicate with a virtual hardware accelerator that is assigned to that driver.

To provide a low latency near RT RIC, some embodiments separate the RIC's functions into several different components that operate on different machines (e.g., execute on VMs or Pods) operating on the same host computer or different host computers. Some embodiments also provide high speed interfaces between these machines. Some or all of these interfaces operate in non-blocking, lockless manner in order to ensure that critical near RT RIC operations (e.g., datapath processes) are not delayed due to multiple requests causing one or more components to stall. In addition, each of these RIC components also has an internal architecture that is designed to operate in a non-blocking manner so that no one process of a component can block the operation of another process of the component. All of these low latency features allow the near RT RIC to serve as a high speed IO between the E2 nodes and the xApps.

Figure 11:
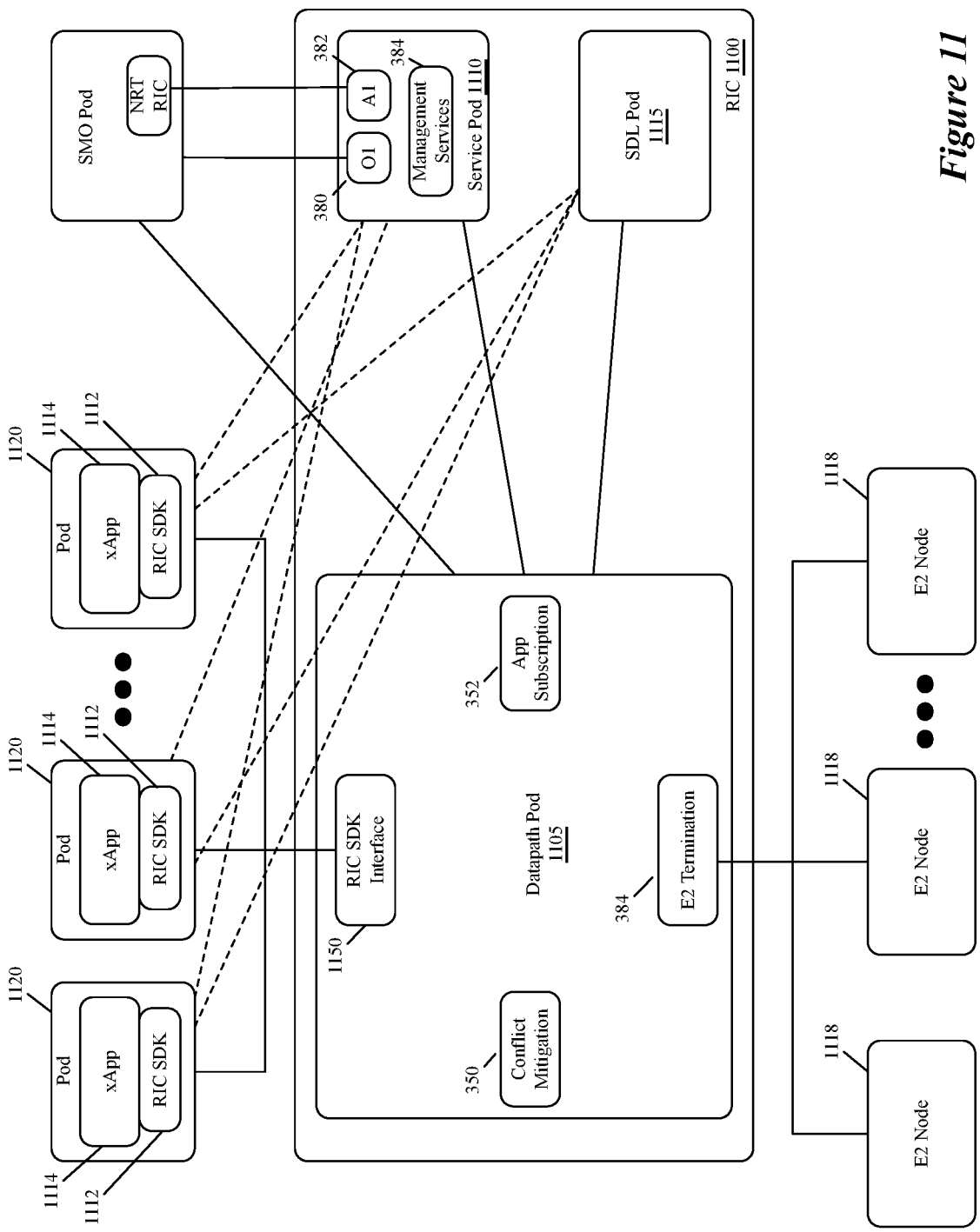
FIG. 11 illustrates an example of a near RT RIC with several components operating on several different machines.

FIG. 11 illustrates an example of a near RT RIC 1100 with several components operating on several different machines. In this example, the near RT RIC is divided into three Pods, which are a datapath Pod 1105, a service Pod 1110, and an SDL Pod 1115. In some embodiments, this RIC (1) handles E2AP messages between the E2 nodes 1118 and the xApps 1120, (2) manages connections with the E2 nodes 1118, (3) processes xApp subscriptions to E2 nodes, and (4) handles xApp liveness operations. The RIC 1100 provides reliable low-latency messaging between its various components, between the E2 nodes and xApps, and between E2 nodes/xApps and the RIC components. Part of the RIC's low latency architecture is attributable to using different Pods to implement the data IO, service and SDL operations, so that different resource allocations and management operations can be provided to each of these Pods based on its respective needs of the operations that they perform in several different Pods.

Each of the three RIC Pods 1105, 1110, and 1115 communicates with one or more xApp Pods 1120. In some embodiments, each Pod (1105, 1110, 1115 or 1120) is allocated hardware resources (e.g., CPUs, memory, disk storage, network IO, etc.) per the Pod's unique needs (i.e., per the datapath, service and storage operations performed by each Pod). Also, in some embodiments, each Pod has its own high availability and lifecycle update configuration that matches the unique needs of each Pod.

The service Pod 1110 performs xApp onboarding, registration, FCAPS (fault, configure, accounting, performance, security), and other services in some embodiments. For instance, in some embodiments, the service Pod 1110 provides the management services 354 of the near RT RIC, and performs the O1 termination 380 and the A1 termination 382 to the SMO and its associated non-RT RIC. In some embodiments, each of these components 354, 380 and 382 operate on a separate container in the service Pod 1110, while in other embodiments two or more of these components operate on one container in the service Pod 1110.

As mentioned above, the A1 Interface is between the near-RT RIC and the non-RT RIC in some embodiments. Through this interface, the near RT RIC relays relevant network information as reported by E2 nodes (e.g., CUs and DUs), and the non-RT RIC provides control commands for the E2 nodes (e.g., for control use-cases operation in non-RT granularities). The O1 Interface is between the near-RT RIC and the SMO, and in some embodiments is used for discovery, configuration, resource management and auto-scaling, life-cycle management, and fault tolerance.

The RIC management services 354 in some embodiments include services that the near RT RIC provides to the xApps and to the other RIC components. Examples of the services provided to the xApps include xApp service registry/directory (which the xApps can use to identify other xApps associated with the distributed near RT RIC and the operations performed by these other xApps), and FCAP operations, such as metric collection, policy provisioning and configuration. In some embodiments, the xApps can query the service registry/directory to identify other xApps or other xApps that perform particular services, and can register to receive notifications regarding xApps and their capabilities when the xApps are added to the directory.

Examples of FCAP operations performed by the service Pod 1110 for the xApp include fault operations involving collecting metrics that monitor CPU and memory utilizations to analyze to raise alerts, configuration operations to configure or re-configure the xApps, accounting operations to collect data needed for accounting and performance operations to collect metrics from xApps to analyze to quantify the xApp performance.

For the other RIC components (e.g., the datapath Pod 1105 and the SDL Pod 1115), the service Pod 1110 performs services as well, such as metric collection, policy provisioning and configuration. The service Pod 1110 can be viewed as a local controller that performs operations at the direction of a central controller, which is the SMO. Through the SMO, the service Pod 1110 would receive configuration and policies to distribute to the xApps and the other RIC components. Also, to the SMO, the service Pod 1110 provides metrics, logs and trace data collected from the xApps and/or RIC components (e.g., the datapath Pod and the SDL Pod). In some embodiments, the service Pod can be scaled (e.g., replicated) and backed up independently of the other Pods. In some embodiments, the service Pod has a data cache that is a cache for a time series database of the SMO. In this cache, the service Pod stores stats, logs, trace data and other metrics that it collects from the xApps and one or more RIC components before uploading this data to the SMO database.

The SDL Pod 1115 implements the SDL 360 and its associated database 370. As further described below, the SDL Pod 1115 in some embodiments also executes one or more service containers to execute one or more preprocessing or post-processing services on the data stored in the SDL. Like the service Pod, the SDL Pod in some embodiments can be scaled (e.g., replicated) and backed up independently of the other Pods.

The datapath Pod 1105 includes several important near RT RIC components. These are the E2 termination 384, the conflict mitigation 350, the application subscription management 352, and the RIC SDK interface 1150. In the discussion below, the datapath Pod is at times referred to as dric-control (e.g., dRIC control pod) given the control operations of the datapath Pod, or E2 termination interface (E2T) given that from the RAN application perspective (e.g., xApp perspective), the datapath Pod is an interface to the E2 nodes. Also, as further described below, some or all of the datapath services in some embodiments are embedded in a datapath thread and a control thread of the datapath Pod. In other embodiments, the datapath services are embedded in a data IO thread, multiple data processing threads and a control thread.

A thread is a component of a process that executes on a computer. The process can be an application or part of a larger application. A thread is a sequence of programmed instructions that can be managed independently of other threads of the process. Multiple threads of a given process can execute concurrently (e.g., by using multithreading capabilities of a multi-core processor) while sharing the memory allocated to the process. Multithreading is a programming and execution model that allows multiple threads to exist within the context of one process. These threads share the process's resources, but are able to execute independently.

The control thread in some embodiments is the interface with the service Pod and SDL Pod for the datapath threads, while in other embodiments it is the interface to just the service Pod for the datapath threads (as the datapath threads can communicate directly with the SDL Pod). The control thread in either of these approaches performs the slower, control related operations of the datapath, while the one or more datapath threads perform the faster IO operations of the datapath. The control thread in some embodiments interfaces with the service Pod to receive configuration data for configuring its own operations as well as the operations of the datapath thread.

The embodiments that separate the datapath thread into a data IO thread and multiple data processing threads further optimize the data IO by pushing the more computationally intensive operations of the datapath thread into multiple datapath processing threads, which then allows the less computationally intensive operations to run in the data IO thread. Both of these optimizations are meant to ensure a fast datapath IO (one that does not experience unwanted latencies) so that the near RT RIC can serve as a high speed interface between E2 nodes 1118 and xApps 1120.

As mentioned above, the Pods 1105, 1110 and 1115 communicate through high speed inter Pod interfaces. In some embodiments, the Pod-to-Pod connections are established through SCTP (streaming control transport protocol) or through even higher speed shared memory (shmem) connections. In some embodiments, the shared memory connections are employed only between a pair of Pods that executes on the same host computer. Examples of such pairs of Pod include (1) a datapath Pod and an SDL Pod, (2) a datapath Pod and a service Pod, (3) a service Pod and an SDL Pod, (4) an xApp Pod and a datapath Pod, (5) an xApp Pod and an SDL Pod, etc. The shared memory is lockless and access to it is non-blocking in some embodiments. Other embodiments use slower interfaces (e.g., gRPC) between the service Pod 1110 and the other Pods 1105, 1115, and 1120 as the service Pod is not as critical a Pod as the other Pods.

Figure 12:
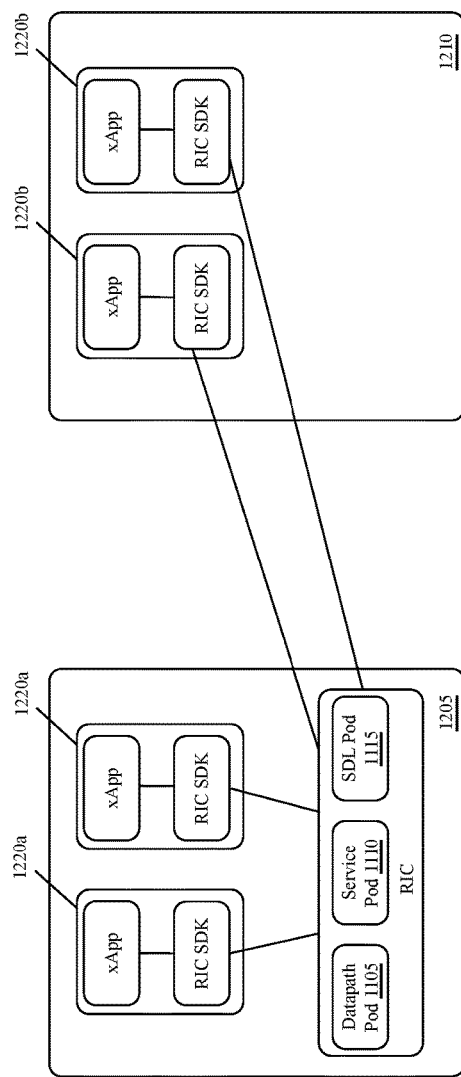
FIGS. 12 and 13 illustrates different examples for deploying the components of the near RT RIC of FIG. 11.

The different Pods (e.g., 1105, 1110 and 1115) of a near RT RIC in some embodiments can execute on the same host computer or can execute on two or more host computers. In other embodiments, one or more of the Pods (e.g., the service Pod 1110) always operates on a separate host computer than the other Pods (e.g., the datapath Pod 1105 and the SDL Pod 1115). Also, in some embodiments, the Pods 1105, 1110 and 1115 operate on one host computer 1205 along with one or more xApp Pods 1220*a*, while other xApp Pods 1220*b* operate on other host computers 1210, as shown in FIG. 12. In other embodiments, two of the Pods 1105, 1110 and 1115 operate on one host computer along with one or more xApp Pods, while the other one of the Pods 1105, 1110 and 1115 operates on another host computer along with one or more xApp Pods.

Figure 13:
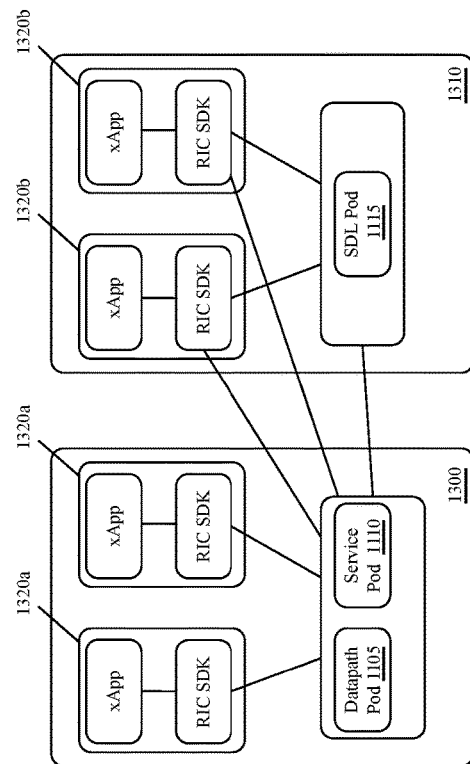

For instance, FIG. 13 illustrates the datapath Pod 1105 and service Pod 1110 executing on a host computer 1300 along with two xApp Pods 1320*a*, while the SDL Pod 1115 executes on a host computer 1310 along with two xApp Pods 1320*b*. In some embodiments, Pods that require hardware accelerators are placed on host computers with such hardware resources, while Pods that do not require these accelerators are put on host computers without these accelerators, as mentioned above. In some embodiments, SDL Pods and xApp Pods use hardware accelerators, while the datapath Pod and service Pods do not. Various examples of Pods that can benefit from hardware accelerators and bypass paths to these accelerators are described above and further described below.

Also, although several near RT RICs are described above and below as being implemented with Pods, the near RT RICs in other embodiments employ VMs to implement the RIC components. Moreover, even in the embodiments that implement the different RIC components with Pods, some or all of the Pods operate on VMs, such as lightweight VM (e.g., Photon VMs provided by VMware, Inc.).

In addition to using fast communication interfaces between the Pods, some or all of the Pods use non-blocking, lockless communication protocols and architectures in some embodiments. For instance, the datapath Pod 1105 uses non-blocking, lockless communication between threads and processes that make up this Pod. Datapath Pod 1105 also uses non-blocking, lockless communication when communicating with the service Pod 1110, the SDL Pod 1115 or the xApp Pods 1120. Non-blocking communication ensures that no first component that sends a request to a second component can stall the operations of the second component when the second component is processing too many requests. In such cases, the second component will direct the first component to resend its request at a later time. The datapath Pod employs lockless communication in that it uses single thread processing that does not employ thread handoffs. Hence, no portion of memory has to be locked to ensure that another process thread does not modify it in an interim time period.

The communication interface between the RIC SDK interface 1150 of the datapath Pod 1105 and the RIC SDK 1112 of an xApp Pod 1120 is also novel in some embodiments. In some embodiments, this interface parses the header of E2AP messages received from E2 nodes, stores some or all of the parsed components in a new encapsulating header that encapsulates the E2SM payload of the E2AP message along with some or all of the original E2AP header. In doing this encapsulation, the SDK interface 1150 in some embodiments performs certain optimizations, such as efficiently performing data packing to reduce message size overhead for communications from one Pod to another (e.g., reduces the size of the E2 Global ID value, etc.). These optimizations improve the efficiency of the near RT RIC datapath Pod and xApp Pod communication.

Figure 14:
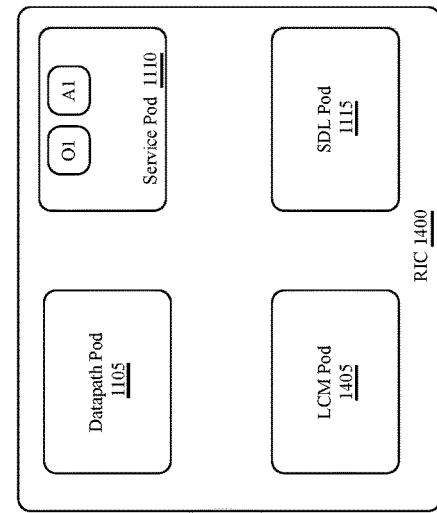
FIGS. 14 and 15 illustrate other examples of a near RT RIC.

The near RT RIC in other embodiments has one or more other Pods. For instance, FIG. 14 illustrates a near RT RIC 1400 that in addition to the Pods 1105, 1110, and 1115, also includes a lifecycle management (LCM) Pod 1405. The LCM Pod is a specialized service Pod responsible for upgrading each of the other Pods 1105, 1110 and 1115 of the near RT RIC 1400. Separating the lifecycle management from the service Pod 1110 allows the service Pod 1110 to be upgraded more easily.

In some embodiments, the LCM Pod 1405 uses different upgrade methodology to upgrade the different Pods. For instance, the LCM Pod in some embodiments replicates the SDL data store and seamlessly transitions from an active data store to another standby datastore in order to perform a hitless upgrade of the SDL. On the other hand, to upgrade the datapath Pod, the LCM Pod's procedure is more involved, as it configures the active and standby datapath Pods to be dual-homed connections for each E2 node and each xApp, and configures the active datapath Pod to replicate state with the standby datapath.

Figure 15:
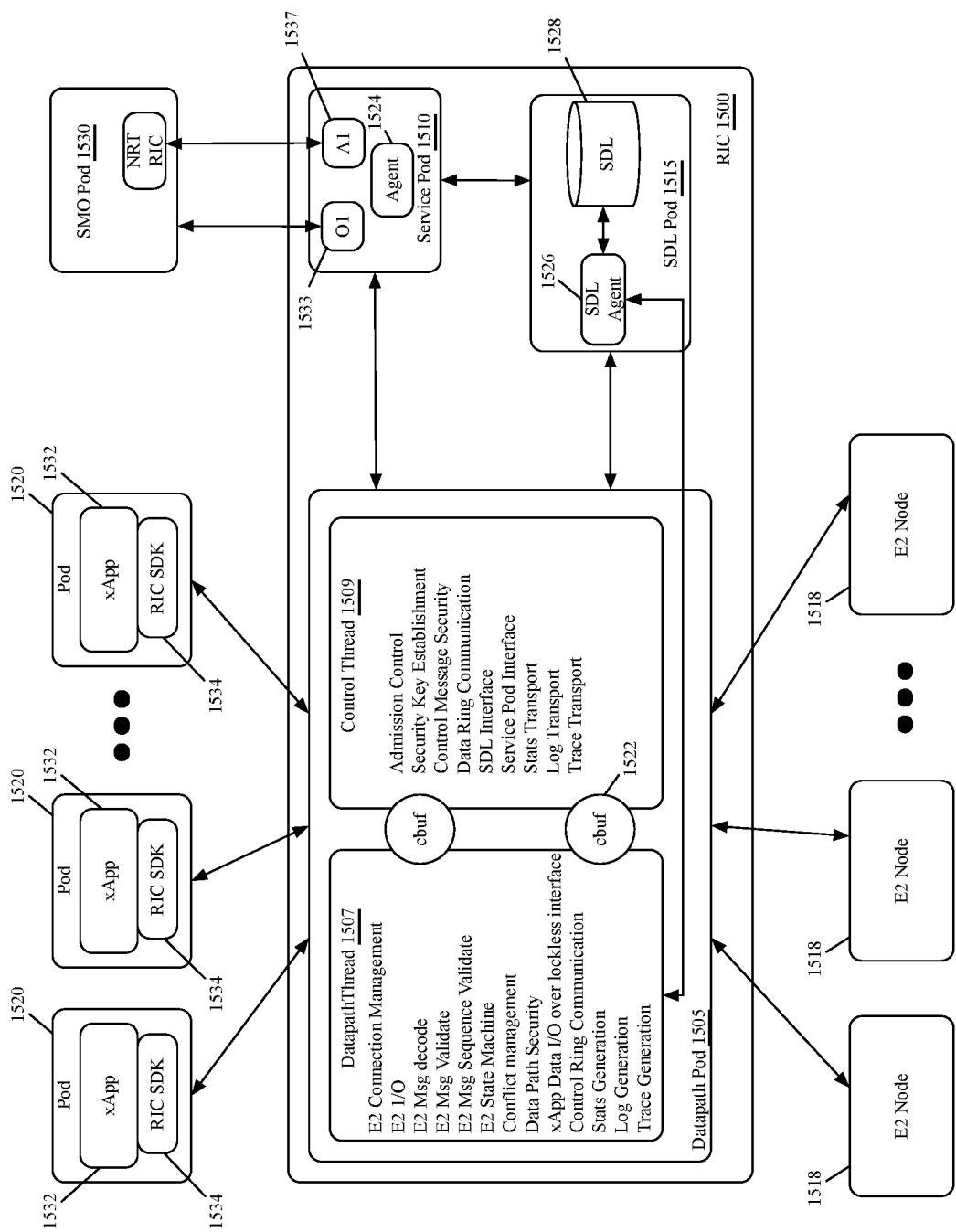

FIG. 15 presents a more detailed view of a near RT RIC 1500 for some embodiments. As shown, the near RT RIC 1500 includes a datapath Pod 1505, a service Pod 1510 and an SDL Pod 1515. The SDL Pod 1515 includes an SDL agent 1526 and the shared SDL storage 1528 of the RIC 1500, while the service Pod 1510 includes a service agent 1524 along with the O1 and A1 termination interfaces 1535 and 1537. The datapath Pod 1505 includes a datapath thread 1507 and a control thread 1509.

The datapath thread 1507 provides a fast datapath IO of the near RT RIC between the E2 nodes 1518 and the xApps 1532. The data plane capabilities of the RIC in some embodiments can be scaled up by implementing the RIC datapath IO with one control thread and multiple datapath threads that share the load for the datapath processing of the datapath Pod. Several such implementations will be further described below. The control thread 1509 performs several control operations associated with the RIC's datapath. The near RT RIC 1500 separates the control and datapath threads because the data IO operations need to be fast and should not be slowed down by control operations that can operate at a slower rate. In some embodiments, the control and datapath threads are two threads in a single process (i.e., run in the same shared memory address space).

In some embodiments, each of these threads uses non-blocking, lockless interfaces to communicate with other components in this architecture (e.g., with the RIC SDK, service Pod agent, SDL agent, and/or E2 nodes) to the extent that they communicate with these other components. Also, in some embodiments, both threads use minimal OS system calls and run as infinite loops. As further described below, the datapath thread and the control thread exchange data over two circular rings 1522 (called cbuf), with one ring handling messages from the datapath thread to the control thread and the other handling messages from the control thread to the datapath thread.

The control thread 1509 serves as the control interface to the E2 nodes 1518, the SMO 1530 (through the service Pod agent 1524), the xApps (e.g., through SCTP), and the SDL Layer (through the SDL agent 1526). In some embodiments, the control thread is the main thread to communicate with these external entities; however, as further described below, the datapath thread in some embodiments also communicates with the SDL 1515 through the SDL agent 1526.

The control thread 1509 in some embodiments handles all control functions. This thread sends various control parameters to other functions, and in some embodiments enforces admission controls. In other embodiments, the datapath thread 1507 enforces admission controls and the SMO through the service Pod specifies the admission controls. The control thread 1509 in some in some embodiments has control channel communications with the RIC SDK of an xApp Pod through SCTP. In other embodiments, the control thread communicates with the RIC SDK of an xApp Pod through gRPC. Also, in some embodiments, the control thread communicates with the RIC SDK through shared memory (shmem) when the xApp Pods and the datapath Pod execute on the same host computer The control thread 1509 also provides the transport mechanism to transport the statistics, logs and trace data generated by the datapath thread 1507. In some embodiments, some or all of this data is transported to the SDL Pod 1515 through the SDL agent 1526 and/or to the SMO 1530 through the service agent 1524. The control thread 1509 in some embodiments negotiates security keys with E2 node peers, and passes these keys to the datapath thread, which uses them to perform its encryption/decryption operations.

The datapath thread 1507 provides the high speed IO between E2 nodes and xApps. This thread handles the RIC SDK interface and the E2 termination operations, as well as the conflict mitigation and xApp subscription operations in some embodiments. This thread performs ASN.1 decoding of E2AP messages to extract the message data. In some embodiments, the datapath thread does not decode the E2SM payload of these messages. The datapath thread 1507 validates E2 and xApp messages and sequences. In some embodiments, the message types include E2 node setup and service update, E2 node indication reports, xApp initiated subscriptions for E2 node data and xApp initiated control requests.

The datapath thread 1507 in some embodiments runs E2 state machines in order to create and maintain state on behalf of xApps (e.g., state of E2 nodes, subscriptions to E2 nodes, etc.). Also, in some embodiments, the datapath thread performs table lookups to send messages to xApps that request data. This thread also handles control requests from xApps towards E2 nodes and forwards back responses to these requests from the E2 node to the xApps.

The datapath thread communicates with the xApps through SCTP when the xApps are on another host computer, or through shared memory when the xApps are on the same host computer. In some embodiments, the xApp messages have CRC bits to detect corruption. These messages also carry timestamps and can be compressed in some embodiment. The datapath thread 1507 performs data replication for multiple subscriptions. The datapath thread 1507 also performs datapath security operations, e.g., by signing, encrypting and decrypting data messages.

As mentioned above and further described below, the datapath thread 1507 communicates with the control thread 1509 in some embodiments via a pair of rings 1522. In some embodiments, the frequency of messages between the two threads can be tuned (e.g., can be configured) to be from sub milliseconds to seconds per ring pair. Through the control thread, the datapath thread 1507 receives configuration data updates and state changes. The datapath thread 1507 generates statistics, logs and traces and provides the generated statistics, logs and trace data to the control thread for storage in the SDL and/or to provide to the SMO.

The datapath thread 1507 also performs conflict management operations in case multiple xApps try to set the same parameters to the same E2 node at the same time. For instance, the conflict management operations ensure that two xApps do not try to change a cellular network setting (e.g., a direction of an antenna) differently within a short time period. In some embodiments, the datapath thread's conflict management employs different methodologies to address different types of conflicts, e.g., (1) for one set of requests, for a duration of time, it rejects a second request to modify a parameter after receiving a conflicting earlier first request, (2) for another set of requests, it rejects a request regarding a parameter from one xApp when another higher priority xApp makes a conflicting request for the same parameter, (3) for another set of requests regarding another set of parameters, it only accepts requests made by xApps that are allowed to make such requests during particular periods of time. The policies for handling these conflicts are provided by the SMO 1530 through the service Pod's agent 1524.

In FIG. 15, each xApp Pod 1520 can execute one or more xApps 1532, and interfaces with the datapath Pod 1505, the SDL Pod 1515 and the service Pod 1510 through the RIC SDK 1534 that executes on the xApp Pod. Each RIC SDK provides high-level interfaces for xApps to communicate with the RIC and the E2 nodes. This high level interface hides details of underlying implementation. The RIC SDK communicate with the RIC instances through fast data IO communication channels (such as shared memory or SCTP).

The RIC SDK also uses control communication channel with the service Pod 1510 and the control thread 1509 for xApp control operations such as xApp onboarding, registration, capabilities, subscription, FCAPS, etc. In some embodiments, the control channel communication between the SDK and the control thread 1509 is through shared memory when the xApp Pod (and its SDK) and the datapath Pod operate on the same host computer, and through SCTP when they operate on different computers. Also, in some embodiments, the control channel communication between the xApp Pod (and its SDK) and the service Pod is through shared memory when the SDK and the service Pod operate on the same host computer, and through gRPC when they operate on different computers. Other embodiments use SCTP for communications between the SDK and the service Pod when the xApp Pod (and its SDK) and the service Pod operate on different host computers.

Some of embodiments use proto bufs when the RIC SDK communicates with the service Pod through gRPC. Also, in some embodiments where the RIC SDK's communication with the datapath Pod is over shared memory, the shared memory communication uses proto bufs. The RIC SDK has APIs for data functions, e.g., E2 messages to and from E2 nodes. These APIs also include control function messaging, such as onboarding xApp (name, version, function), message subscription, keep alive messaging, and A1 and O1 interface communications with the SMO through the service Pod (e.g., communications to store stats, logs, and trace data in a time series database on the SMO or service Pod, such as Prometheus and ELK).

Some embodiments assign the datapath thread and control thread to one processor core, assign the SDL to another processor core (in order to isolate it from data and control threads), and assign the service Pod to yet another processor core. When one or more xApps execute on the same host computer as the RIC, the xApps are assigned to different cores than the RIC Pods, where multiple xApps can be assigned to the same core, or individual cores are assigned to individual xApps, as needed.

To improve the performance of the RIC and the xApps further, other embodiments perform other hardware assignment optimizations, such as particular memory allocations (e.g., larger RAM allocations) and particular IO allocations. Examples of special IO allocations for some of the Pods include (1) SRIOV allocations for an xApp Pod on one host computer to communicate with a datapath Pod on another host computer, (2) SRIOV allocations for a datapath Pod to communicate with E2 nodes, (3) SRIOV allocations for an xApp Pod on one host computer to communicate with a service Pod on another host computer, and (4) gRPC or SCTP communication over the SRIOV allocations, with the gRPC communications having lower bandwidth allocations and being lower priority than the SCTP communications.

In some embodiments, one RIC and several xApps are bundled together to operate on different Pods that operate on one VM. Multiple instances of the RIC can also be deployed in some embodiments with different sets of xApps. Also, in some embodiments, xApps that need to talk to each other are bundled on the same VM.

As mentioned above, some embodiments implement the RIC datapath not as one datapath thread but as one data IO thread along with multiple datapath processing threads. In some embodiments, each datapath processing thread (DPT) is responsible for performing the datapath processing for a different set of E2 nodes, with each E2 node assigned to just one datapath processing thread. In some embodiments, the data IO thread identifies the DPT associated with an E2 message or an xApp message by hashing the E2 node identifier contained in the message and using the hashed value (obtained through the hashing) as an index into a lookup table that provides the DPT identifier of the DPT that needs to process the data message.

Figure 16:
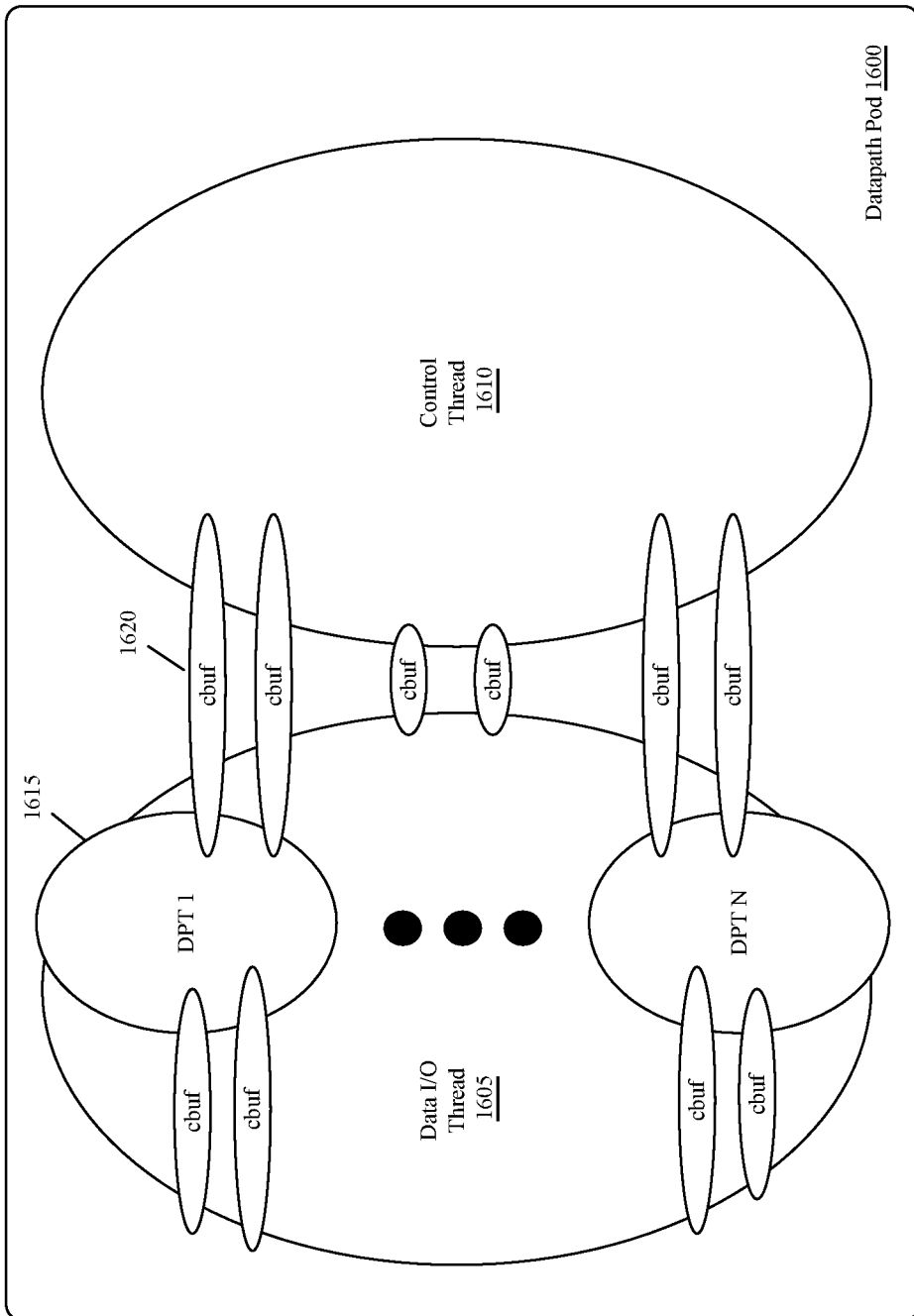
FIG. 16 illustrates an example of a RIC datapath Pod.

FIG. 16 illustrates an example of a RIC datapath Pod 1600 that has one data IO thread 1605, one control thread 1610, and multiple DPTs 1615. The DPTs share the datapath processing load of the datapath Pod 1600. As shown, there is a pair of cbuf rings 1620 between each DPT 1615 and the data IO thread 1605, each DPT 1615 and the control thread 1610, and the data IO thread 1605 and the control thread 1610. Each ring 1620 in a cbuf pair passes data messages in one direction from one of the two threads associated with the ring to the other thread, with one ring handling communication in one direction (e.g., from first thread to second thread) and the other ring handling communication in the other direction (e.g., from second thread to the first thread).

Separating the data IO thread 1605 from multiple DPTs 1615 optimizes the data IO of the datapath Pod 1600 by pushing the more computationally intensive operations into the DPTs, which then allows the less computationally intensive IO operations to run in the data IO thread 1605. This optimization ensures a fast datapath IO (one that does not experience unwanted latencies) so that the RIC can serve as a high speed interface between the E2 nodes and the xApps. Also, each E2 node is the responsibility of just one DPT thread 1615, which typically is responsible for several E2 nodes. Because each E2 node is handled by one particular DPT, no two DPTs will try to change one or more records associated with one E2 node. Hence, the datapath Pod 1600 does not need to lock any E2 node's records as there is clear demarcation of responsibilities vis-a-vis the communications with the E2 nodes.

The data IO thread 1605 performs the following operations (1) managing connections to the E2 nodes and the xApp Pods, (2) transmitting data messages through these connections to and from the E2 nodes and the xApp Pods, (3) performing security operations, (4) control ring communication with control thread 1610 and DPTs 1615, and (5) generating statistics, logs and trace data regarding messages that it processes.

Each DPT thread 1615 performs the following operations (1) message decode and encode operations (e.g., message encrypt and decrypt operations), (2) message validate operations, (3) sequence validate operations, (4) maintain state machine to keep track of state of the E2 node and the xApp requests and subscriptions, (5) perform conflict management, (6) control ring communication with control thread 1610 and DPTs 1615, and (7) generate statistics, logs and trace data regarding messages that it processes.

Figure 17:
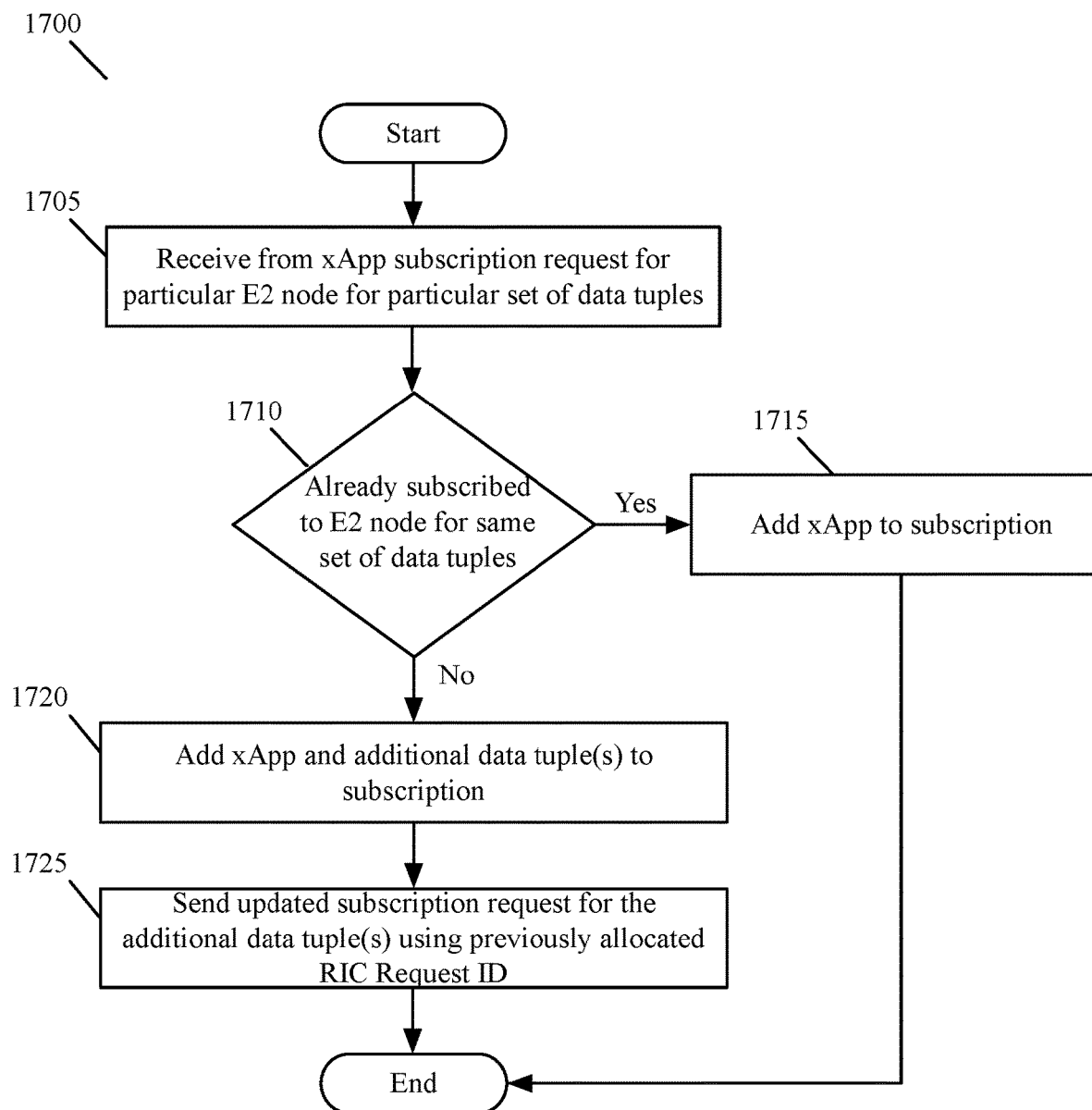
FIG. 17 illustrates a process that the datapath thread performs in some embodiments to process subscription requests from an xApp.

FIG. 17 illustrates a process 1700 that the datapath thread performs in some embodiments to process subscription requests from an xApp. As shown, the process starts when the DPT receives (at 1705) an xApp subscription request from the data IO thread. The subscription request is directed to a particular E2 node for a particular set of data tuples (e.g., a particular set of operational parameters or other parameters) that the particular E2 node maintains.

At 1710, the process 1700 determines whether it has already subscribed to the particular E2 node to receive the particular set of data tuples. This would be the case if the DPT previously sent the particular E2 node one or more subscription requests that individually or collectively requested the particular set of data tuples or a larger set of data tuples that includes the particular set of data tuples.

When the process 17100 determines (at 1710) that it has already subscribed to the particular E2 node to receive the particular set of data tuples, it (at 1715) adds a new record, or updates a record previously specified, for the xApp in this E2 node's subscription list and specifies in this record the particular set of data tuples that the xApp should receive. After 1715, the process ends.

On the other hand, when the process 17100 determines (at 1710) that it has not already subscribed to the particular E2 node to receive the particular set of data tuples, it has to either send a first subscription to the particular E2 node if it does not have an active subscription with this node, or has to send an updated subscription to the node if it has an active subscription but not one that includes all of the data tuples in the particular set of data tuples specified in the request received at 1705.

Hence, in such a case, the process 1700 (at 1720) adds a new record, or updates a record previously specified, for the xApp in this E2 node's subscription list and specifies in this record the particular set of data tuples that the xApp should receive. Next, it sends an updated subscription request to the particular E2 node using a previously allocated RIC Request ID. This updated subscription specifies all of the data tuples in the requested particular set of data tuples when none of these tuples were previously requested by an earlier subscription to the particular E2 node, or specifies some of these data tuples when other data tuples in the particular set were previously requested by one or more earlier subscriptions to the particular E2 node. After 1725, the process 1700 ends.

Figure 18:
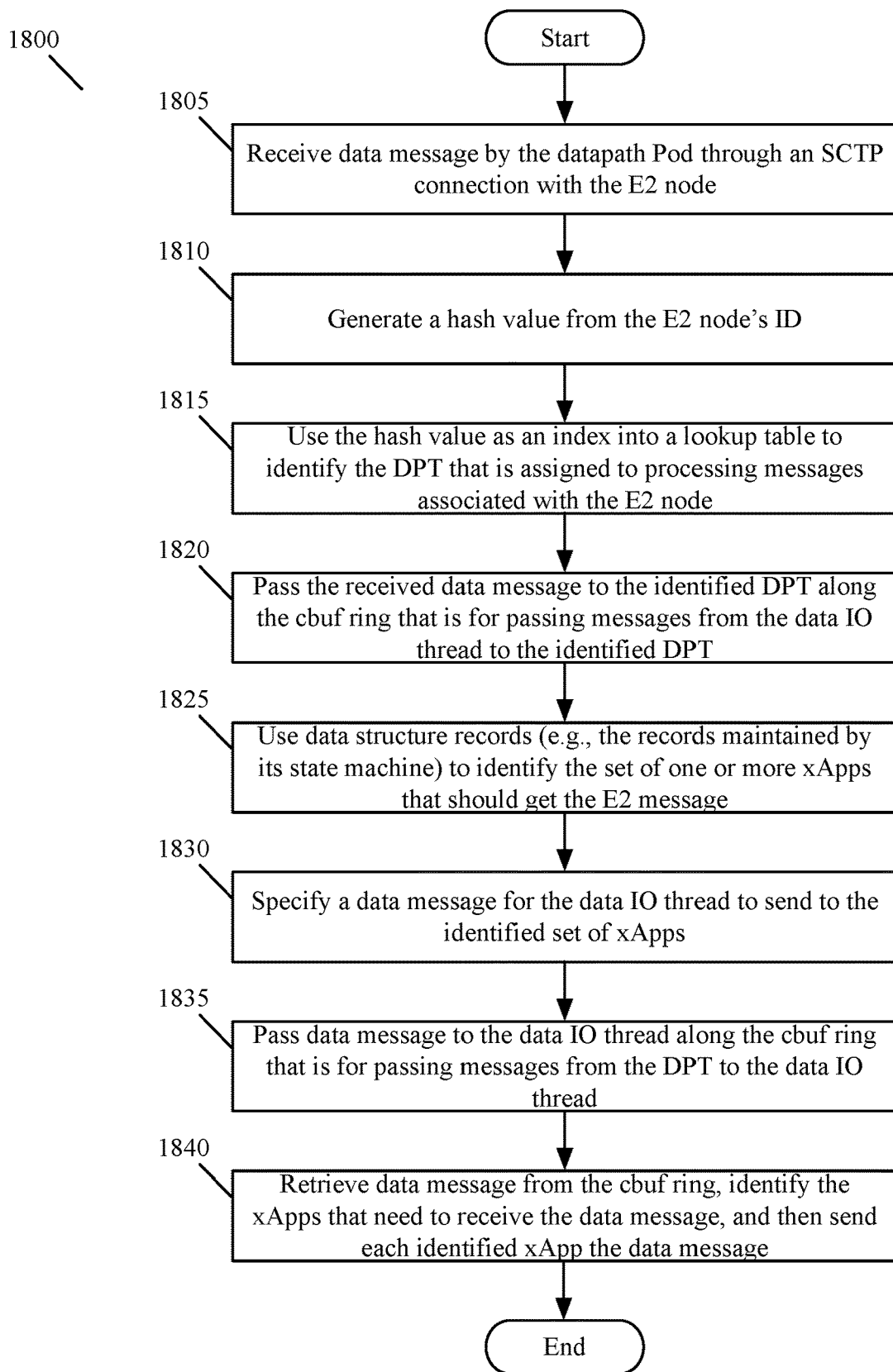
FIG. 18 illustrates a process that the data IO thread and a DPT perform in some embodiments to process a data message from the E2 node that one or more xApps should receive.

FIG. 18 illustrates a process 1800 that the data IO thread 1605 and a DPT 1615 perform in some embodiments to process a data message from the E2 node that one or more xApps should receive. As shown, the process 1800 starts when the data message is received (at 1805) by the datapath Pod through an SCTP connection with the E2 node. At 1810, the data IO thread 1605 generates a hash value from the E2 node's ID. It then uses (at 1815) the hash value as an index into a lookup table to identify the DPT that is assigned to processing messages associated with the E2 node.

At 1820, the data IO thread passes the received data message to the identified DPT (i.e., the DPT identified at 1815) along the cbuf ring 1620 that is for passing messages from the data IO thread to the identified DPT. Next, at 1825, the DPT uses its data structure records (e.g., the records maintained by its state machine) to identify the set of one or more xApps that should get the E2 message. In some embodiments, the identified set of xApps are the xApps that have subscribed to receive data (e.g., all the data or a subset of the data) from the E2 node.

At 1830, the DPT specifies a data message for the data IO thread 1605 to send to the identified set of xApps. This data message is in the encapsulated format described below by reference to Table 1. The DPT then passes (at 1835) the data message to the data IO thread 1605 along the cbuf ring 1620 that is for passing messages from the DPT 1615 to the data IO thread 1605. Next, at 1840, the data IO thread 1605 retrieves the data message from the cbuf ring 1620, identifies the xApps that need to receive the data message, and then sends each identified xApp the data message. After 1840, the process ends.

Figure 19:
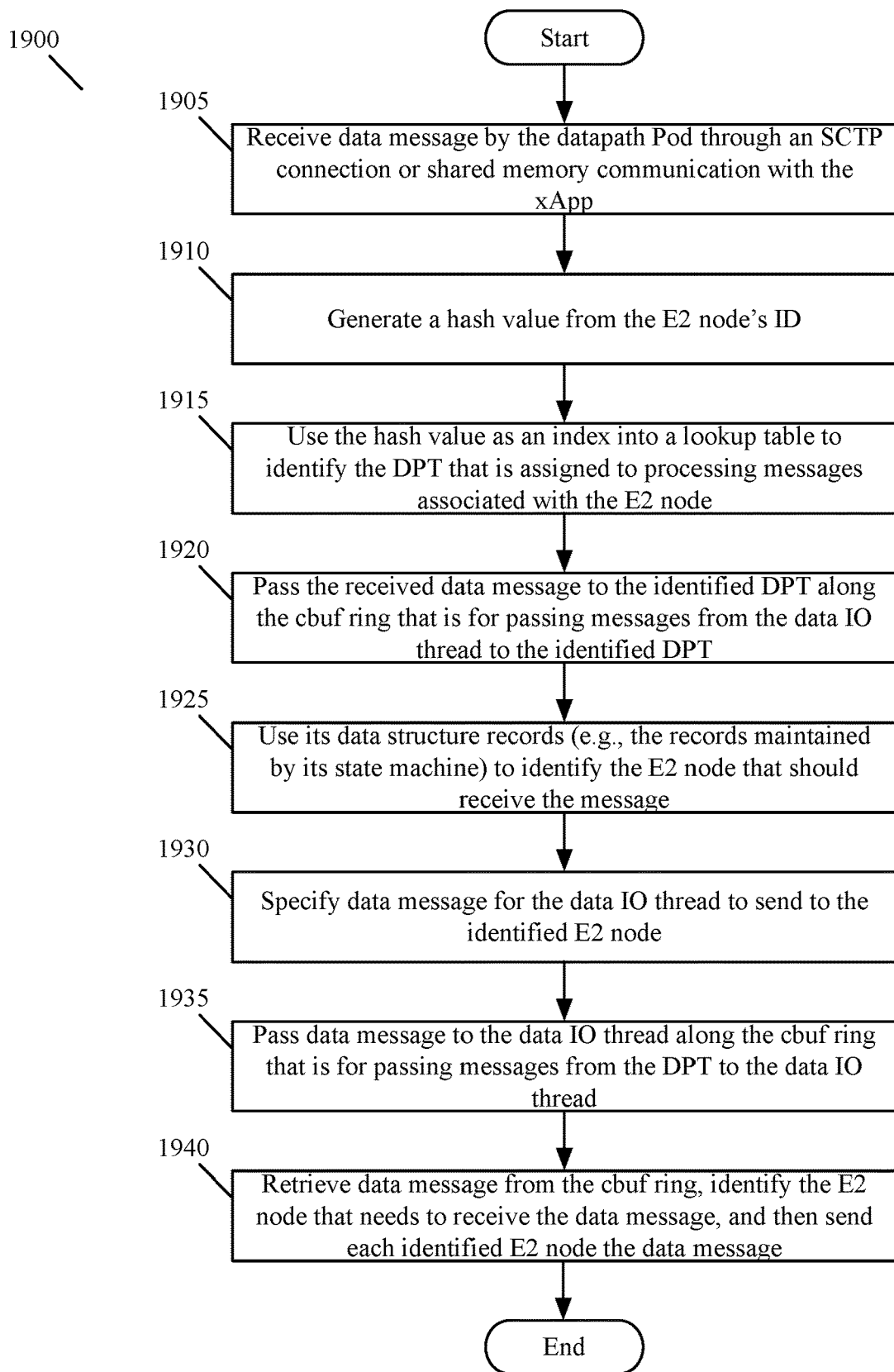
FIG. 19 illustrates a process that the data IO thread and a DPT perform in some embodiments to process a data message from an xApp that should be sent to an E2 node.

FIG. 19 illustrates a process 1900 that the data IO thread 1605 and a DPT 1615 perform in some embodiments to process a data message from an xApp that should be sent to an E2 node. As shown, the process 1900 starts when the data message is received (at 1905) by the datapath Pod through an SCTP connection or shared memory communication with the xApp RIC SDK. This message is in the encapsulated format that is described below by reference to Table 1. This message includes an E2 node identifier that identifies the E2 node that should receive this message.

At 1910, the data IO thread 1605 generates a hash value from the E2 node's ID. It then uses (at 1915) the hash value as an index into a lookup table to identify the DPT that is assigned to processing messages associated with the E2 node. At 1920, the data IO thread passes the received data message to the identified DPT (i.e., the DPT identified at 1915) along the cbuf ring 1620 that is for passing messages from the data IO thread to the identified DPT.

Next, at 1925, the DPT uses its data structure records (e.g., the records maintained by its state machine) to identify the E2 node that should receive the message. In some embodiments, the data message is a subscription request and the identified E2 node is an E2 node to which an xApp wants to subscribe. At 1930, the DPT specifies a data message for the data IO thread 1605 to send to the identified E2 node. This data message is in the E2AP message format required by a standard. The DPT then passes (at 1935) the data message to the data IO thread 1605 along the cbuf ring 1620 that is for passing messages from the DPT 1615 to the data IO thread 1605. Next, at 1940, the data IO thread 1605 retrieves the data message from the cbuf ring 1620, identifies the E2 node that needs to receive the data message, and then sends each identified E2 node the data message. After 1940, the process ends.

In some embodiments, the DPT 1615 might determine that no new subscription message needs to be sent to the E2 node that it identifies at 1925. For instance, before receiving (at 1905) from a first xApp the subscription request for a set of data tuples from an E2 node, the datapath Pod previously sent for a second xApp a subscription request to the same E2 node for the same set of data tuples or for a larger set of data tuples that includes the data tuples requested by the first xApp. In such a case, the DPT 1615 simply adds the first xApp to the subscription list of the E2 node, so that it can provide subsequently received values from the E2 node to the first xApp. In some embodiments, the DPT 1615 also supplies previously received values from the E2 node that are stored in the SDL to the first xApp or directs the xApp to obtain these values from the SDL.

In some cases, the first xApp asks for additional data tuples from the E2 node that the second xApps did not request previously. In such cases, the DPT 1615 would prepare an updated subscription message for the data IO thread to send to the E2 node to request the data tuples that are newly requested by the first xApp. The DPT would also prepare such a message when the second xApp requested additional data tuples from the E2 node after its initial subscription.

In some embodiments, a service Pod 1510 configures the datapath Pod 1600 to instantiate N DPTs when it starts up with N being an integer greater than one. For the datapath Pod 1600 of a near RT RIC, the number N is computed in some embodiments based on the expected number of E2 nodes and xApps that communicate with the E2 nodes through a near RT RIC. The data IO thread 1605 of the datapath Pod 1600 in some embodiments then assigns the E2 nodes to the DPTs based on the order of subscription requests that it receives and the load on the DPTs at the time of these requests.

Figure 20:
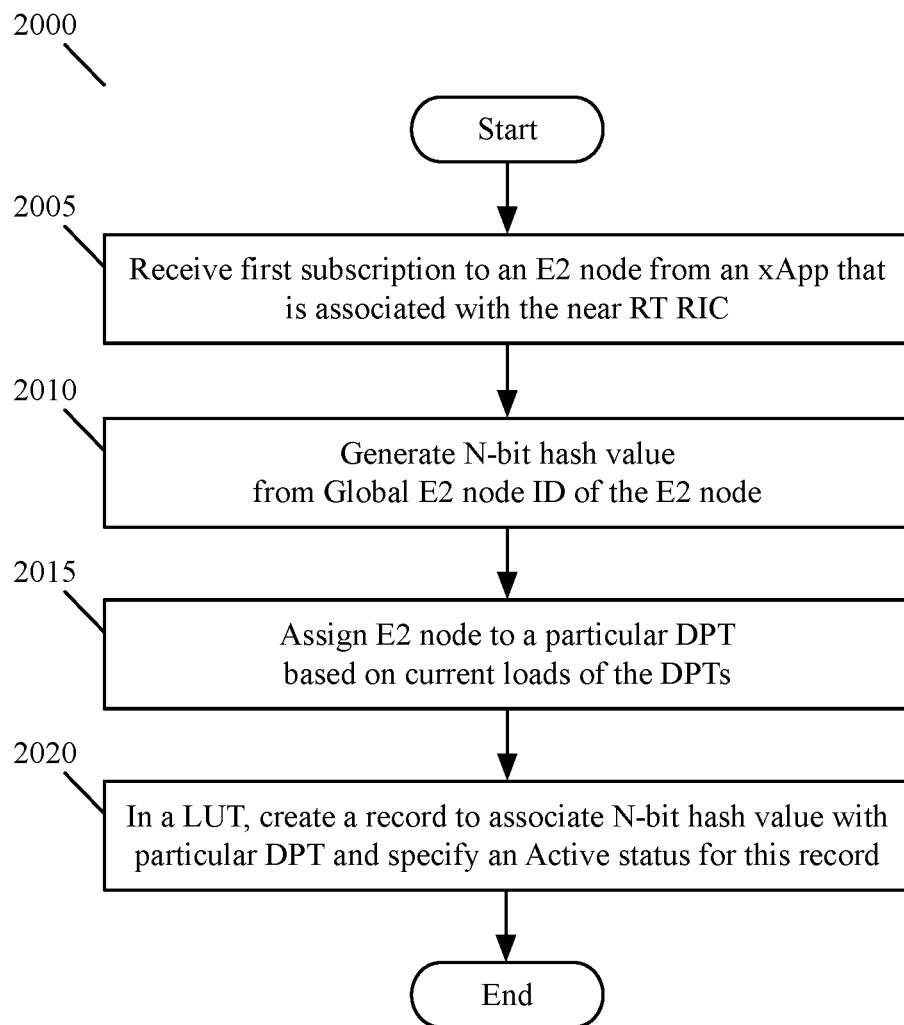
FIG. 20 illustrates an example of a process that the data IO thread uses in some embodiments to assign E2 nodes to DPTs.

FIG. 20 illustrates an example of a process 2000 that the data IO thread 1605 uses in some embodiments to assign E2 nodes to DPTs. As shown, the process 2000 starts when the data IO thread 1605 receives (3005) a first subscription request for a particular E2 node from an xApp that is associated with the near RT RIC of the data IO thread. A first subscription request for a particular E2 node means that no other subscription requests were previously received for this particular E2 node by the data IO thread.

Next, at 2010, the data IO thread 1605 generates an N-bit hash value from the Global E2 node ID of the particular E2 node, where N is an integer (e.g., is 6 or 8). This N-bit value is used to identify the particular E2 node in a hash LUT (lookup table) as further described below. At 2015, the process 2000 selects a particular DPT for the particular E2 node based on the current load on each of the DPTs of the datapath Pod 1600 (e.g., by selecting the DPT with the least amount of load). In some embodiments, the current load is just based on the number of E2 nodes assigned to each DPT, while in other embodiments the current load is based on the number of E2 nodes and the number of xApp subscriptions to these nodes. In still other embodiments, the current load is computed in other ways.

At 2020, the process 2000 then creates a record in a LUT and in this record associates the N-bit hash value with the identifier of the particular DPT selected at 2015 for the particular E2 node. In some embodiments, the N-bit hash value is an index into the LUT that identifies the record that specifies the particular E2 node's ID. At 2020, the process 2000 also specifies the state of this record as Active.

At a subsequent time, if the data IO thread encounters a situation where all xApps have canceled their subscriptions to the particular E2 node, the process 2000 maintains the LUT record created at 2020 but changes the status of this record to Inactive. The data IO thread maintains this Inactive status until the next time that an xApp submits a subscription request for the particular E2 node, at which time the status of this record is changed to Active again. This status value is used as a mechanism to ensure that the data IO thread does not have to continuously revisit the E2 node assignments to the DPTs.

Figure 21:
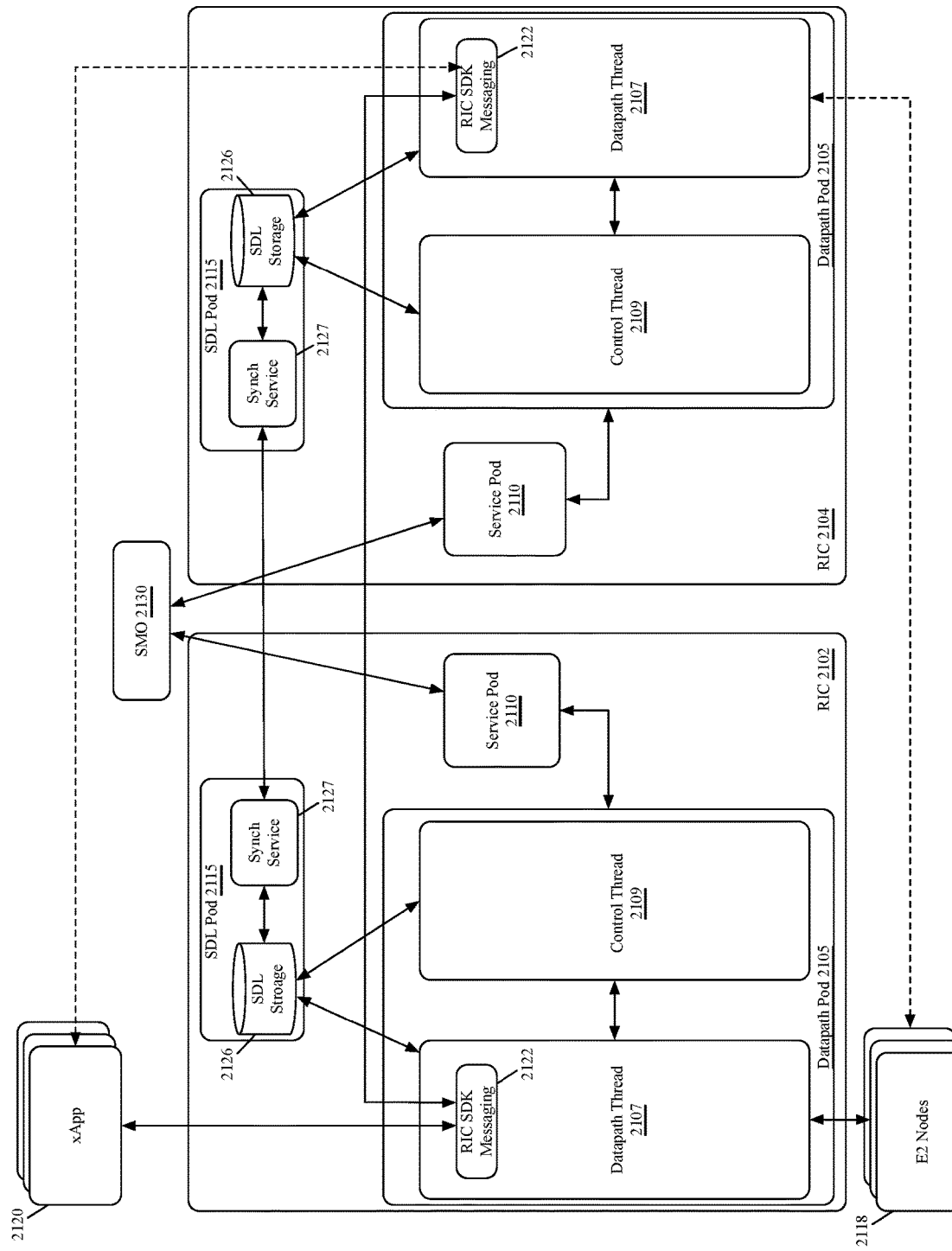
FIG. 21 illustrates a distributed near RT RIC that is implemented by an active RIC and a standby RIC.

FIG. 21 illustrates a distributed near RT RIC that is implemented by an active RIC 2102 and a standby RIC 2104. As shown, the E2 nodes 2118 and xApp Pods 2120 communicate with the active RIC 2102, until one or more components of this RIC fail. When the active RIC fails, the standby RIC 2104 becomes the active RIC, and the E2 nodes and xApp Pods continue their communications through the RIC 2104, which is now the active RIC.

Both of these RICs have the same components, which are a datapath Pod 2105, a service Pod 2110, and an SDL Pod 2115. The datapath Pod is shown to include a control thread 2109 and a datapath thread 2107. Instead of one datapath thread 2107, some embodiments employ one data IO thread and multiple DPTs as mentioned above. In some embodiments, the active RIC 2102 is implemented by a first set of one or more computers, while the standby RIC 2104 is implemented by a different second set of one or more computers.

As shown, each E2 node 2118 has a dual-homed SCTP connection with the datapath threads 2107 of the active and standby RICs 2102 and 2104. Similarly, each xApp Pod 2120 has a dual-homed SCTP connection with the datapath threads 2107 of the active and standby RICs 2102 and 2104. Dual-homing connections is a feature provided by SCTP. When a first component connects to an active/standby pair of components through a dual-home connection, the first component can automatically switch to using the standby component when the active component fails. Thus, using the dual-homed SCTP connections, each E2 node or xApp Pod can switch to the datapath thread 2107 of the standby RIC 2104 when the active RIC 2102 or its datapath Pod fails.

As shown, the RIC SDK interface 2122 of the datapath thread 2107 of the active RIC 2102 forwards messages that it receives from the xApp RIC SDKs, and messages that it sends to the xApp RIC SDKs, to the RIC SDK interface 2122 of the datapath 2107 of the standby RIC 2104. This is done in some embodiments so that the standby RIC's datapath thread 2107 can update its state machine to match the state of the active RIC's datapath thread 2107. Also, as shown, synchronizing agents 2127 of the active and standby RICs 2102 and 2104 synchronize the SDL storage 2126 of the standby RIC 2104 with the SDL storage 2126 of the active RIC 2102. All components of the active and standby RICs 2102 and 2104 are consistently managed by the SMO 2130.

Figure 22:
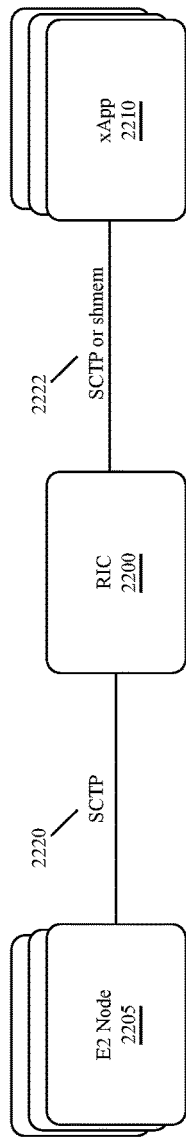
FIG. 22 illustrates the interfaces between a near RT RIC and E2 nodes, and between the near RT RIC and xApp Pods in some embodiments.

FIG. 22 illustrates the interfaces between a near RT RIC 2200 and E2 nodes 2205, and between the near RT RIC 2200 and xApp Pods 2210 in some embodiments. In some embodiments, the near RT RIC is one of the above-described near RT RICs. As mentioned above, and as shown in FIG. 22, the near RT RIC in some embodiments employs SCTP interface 2220 and 2222 with both the E2 nodes 2205 and the xApp Pods 2210. When the xApp Pod and the near RT RIC execute on the same host computer, some embodiments use a shared memory as the interface between the near RT RIC and the xApp Pod, as shown. These interfaces keep the message exchange fast, and minimize encoding and decoding overhead across all paths to minimize latency (e.g., perform one ASN decode and one ASN encode). In some embodiments, the interface 2220 between an E2 node and near RT RIC will follow the E2AP specifications, and all message exchange will conform to E2AP specifications.

Also, in some embodiments, the interface 2222 between the near RT RIC and an xApp Pod uses a novel encapsulating header that will be described below by reference to Table 1. The interface 2222 handles a mix of different types of messages. Examples of such messages in some embodiments include (1) the entire E2AP messages (e.g., E2 Setup Request) from an E2 node, (2) some fields of the E2AP header along with the entire E2SM content (i.e., the entire E2AP message payload), (3) internal messages between the near RT RIC and xApp Pod (e.g., a message from the near RT RIC that an earlier message of an xApp caused an error), and (4) messages from xApp to near RT RIC or E2 Node. In some embodiments, the E2 content might not be ASN1 encoded (e.g., portion of a subscription request might not be encoded).

In some embodiments, the near RT RIC 2200 can be configured on a case by case basis to decode just the E2AP messages before it sends the message to an xApp, or to decode the entire E2AP header along with its E2SM payload. In some cases, the near RT RIC sends the entire E2AP header while in other cases it only sends a part of this header. In the RIC E2AP message handling of some embodiments, all fields are in network byte order, and the near RT RIC 2200 will work with that order as much as possible. For displaying fields, some embodiments can convert the data to host order. In some embodiments, the near RT RIC 2200 will not look into E2SM payload, while in other embodiments it will (e.g., in order to avoid duplicate subscription errors).

In some embodiments, the RAN function ID is E2 node specific. The xApps will not subscribe to RAN functions across E2 nodes, as every subscription will be to an individual E2 node. Also, in some embodiments, the RIC Request ID space is local to an E2 node. In some embodiments, the RIC Request ID number space is ephemeral component as well as a persistent component. For example, the RIC request IDs used for indication reports will persist while RIC request IDs used from subscription may be reused.

Table 1 below displays an exemplary message format used in some embodiments for the communication between the RIC and RIC SDK. This is the format of an encapsulating header that is used to encapsulate all messages from and to the RIC to and from the RIC SDK. In some embodiments, the encapsulating header stores data needed by the RIC SDK and the RIC for efficient processing of the data message. In the example illustrated in Table 1, the first sixteen bytes associated with the msg_type, msg_serial_num, msg_len, msg_flags, and ctrl_len are part of the encapsulating header along with the ctrl_info field. The payload of the encapsulated packet can include any data. In the example shown in Table 1, the payload includes the original E2AP packet along with its E2SM payload.

All messages between RIC and RIC SDK are encapsulated with the header shown in Table 1. Control information and payload are optional. Some messages may have control information but no payload field, others might have payload without control information and some may have both control and payload fields. In some embodiments, the RIC SDK can be configured to trap these messages and reformat them for presentation to xApps. The format of the message is a raw byte stream. In some embodiments, a message CRC field is not used, while it is used in other embodiments.

TABLE 1

| Type | Length (bytes) | Description |
| --- | --- | --- |
| msg_type | 4 | Message type identifying what type of message is being sent |
| msg_serial_num | 4 | Running serial number identifying a particular message |
| msg_len | 4 | Total message length: includes header, control and payload. Msg Len = 16 (header len) + control len + payload len |
| msg_flags | 2 | Message flags |
| ctrl_len | 2 | Control Info Len |
| ctrl_info | variable len | Control Info - Contents depend on message type |
| payload | variable len | Could include any portion of original data message—any portion of E2AP header or E2SM payload—ASN1 encoded or decoded |

The near RT RIC 2200 handles E2 node and xApp connect, disconnect, reset, and crashes as follows. For E2 nodes, the RIC in some embodiments handles a connect, disconnect, and crash similarly. Specifically, when the connection to the E2 node drops and comes back for any of these reasons, the E2 node will send a connection setup all over again as though it started for the first time, and the near RT RIC will clean all its state related to the E2 node and start over. In some embodiments, the near RT RIC informs all xApps when an E2 node connection drops and comes back up whether they had previously subscribed to the particular E2 node or not, as the E2 node might advertise new functionality in which a previously unsubscribed xApp may be interested. When an xApp connects, disconnects, or crashes, the near RT RIC again performs the same operations, in that it resets all the state of the xApp in the near RT RIC and deletes its subscriptions from all E2 nodes.

Figure 23:
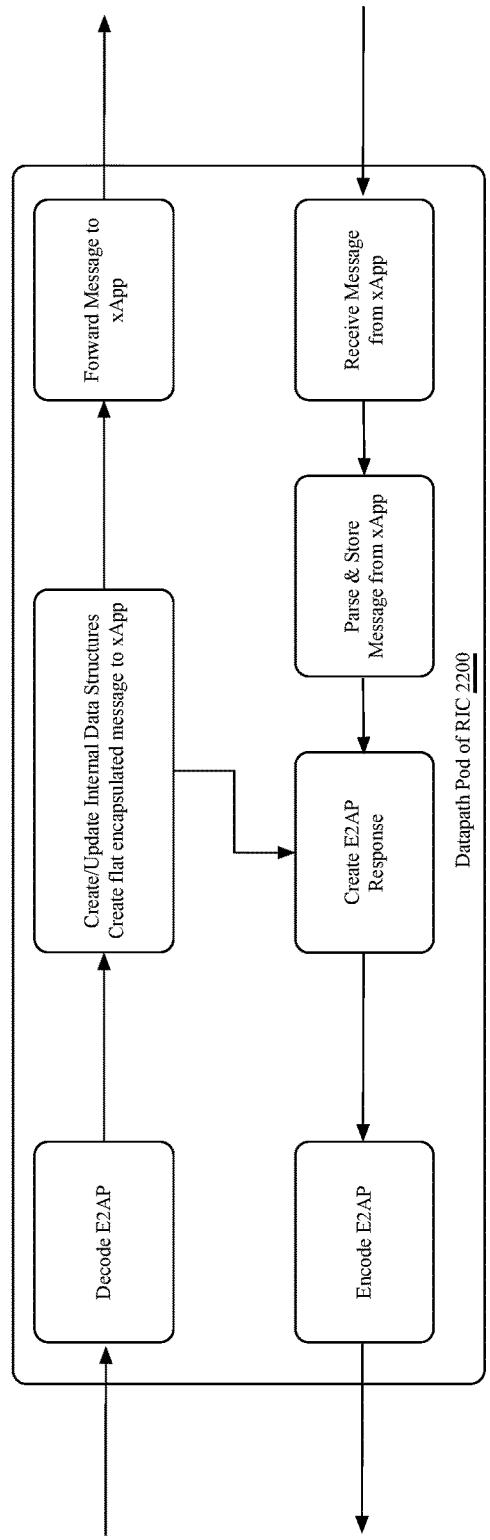
FIG. 23 illustrates the E2AP message handling of the datapath Pod of the near RT RIC.

FIG. 23 illustrates the E2AP message handling of the datapath Pod of the near RT RIC 2200. In the discussion below regarding the E2AP message handling and other message handling, this datapath Pod is simply referred to as the near RT RIC 2200 or the RIC 2200 for purposes of brevity. As shown, the near RT RIC 2200 initially decodes an E2AP message received from an E2 node. In some embodiments, this decoding involves the decoding of only the E2AP header, while in other embodiments, this decoding involves the decoding of the E2AP header and the E2SM payload. For some or all of this decoding (e.g., E2SM), the near RT RIC in some embodiments uses a hardware accelerator (e.g., a GPU accelerator) that it accesses through a bypass path, which is described above.

After decoding the E2AP message, the near RT RIC creates or updates its internal data structures to account for the received data message, and then creates a flat encapsulated message to the xApp in the format described above by reference to Table 1. As the near RT RIC and RIC SDK operate on different containers and reside on different Pods in some embodiments, they do not pass arbitrary data structures to each other but format their data exchange into an encapsulated message with a specific sequence of bytes in some embodiments. After encapsulating the data message, the near RT RIC forwards the data message to the xApp Pod for the RIC SDK on this Pod to forward to the appropriate xApp.

The internal data structure that the near RT RIC creates or updates while processing the E2AP message is used for processing of responsive messages from the xApp to the E2AP message and for processing of subsequent E2AP messages. Examples of data stored in the near RT RIC's internal data structure in some embodiments include (1) a subscription list of xApps that are interested in data from a particular E2 node, (2) particular data tuples that each xApp is interested from each E2 node, (3) records identifying network addresses and other location data relating to E2 nodes and xApps, (4) identifiers that are allocated and assigned (e.g., RIC Request IDs).

When the xApp sends a message, its RIC SDK processes the message and forwards it to the RIC along a shared memory or SCTP interface as described above. The near RT RIC then parses the message and stores the parsed components. Based on these components, and on one or more data tuples that it stored in its internal data structure for the associated E2 node message(s), the RIC creates an E2AP response, and then encodes and forwards this response to the E2 node to which it is directed.

For instance, after a first xApp sends a subscription request to receive M data tuples from an E2 node, the near RT RIC's datapath Pod creates a state to record the first xApp's desired subscription, requests a subscription with the E2 node for the M data tuples, and forwards these M data tuples to the xApp when it initially receives them and each subsequent time that it receives them. In some embodiments, the near RT RIC's datapath Pod can be configured to forward the M data tuples to its associated SDL each time that it receives them from the E2 node.

After the first xApp subscribes to receive the M data tuples from the E2 node, a second xApp can subscribe to receive N different data tuples from the E2 node, where N is larger than M. The near RT RIC then sends an updated subscription request to the E2 node. This update now requests the N data tuples. Each time that the near RT RIC receives the N data tuples, it sends M data tuples to the first xApp and all N data tuples to the second xApp.

Another example involves the near RT RIC removing and caching an RIC request ID from an E2AP message from an E2 node in response to a subscription request. After this ID is removed, the RIC provides a portion of the E2AP message and its E2SM payload (if applicable) to the xApp. Subsequently, when the xApp wants to delete the subscription, the RIC retrieves RIC request ID from its state, and inserts it into its E2AP message to the E2 node to request the deletion of the subscription.

In some embodiments, the near RT RIC's E2 Setup, Response Message, and Failure Message handling is as follows. The near RT RIC initially receives the setup request message from the E2 node. In response, the near RT RIC will decode the message and build internal data structures. The RIC will also cache the raw ASN1 payload. In some embodiments, the near RT RIC accepts all added RAN function identifiers. In some embodiments, the near RT RIC sends the setup message to xApps after decoding the E2AP header but nothing else (i.e., as a message with an ASN1 encoded E2SM payload). In some embodiments, a setup message that the near RT RIC sends to an xApp has a control length (ctrl_len) of 0 with its ASN1 encoded payload.

When an xApp connects later, the near RT RIC will send all setup requests from E2 nodes to the xApp so it has an inventory of connected E2 nodes. In some embodiments, the near RT RIC sends these messages one at a time. Also, as mentioned above, the near RT RIC in some embodiments constructs E2Setup response and send it to the E2 node. In some embodiments, the near RT RIC sends a failure message when a setup request is malformed (e.g., it is a duplicate of the RAN function list, or removes a record not added to a list).

After receiving a reset from E2 node, the near RT RIC performs the following actions after decoding the message. It sends a message regarding this reset to all xApps that have a subscription to this E2 node. In some embodiments, this is an internal message without any ASN1 content. The near RT RIC ends subscription deletion messages to the E2 node for all previous subscriptions that it sent to it. It also sends control, insert and policy deletions to this E2 node. It cleans up any outstanding requests, and sends reset response to the E2 node.

The near RT RIC also employs a Service Update, Acknowledge, and Failure message in some embodiments. This message updates the supported RAN function list, with additions, modifications and deletions. The near RT RIC inform all xApps about the new service configuration of an E2 node. In some embodiments, the near RT RIC sends the message to xApps after application of the configuration so it will reflect the final state of the configuration. In other embodiments, the near RT RIC sends the message as is for xApps to compute the delta between the previous and new state of supported RAN functions. In this latter approach, the near RT RIC does not need to ASN1 encode the resulting delta.

The handling of the E2AP subscription is as follows in some embodiments. An xApp formats the E2SM portion of the subscription and ASN1 encode it. Table 2 below details the control portion of the subscription message (i.e., the portion that is stored in the control field of a message from the xApp to the near RT RIC). The payload will be the ASN1 encoded E2SM content. Multiple subscription message types are defined in some embodiments to disambiguate optional information. Also, in some embodiments, message flags are used to specify the exact format. In some embodiments, each subscription message specifies one E2 node Global ID and one RAN Function ID.

In some embodiments, the E2 node sends an identifier that is 113 bytes and the RIC compresses that to a 40 byte ID. When sending the subscription message to the E2 node, the RIC converts the 40 byte to 113 byte ID. The subscription message control fields will be of fixed formats as far as possible. In some embodiments, the RIC caches all subscription requests and compares requests from multiple xApps in order to avoid sending out duplicate subscription messages. However, when a second subsequent xApp requests additional information from the same E2 node after a first initial xApp requests some information from the E2 node, the RIC resends the subscription (with the same RIC Request ID in some embodiments) but this time asks for the additional information. When sending out the subscription request to the E2 node, the RIC sends out as the E2AP message payload the entire payload received from xApp in some embodiments.

TABLE 2

| Field Name | Field Len |
| --- | --- |
| E2 Node Global Id | 40 bytes |
| RAN Function Id | 2 bytes |
| RIC Event Trigger Len | 2 bytes |
| RIC Action Admit Cnt | 2 bytes |
| RIC Action Not Admit Cnt | 2 bytes |
| RIC Subsequent Action Cnt | 2 bytes |
| RIC Action Type | 16 bytes - Only RIC Action Cnt Fields are valid |
| RIC Action Definition Length | 32 bytes - 2 bytes per - Only RIC Action Cnt Fields are valid |
| RIC Subsequent Action Type | 16 bytes - Only RIC Subsequent Action Cnt Fields are valid |
| RIC Subsequent Action Time to Wait | 16 bytes - Only RIC Subsequent Action Cnt Fields are valid |
| RIC Action Definition | x bytes each * Action Cnt |
| RIC Event Trigger Definition | x bytes |

The near RT RIC handles an E2AP RIC subscription response by storing the E2 node Global ID and RIC Request ID (generated by RIC) as control information and sending the exact ASN1 encoded message from E2 node back to xApps.

The E2AP RIC subscription delete request, response or failure message are sent from an xApp to the near RT RIC with message fields sent as control information (i.e., as part of the ctrl_info). The near RT RIC creates the encoded ASN1 message and sends it to the E2 node. The deletion request does not specify the E2 Node Global ID. Hence, this information is provided by the RIC for the xApp. The response message is sent as packed bytes (not ASN1 encoded) from near RT RIC to xApp in some embodiments.

An E2 node's E2AP indication report is handled as follows. The message is decoded by near RT RIC to determine the RIC Request ID field. This helps determine which xApp(s) subscribed to the indication. The near RT RIC in some embodiments sends the message as an ASN1 encoded to xApp(s). In some embodiments, the near RT RIC also sends the reduced E2 Global ID as control information along with the message.

The near RT RIC's processing of the E2AP control request is as follows in some embodiments. The xApp sends this request as packed byte information. The near RT RIC does not specify the E2 Global ID in the message, as this information is specified by the xApp. The near RT RIC's formatting of this message is illustrated in Table 3.

TABLE 3

| Field Name | Field Len |
| --- | --- |
| E2 Node Global Id | 40 bytes - fixed |
| RAN Function Id | 2 bytes - fixed |
| RIC Call Process Id len | 2 bytes |
| RIC Control Header len | 2 bytes |
| RIC Control Message len | 2 bytes |
| RIC Control Ack Request | 1 byte |
| RIC Call Process | byte string |
| RIC Header len | byte string |
| RIC Control Message | byte string |

The near RT RIC handles E2AP control response or failure message is as follows. The near RT RIC decodes the message to obtain the RIC Request ID. It then sends the ASN1 encoded message to xApp prepended with the Global E2 Node ID as control information In some embodiments, the SDL data store is an in memory database that runs in its own set of one or more Pods. It has its own compute and memory resources assigned. As mentioned above, multiple near RT RIC instances define a distributed near RT RIC. In some embodiments, each near RT RIC instance has its own instance of an SDL, which stores system wide information for the RIC instance. Examples of such information include a list of connected E2 nodes (i.e., base station nodes), xApps, subscriptions from each xApp and critical cell data returned by E2 nodes. Further, each SDL instance in some embodiments provides services to preprocess incoming data by running custom algorithms internally as the data arrives and by interfacing to hardware accelerators (e.g., GPUs), or post-process data retrieved from its storage.

The data IO Pod and xApp Pods of the RIC instance are connected to the SDL Pod of the RIC instance. In some embodiments, each SDL instance just operates with the data IO Pod and service Pod of its own RIC instance. Also, in some embodiments, the SDL Pod is managed by the SMO and configured via the service Pod. The dataflows to and from the SDL include (1) data IO to SDL data store, (2) xApps from SDL data store, (3) xApps to SDL data store, (4) data IO from SDL data access (e.g., retrieval of E2 node info, subscription info, etc.), and (5) service Pod to and from SDL communication to provide and retrieve configuration information.

Examples of SDL transaction in some embodiments include (1) data IO Pod (control or data IO thread) writing data to SDL, which is then read by an xApp, (2) an xApp reading data from another xApp that is written to the SDL, or the xApp writing data to the SDL for another xApp, (3) xApp writing to SDL so that a service container (e.g., a post processor) operating in the SDL Pod performs an operation (e.g., by using the GPU services or just using the general CPU) on the written data before the same xApp or another xApp retrieves the result of this operation from the SDL, (4)

the non-RT RIC reading data from and writing data to the SDL as part of an A1 subscription, (5) SMO storing O1 configuration data in the SDL, and (6) non-RT RIC storing ML data in the SDL. Additional details regarding the embodiments described above and additional features of the RIC can be found in U.S. Patent Application Publication No. 2022-0283882, titled "Data IO and Service on Different Pods of a RIC", and filed Jul. 25, 2021, and U.S. patent application Ser. No. 17/893,155, titled "Use of CRDs as Descriptors for Applications, Application Components, Deployments, Clouds, AI/ML Models, and RTE in an O-RAN System", and filed on Aug. 8, 2022. U.S. Patent Application Publication No. 2022-0283882 and U.S. patent application Ser. No. 17/893,155 are incorporated herein by reference.

The ORAN guidelines followed by embodiments described below include ORAN Alliance WG10 OAM Architecture, which defines Configuration Provisioning for O1 interface with Netconf (Network Configuration Protocol) and Yang between an SMO (Service, Management, Orchestration) framework and a Managed Element (ME) for dynamic interactions. As per rev 5.0.0, a reference to communication and procedures is mentioned in RFC 6241. The following mechanisms are used: for transport layer, SSH/TLS; for encoding, XML; and for data modeling, Yang. It should be noted that while SSH is mandatory, TLC/HTTP, etc., are also allowed. Additionally, while many of the embodiments described below refer to a RAN or RAN system, these embodiments are applicable to O-RAN systems.

Netconf is a network management protocol defined by the IETF for installing, manipulating, and deleting configurations of network devices (e.g., RAN components). In some of the embodiments described herein, Netconf is referred to as a protocol defined by a telephony-based standards body, and the formats used are referred to as formats of telephony-based standards body communications. Netconf operations occur at the RPC (Remote Procedure Call) layer. Netconf uses XML-encoding and provides a basic set of operations to edit and query configurations on a network device. Netconf is commonly used for network automation. Features of Netconf include a distinction between configuration and state data, multiple configuration datastores, error checking and recovery, configuration change validations and transactions, selective data retrieval with filtering, event notification streaming and playback, and an extensible remote procedure call mechanism.

The multiple configuration datastores for Netconf include a running datastore that is a mandatory active datastore to hold current configurations of a device, a candidate datastore that can be manipulated without impacting a device's current configuration and that can be committed to the running datastore, and a startup datastore that is loaded at startup and copied to the running datastore at boot. Base capabilities of Netconf include operations such as <get> for fetching a running configuration and state information, <get-config> for fetching all or part of a specified configuration datastore, <edit-config> for loading all or part of a configuration to the specified configuration datastore, <copy-config> for replacing the whole configuration datastore with another configuration datastore, <delete-config> for deleting a configuration datastore, <discard-changes> for clearing all changes from the candidate datastore <candidate/> and making it match the running configuration datastore <running/>, <create-subscription> for creating a Netconf notification subscription, <commit> for copying a candidate datastore to the running datastore, <cancel-commit> for cancelling an ongoing confirmed commit, <lock> and <unlock> for locking the entire configuration datastore system so one session can write and unlocking the entire configuration datastore system so any session can write, <close-session> for gracefully terminating a Netconf session, and <kill-session> for forcefully terminating a Netconf session.

Yang is a protocol-independent data modeling language that is used to model configuration and state data manipulated by the Netconf. Yang models the hierarchical organization of data as a tree in which each node has a name and either a value or a set of child nodes. It structures data models into modules and submodules. Because Yang is protocol independent, it can be converted into any encoding format (e.g., XML or JSON). The Yang tree structure includes a module name and one or more containers. Each container within the Yang tree structure includes a list that includes a key and one or more leaves, with each leaf including a data type.

Netconf and Yang both have associated libraries. Libyang is a Yang parser that is implemented and provided as a library with API in C language, while libnetconf is a generic Netconf library in C language that is intended for building Netconf clients and servers. Sysrepo is a library that acts as a standalone datastore for storing configuration data. Netopeer2 uses each of these three libraries (i.e., libyang, libnetconf, and sysrepo) to expose command-line server and client executables.

Figure 24:
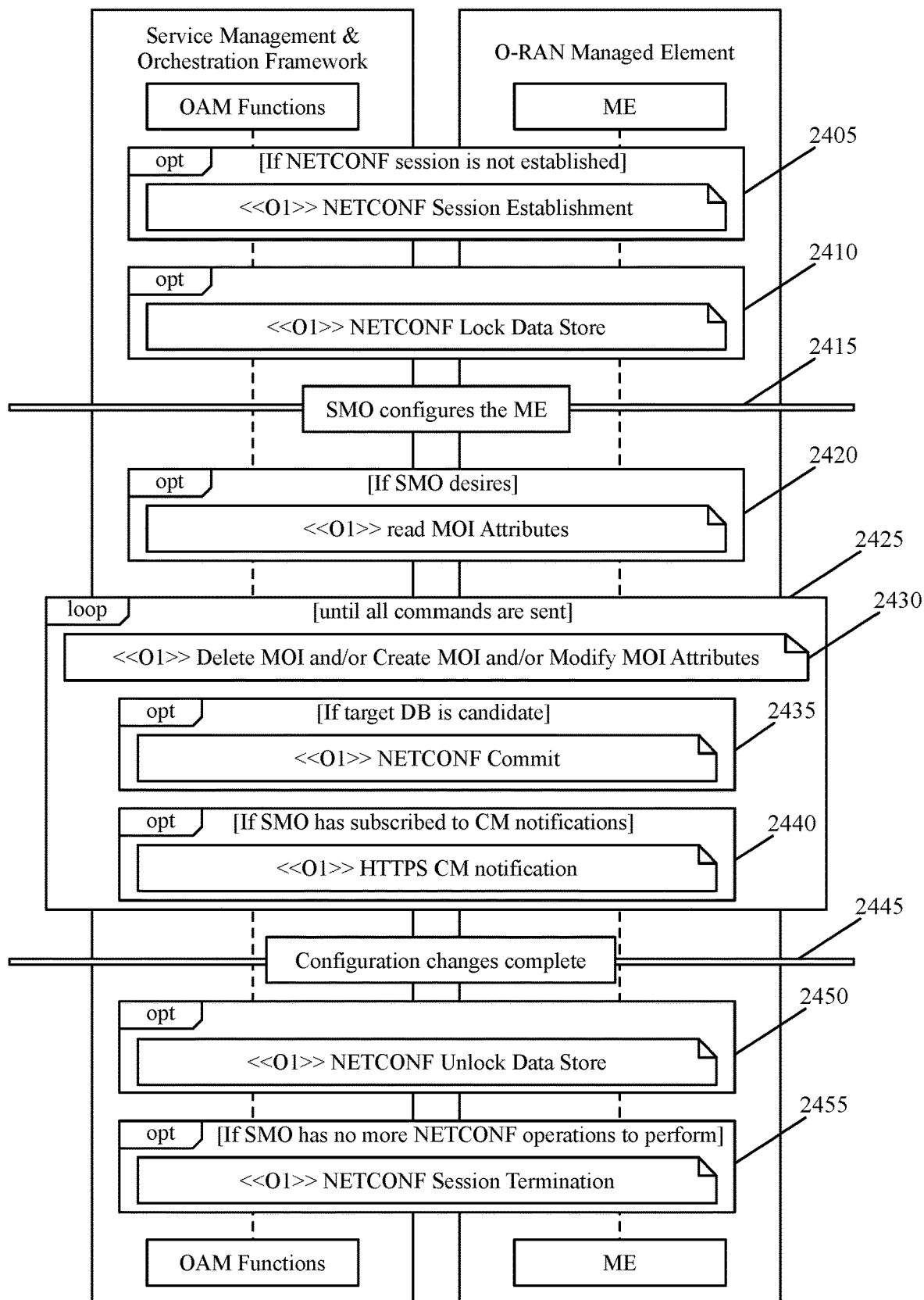
FIG. 24 illustrates a sequence diagram that explains a Netconf command procedure that an SMO (i.e., Netconf Client) sends to configure an ME (i.e., Netconf Server) in a RAN environment, in some embodiments.

FIG. 24 illustrates a sequence diagram that explains the Netconf command procedure that an SMO (i.e., Netconf Client) sends to configure an ME (i.e., Netconf Server) in a RAN environment in which embodiments described below operate, in some embodiments. Initially, if a Netconf session has not yet been established, the SMO connects (at 2405) with ME using SSH/TLS transport. After a successful connection, a secured Netconf session is established between the two entities. At 2410, the SMO then locks (i.e., <lock>) the target datastore (e.g., running/candidate datastore) located at the ME to prevent other Netconf clients from operating on the datastore.

To configure the ME (starting at 2415), the SMO reads the configurations of the ME's running datastore (at 2420) using a Read Managed Object Instance (MOI) Procedure to get the latest updates. If the changes are made in a candidate data store using Write MOI or Delete MOI, the SMO (e.g., at 2430 in the loop 2425) of some embodiments commits the changes to the running datastore (at 2435 in the loop 2430) to make them effective. If the SMO has subscribed to CM (configuration manager) notifications, an HTTPS CM notification is sent (at 2440) as part of the loop 2425. The ME then processes the configurations as per the needs.

Multiple provisioning procedures can be executed in sequence, one at a time, under the same lock session, in some embodiments. After performing all the provisioning procedures, the SMO unlocks (i.e., <unlock>) the data store (at 2450) and terminates the Netconf session (at 2455).

In some embodiments, ORAN specifies the provisioning workflow for the dRIC, and a similar workflow is assumed for the cRIC. This automated provisioning process, in some such embodiments, is triggered following the completion of a registration process. As such, the configurations service in some such embodiments is already aware of the topology of the cRIC and dRIC clusters, as well as the IP address and port to establish a Netconf connection with the O1 CM agent at each RIC instance. The O1 CM agent, in some embodiments, is an FCAPS pods. In some embodiments, the configurations service is also aware of any RIC components (e.g., xApps, rApps, LCM, E2T, etc.). In other embodiments, a UI to RMS configurations service interaction is implemented. The RMS configurations service can be implemented using a command-line interface, in some embodiments. This framework, in some embodiments, works with components that have been onboarded by the RMS configurations service provider, while other components are managed by a vendor's respective element management system (EMS).

Figure 25:
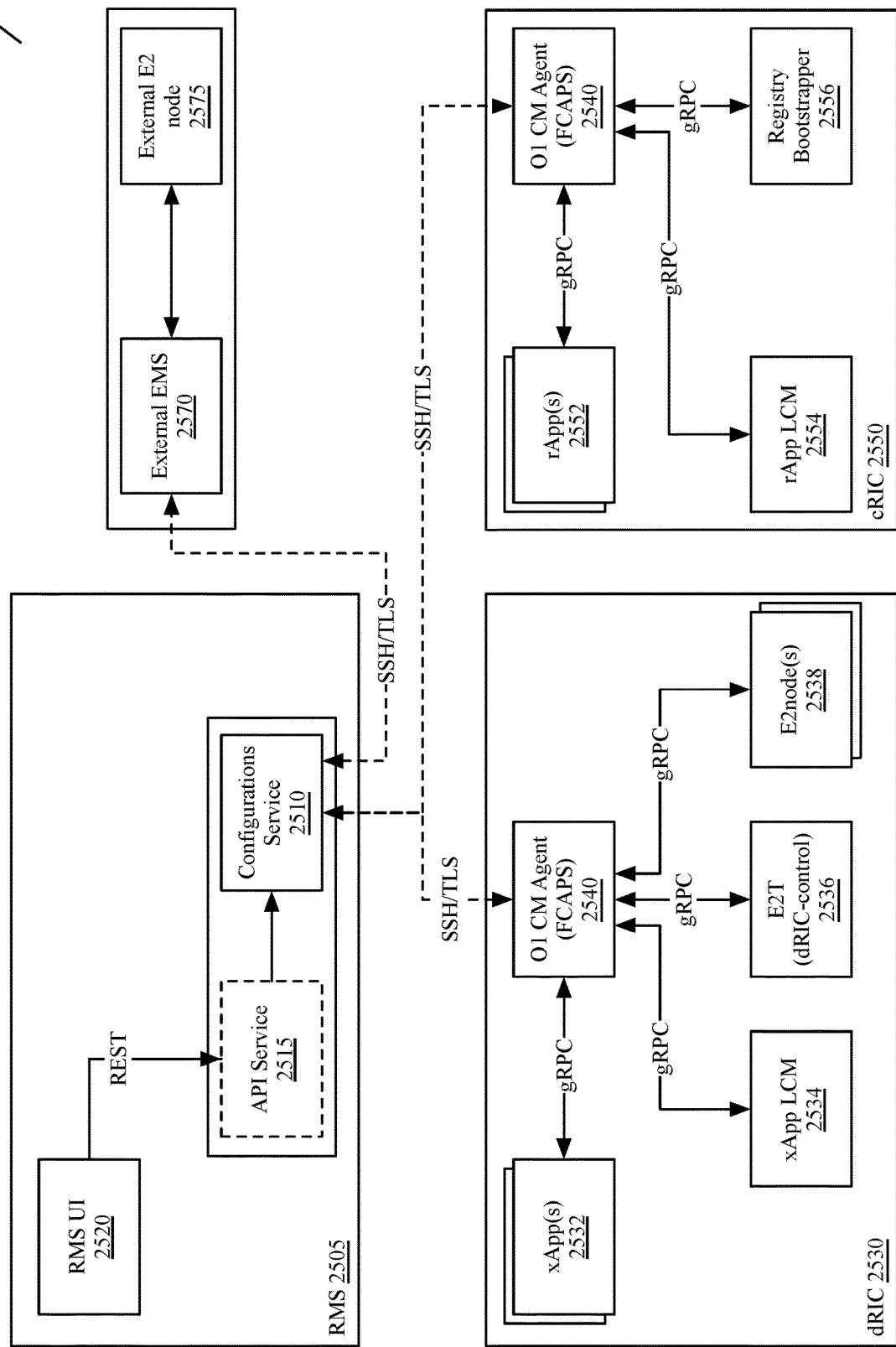
FIG. 25 conceptually illustrates a simplified top-level diagram of a RAN system of some embodiments that includes an RMS configurations service (i.e., Netconf client) and O1 CM agents (i.e., Netconf Servers) as the main components in Netconf-based communication.

FIG. 25 conceptually illustrates a simplified top-level diagram of a RAN system 2500 of some embodiments that includes an RMS configurations service 2510 (i.e., Netconf client) and O1 CM agents 2540 (i.e., Netconf Servers) as the main components in Netconf-based communication. The RMS configurations service 2510 is part of the RMS 2505, which also includes an API service 2515 and a UI 2520. An O1 CM agent 2540 is deployed to each of the dRIC 2530 and cRIC 2550, as shown. In addition to the O1 CM agent 2540, dRIC 2530 also includes one or more xApps 2532, an xApp LCM 2534, an E2 termination interface 2536, and one or more E2 nodes 2538, while the cRIC 2550 includes one or more rApps 2552, an rApp LCM 2554, and a registry bootstrapper 2556. In some embodiments, each RIC instance is deployed as one physical computer (i.e., one single box), or as multiple computers that execute the various modules that form the RIC. The xApp LCM 2534, in some embodiments, is an LCM pod or an LCM VM (virtual machine).

In some embodiments, the RAN system 2500 also includes external E2 nodes 2575 that are deployed by third-party vendors and are managed by an external EMS (element management system) 2570 that communicates with the configurations service 2510 of the RMS 2505. In some embodiments, the RICs (i.e., dRIC 2530 and cRIC 2550) are implemented in a set of one or more cloud datacenters. These cloud datacenters, in some embodiments, include one or more public cloud datacenters, or a combination of public and private cloud datacenters.

The RMS 2505, in some embodiments, is a RIC management system that uses the UI 2520 and the configurations service 2510 for configuration management and state storage for all of the O1 CM agents 2540. More specifically, the RMS 2505 uses the UI 2520 for configuration management to show the current state of configuration of a RIC component (e.g., the E2 termination interface (dric-control) 2536, E2 nodes 2538, xApps 2532, rApps 2552, etc.), in some embodiments, as well as to expose write/delete/modify operation procedures for operators to change configurations during runtime, according to some embodiments. The UI 2520 of some embodiments leverages REST APIs exposed by the API service 2515. In some embodiments, the UI 2520 also includes functionalities other than those specified.

In some embodiments, the RMS 2505 uses the configurations service 2510 for exposing REST APIs for northbound communication with API service 2515. The configurations service 2510 acts as a Netconf termination client for southbound communication, while the O1 CM agent 2540 acts as a Netconf server, in some embodiments. The interaction between the configurations service 2510 (i.e., Netconf client) and the O1 CM agent 2540 (i.e., Netconf server) is the interaction described above for FIG. 24.

In some embodiments, the UI 2520 of the RMS 2505 uses configurations service 2510 as a proxy layer to fetch configurations from the O1 CM agent 2540 data store (not shown), and/or to express write intent to it. A database/cache layer (not shown) is added near the configurations service 2510 in some embodiments to store recent configurations. In some embodiments, adding such a database/cache layer helps to avoid network calls to the O1 CM agent 2540 every time a configuration page is loaded on the UI 2520.

Also, in some embodiments, the O1 CM agent 2540 has two different connection mechanisms. As the first mechanism, the O1 CM agent 2540 acts as a Netconf server to terminate all the incoming requests from the RMS configuration backend, in some embodiments. After a basic authentication check, in some embodiments, the O1 CM agent 2540 then validates the incoming configurations against a Yang model. If the validation fails the entire configuration block is discarded and Netconf error code is relayed back to the sender, in some such embodiments, while a successful validation will generate a structured Yang tree for further processing and make an entry in the running datastore.

As the second mechanism, in some embodiments, all of the RIC (i.e., cRIC and/or dRIC) components that desire run-time configurations updates connect with the O1 CM agent 2540 over a gRPC connection using a service discovery model (e.g., Kubernetes service discovery model) and static defined port, according to some embodiments. It should be noted that as per ORAN, a near-real-time platform (e.g., dRIC) is considered a managed element. This functionality is implemented in some embodiments using the O1 CM agent 2540, which is a dedicated pod decoupled from the main E2 termination interface (dric-control) 2536 pod. The E2 termination interface 2536 acts as an intelligent proxy and adapter for managing interactions between components of the RAN system 2500 and e2 nodes (not shown), according to some embodiments.

In some embodiments, xApps are not considered managed elements, while in other embodiments, xApps are considered managed elements. To pass configurations internally, some embodiments use gRPC as the internal transport mechanism. In some embodiments, gRPC is more efficient in terms of resource utilization, faster, and simpler than other internal transport mechanisms. Also, in some embodiments, other internal transport mechanisms require opening other ports that pose security risks, and as such, gRPC is a safer internal transport mechanism, in some embodiments.

The structured Yang tree generated following the successful validation of the configuration is then decoded to find whether the configurations apply to a set of RIC components (i.e., broadcast) or just one RIC component (i.e., unicast), in some embodiments. This intent (i.e., whether the configurations apply to a set of RIC components or a single RIC component) is designed during the Yang model creation phase, according to some embodiments. Examples of a first type of configurations applied to a group of RIC components, in some embodiments, include changing the log level, log mode, debug mode, etc. Examples of a second type of configurations applied to one RIC component, in some embodiments, include changing component-level parameters, such as provisioning an E2 node, etc.

In some embodiments, a central collector is required to enable the first type approach. This central controller performs a sequence over gRPC, in some embodiments. As a first step of the sequence, in some embodiments, the central controller checks with the connected RIC components to determine whether they are willing and ready to accept new configurations. Then, if all the underlying components give a positive ACK (i.e., based on the connectivity, readiness to accept the configs), the central controller disseminates the configurations to the components, in some embodiments. If any component returns a negative ACK, the central controller of some embodiments rolls back the committed changes to the running datastore and returns a Netconf error back to the configurations service in the same Netconf session. This mechanism is called a two stage commit, in some embodiments.

Some embodiments have two approaches to implement gRPC servers and gRPC clients. In the first approach, in some embodiments, the RIC components act as a gRPC server, and the O1 CM agent acts as gRPC client. As soon as the RIC components and the O1 CM agent are bootstrapped, a channel is established between them, in some embodiments. The O1 CM agent, in some embodiments, needs to know the service endpoints of all the deployed RIC components, and needs to keep a track of added and/or removed RIC components in runtime. In some embodiments, this information is conveyed from the RMS configurations service when the user (e.g., operator) wants to provision one or more components. As such, the O1 CM agent 2540 does a bookkeeping operation of maintaining the connection endpoints and dissemination of configurations, in some embodiments.

The RIC components of some embodiments act as a gRPC server, while the O1 CM agent 2540 acts as gRPC client. In some embodiments, the RIC components need to know the service endpoint of the O1 CM agent 2540, which is easier to manage. A server push mechanism, where a client can establish a connection with the server, can be implemented in some embodiments. The server, in some embodiments, maintains a subscriber list that includes a list of connected clients. Whenever the server has any events for a particular client, it will stream the response, in some embodiments. Both approaches, in some embodiments, require validation when the system is scaled (i.e., scaled in reference to multiple xApps/E2 nodes provisioning).

In some embodiments, some vendors can bring their own CU/DU (E2 node) 2575 whose configurations are managed by their own Element Management System (EMS) 2570. The RMS Configuration Backend 2510 can connect with this EMS 2570 using standard Netconf procedure. To accomplish this, in some embodiments, the EMS 2570 acts as a Netconf Server and relays information to the external E2 node 2575. In some such embodiments, the vendor then provisions the E2 node 2575 using the RMS UI 2520 according to the workflow described above, and assuming both that RMS 2505 knows how to connect with the EMS 2570, and that the connection and message exchange complies with Netconf procedures (i.e., as described in WG10).

The O1 CM agent 2540 stores currently applied configurations for the entire RIC in the running datastore (not shown). If the O1 CM agent 2540 restarts, the configurations are lost, in some embodiments. As such, persistence is enabled in some embodiments. In some embodiments, there are two approaches to make sure RIC components have correct configurations. For the first approach, in some embodiments, if any connected RIC component restarts, the O1 CM agent 2540 sees that one of the subscription clients went inactive, and then relays the configurations for that RIC component whenever the client comes back again. In some embodiments, the O1 CM agent 2540 will only be allowed to push the configurations. For the second approach, if any connected RIC component restarts, the component will make a GET call to the O1 CM agent 2540 to obtain the desired configurations from the running datastore, according to some embodiments.

With respect to upgrades, the O1 CM agent 2540 of some embodiments needs to be updated first, prior to any RIC component being updated. The upgrade of the O1 CM agent 2540 needs to account for some downtime, in some embodiments. The O1 CM agent 2540 is upgraded, in some embodiments, with the new version of Yang modules, as well as a protobuf file. Protobuf (Protocol Buffers) is a data format that is open-source and cross-platform and is used to serialize structured data. As such, protobuf is useful for communications between processes (e.g., FCAPs processes, application processes, etc.) for storing data and for communications over the network (e.g., RAN, O-RAN, etc.). Protobuf works by utilizing both an interface description language that describes the data structure and a program that generates source code from that description. The source code is then used for generating or parsing a stream of bytes that represents the structured data. After the upgrade, in some embodiments, all the northbound and southbound communications are reinitiated. In some such embodiments, a version field is added in both Yang modules, as well as the protobuf file.

The process for upgrading RIC components is a two-fold process, in some embodiments. First, the new version of RIC is onboarded in some embodiments in a blue-green deployment model. In some embodiments, this is handled by a third party (e.g., Kubernetes). Second, registration is reinitiated with RMS service, and then the RMS backend pushes/updates new configurations into the O1 CM agent. It is then written to the RIC component. At boot time, each RIC component will follow the Restart Procedure described above.

In some embodiments, conflict management is required such as for overwriting static configuration files. For instance, consider a RIC component that was onboarded with a static file that contains log level set to INFO, and the dynamic provisioning changes the log level to DEBUG. After running for a few cycles, the RIC component crashes and then comes back. The RIC component of some such embodiments can use the log level from the static file since this is a part of the startup process, in some embodiments. In some embodiments, there are two approaches that help to get back the dynamically provisioned changes. In the first approach, in some embodiments, every time an update for log level comes from the O1 CM agent, the static configuration file is modified and saved. Accordingly, a GET network call to the O1 CM agent is avoided.

In order to model configuration and state data manipulated by the Netconf, some embodiments use a data modeling language. For instance, in some embodiments, the modeling language Yang is used for modeling configuration and state data manipulated by the Netconf. Yang model can be defined to either configure a group of RIC components or just one RIC component, and also allows high flexibility to define the actions to be performed on a given set of ME, according to some embodiments. For example, log level, timers, etc. affecting a set of components at RIC can be modeled into one single Yang file. Additionally, a RIC-specific provisioning feature can be modeled into a provisioning Yang file.

In some embodiments, gRPC interface is realized using protobuf. There is no one-to-one relation with Yang and protobuf file, according to some embodiments. In some embodiments, it depends on the implementation of the O1 CM agent. Versioning of both Yang and Protobuf is very crucial for compatibility, in some embodiments. If Yang and Protobuf go out of sync, in some embodiments, certain key operational configurations cannot be configured in run time.

Vendors, in some embodiments, are allowed to create their Yang models for specific use cases, such as for vendor xApp configuration. A programmable CM agent, in some embodiments, enables a vendor to write Yang data parsing logic as well as message transmission to the vendor xApp.

The vendor, in some such embodiments, can bring their own protobuf and enable the xApp SDK to act on the commands sent by the CM agent.

Figure 26:
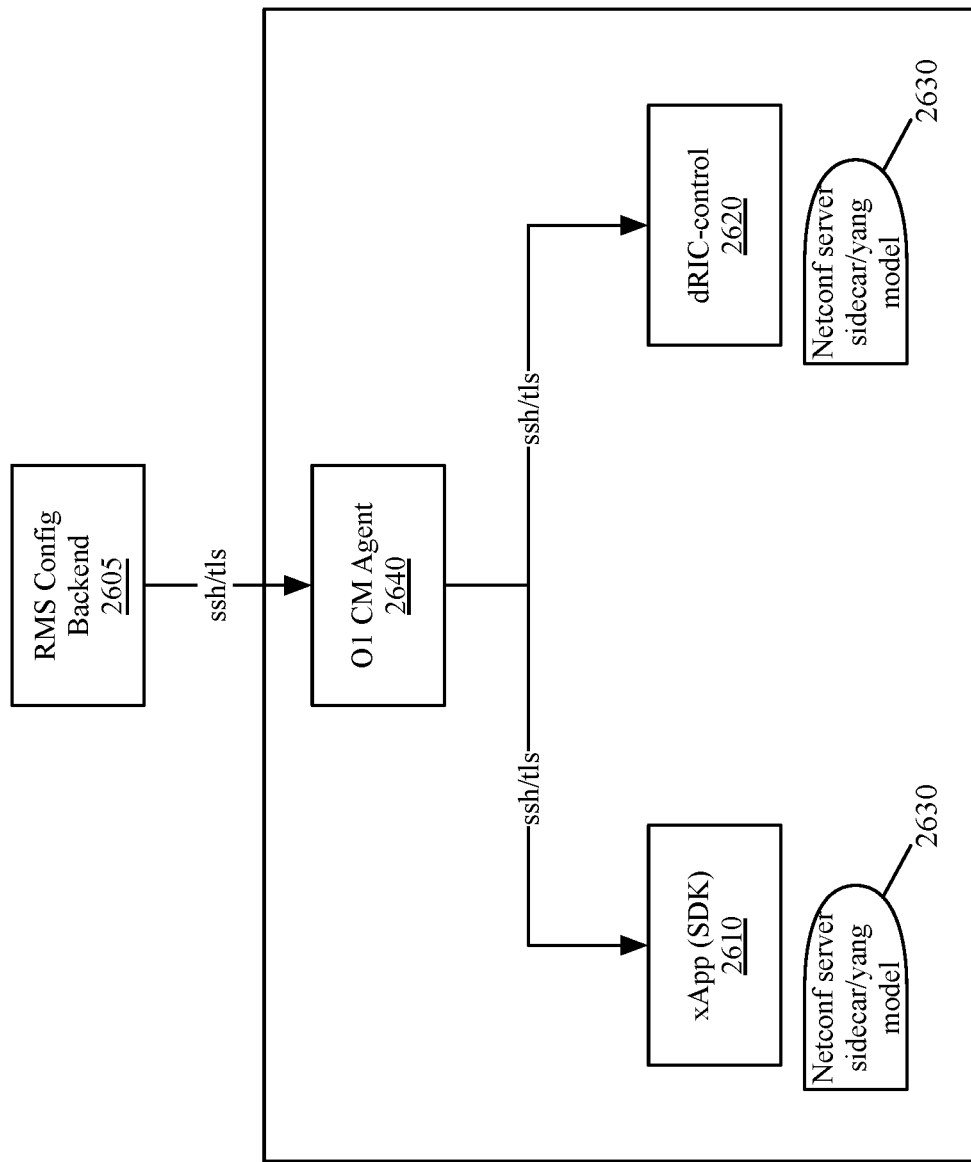
FIG. 26 conceptually illustrates an example of an alternative design in which an O1 CM agent of some embodiments acts as a Netconf tunnel.

In some embodiments, there are two approaches to put the Netconf server in existing RIC architectures. FIG. 26 conceptually illustrates an example of an alternative design in which an O1 CM agent 2640 of some embodiments acts as a Netconf tunnel. As shown, the RMS Configuration Backend 2605 is connected to one side of the tunnel 2640, while the RIC components 2610 and 2620 are connected on the other side of the tunnel 2640. The Netconf Server 2630 is a side car on dRIC-control and dRIC-xlcm, in some embodiments.

Figure 27:
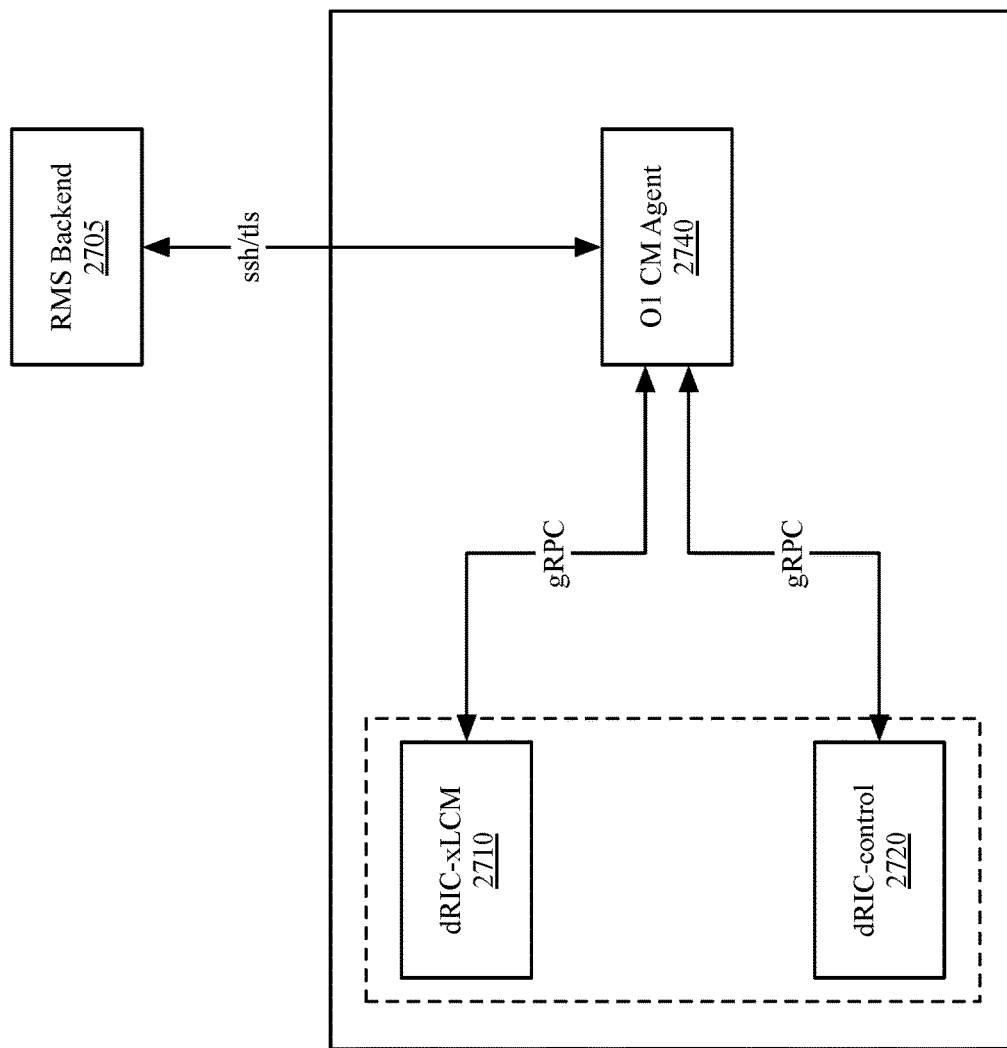
FIG. 27 conceptually illustrates an example of some embodiments in which the Netconf server is on the O1 CM agent.

FIG. 27 conceptually illustrates an example of some embodiments in which the Netconf server is on the O1 CM agent. XML data from the Netconf connection is decoded and parsed to protobuf for gRPC transport. In some embodiments, an application exposes a Yang model. This Yang model is an application-specific custom Yang model (e.g., a 3GPP TS 28.541 Yang can be reused and augmented depending on the scope of each application). In some such embodiments, the application registers with an O1 termination library in Near RT RIC giving the root xpath of the Yang tree that it is interested in. The O1 termination library then terminates the Netconf protocol from SMO. Upon receiving a GET, EDIT-CONFIG, or DELETE-CONFIG on any of the containers and/or leaves under the registered root xpath, the O1 termination library of some embodiments sends the corresponding request to the registered xApp. In some embodiments, the interface between the O1 termination library and the xApp is a Netconf interface, or an interface other than Netconf, such as gRPC.

Various schema options can be used, according to some embodiments. The simplest option, in some embodiments, is a <type of request, "key": "value">tuple where type of request indicates whether it's a GET, EDIT, DELETE, or MERGE; "key" is the xpath of the attribute being requested for GET, EDIT-CONFIG, DELETE-CONFIG; "value" is the value queried and/or edited and is sent in the form of a string. The xApp of some such embodiments can internally convert the string value to a respective data type because the xApp knows the Yang schema and corresponding data type of each leaf. Additionally, some such embodiments have the benefit that O1 termination code does not need to be recompiled for every change in Yang schema.

A second schema option, in some embodiments, uses gNMI-based Protobuf encoding for Yang schema. Yang tools for converting to Protobuf can be found at https://karneliuk.com/2020/05/gnmi-part-1-intro-to-protobuf/. The advantage of this schema option, in some embodiments, is the efficiency with which the processing is performed. However, in some embodiments, this schema option requires re-compilation of the O1 termination library every time the Yang schema of an xApp changes or new xApps with their custom Yang models register. In some embodiments, multiple xApps can register with the O1 termination entity for the same Yang root xpath (e.g., for some common configurations). In some such embodiments, the O1 termination fans-out/multiplexes the incoming Netconf requests on those xpaths to all the registered applications. In some embodiments, the provisioning workflow for the allow list of xApp identifiers and E2 nodes uses a dedicated Yang model for these operations. The opensource implementation for how an SMO Netconf client is set up is leveraged, in some embodiments.

To dynamically provision dRICs, some embodiments use a transaction-based approach on the whole path. In other embodiments, an alternative design approach that is a mix of transaction- and event-based is taken. The transaction-based approach, in some embodiments, relies on a set of assumptions. In some embodiments, the first assumption is that RIC components tell their identity using the register gRPC calls. Each RIC component (e.g., xApp, dric-control, etc.) is uniquely identified using a global_id, in some embodiments, and the assignment of global_id is managed during the registration phase by the LCM operator, in some embodiments. The second assumption, in some embodiments, is that the mechanism is transaction-oriented to guarantee that configurations are sent to RIC components. This ensures that only one transaction-oriented configuration is sent at a time from any Netconf client, in some embodiments. The third and final assumption of some embodiments is that the focus is on a single gRPC worker thread using asynchronous methods.

Figure 28:
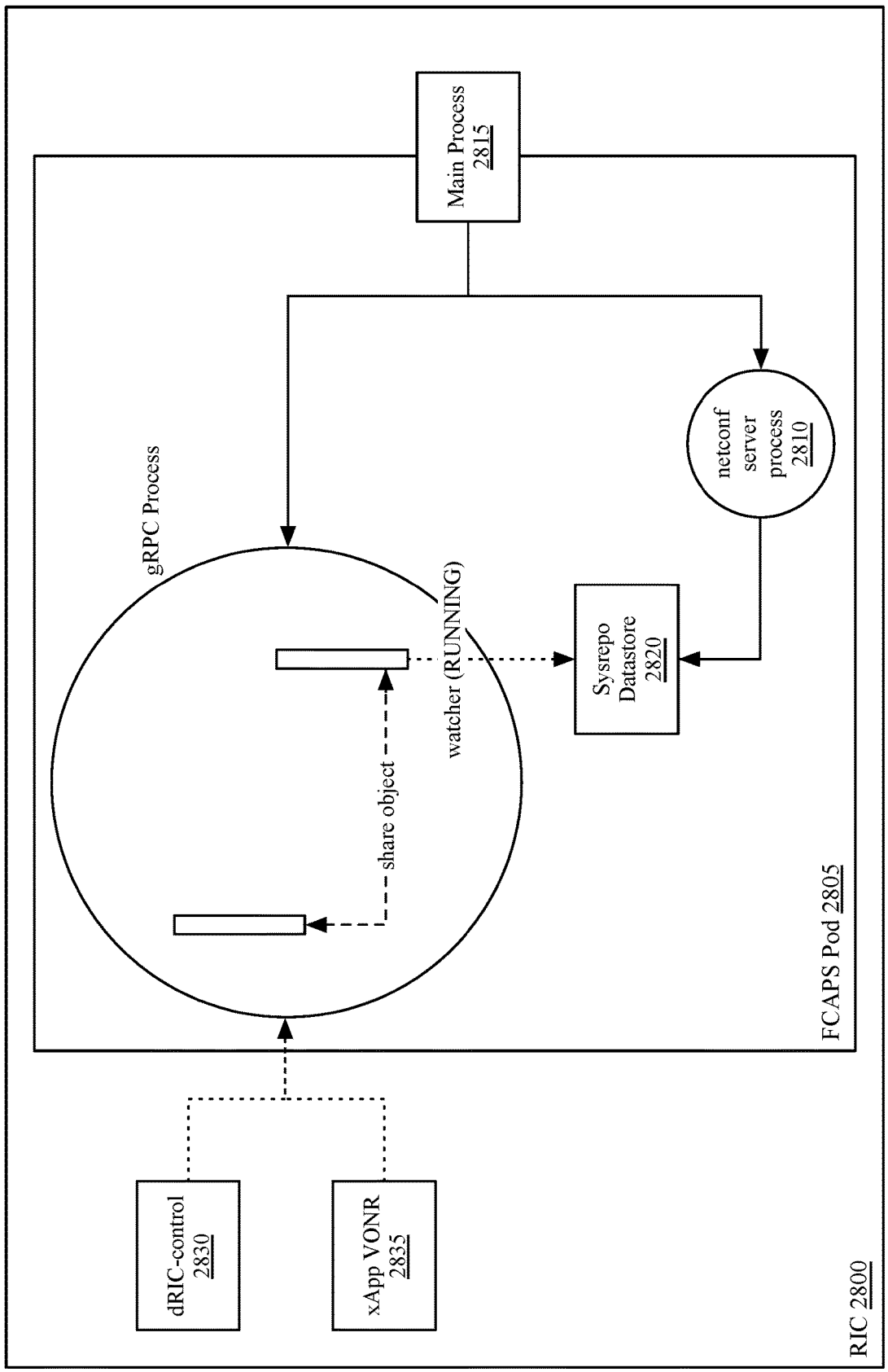
FIG. 28 conceptually illustrates a high-level diagram of the transaction-based approach, in some embodiments.

FIG. 28 conceptually illustrates a high-level diagram of the transaction-based approach, in some embodiments. The FCAPS (fault, configuration, accounting, performance, and security) management pod 2805 spins up two kinds of processes (binaries). The first kind of process is the Netconf Server 2810 in detached mode, and the second kind of process is the gRPC Server 2835, which includes a service-manager-agent.

The Netconf Server 2810 of some embodiments includes 3 main components (not shown) including a Netconf library component, a sysrepo datastore component, and a lib Yang library component. In some embodiments, the Netconf library component defines constructs such as connect, session, transport layer, disconnect, and XML parsing for Netconf-based connections. The sysrepo datastore component, in some embodiments, stores the Yang models as well as configuration data. The Netconf library establishes a session with sysrepo for all the configuration operations, according to some embodiments. The libYang library component validates the incoming data through the Netconf session for the correctness with the Yang model, in some embodiments, and also optimizes the storage by saving it in a form on the tree data structure.

In some embodiments, a sequence of operations is used to establish a successful connection and data transmission. As a first step, in some embodiments, a user is defined along with the password for the SSH connection inside the FCAPS pod. In some embodiments, this user has write permissions to the Yang module that they want to edit, create, and/or delete.

The second step in the sequence is to load required Yang modules that are needed for Netconf operations defined in IETF with correct user permission, in some embodiments. Next, the Netconf server binary of some embodiments is run at a default port (i.e., Netconf over SSH port 830) as the third step of the sequence of operations. As a fourth step, a Netconf client can initiate the configuration intent described above for FIG. 24, and run basic operations such as "get-config", "edit-config", and "delete-config" on "running" store type, in some embodiments. In some embodiments, the RMS CM is needed to service the northbound. After successful validation of the configurations, in some embodiments, the configuration data is then stored in the sysrepo datastore 2820.

In some embodiments, the gRPC Server functionality can be divided into 3 parts. The first part, in some embodiments, involves instantiating an asynchronous gRPC Server for both metrics and provisioning gRPC service. Dedicated threads are used, in some embodiments, for these two services. The second part, in some embodiments, involves defining a dedicated thread sysrepo watcher which will generate an event as soon as the configurations are stored into the sysrepo datastore 2820. The event types include create, delete, and modify, in some embodiments. The third part involves implementing a shared data structure between the sysrepo watcher thread and the provisioning gRPC service thread, in some embodiments.

The shared data structure is responsible, in some embodiments, for sending configuration updates between the sysrepo watcher thread and the gRPC thread. A singleton class object shared between these two threads is used, in some embodiments. The shared object, in some embodiments, contains "state" and "response_" variables which mark the state of configurations READ/WRITE on the consumer side (i.e., provisioning gRPC service thread) and response encoded in protobuf format, respectively.

FIG. 29 illustrates a basic skeleton of code 2900 of some embodiments for implementing a sequence of operations and interactions between the sysrepo watcher thread and the provisioning gRPC service thread. In some embodiments, the sequence of operations and interactions between the sysrepo watcher thread and the provisioning gRPC service thread includes three steps. For the first step, in some embodiments, at the first time when a gRPC client connects to FCAPS gRPC server, using "registerComponent" RPC, an entry is created in the "client_info" with the key as global_id and the value as ConfigObject with state "CLEAR".

In some embodiments, for the second step, whenever the sysrepo watcher thread reads any changes in the datastore, it first does a lookup into the map with incoming global_id and reads the state of the stored object. If the state is READ, the sysrepo watcher thread of some embodiments parses the incoming configurations into protobuf and sets the "response_". The state is then updated to WRITE. For the third step, on the other side, gRPC clients (e.g., dric-control 2830, xApp VONR 2835, etc.) call "FetchConfiguration" RPC every x intervals with global_id, in some embodiments. The sysrepo watcher thread of some embodiments performs a lookup into the map to fetch the ConfigObject. If the state of Object is WRITE, the sysrepo watcher thread sends the desired response back to the client, in some embodiments. Otherwise, in some embodiments, it sends NO_DATA_AVAILABLE for that call. The state of the object is then marked as "READ", according to some embodiments.

Figure 30:
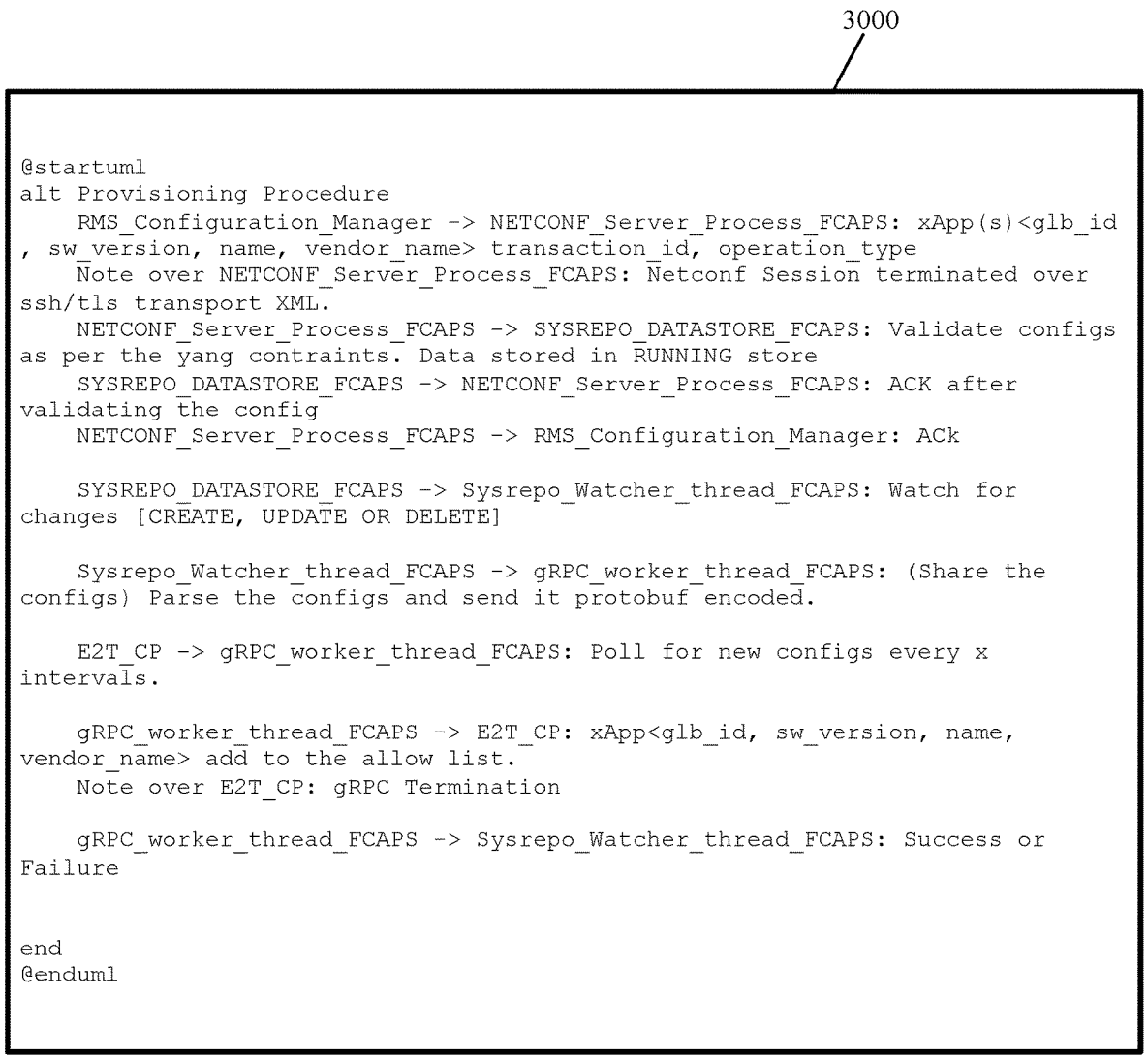
FIG. 30 illustrates an example of a sequence performed in some embodiments for xApp provisioning using dric-admission-control.yang.
Figure 31:
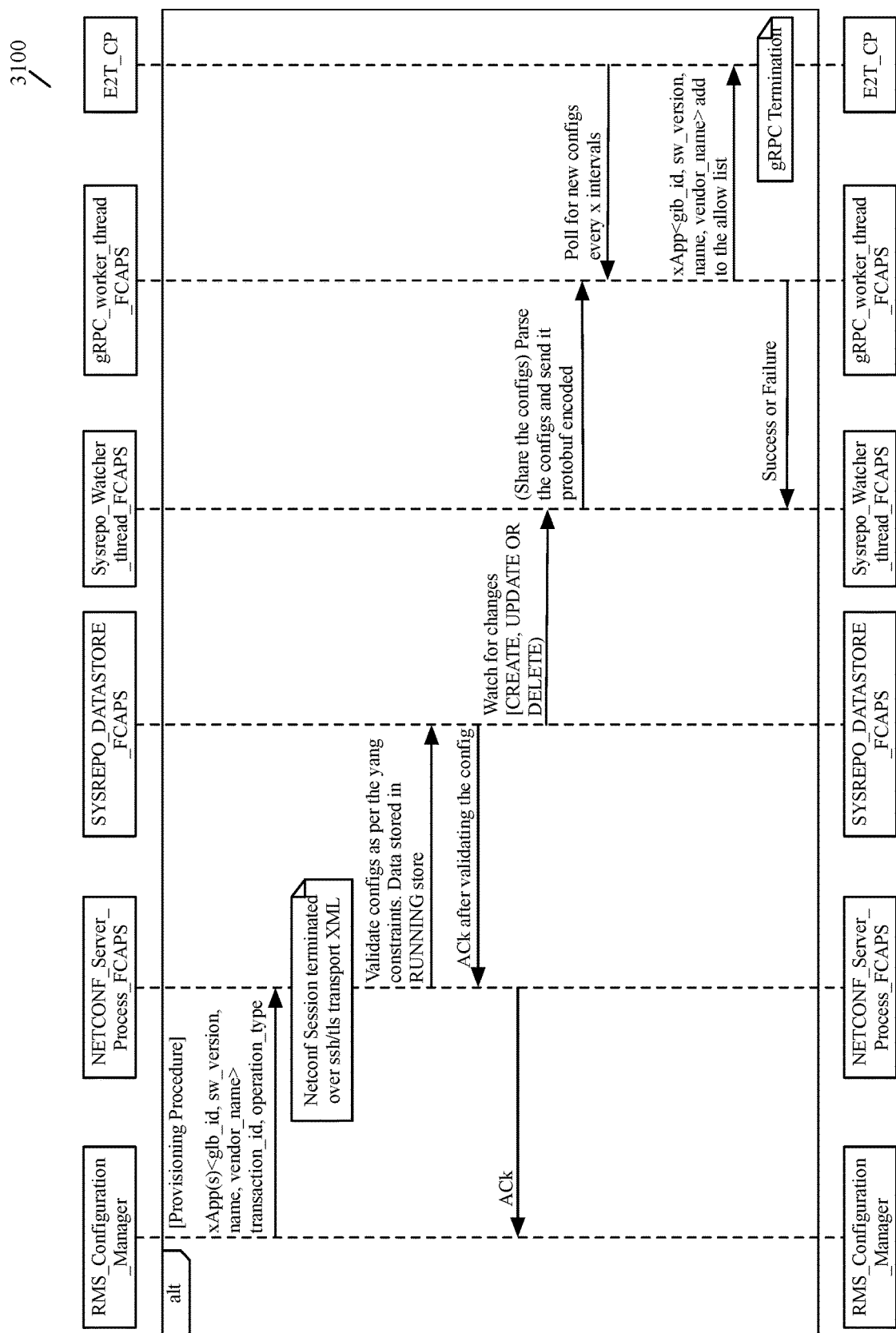
FIG. 31 illustrates a workflow of some embodiments for xApp provisioning using dric-admission-control.yang.

FIG. 30 illustrates an example of a sequence 3000 performed in some embodiments for xApp provisioning using dric-admission-control.yang, while FIG. 31 illustrates a workflow 3100 showing the same. The sequence is performed by a set of actors that include an RMS Configuration Manager service, FCAPS that runs two binaries (i.e., the Netconf server binary and gRPC server binary), and E2T_CP. The RMS configuration manager service, in some embodiments, is located in the RMS cluster and acts as a northbound entry point. During production setup, the RMS configuration manager service acts as a Netconf client, in some embodiments. The Netconf server binary run by FCAPS is run in daemon mode, in some embodiments, and Netconf_Server_Process_FCAPS and SYSREPO_DATASTORE FCAPS are a part of this binary. In some embodiments, the gRPC server binary run by FCAPS includes Sysrepo_Watcher_thread_FCAPS and gRPC_worker_thread_FCAPS. The E2T_CP includes dric-control with gRPC client implementation, according to some embodiments.

There are two data models needed to accomplish Netconf and gRPC communication, according to some embodiments. The first module, in some embodiments, is an admission control module that defines xApp and E2 node entities that need to be sent to dric-control. These configurations, in some embodiments, are meant for only one dRIC instance. In some embodiments, it is mandatory for a Netconf client to send a records container block for every request. Each records container block, in some embodiments, includes service_id and transaction_id. The service_id is the global_id mentioned above and should be uint+64 format. The transaction id is an incremental identifier and should be included in every call coming from a Netconf client to maintain a record of transactions. The second module is a Yang module that describes the data type and structuring, in some embodiments.

For example, FIG. 32 illustrates an example of a portion of code 3200 (i.e., dric-admission-control@2022-03-03.yang) of the Yang module that describes data type and structure and is used for dRIC admission control in some embodiments. Netconf clients (e.g., the RMS configuration manager service) use the modeling language 3200 and send the configurations to a Netconf server (e.g., FCAPS) in an XML-encoded format. FIG. 33 illustrates an example of the XML-encoded format 3300 (i.e., dric-admission-control@2022-03-03.xml) of some embodiments.

The provisioning gRPC of some embodiments has two RPCs. The first RPC, in some embodiments, is a RegisterComponent RPC, while the second is a FetchConfiguration RPC. The RegisterComponent RPC is a registration RPC that a client uses to register itself to the gRPC server. Information such as global_id, request, instance, and capability is sent to the gRPC server. The server then creates a mapped entry (e.g., as described above) for each connected client and responds the client with positive ACK. The client can then request configurations from the server using the FetchConfiguration RPC periodically every X interval. The fetch response should be generic, according to some embodiments, to handle all of the use cases as described above with regard to the Yang files. FIG. 34 illustrates an example of an admission control use case 3400 of some embodiments.

In some embodiments, a mechanism for the gRPC call to query the sysrepo store directly is provided. Two requirements for this mechanism, in some embodiments, include fetching previous configurations from FCAPS and trying to use the same RPC FetchConfigurations from client to FCAPS, and waiting to implement any new configuration updates until the client is updated with previous configurations, hence replay of configurations is a blocking call. These two requirements will guarantee that the connected client will have restored its old configurations before proceeding with the new configurations, according to some embodiments.

If a connected client restarts, in some embodiments, a two-step procedure is followed. The first step, in some embodiments, includes fetching the previous configurations from FCAPS sysrepo datastore using gRPC because the connected client keeps the configurations in memory and restart cleans it. In some embodiments, second step includes continuing polling from FCAPS for any new configurations. In some embodiments, existing RPC FetchConfiguration is leveraged with small changes in the request body.

FIG. 35 illustrates a procedure 3500 used by a client in some embodiments to call the above RPC with a request containing an enum (i.e., enumerator). First, the client calls the first FetchConfiguration with config_mode_flag set to CONFIGURATION_MODE_REPLAY. This is done irrespective of restart or first time deployed. If the response code is CONFIGURATION_RESPONSE_CODE_SERVER_U-NAVAILABLE or CONFIGURATION_RESPONSE_CODE_CLIENT_NOT_REGISTERED, step 1 is retried for successive calls. Otherwise, the next time FetchConfiguration is called, config_mode_flag is set to CONFIGURATION MODE POLLING and successive calls are made with the same mode.

The server-side procedure includes a dedicated logic for when config_mode_flag is set to CONFIGURATION_MODE_REPLAY. The gRPC thread will call sysrepo_get_data api to fetch configurations for the connected client when FetchConfiguration is called. It should be noted that all of the configurations are replayed to the connected client with Operation Type as ADD, so that connected client can save these configurations without any conflict resolution. When config_mode_flag is set to CONFIGURATION_MODE_POLLING, then the original behavior that includes looking into the shared object state will continue.

In some embodiments, if a connected client restarts or is created, it will call fetchConfig RPC to fetch the configurations that were applied to the component. In some embodiments, different scenarios for the situation when FCAPS has some configurations for a component can include when FCAPS has configuration for only one component, when FCAPS has configurations for multiple components, and when a component does not return to the running state. For the first scenario when FCAPS has configuration for only one component, there can be scenarios when the connected client is offline or restarting. In this case, the RPC needs to be failed and the RMS Configurations services needs to be informed about the failure (i.e., rollback the candidate datastore). This way, the transaction atomicity is maintained, in some embodiments.

For the second scenario, when FCAPS has configurations for multiple components, there can be scenarios when one or multiple connected client are offline or restarting. A channel active call needs to be done on all the desired components gRPC channels before sending the configurations. If any one of the components is inactive, the configurations call should be failed and a failure should be sent back to RMS Configurations Service. This observes the 2 stage commit strategy. For the third scenario, where the component never comes back to the running state, the configurations which are desired for that component will never be applied.

In some embodiments, a persistent volume is attached to sysrepo datastore so that in case of FCAPS pod restarts, sysrepo data persists. In some embodiments, the operation status is saved per configuration using in-memory data structures as sysrepo does not maintain the Operation status. As such, to build this structure in some embodiments, the configurations are reloaded from sysrepo at init and the configuration OperationType is marked as ADD. Successive operations of any configuration with a modify or delete operation will change the status, according to some embodiments.

A single configuration block implements multiple Yang modules, in some embodiments. In some embodiments, either the entire configurations or module-level configurations can be sent to the Netconf server in a single session. The job of the FCAPS Netconf server can be broadly classified, in some embodiments, to process two kinds of payload. The first kind is a configuration that is intended for multiple RIC components at a RIC site sent as one request, but pertaining to a single module level. The second kind is a configuration belonging to multiple modules (i.e., bulk upload). Implementations for both use cases are described below.

In some embodiments, FCAPS restart has limitations. For instance, in some embodiments, the Netconf RPC (i.e., edit-config from RMS) is marked as a success if configurations are read by the gRPC worker thread. Otherwise, there is a timeout triggered (e.g., a timeout period expires) for it to fail, in some embodiments, and the error is propagated to RMS. In another example, some embodiments do not have a mechanism to account for acknowledgment from the connected components. As such, it is unknown if the components accepted the configurations or rejected them due to some reason, which can give the wrong notion of southbound accepting the configurations, but not acting on them. Moreover, the RMS or other SMO will believe that the configuration is successful while not seeing the expected behavior.

Also, in some embodiments, the above limitations can cause issues when FCAPS restarts in the middle of the transaction, where the configurations are sent to the connected component, but acknowledgment is not received and, as such, components will have a higher version transaction than FCAPS. FCAPS will need to have version management of the configurations to correct the state of the system. It should be noted that sysrepo on FCAPS does not provide this functionality, in some embodiments.

The requirements for overcoming the above limitations, in some embodiments, include a synchronous transaction Netconf API; a mechanism to multicast configurations to a given list of connected clients; two-stage commit where FCAPS send configurations to connected clients for validation, and based on the response, commits to them; and means to handle FCAPS restart in the middle of a transaction and at the end of the transaction by rejecting configurations and then sending a negative ACK to RMS.

Sysrepo Watcher API, for example, has event states which signify the operation on the underlying datastore. SR_EV_CHANGES is an event (i.e., event notification) that is generated by sysrepo watcher just before writing changes into the datastore. A user can use this event to validate the configurations. Successful validation returns OK, else an error is returned and configurations are not written to the store. SR_EV_DONE is an event generated after writing to the store.

The SR_EV_CHANGES state can be leveraged in some embodiments to validate and send configurations to connected clients and to test and apply the configurations. However, while consistency and guarantee are maintained, the session is open for a long time and transactions will take some time to process. Additionally, another thread and a new state "MARK" can be introduced which will help to add conflict-watching abilities in the event where clients are not active or they reject the configurations span for multiple connected components. Another example solution, in some embodiments, includes introducing new states per client object, and/or accounting for acknowledgements in the next polling iteration.

Figure 36:
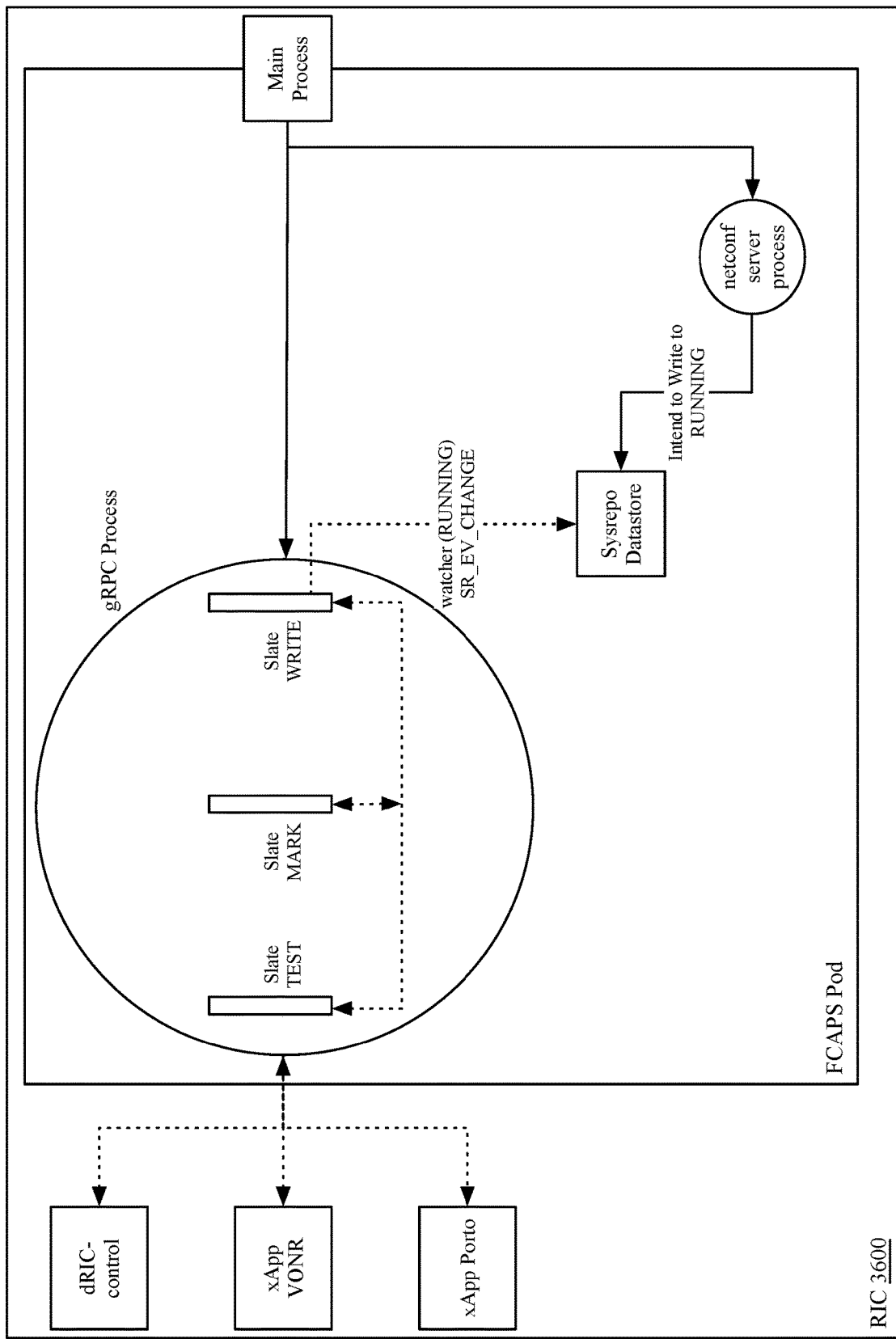
FIG. 36 illustrates a system diagram of some embodiments.

FIG. 36 illustrates a system diagram of an FCAPS pod of some embodiments. As mentioned above, every RIC includes a respective FCAPS pod (or FCAPS VM) that communicates with the configuration management pod (i.e., RMS CM) deployed to the RMS. In some embodiments, the RMS CM will implement the same Netconf API edit-configs to the RUNNING store with a higher timeout.

Figure 37A:
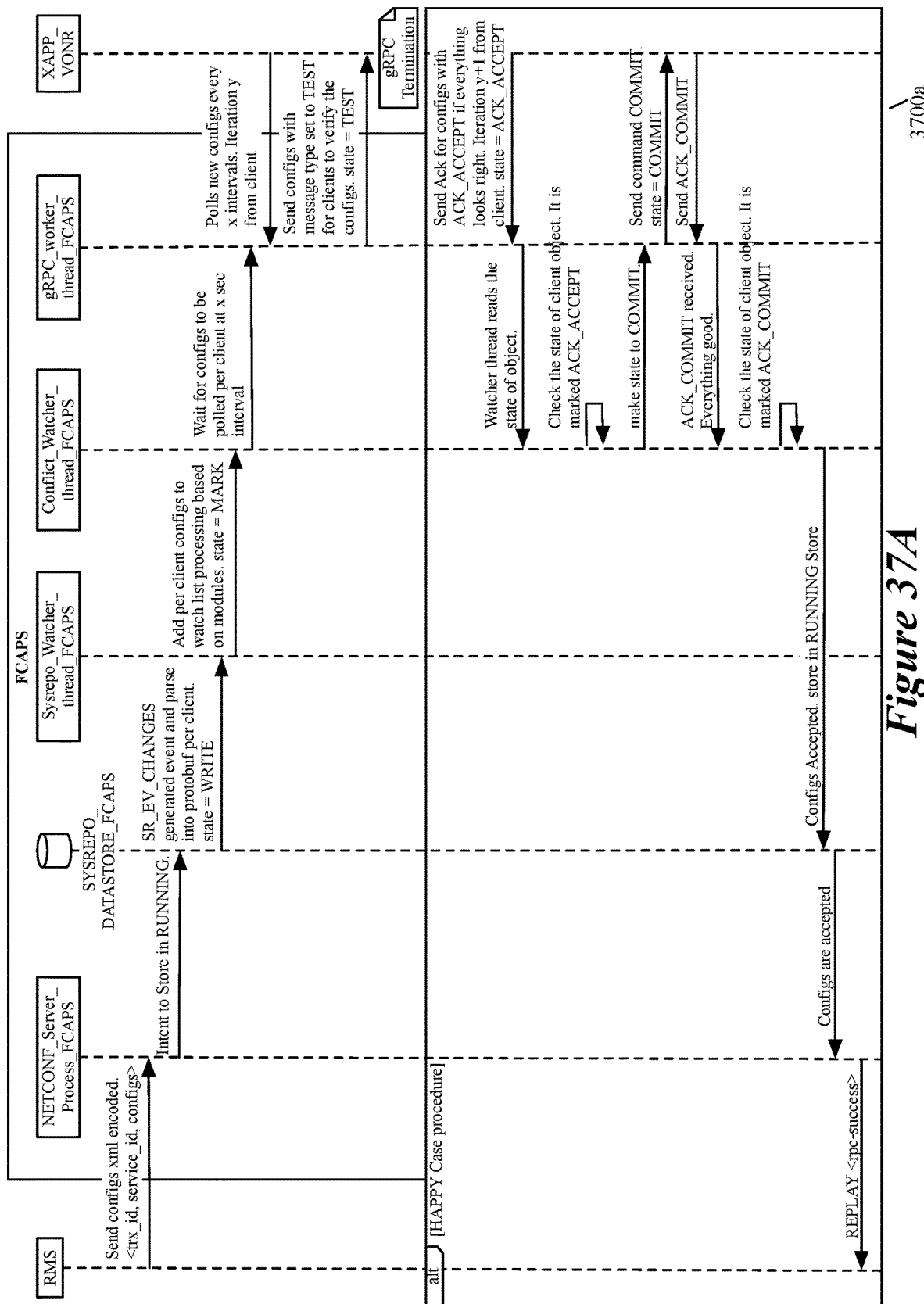
FIGS. 37A-37B, which conceptually illustrate a workflow of some embodiments for configuring a single southbound component.
Figure 37B:
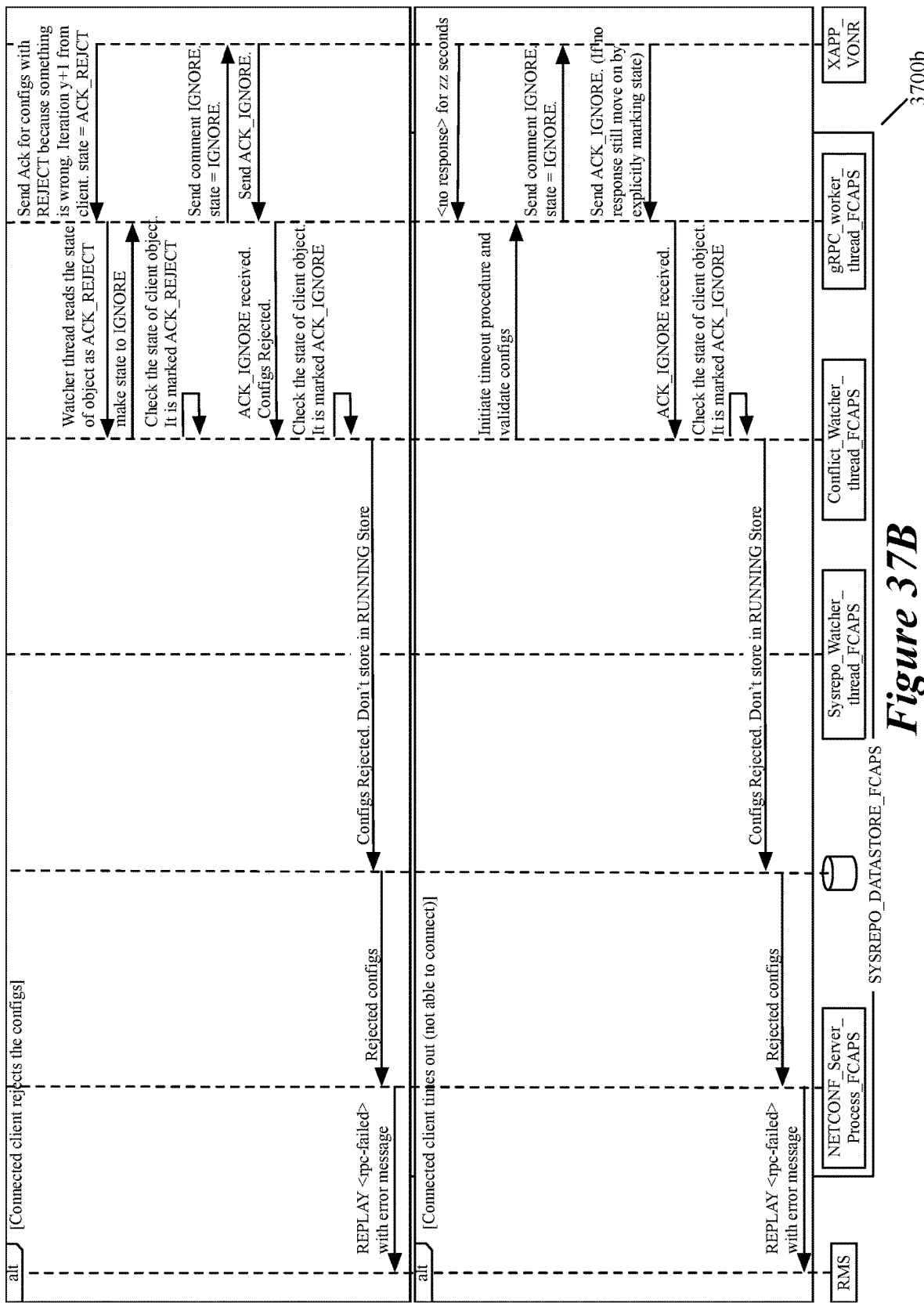

Configurations for a single southbound component includes client_id=global_id=service_id, which uniquely identifies each dRIC component. The configuration request is started from RMS, as illustrated in FIGS. 37A-37B, which conceptually illustrate a workflow 3700a-3700b of some embodiments for configuring a single southbound component. As shown, the workflow 3700a starts with the RMS sending XML-encoded configurations to the FCAPS Netconf server process.

The XML-encoded configurations, in some embodiments, are updated configurations, and are sent to FCAPS along with a request to modify the configurations. The configuration updates, in some embodiments, include modifications to the log level for xApps (e.g., from INFO to DEBUG), modifications to an absolute radio frequency channel number assigned to one or more xApps, modifications to a request timeout period configured for one or more xApps, and modifications to whether replay for messages is enabled for one or more xApps. The FCAPS Netconf server process then stores the intent in a cache that will be committed to its running datastore if accepted and committed by the intended component(s), causing an event regarding the changes to be generated for the FCAPS sysrepo watcher thread and parsed into protobuf on a per-client basis with the state being WRITE.

The FCAPS sysrepo watcher thread then adds per-client configurations to a watch list processing of the FCAPS conflict watcher thread based on modules, with the state being MARK. The FCAPS conflict watcher thread then waits for the configurations to be polled from the FCAPS gRPC worker thread on a per-client basis at an interval of x seconds. A VONR (voice over new radio) xApp then polls the FCAPS gRPC worker thread for new configurations every x intervals. The FCAPS gRPC worker thread sends the configurations to the VONR xApp with the message type set to TEST for clients to verify the configurations, and with the state as TEST.

In a happy case, the VONR xApp sends an acknowledgment ("ACK") to the FCAPS gRPC worker thread with ACK_ACCEPT if everything looks right and is accepted, with the state as ACK ACCEPT. That is, the ACK_ACCEPT acknowledgement, in some embodiment, indicates that the xApp has validated the configurations and accepted the configurations. The validation performed by the xApp, in some embodiments, includes validating that the configurations are not duplicate configurations having the same operation(s) as any current configurations for the xApp and validating that the configurations do not include any illegal entries or random configurations which xApps are not aware. Also, in some embodiments, new configurations are not accepted when the xApp has exhausted its resource quota. In some embodiments, the xApp places the validated configurations in a buffer to be processed if/when FCAPS instructs the xApp to commit the configurations.

The FCAPS conflict watcher thread reads the state of the object from the FCAPS gRPC worker thread and checks the state of the client object. When the FCAPS conflict watcher thread learns the state is marked ACK_ACCEPT, the FCAPS conflict watcher thread directs the FCAPS gRPC worker thread to make the state to COMMIT. The FCAPS gRPC worker thread then also sends a command to the VONR xAPP to COMMIT, and, in response, the VONR xApp processes the configurations from the buffer and sends an acknowledgement ACK_COMMIT to the FCAPS gRPC worker thread to acknowledge the COMMIT command and notify the FCAPS gRPC worker thread that the xApp has successfully processed and committed the configurations.

Based on the received acknowledgement, the FCAPS gRPC worker thread then indicates to the FCAPS conflict watcher thread that the ACK_COMMIT has been received and that everything is good (i.e., the configurations have been successfully processed and committed by the xApp).

The FCAPS conflict watcher thread then checks the state of the client object, which is marked as ACK_COMMIT, and based on the state, stores the accepted configurations in the FCAPS running datastore. Upon learning that the configurations have been accepted based on the accepted configurations being stored in the FCAPS running datastore, the FCAPS Netconf server process notifies the RMS that the configuration was successfully processed and committed.

The second portion 3700b of the workflow covers two alternative cases to the happy case described above. In the first alternative case, the VONR xApp sends an acknowledgement for the configurations to the FCAPS gRPC worker thread with REJECT indicating the configurations have been rejected (e.g., because something is wrong with the configurations), with the state as ACK REJECT. In some embodiments, configurations are rejected by an xApp during the validation process performed by the xApp. For example, an xApp rejects configurations when the xApp determines that the configurations include duplicate operations of current operations already configured for the xApp, and/or that the configurations include one or more illegal entries or random configurations of which the xApp is not aware. Also, in some embodiments, the xApp rejects the configurations because the xApp has already exhausted its resource quote (i.e., does not have sufficient resources).

The FCAPS conflict watcher thread then reads the state of the object as ACK_REJECT, instructs the FCAPS gRPC worker thread to make the state to IGNORE, and checks the state of the client object, which is marked as ACK_REJECT. The FCAPS gRPC worker thread then sends comment IGNORE, with the state as IGNORE, to the VONR xApp to instruct the VONR xApp to ignore the configurations (i.e., to discard the configurations from the xApps buffer without processing and committing the configurations).

In response to the IGNORE comment from the FCAPS gRPC worker thread, the VONR xApp sends an acknowledgement ACK_IGNORE to the FCAPS gRPC worker thread, which, in turn, indicates to the FCAPS conflict watcher thread that ACK IGNORE has been received and the configurations have been rejected. The FCAPS conflict watcher thread checks the state of the client object, which is marked as ACK_IGNORE, and as a result, does not store the configurations in the FCAPS sysrepo running datastore. Additionally, based on the rejection of the configurations, the FCAPS Netconf server process returns an error message to the RMS indicating rpc-failed to notify the RMS that the configurations have failed and have not been processed and committed by the target xApp (i.e., xApp VONR).

In the second alternative case, after the FCAPS gRPC worker thread has not received a response from the VONR xApp for zz seconds (i.e., a specified timeout period), the FCAPS conflict watcher thread directs the FCAPS gRPC worker thread to initiate a timeout procedure and validate the configurations. Accordingly, the FCAPS gRPC worker thread sends a comment IGNORE to the VONR xApp to instruct the xApp to ignore the configurations without processing and committing the configurations.

The FCAPS gRPC worker thread treats both an ACK_IGNORE acknowledgement from the VONR xApp and a no response from the VONR xApp as an ACK_IGNORE (i.e., an acknowledgement that the configurations have been ignored and discarded), and indicates to the FCAPS conflict watcher thread that the ACK_IGNORE has been received. The FCAPS conflict watcher thread then checks the state of the client object, which is marked as ACK_IGNORE (i.e., based on an ACK_IGNORE response from the xApp or explicitly marked following no response from the xApp), and as such, does not store the configurations in the FCAPS sysrepo running datastore. Based on the rejected configurations, the FCAPS Netconf server process then sends an error message to the RMS indicating rpc-failed to notify RMS that the configurations have not been processed or committed by the xApp.

Figure 38A:
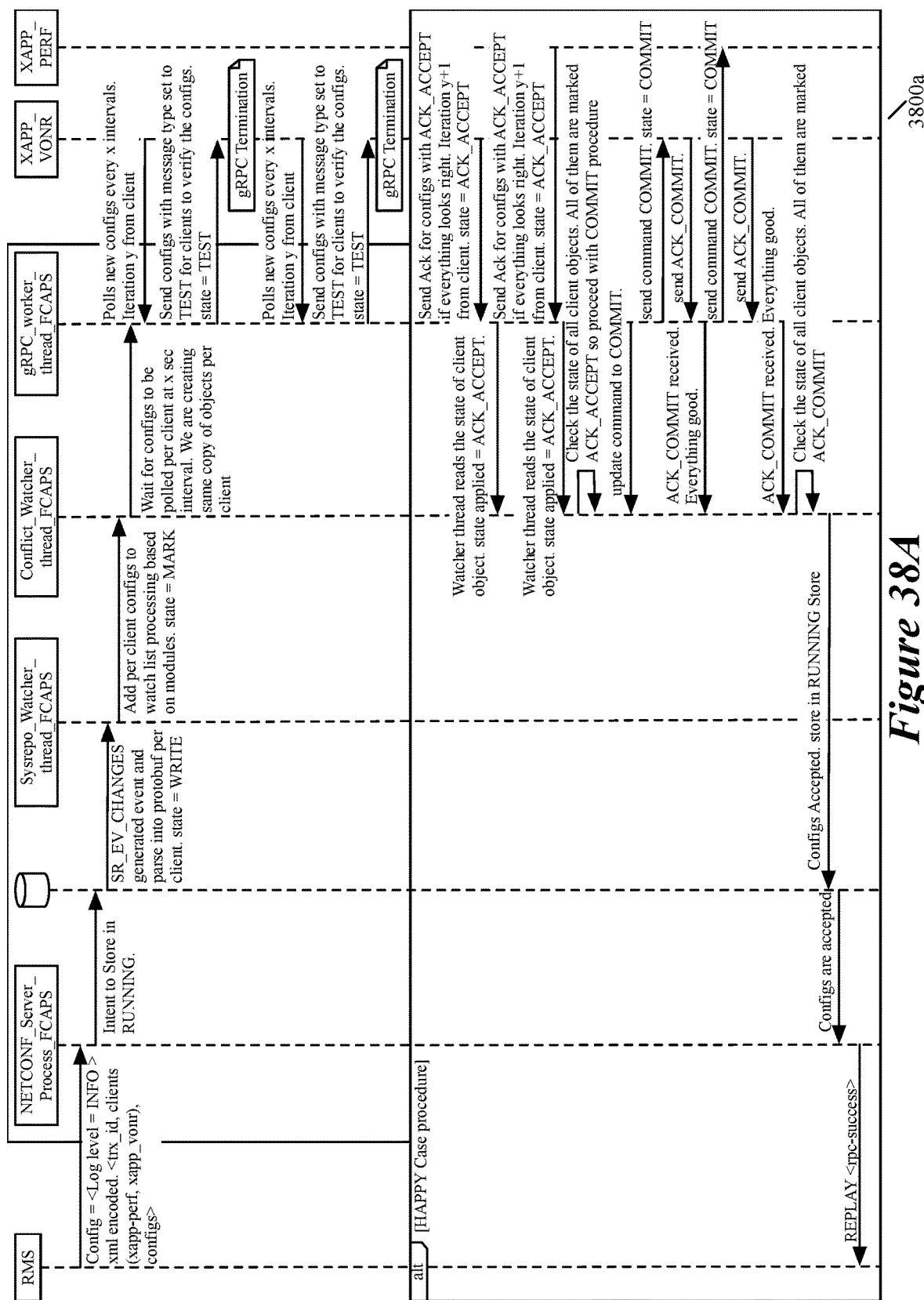
FIGS. 38A-38B conceptually illustrate a workflow of some embodiments for configuring multiple southbound components.
Figure 38B:
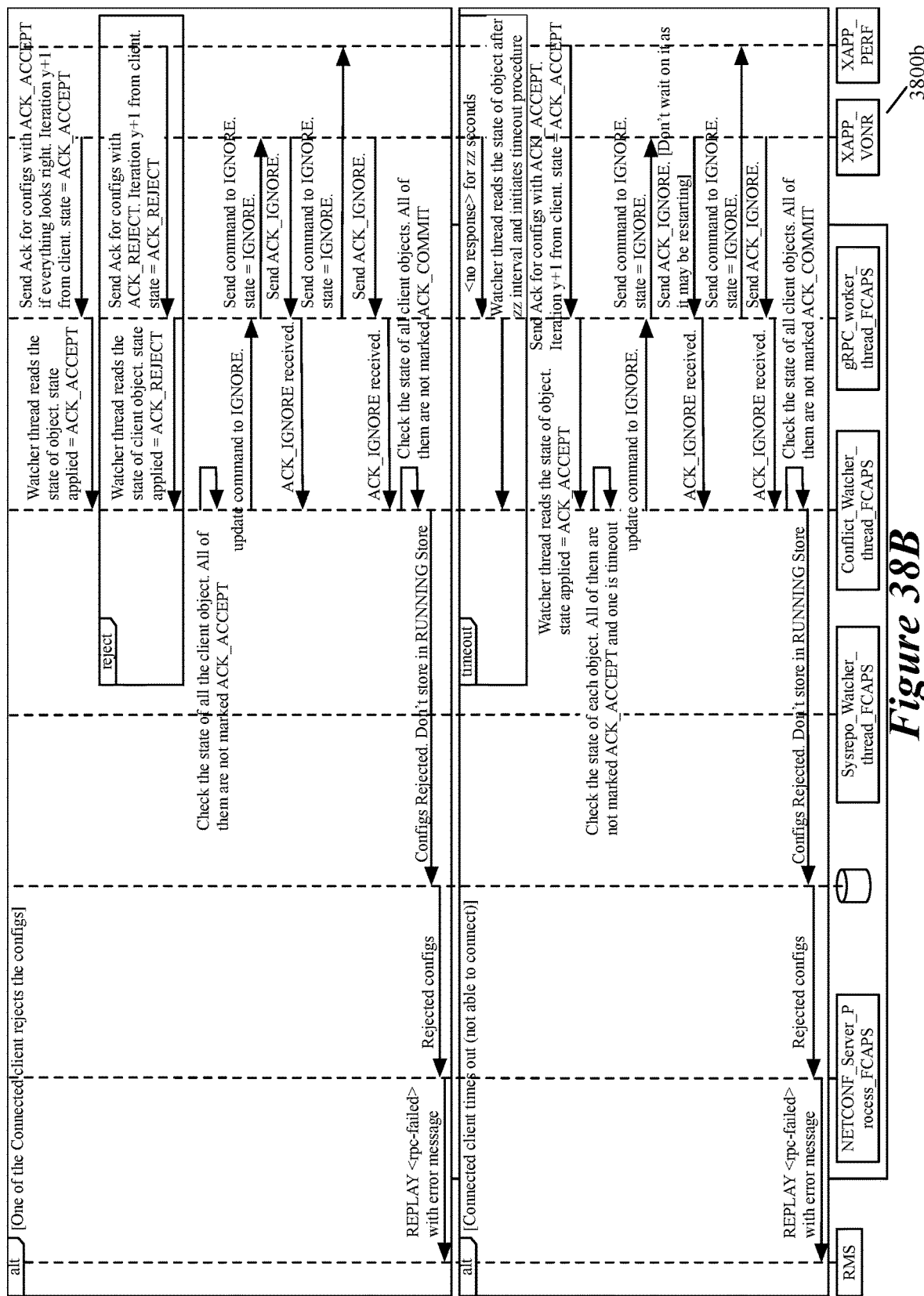

FIGS. 38A-38B conceptually illustrate a workflow 3800a-3800b of some embodiments for configuring multiple southbound components. The workflow 3800a-3800b is similar to the workflow 3700a-3700b (i.e., includes many of the same steps as the workflow 3700a-3700b) with the exception that rather than performing the workflow for configuring the single xApp, the workflow is performed for configuring two xApps (e.g., VONR xApp and PERF xApp). Additionally, the conflict watcher thread checks the state of the configuration each time an ACK is received from an xApp. Once all ACKs have been received, the gRPC worker thread sends either the COMMIT command or the IGNORE command to all of the xApps.

If all xApps for which the configurations are intended (e.g., xApp VONR and xApp PERF in this example) accept the configurations, the gRPC worker thread sends the COMMIT command. However, if at least one xApp sends an ACK_REJECT or fails to respond following the specified timeout period, the gRPC worker thread sends the IGNORE command to all of the xApps, including any xApps that accepted the configurations. That is, if the VONR xApp sends ACK_ACCEPT and the PERF xApp sends ACK_ACCEPT, indicating each of the xApps has validated and accepted the configurations for processing, then the FCAPS gRPC worker thread sends the COMMIT command to both the VONR xApp and the PERF xApp to instruct the xApps to process and commit the configurations, as illustrated in the first portion of the workflow 3800a.

If the one of the xApps sends ACK_ACCEPT and the other xApp sends ACK_REJECT, then the FCAPS gRPC worker thread sends the IGNORE command to both of the xApps to instruct the xApps to ignore the configurations without processing and committing the configurations. For example, in the second portion of the workflow 3800b, the xApp VONR sends ACK_ACCEPT, while the xApp PERF sends ACK_REJECT. In response to the at least one ACK_REJECT, the conflict watcher thread instructs the gRPC worker thread to update the command to IGNORE, and the gRPC worker thread then sends the IGNORE command to both of the xApps, as illustrated.

Similarly, if one xApp does not respond for zz seconds (i.e., the specified timeout period), and the other xApp sends an ACK_ACCEPT, the conflict watcher thread instructs the gRPC worker thread to update the command to IGNORE, and the FCAPS gRPC worker thread sends the IGNORE command to both the VONR xApp and the PERF xApp to instruct the xApps to ignore the configurations. As also described above for the workflow 3700a-3700b, a lack of response to the IGNORE command is treated as an ACK_IGNORE.

In some embodiments, the dynamic configuration framework described above by the workflows 3700a-3700b and 3800a-3800b is used, for example, when xApp pods (e.g., xapp_vonr and xapp_perf pods) are not performing as intended. For instance, if the xApps are not pushing metrics as they are supposed to, the log level for each of the xApps can be changed using the dynamic configuration framework from INFO to DEBUG in order to provide insight into the behavior of the thread responsible for pushing the metrics. The RMS is responsible, in some embodiments, for establishing a Netconf session with FCAPS and pushing the log_level change configuration to FCAPS.

In some embodiments, as mentioned above, the RMS (e.g., RMS CM) sends the configuration to FCAPS with a request to modify. The request to modify, in some embodiments, includes the global identifiers for each RAN component for which the configuration is intended. Examples of RAN components, in some embodiments, include RAN applications (e.g., xApps, rApps), datapath pods (i.e., E2T, dric-control), and SDKs. Also, in some embodiments, the configurations are intended for modules, such as the schemas used to define RAN components. FCAPS then receives the configurations and initiates the two-stage commit procedure described above by the workflows 3700a-3700b and 3800a-3800b.

Based on the individual cases described above (i.e., the happy case, at least one rejection, or at least one lack of response), the outcome can vary. However, in the happy case, both xApps after successful configuration change will start printing debug level logs, which an application developer or SRE (site reliability engineer) can use to identify and locate the issue, according to some embodiments.

Figure 39:
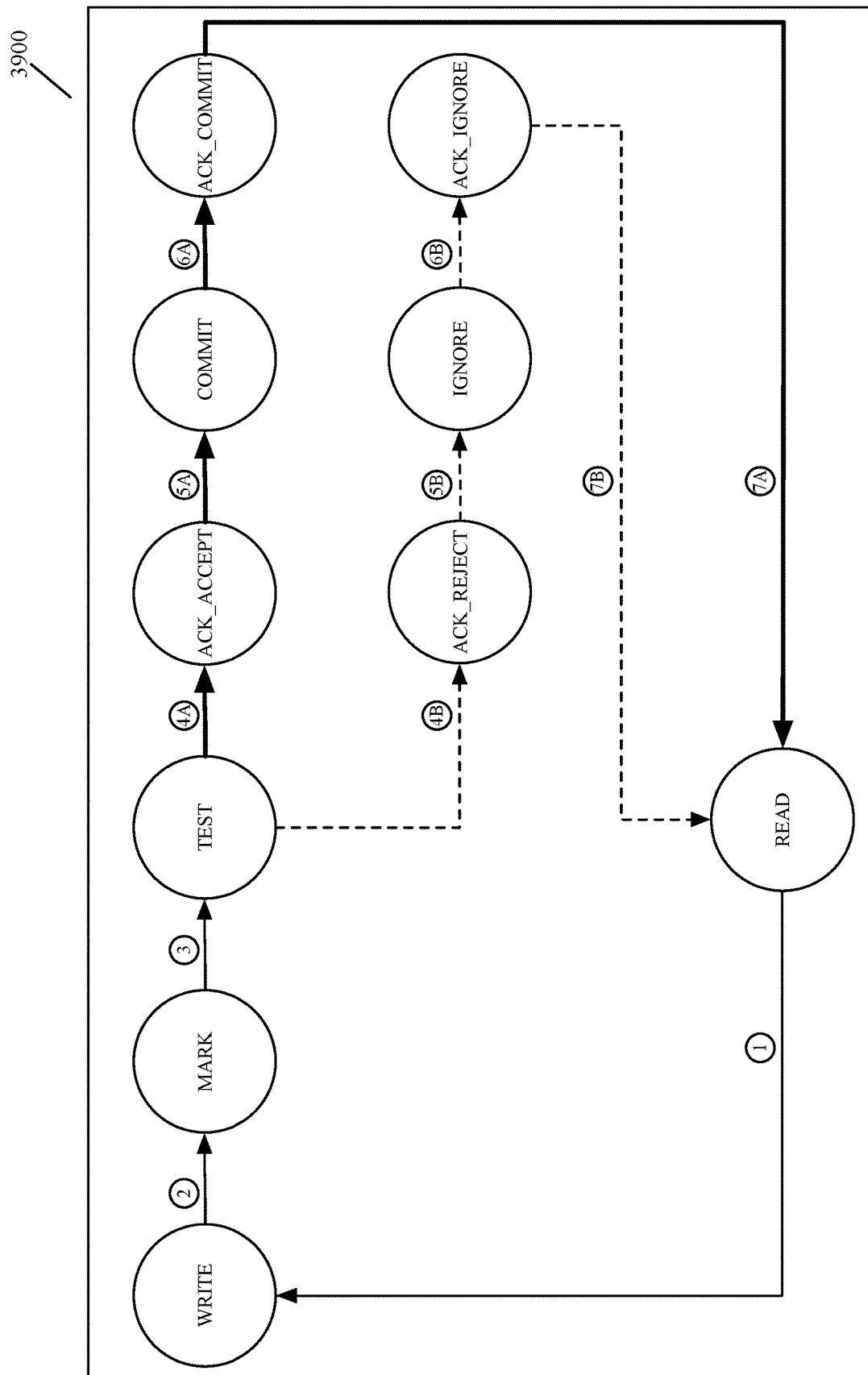
FIG. 39 conceptually illustrates a state transition diagram illustrating the states during each of the happy and alternative cases described above.

FIG. 39 conceptually illustrates a state transition diagram 3900 illustrating the states during each of the happy and alternative cases described above. The thicker solid line in the diagram 3900 represents the transitions for the happy case (i.e., all accept) described above, while the dashed line represents the transitions for the alternative cases (i.e., reject or no response). At the encircled 1, the state is READ, and the sysrepo watcher thread parses an event to protobuf per client and moves from initial default READ to WRITE. At the encircled 2, the state is WRITE which is read by the conflict watcher thread to watch for configurations per client. At the encircled 3, the gRPC worker thread reads the MARK state, and sends the configurations to the client (i.e., the xApp) with the state TEST.

Continuing on the happy case transition (i.e., the thicker solid line), following the TEST state, the next polling iteration returns a positive ACK (i.e., ACK_ACCEPT) from the xApp at the encircled 4A and the state is changed to ACK_ACCEPT. At the encircled 5A, the conflict thread makes a decision to send the COMMIT command, changes the state to COMMIT, and receives, at the encircled 6A, acknowledgement of the COMMIT command with ACK_COMMIT, which changes the state to ACK_COMMIT. The accepted configuration is then written to the running datastore at the encircled 7A and notification of successful configuration is sent to the Netconf client. The state diagram 3900 then returns to the initial READ state.

For the alternative cases (i.e., reject or no response), following the TEST state at the encircled 4B, the next polling iteration from the client (i.e., xApp) returns a negative ACK, ACK REJECT, and the state is changed to ACK_REJECT. At the encircled 5B, the conflict watcher thread makes a decision to send the IGNORE command to the xApp, and the state is changed to IGNORE. The client returns ACK_IGNORE (or no response at all) at the encircled 6B and the state is changed to ACK_IGNORE. As a result, the configurations are not written to the running datastore at the encircled 7B, and an ERROR with a message is sent to the Netconf client. The state then returns to READ.

In some embodiments, the proto schema will account for ACK-based design from clients. This adds a slight delay to the user experience, but correctness is achieved at any point. FIG. 40 illustrates an example of the code 4000 used in some embodiments for the proto schema.

In some embodiments, a simple conflict thread algorithm is used that checks the status of each config object sent to each clients and involves a two-stage commit. For example, if the configurations are applicable to 4 clients (e.g., log level), the algorithm can account for three situations for clients. In the first situation, connected clients accept the configurations with the state ACK_ACCEPT. In the second situation, connected clients reject the configurations with the state ACK_REJECT. In the third situation, connected clients do not respond back in a given time window. The algorithm is in python language for quick prototyping, while the actual implementation is in C++, according to some embodiments. FIG. 41 illustrates an example of this algorithm 4100 in some embodiments.

In some embodiments, FCAPS restarts while waiting for ACK_COMMIT from clients. In some such embodiments, when clients repeatedly send an ACK_COMMIT after FCAPS has restarted, the FCAPS will check the incoming ACK transaction_id and what it includes. The incoming is higher, and as such, FCAPS sends a command to clients to invalidate the configurations and act as though the clients have restarted to replay them. FIG. 42 illustrates an example of gRPC worker thread logic 4200 of some embodiments.

Figure 43:
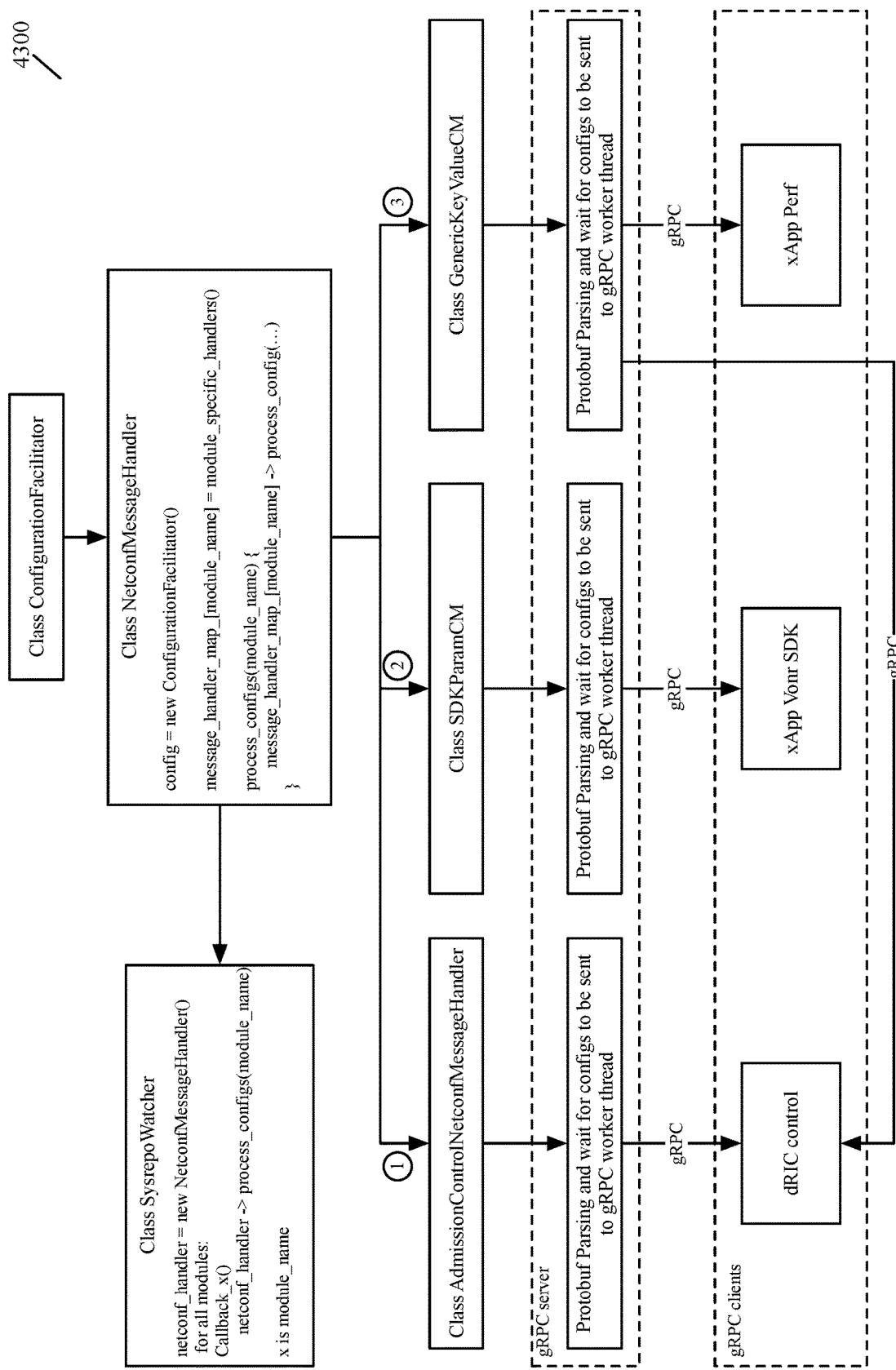
FIG. 43 illustrates a class diagram of the watcher API of some embodiments performing bulk processing.

Processing configurations is limited, in some embodiments, such that configurations are processed module by module due to the implementation of sysrepo API's callback functionality. FIG. 43 illustrates a class diagram 4300 of the watcher API of some embodiments performing bulk processing.

In some embodiments, users want to implement configurations that spans across different modules. For example, in some embodiments, a user may want to adjust SDK parameters on an xApp VONR 4322, adjust admission control on dRIC-control 4320, and change log_level on an xApp PERF 4324 and dRIC-control 4320. In some embodiments, sysrepo watcher will generate an event for dric_admission_control module. The admission configuration is then parsed at the gRPC server 4310 into protobuf and the operation is blocked until configurations are sent to dric-control during the regular polling intervals. The next event generated, in some embodiments, is for a vmware_sdk_param_cm module. Similarly, these configurations are parsed and blocked until xApp VONR SDK 4322 picks them up, and generic_key_value_cm configurations are blocked until the configurations are picked up by dRIC-control 4320 and xApp-perf 4324.

Due to this limitation, in some embodiments, there is a good amount of processing time on the FCAPS side. In some embodiments, the processing time increases with the increase in the number of configurations for multiple RIC components/gRPC clients as well as with the increase of modules in the system. In some embodiments, the Netconf server and Netconf client connection timeouts are increased as a temporary solution. As a requirement, in some embodiments, configurations of multiple modules are combined into one that is intended for a single RIC component/gRPC client.

Figure 44:
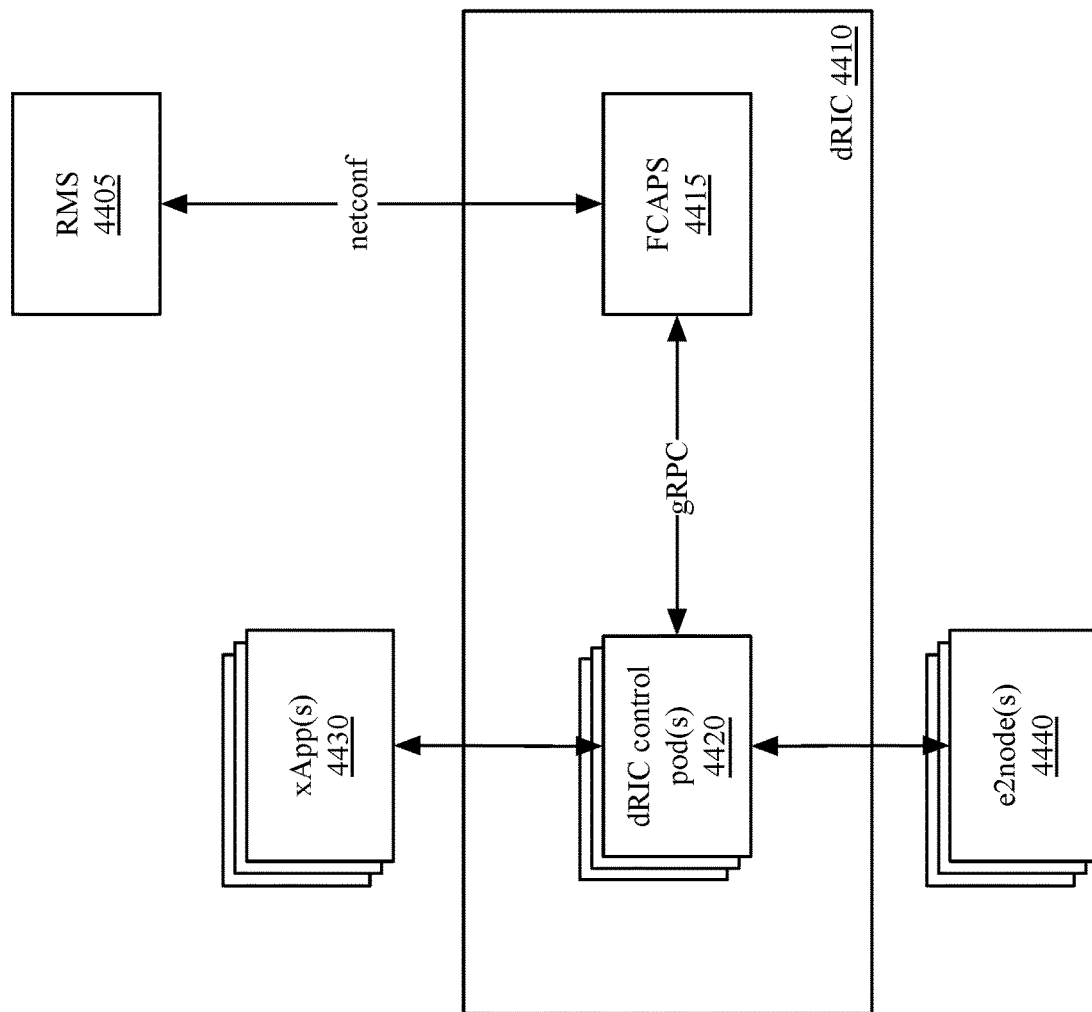
FIG. 44 conceptually illustrates a diagram of southbound dynamic configurations on a dRIC instance, in some embodiments.

FIG. 44 conceptually illustrates a diagram 4400 of a dRIC instance of some embodiments that includes multiple dRIC control pods that provide datapaths for communications between multiple xApps and multiple E2 Nodes, in some embodiments. As shown, the diagram 4400 includes an RMS 4405, a dRIC 4410, one or more xApps 4430, and one or more E2 nodes 4440. The dRIC 4410 includes one or more dRIC control pods 4420 (e.g., one or more datapath pods) to manage datapaths used for communications between the xApps 4430 and the E2 nodes 4420, and an FCAPS pod 4415 that interfaces with the RMS 4405 and with the dRIC control pods 4420. Each xApp 4430, in some embodiments, connects to each dRIC control pod 4420 (i.e., via the xApp's SDK (not shown)), while each E2 node, in some embodiments, is associated with a different dRIC control pod 4420. In some embodiments, as will be described further below, an E2 node load distributer is instantiated on the dRIC 4410, and all of the E2 nodes 4440 connect to the E2 node load distributer, which receives traffic forwarded by the dRIC control pods 4420 from the xApps 4430 and distributes the traffic among the E2 nodes 4440, in some embodiments. FIG. 44 conceptually illustrates a diagram 4400 of southbound dynamic configurations on a dRIC instance, in some embodiments.

In some embodiments, the gRPC thread functionality can be divided into three parts. The first part includes instantiating asynchronous streaming with the client (i.e., server-side streaming). The second part includes getting configurations from Netconf server thread using a shared data model. The third part includes sending the configurations to the client.

Figure 45:
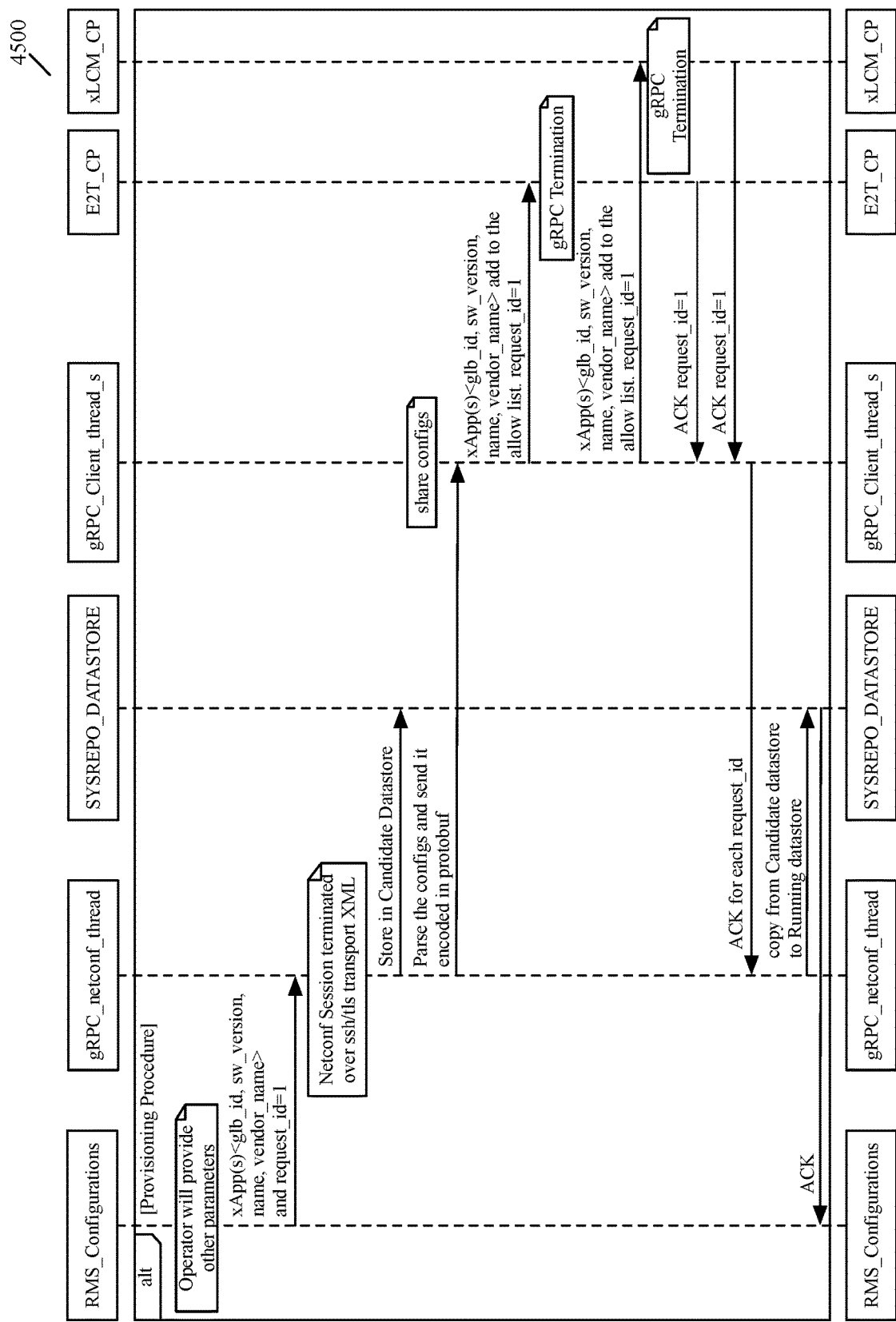
FIG. 45 illustrates a provisioning sequence diagram of some embodiments.

FIG. 45 illustrates a provisioning sequence diagram 4500 of some embodiments. This provisioning takes care of adding xApps or E2 nodes (not shown here) to the allowed list of E2T (dric-control) and the LCM operator. FIG. 46 illustrates an example of the code 4600 used in some embodiments to perform the provisioning sequence.

Some embodiments of the invention provide a configuration service designed to configure the RICs, xApps, and rApps as per user-defined configurations. Functional requirements for the configuration service, in some embodiments, include the ability to get, update, create, and delete the user-defined configuration. In some embodiments, an additional functional requirement for the configuration service includes the ability to get a list of changes (i.e., configuration changes) with timestamps. Additionally, non-functional requirements for the configuration service of some embodiments include that the configuration service is scalable such that the configuration service can support multiple RICs, xApps, and rApps; and that the configuration service has the ability to operate in real time in order to provide feedback and status of the configuration operation to the user. In some embodiments, an additional non-functional requirement for the configuration service includes that the configuration service is intent-based.

For the embodiments described below, a user is any entity which calls the configuration manager APIs (e.g., UI or client), CM is the configuration manager, RIC is either a cRIC or dRIC instance, and App is either an xApp or rApp instance. To complete a configuration operation, in some embodiments, a configuration service requires certain parameters from an API Server, including DNS/IP, authorization information (i.e., user/pass, TLS certificates), and configuration identifier. In some embodiments, the API server is responsible for creating a configuration record in its database.

Once the configuration operation is completed, the configuration service then updates the following status for the configuration: Pending, Error, Success, Failed, Time Out. The configuration service makes this update for the configuration by providing the configuration identifier and the status. FIG. 47 illustrates an example a UI 4700 in some embodiments through which an API endpoint is exposed.

Figure 48:
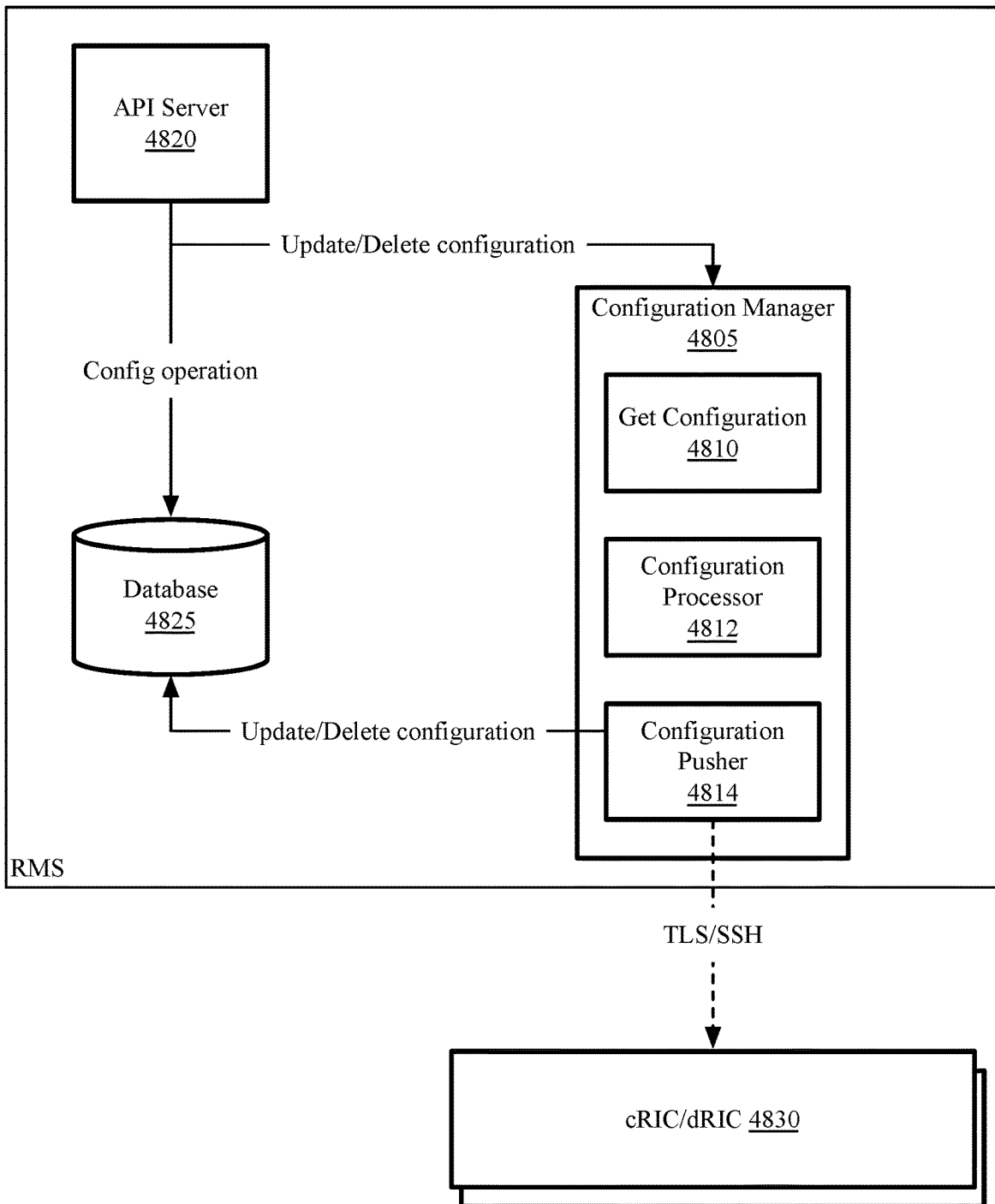
FIG. 48 conceptually illustrates an example of a diagram of a transaction-based configuration service of some embodiments.

The architecture design of some embodiments is a transaction-based design. FIG. 48 conceptually illustrates an example of a diagram of a transaction-based configuration service 4800 of some embodiments. As shown, the configuration service 4800 includes a configuration manager 4805, an API server 4820, a database 4825, and multiple cRICs and dRICs 4830. The configuration manager 4805 includes a get configuration module 4810, a configuration processor 4812, and a configuration pusher 4814. In some embodiments, a user is responsible for ensuring successful configuration of the RICs and Apps. As mentioned above, the configuration service of some embodiments is able to operate in real time and is easy to scale. In some embodiments, the order of the configuration operation is not guaranteed. Also, in some embodiments, the database 4825 is not a source of truth.

The get configuration module 4810 of the configuration manager 4805 is responsible for getting the configuration record and dRIC instance endpoint information from the database 4825 once there is a notification from the API server 4820. Additionally, the get configuration module 4810 gets the configuration template from the database 4825. The configuration processor 4812 of the configuration manager 4805 is responsible for converting the configuration record from JSON to XML and validating that the configuration is compliant with the obtained configuration template. The configuration pusher 4814 of the configuration manager 4805 is responsible for connecting to a Netconf server (e.g., an O1 CM agent (not shown) on a cRIC/dRIC 4830), sending the configuration over SSH, and waiting for a response from the Netconf server. Once the response from the Netconf server is received, the configuration pusher 4814 will update the status to the database 4825.

Figure 49:
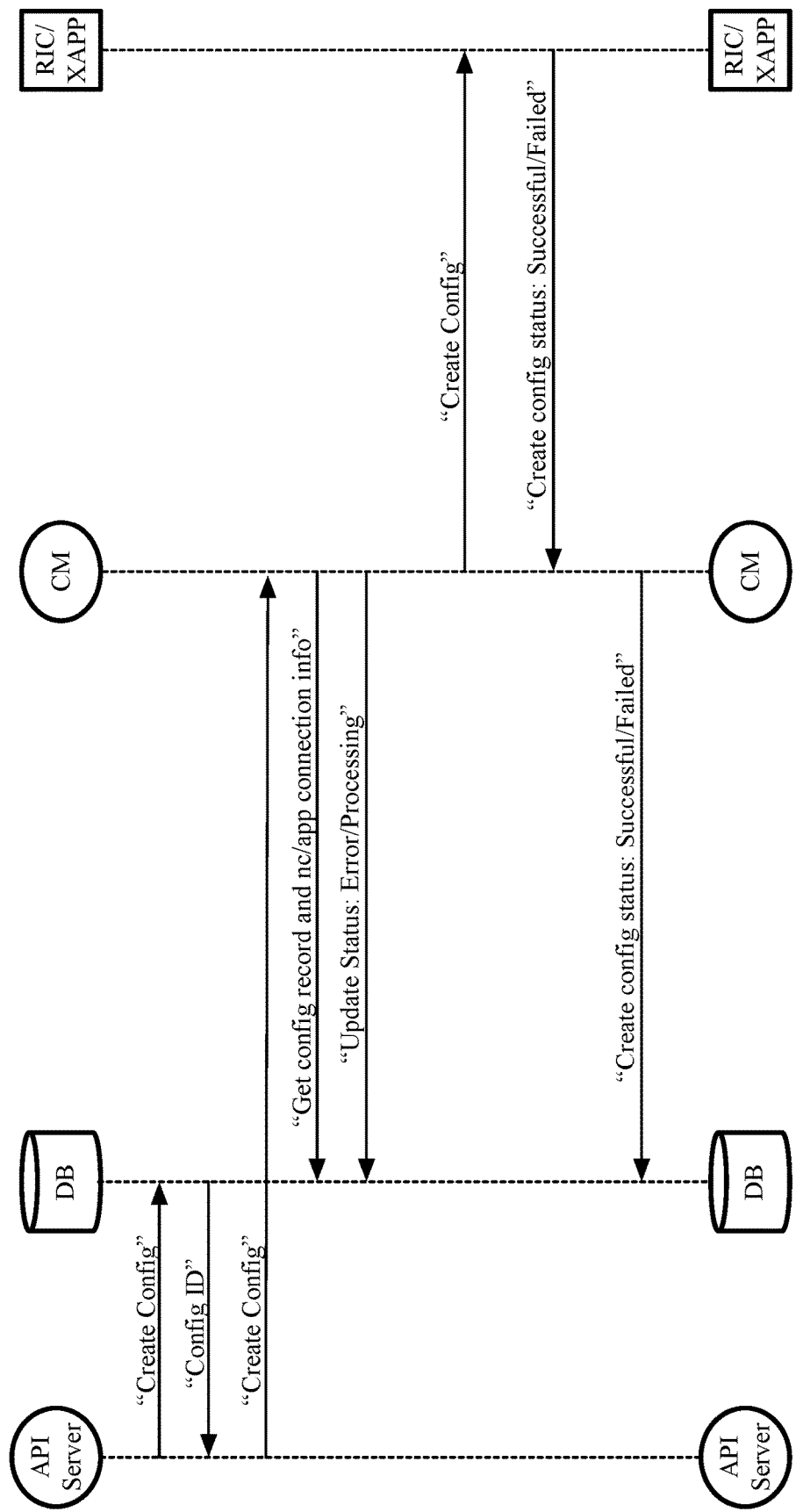
FIG. 49 conceptually illustrates a workflow of some embodiments for the configuration service to create configurations.
Figure 50:
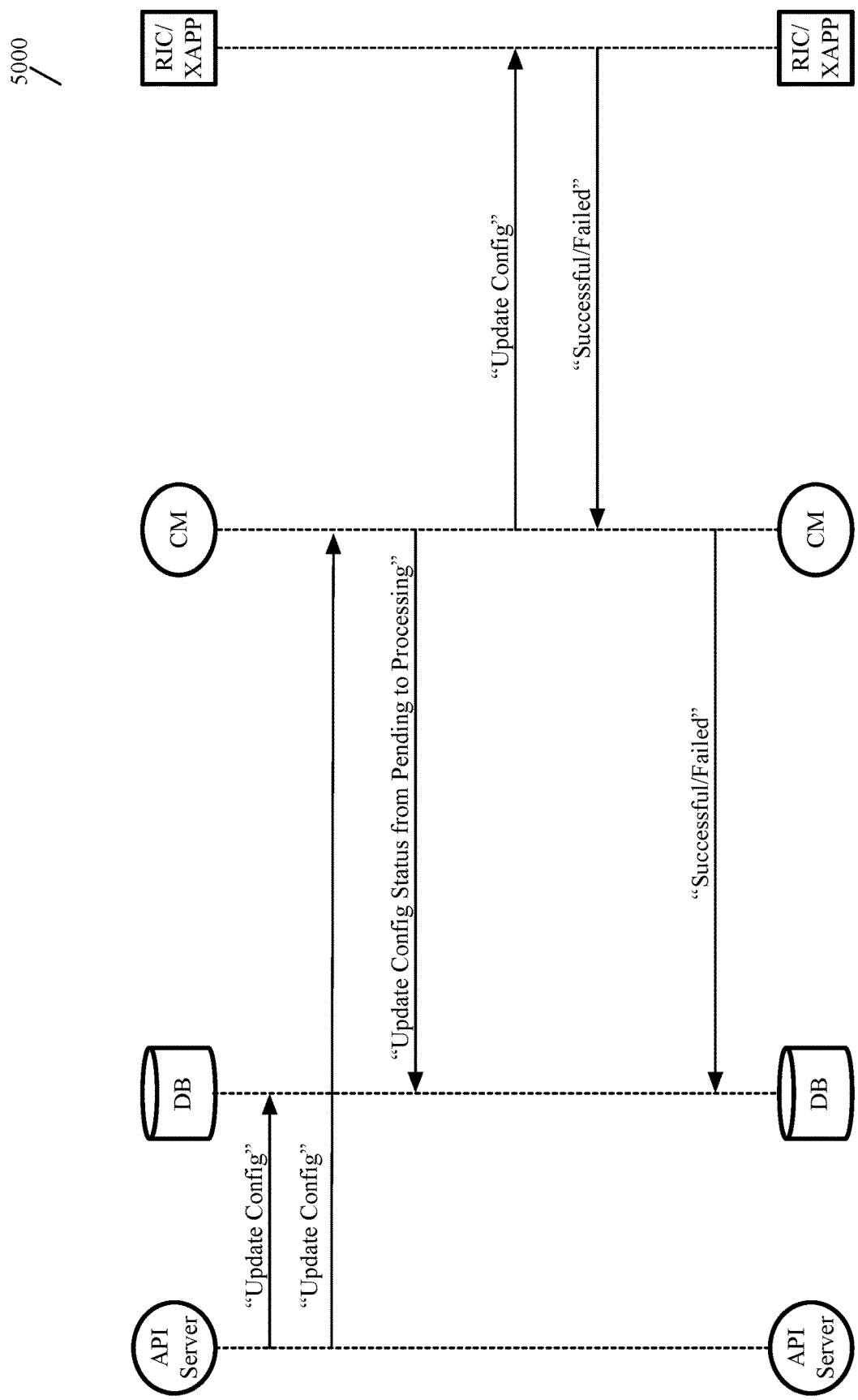
FIG. 50 conceptually illustrates a workflow of some embodiments for the configuration service to update configurations.
Figure 51:
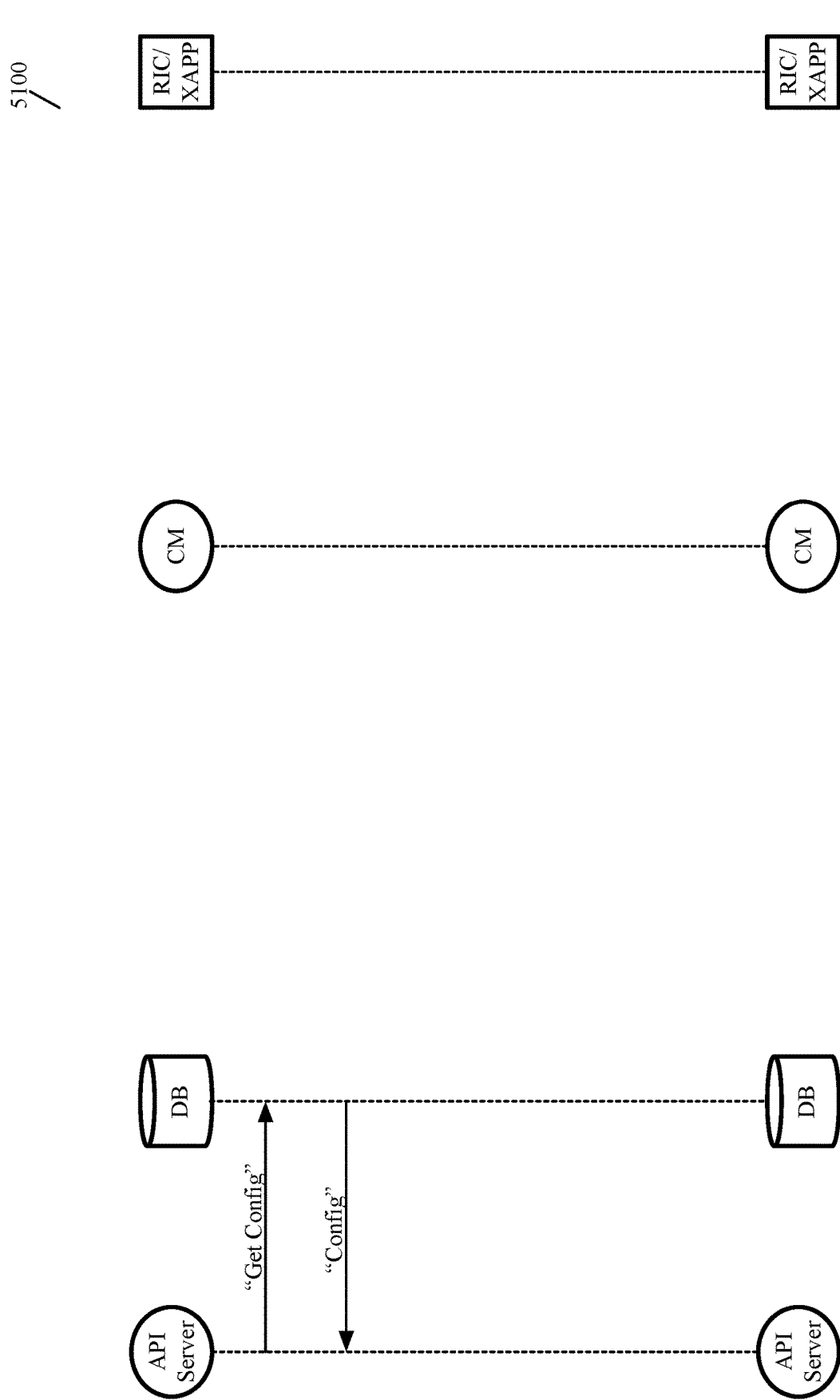
FIG. 51 conceptually illustrates a workflow of some embodiments for the configuration service to get configurations.

FIG. 49 conceptually illustrates a workflow 4900 of some embodiments for the configuration service 4800 to create configurations. FIG. 50 conceptually illustrates a workflow 5000 of some embodiments for the configuration service 4800 to update configurations. FIG. 51 conceptually illustrates a workflow 5100 of some embodiments for the configuration service 4800 to get configurations.

In some embodiments, during CM downtime, users are able to get a configuration as long as the database is still up and running. However, in some such embodiments, users are not able to update and/or delete the configuration. In response to any user attempts to update and/or delete the configuration, in some embodiments, the API server sends an error to the user.

As with CM downtime, users can get configurations from the database during a CM restart, in some embodiments. In order to update a configuration after a CM restart, in some embodiments, the user has to retry the pending configuration as the CM does not fetch configurations after restart. In some embodiments, if a user needs to delete a configuration, the CM does not delete pending configurations after restart.

In some embodiments, if a CM fails to update and/or delete a configuration, then the CM will update the configuration as "Failed", and the user has to retry the operation. If the CM updates and/or deletes the configuration and fails to update the status in the database (e.g., due to a network error or restart), then user has to retry the operation, in some embodiments. Also, in some embodiments, if the API server fails to send a notification to the CM and stores the configuration to the database, then the user will see that the operation is pending and has to retry the operation. Assuming a load balancer is delegating the request efficiently, increasing the number of CM instances will increase the number of requests (e.g., configuration operations) processed. In some embodiments, rolling upgrades are utilized for managed elements to ensure there is no downtime.

Figure 52:
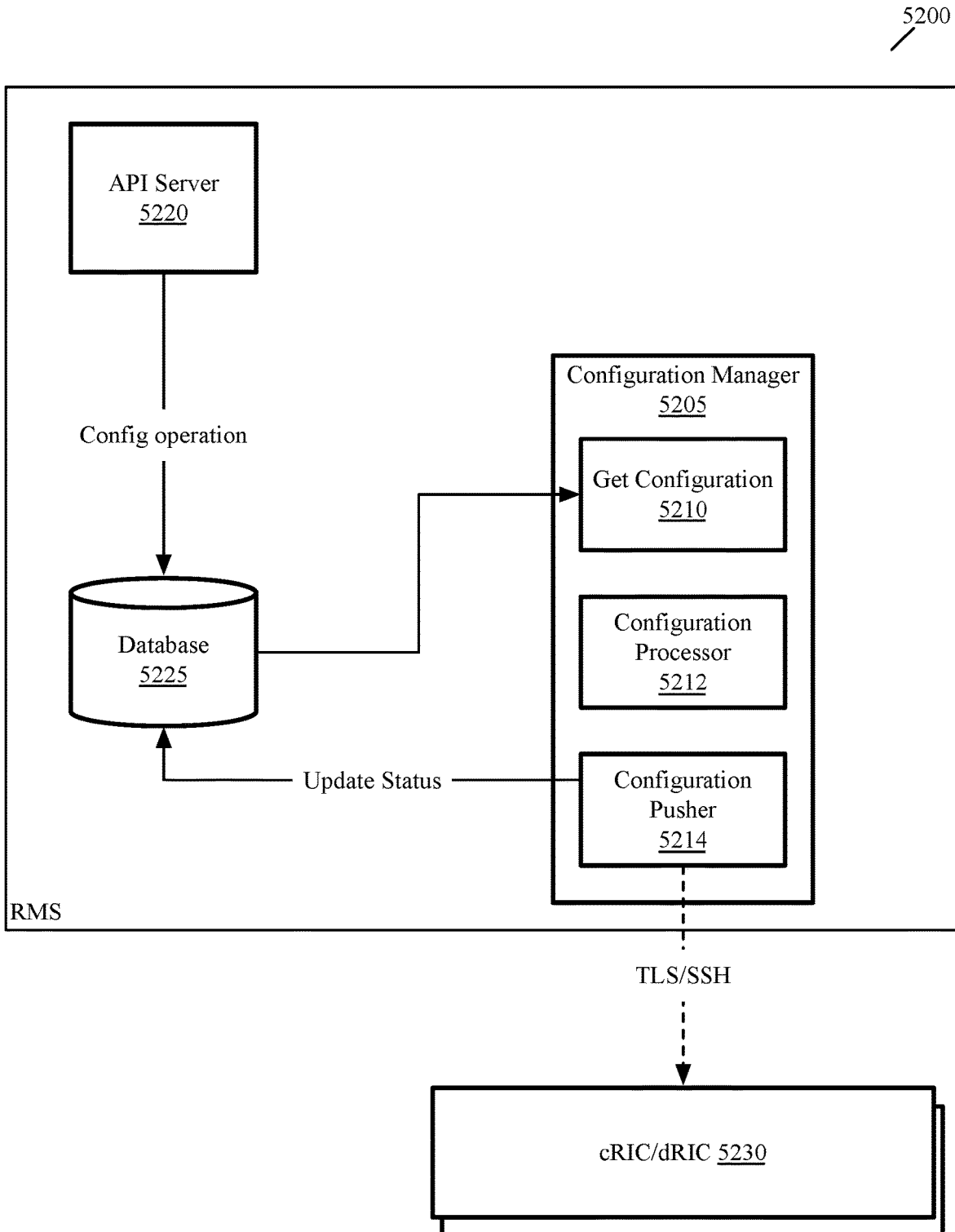
FIG. 52 conceptually illustrates a diagram of an intent-based configuration service of some embodiments.

FIG. 52 conceptually illustrates a diagram of an intent-based configuration service 5200 of some embodiments. In some embodiments, the configuration service 5200 is responsible for ensuring that the RICs and/or Apps are configured successfully. In some embodiments, the current state of the database 5235 is fetched using polling. Making real-time work with polling, in some embodiments, increases memory and CPU footprint. In some embodiments, additional complexities associated with polling leads to difficulty with scaling, and as such, some embodiments implement a master/worker configuration to delegate requests.

Some embodiments of the invention provide a RIC Management System (RMS) (e.g., VMware, Inc., RMS) backend to operate and manage multiple instances of centralized RIC (cRIC) and distributed RIC (dRIC) (e.g., VMware, Inc., cRIC and dRIC). The RMS backend, in some embodiments, provides rich observability and configuration management capabilities for CRIC and dRIC, as well as for xApps and rApps. Providing such rich observability and configuration management configuration capabilities, in some embodiments, results in more simplified operating of multiple instances of cRIC and dRIC. The RMS backend, in some embodiments, is scalable, secure, and highly available. In some embodiments, the RMS backend visualizes and operates multiple instances of RIC according to an RMS UI.

In some embodiments, an API backend is designed and implemented for RMS to meet RMS needs. A health check API for cRICs and/or dRICs is also designed and implemented, in some embodiments. The RMS backend of some embodiments supports dynamic provisioning (i.e., configuration) of dRIC and xApps, and supports local authentication. In some embodiments, the RMS backend supports integration with SSO backend authentication system. The RMS backend, in some embodiments, also supports registration of cRIC and dRIC instances, as well as operations of multiple dRIC instances. Additionally, in some embodiments, the RMS backend supports cRIC/rApp alerts and dRIC/xApp alerts.

The cRIC and dRIC should implement interfaces standardized by O-RAN, according to some embodiments. More specifically, in some embodiments, in the context of SMO, the O1 interface should be implemented per O-RAN standard. In some embodiments, the O1 interface is essential for the RIC (e.g., VMware, Inc., RIC) so that it is inter-operable with SMO solutions from different vendors.

In some embodiments, the RIC implements the O1 interface. Also, in some embodiments, the RMS does not implement the O1 interface, but uses the O1 interface frequently. All of the services provided by the O1 interface are available, in some embodiments, while in other embodiments, only a portion of the services provided by the O1 interface are available. Netconf/Yang is the standardized approach for provisioning/configuring RICs and applications, in some embodiments, and as such, the provisioning service is implemented using Netconf/Yang between the RMS and the RIC.

In some embodiments, the provisioning service supports Netconf operations such as get, get-config, edit-config, lock, unlock, close-session, and kill-session. In addition to these operations, the provisioning service of some embodiments also supports writable-running, rollback-on-error, validate, and xpath. Other services provided by the O1 interface, in some embodiments, include registration, heartbeat notification, fault notification, fault supervision control, performance data file reporting, performance data streaming, measure job control, trace management, and file management.

Figure 53:
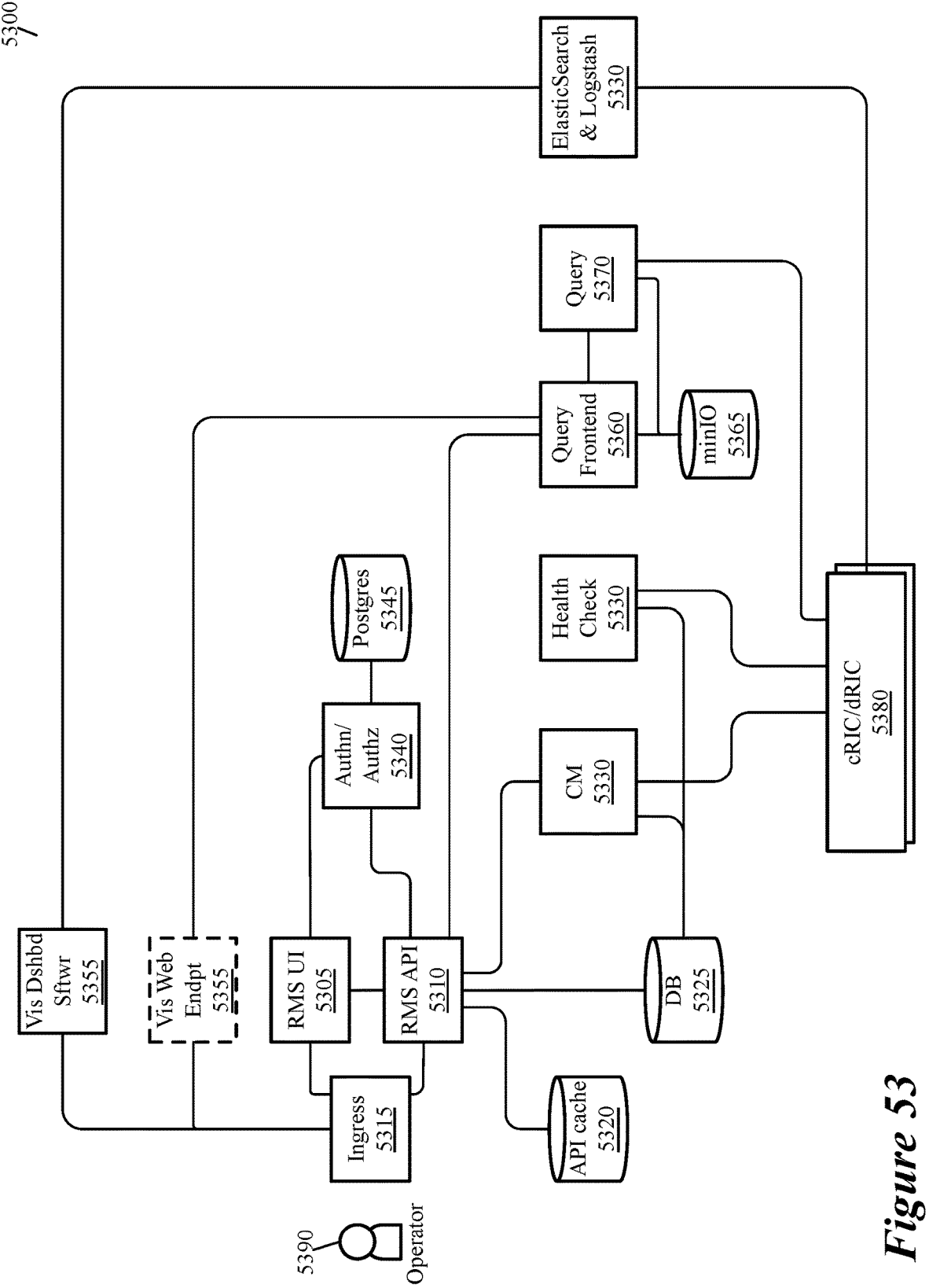
FIG. 53 conceptually illustrates a system diagram of the technical architecture of an RMS of some embodiments.

FIG. 53 conceptually illustrates a system diagram 5300 of the technical architecture of an RMS of some embodiments. As shown, the system diagram 5300 includes an ingress controller 5315, an RMS UI 5305, an RMS API server 5310, an API cache 5320, a database 5325, a configuration management service 5330, a health check service 5335, an authentication/authorization service 5340 that works with Postgres 5345, data visualization dashboard software (e.g., Kibana) 5350, an analytics and interactive visualization web application endpoint (e.g., Grafana) 5355, a metric collection and caching frontend service (e.g., a Thanos Query Frontend) 5360, a storage system 5365 (e.g., a minIO storage system), a metric collection query service (e.g., a Thanos Query) 5370, elasticsearch and logstash 5375, and a set of one or more cRICs/dRICs 5380.

An operator/user's 5390 access to the RMS UI 5305 and RMS API 5310 is terminated by the ingress controller 5315. In some embodiments, Istio is used for the ingress controller 5315 for managing ingress traffic flows between services. Istio, in some embodiments, exposes every endpoint (RMS UI 5305, RMS API 5310, Grafana 5355) using a unique host name (e.g., vmware-rms-dashboard.example.domain.com). Also, in some embodiments, HTTPS support is enabled by Istio. In some embodiments, Istio routes all traffic to corresponding services within the cluster. In other embodiments, additional services are provided by Istio, such as access policy enforcement, and telemetry data aggregation.

The RMS UI 5305 is a dashboard/web console for operators 5390 to visualize, operate, and manage multiple instances of RIC platforms. The RMS API server 5310 provides REST API access to the RMS backend. Operators 5390 can use RMS UI 5305 and/or RMS API 5310 to manage the RIC platforms. In some embodiments, the RMS API 5310 is implemented in Golang, leveraging common libraries from Go-based API in Uhana and R1 interface (not shown) in a cRIC 5380. The APIs, in some embodiments, follow OpenAPI specification. Similar to R1 APIs, Project Eve tools are leveraged for RMS API in some embodiments to generate API documentation from OpenAPI specifications. In some embodiments, the RMS UI 5305 interacts only with the RMS API 5310 and Keycloak 5340.

Because data is collected from multiple instances of RIC 5380 in the RMS, the API cache 5320 is an essential component for better performance of the RMS API 5310 and RMS UI 5305, in some embodiments. In some embodiments, the API caching developed in Uhana, which is built on top of Redis cluster, is leveraged.

In some embodiments, Thanos (e.g., Thanos query frontend 5360 and Thanos query 5370) is used for collecting metrics and events. Thanos works with multiple storage backends from public cloud such as Google Cloud Storage, AWS S3, Ceph, Swift etc., according to some embodiments. Thanos also supports minIO, in some embodiments, which is S3 compatible. In order for RMS to be portable across different cloud providers, in some embodiments, a storage system that works on all of the environments, such as minIO, is ideal.

Prometheus has its own time series database, in some embodiments, for storing all of the metrics and alerts. In some embodiments, all of the metrics and alerts from RIC instances are stored in Prometheus. A subset of this data can be collected and stored at Thanos/minIO 5365, in some embodiments. In some embodiments, elasticsearch 5375 is the database that is used for log analysis. Elasticsearch is already a part of the ELK stack, according to some embodiments. TCX supports elasticsearch, Prometheus, and minIO. The authentication and authorization service 5340 is Key-cloak, in some embodiments. Keycloak works with Postgres 5345, which is also supported by TCX.

The main purpose of RMS, in some embodiments, is to provide a management plane that provides observability and configuration of multiple RIC instances and applications. The topology information, in some embodiments, includes relationships between cRIC, dRICs, xApps, rApps and cells. A cRIC can be associated with multiple dRIC instances using A1 interfaces, in some embodiments. cRIC and dRIC, in some embodiments, is used to observe and/or control multiple cells. In some embodiments, a set of xApps can be managed by a dRIC instance and a set of rApps can be managed by a cRIC instance.

In some embodiments, xApps and rApps can observe and/or control a subset of cells via the RIC platform. Each of the cells in the subset can be well described using a graph on a nationwide network, in some embodiments. As such, some embodiments use a graph database 5325. The graph database 5325, in some embodiments, is an ArangoDB, which assists in representing the topology without much overhead using a traditional relational database. TCX supports ArangoDB.

Configuration data for dRIC, cRIC, xApps, and rApps are documents, in some embodiment. A multi-model database 5325 (e.g., ArangoDB) is used to store documents, in some embodiments, such as the configuration data for dRIC, cRIC, xApps, and rApps when said configuration data is in document form. Additionally, in some embodiments, the multi-model database 5325 (e.g., ArangoDB) supports subscriptions to nodes and documents, which allows for changes in documents to be detected during CRUD operations, and for developing an intent-based configuration management system.

In some embodiments, the RMS backend together with the RMS UI use Keycloak for authentication and authorization. In some embodiments, Keycloak is used to provide local authentication. Also, in some embodiments, Keycloak is used to integrate with external authentication systems using identify protocols such as SAML/OpenID connect.

The health check service 5335 is responsible for registering cRIC, dRIC, xApps, and rApps, as well as monitoring health of these instances. The registration process, in some embodiments, is manual for cRIC and dRIC (i.e., the operator 5390 uses the RMS UI 5305 or RMS API 5310 to register after onboarding the RICs). In some embodiments, a RIC app LCM controller handles automatic registration for xApps and rApps.

The configuration management service 5330 is responsible for handling configuration of RIC instances and their applications. In some embodiments, the configuration management service will implement a Netconf client to interact with Netconf servers running on every instance of RIC 5380.

In some embodiments, metric collection and alert management services are provided by Thanos. Thanos is a CNCF (sandbox) incubated service which handles metrics collection and alert management from multiple instances of Prometheus. In some embodiments, every RIC instance 5380 will have a Prometheus running with Thanos sidecar. Each RIC instance, in some embodiments, will stream metrics to Thanos in the RMS backend, which can then expose to either Grafana (e.g., for internal purposes) or the RMS UI 5305 via the RMS API 5310. In some embodiments, this is used as a temporary solution for collecting PM data from the RICs, and O1 interfaces are utilized solution. as long-term A reverse proxy (e.g., https://thanos.io/tip/operating/reverse-proxy.md/) is used in front of Thanos, in some embodiments, to enable HTTPs and authentication.

RMS architecture designs other than the architecture diagram 5300 are implemented, in some embodiments. For example, in some embodiments, every instance of RIC includes an API service that directly interacts with the RMS UI (i.e., rather than the RMS API). In some such embodiments, additional configuration and state management in the UI is needed, which leads to a more complex UI. Additionally, for every user, API calls will be made repeatedly to RIC instance, in some such embodiments. With caching in the RMS backend, the complexity of the UI can be reduced and the UI's performance can be improved, according to some embodiments.

In some embodiments, configuration and topology are handled by Cassandra (i.e., rather than ArangoDB). Cassandra includes a long list of features, including time-series data and horizontal scaling. As Thanos and Prometheus handle time-series information about metrics and alerts using minIO and Prometheus time series database, in some embodiments, using Cassandra in the backend might be redundant. Additionally, there is no other information in the RMS backend that requires a time series database, and representing and updating topology information would require multiple joins in the application layer, which could be inefficient with Cassandra. The RMS backend itself can be lifecycle managed using Telco Cloud Automation (TCA) and/or TCX admin operator, according to some embodiments. In some embodiments, Cassandra schema migration is leveraged from Uhana.

The RMS of some embodiments is able to scale to handle multiple cRIC/dRIC instances, as well as to handle the load (i.e., streaming PM data from various instances). In some embodiments, the CM, PM (e.g., Thanos), and health check services are implemented to scale horizontally. Persistent connections are used, in some embodiments, so that traffic from an instance of RIC always goes to a specific replica of a pod in the RMS.

In some embodiments, because RMS is a centralized system, any downtime impacts management of several RIC instances. Every service in RMS will be deployed, in some embodiments, with high availability (HA) enabled (i.e., deployed with two or more replicas). The load is spread across multiple Kubernetes nodes, in some embodiments, which recommend to deploy with anti-affinity rules.

All North-South access is secured using TLS, in some embodiments. Internal service-to-service communication does not have TLS, in some embodiments. Customer certificates can be used, in some embodiments, and if these certificates are not provided, some embodiments autogenerate self-signed certificates that are used to secure the communication.

Some embodiments provide a feature that provides a mechanism to update xApp/SDK parameter values during run time using the dynamic configuration mechanism described above. These parameters can be common or unique for each xApp, in some embodiments. In some embodiments, the parameters can be clearly defined names or generic key-value pairs. Also, in some embodiments, the parameters are encapsulated in Yang/JSON schema, as will be described further below, and eventually the values are updated during runtime. The provided feature, in some embodiments, enhances customer experience from the RMS UI, keeps an interface open to be exposed to any SMO, provides a scalable and future-proof way for configuration, and minimizes or removes complex operator involvement to modify RIC parameters from the RMS UI.

Since ORAN WG-10 specifies Netconf-Yang as a heart of communication for Configuration Management, the RIC platform and SMO (e.g., RMS) adhere to the same protocol, in some embodiments, which is beneficial in some embodiments when exposing the Yang schemas to various SMOs.

In some embodiments, the configuration payload from the RMS UI is easy to operate and well-defined such that RMS APIs, as well as a bulk update feature, have the same data schema backing. The SDK APIs of some embodiments are also easy to use from the perspectives of xApp developers. The configuration management service of some embodiments reduces the number of data models/payloads used in RMS and RICs for development and debugging. In some embodiments, to do so, the configuration management service keeps Yang schema as a standard entity. Also, in some embodiments, the configuration management service uses a single type of configuration payload (e.g., JSON rather than XML) from RMS, and stores configurations in the JSON format in the database.

JSON schema is chosen for the RMS UI and RMS backend, in some embodiments, because JSON is a defacto model used for any REST application since the RMS UI operates on REST-based APIS, and because the JSON schema is a simple model to understand and operate for users irrespective of the user's RAN domain knowledge. The configuration input to the dRIC instance side, in some embodiments, is XML as per the standards. From FCAPS to RIC components, in some embodiments, keeping in mind the network API model on the xApp side, protobuf with well-defined structures are very important.

Figure 54:
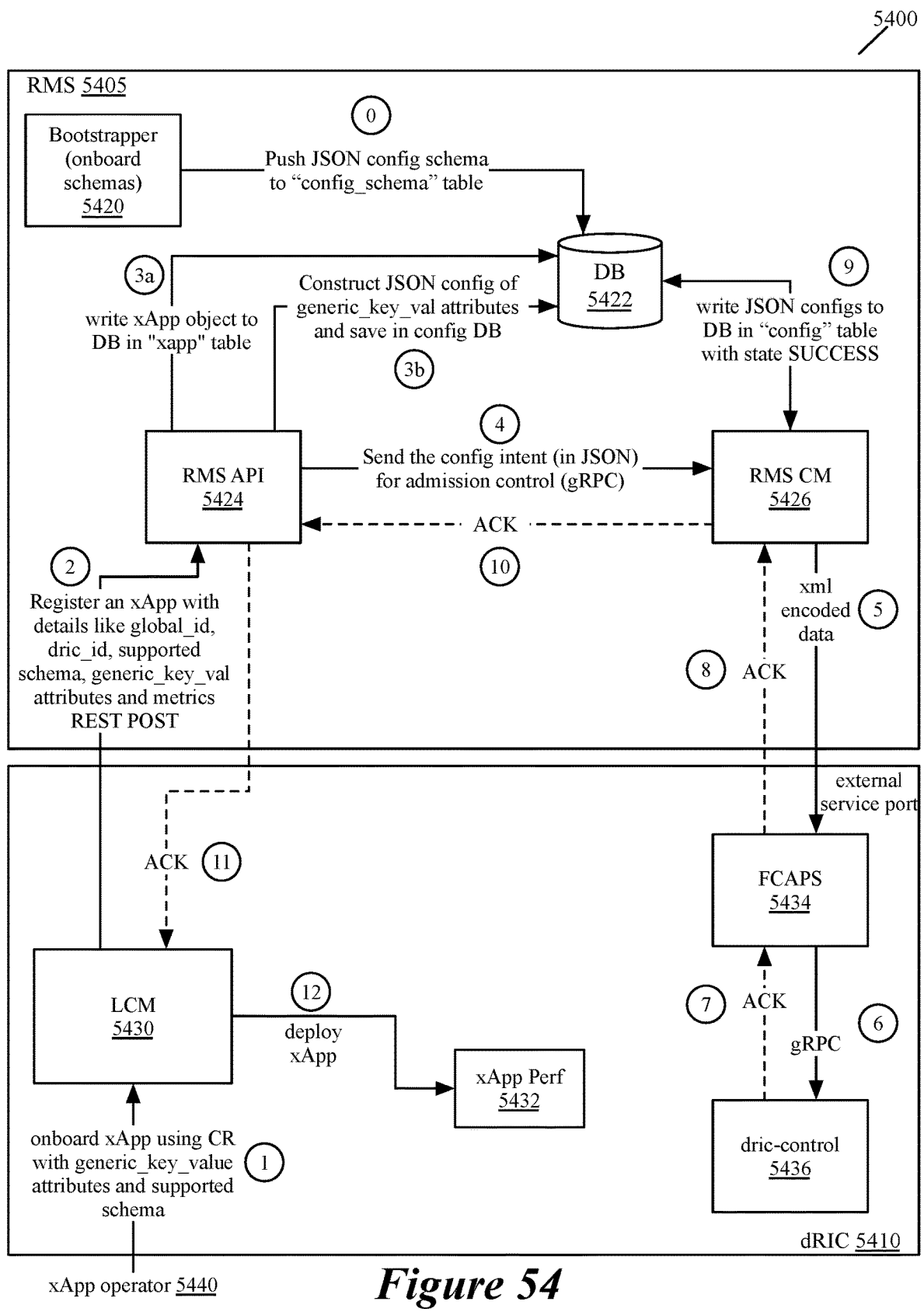
FIG. 54 conceptually illustrates a functional block diagram of the workflows in a RAN system during the deployment phase of some embodiments.

In the embodiments described below, DP refers to a deployment phase, OP refers to an operation phase, and CM refers to the configurations manager service on the RMS side that is responsible for sending configurations to southbound dRIC instances. Each RIC component, such as an xApp, datapath pod (e.g., E2 termination interface or dric-control), etc., in some embodiments, is uniquely identified using a global identifier (i.e., global_id), as mentioned above. In some embodiments, the RMS accepts JSON configurations from an RMS UI and RMS API. After a strict validation, in some such embodiments, the RMS CM sends the configuration to the dRIC platform. In some embodiments, there is only one instance of LCM running for any dRIC. As such, when the LCM is deployed for the first time, it registers the dRIC platform with the RMS (i.e., via the RMS API) using REST API, according to some embodiments. FIG. 54 conceptually illustrates a functional block diagram 5400 of a RAN system during the deployment phase of some embodiments and will be further described below with regard to an admission-control use case. However, this can be generalized for any other features that require dynamic configuration, according to some embodiments.

RMS components like UI, API, CM, and a database (e.g., ArangoDB) are needed, in some embodiments, for the northbound implementation. In some embodiments, configurations are sent to only one xApp at a time from the RMS side. Fanned-out configuration support is also provided, in some embodiments. In some embodiments, vChi does not include any version control for configurations. An xApp, in some embodiments, has a single instance, and as such, it is identified using a unique global identifier. In some embodiments, in order to include xApps that are scaled to have multiple instances, each instance is assigned a global identifier by the LCM, and each instance has the same configuration, which is managed by RMS and FCAPS, according to some embodiments.

An xApp comes with configurable parameters that support the operational flexibility in deployment, in some embodiments. The xApp configuration parameters of some embodiments are on-line modified in the field (i.e., not requiring re-deployment of the xApp, which would result in service disruption). In some embodiments, for xApp dynamic configuration, the RMS UI displays the xApp parameters and the current settings (e.g., as a collection of key-value pairs). Each xApp descriptor, in some embodiments, includes attributes such as name (e.g., as a string), value type (e.g., as a string, int, real, or enum), range (e.g., as an int, real, or enum) or length limit (e.g., as a string), and update type (e.g., as display-only, or modifiable). Also, in some embodiments, the parameter values are on-line updatable in the RMS UI, as mentioned above. In some embodiments, certain modifications are not allowed via dynamic configuration such as parameter values of display-only parameters, parameter attributes, and parameters additions and removals.

The modification response time (i.e., from the time a parameter value modification is made in the RMS UI to the time that the updated value is received by the xApp), in some embodiments, is within five (5) seconds. In some embodiments, the modification response time is within two (2) seconds. A faster modification response time (i.e., within two (2) seconds) is ideal, according to some embodiments. The parameter modification response time is measure from the time of the parameter value modification in the RMS UI to the time the updated value is received by the xApp via SDK, according to some embodiments.

The RMS, in some embodiments, maintains an event log on the parameter modifications for the last 14 days and is able to display this event log upon request. Additionally, in some embodiments, the RMS maintains the xApp parameter setting snapshots before each parameter modification event for the last 14 days and is able to roll back when requested. In some embodiments, when a dynamic modification for an xApp parameter fails, the pre-modification value is continued to be used. Dynamic configuration is successful, in some embodiments, only if the RMS has received the positive acknowledgement from the dRIC on the modification request within the modification response time (e.g., a default time of 5 seconds). In some embodiments, the parameter name and value type are updated via a mechanism other than dynamic configuration. Similarly, in some embodiments, parameter additions and removals are not part of dynamic configuration.

In some embodiments, a generic pre-standard Yang schema is defined that enables configuration of dRIC platform parameters and xApp/SDK parameters. The implementation framework on the dRIC platform side is described above. In some embodiments, the generic pre-standard Yang schemas are a binding contract between VMware, Inc.'s RMS and VMware, Inc.'s RICs, and whereas for other (i.e., non-VMware, Inc.) SMO-based deployments, the contract defines the schema between itself and the RICs.

The two schemas provide flexibility to xApp vendors/operators to configure parameters in the runtime, in some embodiments. On the xApp side, in some embodiments, vendors fetch these parameters using SDK APIs. The functional diagram or the component workflow can be divided into two phases, in some embodiments. In some embodiments, the first phase includes bootstrapping the system to the desired state with the correct deployment order and loading the schemas. In dRIC platform deployment, whenever an xApp is onboarded, the xApp is added in the admission control list of dric-control using a dynamic configuration framework, according to some embodiments. Additionally, generic_key_value attributes are configured.

During runtime, the UI can configure each dRIC instance adhering to the above-mentioned schemas.

The O1 CM agent is a configuration agent present at every dRIC platform, in some embodiments, such as FCAPS 5434 on the dRIC 5410. This O1 CM agent is responsible, in some embodiments, for providing configuration information for all components of the platform. As also mentioned above, gRPC is chosen, in some embodiments, as the internal communications mechanism for the RMS and for RICs. In some embodiments, gRPC is chosen because it provides quick and easy way to send configurations to RIC components, it provides compression of data that saves critical bandwidth in a real-time environment, it provides a strong ACK-based mechanism which is ideal for multi-component configurations (i.e., one set of configurations that applies to multiple RIC components on a platform at the same time), it allows stream-based capabilities for speeding up ACK responses, and its footprint is smaller than other streaming buses.

In some embodiments, the functional block diagram 5400 provides an overall picture of the different components of the dynamic configuration of the RMS 5405 and dRIC platform 5410 of some embodiments. The RMS 5405 includes a bootstrapper 5420, a database 5422, an RMS API 5424, and an RMS CM 5426. The dRIC 5410 includes an LCM 5430, at least one xApp 5432, FCAPS 5434, and dric-control 5436. Different aspects of the deployment phase of some embodiments will be described below with references to the functional block diagram 5400.

Because the xApps are onboarded by a RIC component (i.e., an LCM) of the RAN system, the admission control for xApps is also handled by the RAN system, according to some embodiments. The configuration data transmission, in some embodiments, adheres to the standards mentioned in the O1 interface, including the Netconf client (e.g., the RMS CM 5426) on the RMS that acts as a management interface to send configurations to each dRIC platform site, the Netconf server (e.g., the FCAPS 5434) on the dRIC platform that is realized on a Yang model and accepts XML-encoded configurations as per the standards, a defined Yang model "dric-admission-control" that provides a schema to add a list of xApp and E2 node objects, and supported configuration operations ADD, MODIFY, and DELETE.

In some embodiments, the RMS bootstrapper 5420, an RMS UI (not shown), the LCM 5430, the RMS API 5424, and the RMS CM 5426 are northbound components. During the deployment phase, in some embodiments, the bootstrapper job loads all the pre-standard configuration schemas (in JSON) in the database 5422. Some embodiments include three configuration schemas. The schemas, in some embodiments, are specified by a vendor of the RMS. The bootstrapper job, in some embodiments, is a one-time job that is either triggered through fresh installation or through upgrade, according to some embodiments.

During the deployment phase of some embodiments, an operator 5440 (e.g., an xApp operator, or any user) onboards an xApp using xApp CR on a Kubernetes-enabled system. For instance, at the encircled 1, an xApp operator 5440 onboards an xApp using a CR with generic_key_value attributes and supported schema. Prior to this, in some embodiments, JSON configuration schemas are pushed by the bootstrapper 5420 to a configuration schema (config_schema) table in the database 5422. The database 5422, in some embodiments, is a multi-model database. Examples of multi-model databases include ArangoDB, as also mentioned above.

After the xApp has been onboarded on the dRIC platform 5410, the CR is picked by the LCM 5430, which parses the CR. More specifically, the CR is loaded into the LCM 5430 using a Kubernetes API, according to some embodiments, and then parsed by the LCM 5430. The CR is defined by reference to a RAN application CRD (custom resource definition), according to some embodiments. In some embodiments, in addition to parsing the CR, the LCM 5430 assigns a global identifier to the xApp that uniquely identifies the xApp in the RAN system.

After parsing the CR, the LCM 5430 posts an xApp object for the xApp to the RMS 5405 using an RMS REST API that includes data such as the identity of the xApp (i.e., the assigned global identifier) and an identifier for the dRIC 5410. Additionally, the LCM 5430 registers supported schemas for the xApp, according to some embodiments. For instance, at the encircled 2, the LCM 5430 registers the xApp with the RMS API 5424 with details such as a global identifier (i.e., global_id), a dRIC identifier corresponding to the dRIC 5410 (i.e., dric_id), a supported schema, generic key-value attributes, and metrics. In some embodiments, all communications from the dRIC 5410 to the RMS 5405 are sent via the O1 interface (e.g., FCAPS 5434), and as such, the LCM 5430 provides the API to the RMS 5405 via FCAPS 5434.

The supported schemas, in some embodiments, are supported configuration schemas that specify supported capabilities/modules or functionalities of the xApp. The supported schemas are also schemas that are supported by the RMS 5405, according to some embodiments, and can be found in a configuration schema data store (e.g., configuration schema table) stored by the RMS 5405, in some embodiments. Each supported schema, in some embodiments, includes multiple supported key-value pairs that are used to define supported attributes of a RAN application (e.g., an xApp).

During the runtime operation phase, the LCM 5430 keeps a watch on any updates in the xApp CR. In some embodiments, modifications to the xApp that include additions or deletions are only performed by updating the CR, while other modifications that include updates to current parameters are made using the RMS UI (not shown).

The generic key-value attributes, in some embodiments, are custom attributes defined using custom key-value pairs based on a generic key-value schema. In some embodiments, the generic key-value schema is a data structure that is part of the supported schemas and used to extend the supported schemas to include additional attributes (i.e., custom attributes) to supplement the supported attributes defined using the supported key-value pairs. Also, in some embodiments, the generic key-value schema is a standalone schema that is separate from the supported configuration schema. The generic key-value schema or generic key-value data structure exposes simple key-value pairs for use in defining the custom attributes.

While hundreds of metrics can be extracted from each application (e.g., xApp, rApp, etc.) deployed in the RAN system, not all of the metrics are desired for publishing (e.g., for display through a UI). Accordingly, the metrics parsed from the CR and provided to the RMS include one or more metrics selected for extraction from the xApp during runtime and for publishing (e.g., for display through a UI), in some embodiments. For instance, an application can produce 100 metrics, while only 5 of those metrics are selected for publishing, and as such, the remaining 95 metrics will be ignored. In some embodiments, the metrics are used as part of a process to dynamically generate a UI. This process also includes defining the UI based on a UI visualization CR that is based on a UI visualization CRD, according to some embodiments. Dynamic generation of the UI based on the UI visualization CRD and the UI visualization CR in order to show this metric data is further described in U.S. patent application Ser. No. 18/084,466, filed on Dec. 19, 2022 and titled "Use of CRDs as Descriptors for Application UI in an O-RAN System". U.S. patent application Ser. No. 18/084,466 is incorporated herein by reference.

The LCM 5430 waits until certain mandatory configurations have occurred, such as automated admission control for the xApp, before deploying the xApp from the CR, according to some embodiments. In some embodiments, this ensures that xApp connectivity with dRIC-control is successfully completed (i.e., the xApp is successfully associated with a datapath in the dRIC), as will be described below.

The RMS API 5424, of some embodiments, onboards configuration schemas and handles xApp and rApp registration during the deployment phase. After the LCM 5430 provides the configuration data parsed from the CR to the RMS API 5424 (i.e., after the LCM 5430 posts the xApp object), the RMS API 5424 validates the xApp request and creates an xApp entry in the database 5422 (e.g., at the encircled 3a). Creating the xApp entry, in some embodiments, includes adding the identity (e.g., the global identifier) of the xApp to a RAN application datastore in the configuration database 5422 of the RMS. In some embodiments, the RMS 5405 creates a record of the xApp in the database 5422. During the runtime operation phase, the RMS API 5424 is also responsible for all RMS UI-related API calls, according to some embodiments.

In some embodiments, the RMS API 5424 also uses the received generic key-value attributes provided by the LCM 5430 to construct a JSON configuration of the generic key-value attributes and saves the generic key-value JSON configuration in the configuration database 5422. In some embodiments, the JSON configuration is constructed out of generic_key_value attributes that adhere to a generic key-value schema mentioned below. This JSON configuration is a configuration block, in some embodiments, that is saved in the database without being provided to southbound components due to a set of assumptions, according to some embodiments. For instance, in some embodiments, a first assumption is that an xApp (e.g., the xApp Perf 5432) sets generic_key_value attributes that are already configured using a static file during its deployment (i.e., the xApp is deployed with default values for the given attributes). As such, in some embodiments, the RMS does not provide the same configuration to the southbound components. A second assumption, in some embodiments, is that the attributes specified in the CR by an xApp operator or xApp developer are the only attributes supported through dynamic configuration. In some embodiments, if new attributes need to be configured, the operator or developer has to update the xApp CR and redeploy, as the RMS UI (not shown) cannot add more attributes on the fly, according to some embodiments.

After creating the xApp entry and saving the generic key-value JSON configuration in the configuration database 5422, the RMS API 5424 sends an admission control configuration request to the RMS CM 5426 for the xApp. As illustrated at the encircled 4, the RMS API 5424 sends the configuration intent (i.e., the admission control configuration request) in JSON to the RMS CM 5426 over gRPC. As described above, gRPC is used, in some embodiments, as the internal transport mechanism for passing configurations internally both for the RMS and for RICs.

After receiving the configuration intent from the RMS API 5424, the RMS CM 5426 converts the configuration from JSON to XML and sends the XML-encoded configuration to the dRIC platform 5410 that hosts the xApp. In some embodiments, the RMS CM 5426 does this by generating an XML configuration block for admission control and sending it to the dRIC platform 5410. The RMS CM 5426 uses the Netconf protocol to send the XML configuration block to the dRIC 5410. At the encircled 5, for example, the RMS CM 5426 sends the XML-encoded data to FCAPS 5434 of the dRIC 5410. The XML-encoded data, in some embodiments, is the parsed CR data provided to the RMS API 5424 by the LCM 5430, while in other embodiments, the XML-encoded data differs from the parsed CR data due to modifications made to the data through the RMS UI (not shown) before the RMS CM converts and sends the data to FCAPS 5434.

During both the deployment phase and the runtime operation phase, in some embodiments, the RMS CM 5426 is responsible for constructing XML-encoded configurations as per https://datatracker.ietf.org/doc/html/rfc624121ection-1.2, and sending these XML-encoded configurations downstream to Netconf servers at the RICs.

The southbound components, in some embodiments, include FCAPS 5434 and one or more xApps 5432. During the deployment phase and the runtime operation phase, FCAPS 5434 exposes an external service for Netconf communication over XML-encoded configurations and defines one or more Yang modules to configure SDK or xApp parameters, according to some embodiments. In some embodiments, one or more SDK API functions are defined to expose xApp-related parameters to the xApp vendors for their development. In some such embodiments, SDK does not parse xApp-related information.

After the RMS CM 5426 sends the XML-encoded configuration to FCAPS 5434, which acts as a configuration service for the dRIC 5410, according to some embodiments, FCAPS 5434 validates the incoming request against the dric-admission-control.yang schema, parses these configurations, and converts them into protobuf. The configurations, in some embodiments, include the global identifier assigned to the xApp by the LCM 5430 to enable FCAPS and other components in the RAN system to uniquely identify the xApp.

In some embodiments, the request includes a series of admission control instructions to instruct FCAPS to perform a set of admission control operations for the xApp. The set of admission control operations, in some embodiments, include validating the received configuration for the xApp, associating a datapath from a set of one or more datapaths of the dRIC 5410 with the xApp for processing and passing communications to and from the xApp from and to the base station components, and adding the xApp to an admission control list of the associated datapath (e.g., by adding the global identifier for the xApp to the admission control list).

Some embodiments also automatically configure the deployed xApp's SDK to interface with one or more datapath pods (i.e., E2T, dric-control, etc.) that are configured for the xApp (e.g., all the datapath Pods of the dRIC instance in the embodiments that add the xApp to the admission control allow list of all of the dRIC instance's datapath Pods, or a subset of these datapath Pods in the embodiments that add the xApp to the admission control allow list of only a subset of the instance's datapath Pods). In some embodiments, when additional datapath pods are instantiated on the dRIC, the SDK is informed of each new datapath pod in order to connect to each new datapath pod for communicating with E2 nodes via datapaths of the datapath pods.

The validation, in some embodiments, includes both standard and custom validations. The standard (i.e., system (library)) validations include standards validations as defined in WG10 for the O1 interface and are requirements of the Netconf server (e.g., FCAPS), schema validation for incoming configurations that determine whether the incoming configurations adhere to a given Yang model (i.e., Yang schema), and dependency validation between different kinds of configurations (e.g., access-control has dependency on admission-control, etc.). Custom validations, in some embodiments, include checking whether the RAN components (e.g., E2T and xApps) are connected to FCAPS before accepting any configuration from northbound components, additional data type validation in modification operations for a generic-key-value Yang module to ensure the user does not change the data type of an attribute, and checking for malformed configurations using a Yang module-specific parsing logic.

Each RIC deployed in the RAN system, in some embodiments, includes one or more datapath pods. Each such datapath pod, in some embodiments, includes one or more datapath threads and one or more control threads for managing the one or more datapath threads. FIG. 15 described above, for example, illustrates a RIC 1500 that includes a datapath pod 1505, which includes a datapath thread 1507 that provides a fast datapath IO of the near RT RIC between E2 nodes 1518 and xApps 1532 and a control thread 1509 that performs multiple control operations associated with the RIC's datapath, such as configuring the datapath thread(s).

The datapath thread 1507 and control thread 1509 exchange data over two circular rings 1522 (i.e., cbuf), with one ring handling messages from the datapath thread 1507 to the control thread 1509 and the other ring handling messages from the control thread 1509 to the datapath thread 1507. In some embodiments, a datapath pod 1505 includes a single control thread 1509 and multiple datapath threads 1507 that each exchange data with the single control thread 1509. Also, in some embodiments, a datapath pod 1505 includes multiple control threads 1509 and multiple datapath threads 1507, with each control thread 1509 having a corresponding datapath thread 1507.

Each control thread enforces admission controls according to an admission control list, according to some embodiments. The admission control list, in some embodiments, is propagated by each control thread of each datapath pod of a RIC (e.g., the dRIC 5410) to each other control thread of each datapath pod of the RIC. In some embodiments, propagating the admission control list in this manner provides more flexibility for which datapath pod an xApp can connect to such that if an xApp is allowed to connect to one datapath pod of the RIC (i.e., is associated with a datapath thread in one datapath pod), it can connect to all datapath pods of the RIC.

The control thread(s) passes the admission control list to the datapath thread(s) via cbuf, in some embodiments, to allow the datapath thread to perform admission control checks for incoming messages from xApps. In some embodiments, the process on the datapath thread is referred to as RAN application registration. For each incoming message from an xApp, the datapath thread determines whether the xApp is authorized to use the datapath thread based on the admission control list, according to some embodiments.

In some embodiments, the admission control list is part of an admission control feature that enables the datapath pod (e.g., dric-control 5436) to allow connections from a set of xApp objects and E2 node objects specified in the allow list, and effectively discards connections from any unknown entities (e.g., xApps and E2 nodes that are not included on the allow list). These xApps and E2 nodes have their own signature definition, in some embodiments, which facilitates their unique identity. As mentioned above, the global identifier assigned to an xApp (or E2 node) that uniquely identifies the xApp (or E2 node) within the RAN system is added to the allow list, in some embodiments. In some embodiments, as a first phase, static provisioning of xApps and E2 nodes is enabled using a YAML file. This YAML file is mounted on the dric-control 5436 at deployment time, according to some embodiments.

In some embodiments, a datapath pod can be horizontally scaled to add additional instances of that datapath pod. This horizontal scaling is done, in some embodiments, to increase the number of E2 nodes that can be handled by a single RIC instance. For example, in some embodiments, a single instance of a datapath pod can handle 20 E2 nodes. If the single instance of the datapath pod is horizontally scaled to 50 instances of the datapath pod, with each instance handling 20 E2 nodes, then 1000 E2 nodes will be able to connect.

An E2 node load distribution pod is instantiated to distribute traffic to the E2 nodes, in some embodiments, and a network address for the E2 node distribution pod is provided to each of the E2 nodes to enable these E2 nodes to connect to the RIC on which the E2 node distribution pod is instantiated. For xApps to connect to the E2 nodes, in some embodiments, the SDK logic connects to all of the datapath pod instances, and the traffic from the xApps to the E2 nodes is distributed by the E2 node load distribution pod.

In some embodiments, to limit the number of E2 nodes to which any one xApp can access (i.e., rather than allowing each xApp to connect to all 1000 E2 nodes, the traffic from which the xApp is unlikely to be able to handle), an access control function is configured on each datapath pod. The access control function enables the datapath pod to control which E2 nodes an xApp can access. Using the example above, for instance, each xApp in a set of 50 xApps can be assigned a respective set of 20 E2 nodes.

In addition to controlling which E2 nodes an xApp can connect to, the access control function is also used, in some embodiments, to limit which RAN functions of the E2 node the xApp is allowed to access, as well as what the xApp can do with those RAN functions (e.g., read or write). For example, an xApp can be allowed to connect to an E2 node that includes five (5) RAN functions, while only being allowed to access one (1) of those RAN functions, either to read the data (e.g., to generate graphs and charts for analysis) or write the data (e.g., to change the RAN function). By limiting an xApps access to E2 nodes, the RAN functions of those E2 nodes, and the interactions the xApp can have with those RAN functions, in some embodiments, a first level of conflict management can also be achieved (e.g., xApp 1 is given read permissions for a particular RAN function while xApp 2 is given write permissions for the particular RAN function, thereby avoiding conflicts where both xApps try to change the particular RAN function).

After converting the configurations into protobuf, FCAPS 5434 provides the configurations to the dric-control pod 5436 (i.e., a datapath pod of the dRIC 5410). For instance, FCAPS 5434 sends configurations over gRPC to dric-control 5436 at the encircled 6. The dric-control pod 5436 then validates the configurations and, if the configurations are accepted, adds the xApp to its allow list (i.e., an admission control list managed by a control thread of the dric-control pod). The validation performed by dric-control 5436, in some embodiments, includes validating for duplicate configurations with the same operation and validating for illegal entries or random configurations of which xApps are not aware. Also, in some embodiments, new configurations are not accepted when the RAN component has exhausted its resource quota. In some embodiments, xApps perform their own validations.

Next, the dric-control pod 5436 responds to FCAPS 5434 with either a positive acknowledgement or a negative acknowledgement (e.g., the ACK sent from dric-control 5436 to FCAPS 5434 at the encircled 7). The positive acknowledgement indicates that the configurations have been validated and accepted, and that the xApp has been successfully associated with a datapath and added to the allow list, while the negative acknowledgement indicates that the configurations have been determined to be invalid and/or rejected, and that the xApp has not been associated with a datapath or added to the allow list.

When the acknowledgement is positive, FCAPS 5434 stores the configurations in an FCAPS sysrepo running datastore (not shown) and provides the positive acknowledgement to the RMS CM 5426 (e.g., the ACK sent from FCAPS 5434 to the RMS CM 5426 at the encircled 8). In addition to the configurations, a state of the configurations is also stored to the sysrepo running datastore, according to some embodiments. The RMS CM 5426 then stores the configurations (in JSON) in the database 5422, and sends the positive acknowledgement to the RMS API 5424, which sends the positive acknowledgement to the LCM 5430 to cause the LCM 5430 to deploy the xApp. As illustrated, for instance, the RMS CM 5426 writes the JSON configurations to the database 5422 in a "config" table in the database 5422 with the state as SUCCESS at the encircled 9, and sends the ACK to the RMS API 5424 at the encircled 10, which then sends the ACK to the LCM 5430 at the encircled 11. In some embodiments, because JSON is easier to review by, e.g., a network operator, the configurations are stored in JSON for easy retrieval and display (i.e., without requiring the data to be converted before displaying).

The positive acknowledgement is a clear signal to the LCM 5430 to deploy the xApp. The LCM 5430, for example, is shown deploying the xApp Perf 5432 at the encircled 12. In some embodiments, the LCM 5430 deploys the xApp in the form of a deployment object (e.g., a Kubernetes deployment object). The deployment, in some embodiments, includes the LCM 5430 instantiating the xApp, at which point the xApp 5432 is realized. In some embodiments, the LCM 5430 does not provide an explicit acknowledgement to the RMS 5405 indicating the xApp has been successfully deployed. The RMS 5405 of some embodiments includes multiple modules that are dependent on the xApp running correctly, and as such, the RMS 5405 is able to detect that the xApp is deployed and running (or not deployed, or not running properly) based on data provided by these entities, according to some embodiments.

When the acknowledgement sent from dric-control 5436 to FCAPS 5434 is a negative acknowledgement, FCAPS 5434 does not store the configurations in its sysrepo running datastore (not shown), and the RMS CM 5426 does not store the configurations in the database 5422. Additionally, the receipt of the negative acknowledgement by the LCM 5430 is a clear signal to not deploy the xApp, and as such, the LCM 5430 does not deploy the xApp when the acknowledgement is a negative acknowledgement.

The admission control of xApp and E2 node objects is performed during runtime from the RMS 5405 or any third-party SMO using the O1 interface (e.g., FCAPS 5434) in WG10, in some embodiments. In some embodiments, admission control for E2 nodes is supported through UI upload configurations as well as through API, as will be further described below. The E2 nodes are base station components, such as DUs and CUs in a RAN system, or O-DUs and O-CUs in an O-RAN system.

Figure 55:
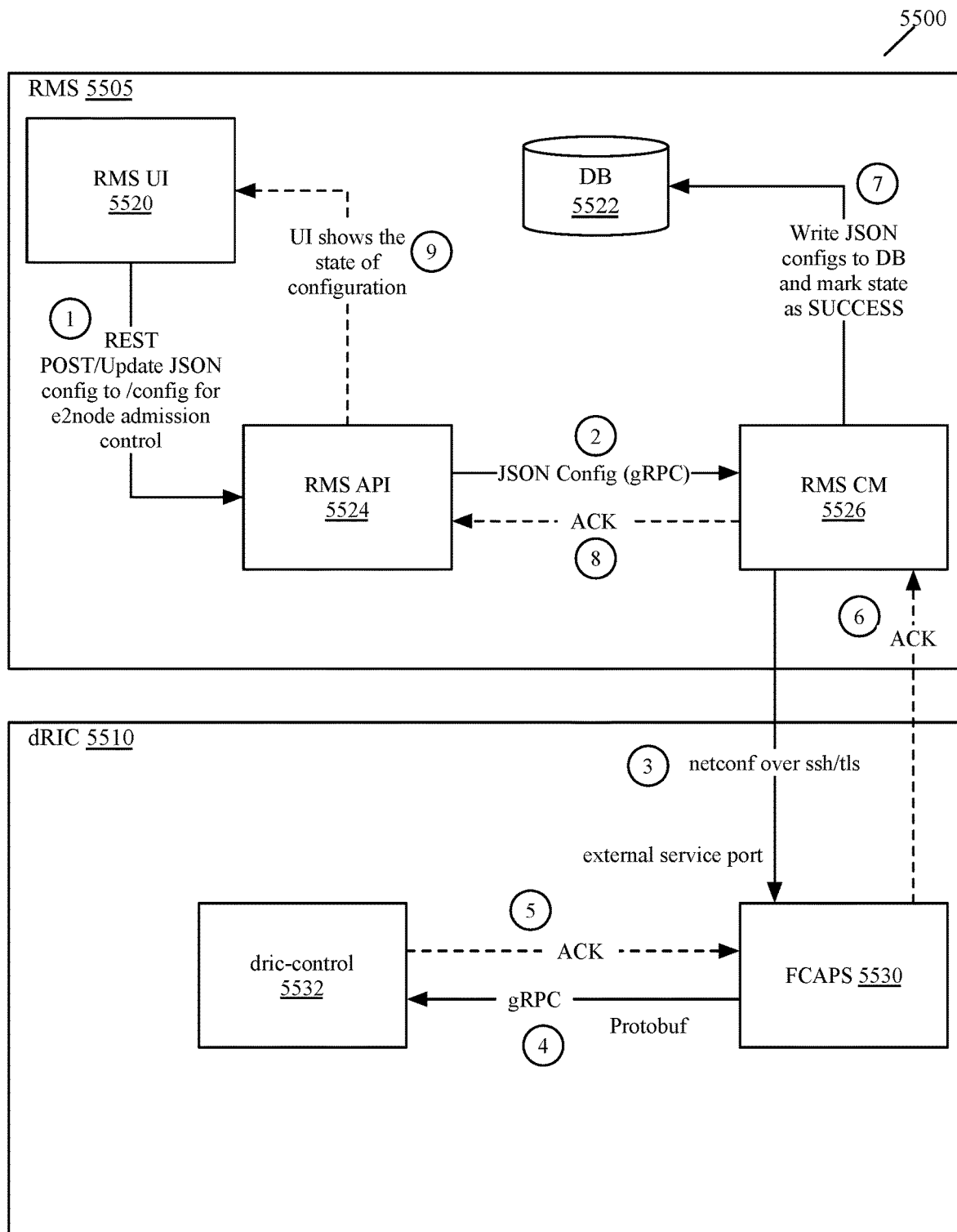
FIG. 55 conceptually illustrates a functional block diagram of some embodiments of the workflows in a RAN system for E2 node admission control using the RMS UI.

FIG. 55 conceptually illustrates a functional block diagram 5500 of a RAN system of some embodiments during an E2 node admission control use case using the RMS UI. As shown, the diagram 5500 includes an RMS 5505 and a dRIC 5510. The RMS 5505 includes an RMS UI 5520, a database 5522, an RMS API 5524, and an RMS CM 5526. The dRIC 5510 includes FCAPS 5530 and dric-control 5532.

During the deployment phase, the RMS UI 5520 is responsible for dynamically constructing the dashboard based on the configuration schema, in some embodiments. During the runtime operation phase of some embodiments, the RMS UI 5520 invokes REST API on the RMS API 5524 side to configure a RAN component instance (e.g., an xApp, SDK, E2T, etc.) with the required configurations. The configuration object's top-level keys match the "supported-_schemas" name so that the RMS UI 5524 can render a SchemaTree on a side-menu displayed through the UI, in some embodiments, as will be described further below.

All "*-config" entities in the schema are an array with only one (1) item, in some embodiments. The schema, in some embodiments, enforces this expectation on the API as well as in the UI (e.g., when in-place property update is available). In some embodiments, the UI uses Type defn for each schema, and uses that to enforce TypeChecks. Schema Name is defined as Type so that mapping between name and Type of Schema can be easily applied, according to some embodiments. As such, any name change or addition of new schema, in some embodiments will need minor UI updates.

Admission control for E2 node objects, in some embodiments starts when a user uploads an E2 node admission control JSON configuration using RMS UI 5520. The RMS UI 5520 then makes a POST/UPDATE call to the RMS API 5524 with the JSON file. For instance, at the encircled 1, the RMS UI 5520 makes the POST/update call to the RMS API 5524 with the JSON configuration to "/config" for E2 node admission control. The RMS API 5524 performs a validation to check the structure of the configuration data, and sends the validated configuration data to the RMS CM 5526 through gRPC protobuf encoding (e.g., at the encircled 2).

Like the xApp admission control use case described above by reference to the diagram 5400, the RMS CM 5526 converts the configuration data from JSON to an XML-encoded format and sends the configuration using Netconf over SSH/TLS to the FCAPS 5530 on the dRIC 5510 (e.g., at the encircled 3). In some embodiments, the configuration is sent along with a request that includes a series of admission control instructions for the dRIC 5510 to perform a set of admission control operations for the E2 node. The admission control operations, in some embodiments, include validating the configuration, associating the E2 node with a datapath of the dRIC 5510, and adding the E2 node (e.g., a global identifier assigned to the E2 node) to an allow list of the associated datapath that is used for admission control to determine whether the E2 node is allowed to send data messages using the datapath.

FCAPS 5530 validates the incoming request from the RMS CM 5526 against the dric-admission-control.yang schema and parses these configurations into protobuf. FCAPS 5530 then sends these configurations to dric-control 5532 (i.e., E2 termination interface/datapath pod). The dric-control pod 5532 performs a validation operation to validate the configurations and, when it accepts the configurations, adds the E2 node to its allow list (i.e., associates the E2 node with a datapath and adds the E2 node to the allow list). The dric-control pod 5532 then responds to FCAPS 5530 with either a positive acknowledgement (i.e., when the configurations have been validated and accepted, and the E2 node has been added to the allow list of an associated datapath) or a negative acknowledgement (i.e., when the configurations have been determined to be invalid and/or have otherwise been rejected, and the E2 node has not been associated with a datapath or added to an allow list). For example, the dric-control pod 5532 sends an acknowledgement to FCAPS 5530 at the encircled 5.

When the acknowledgement is a positive acknowledgement, FCAPS 5530 stores the configurations to an FCAPS sysrepo running datastore (not shown) and returns success for the configuration request over Netconf to the RMS CM 5526 (e.g., the ACK at the encircled 6). The RMS CM 5526 then stores the configurations to the database 5522 by writing the JSON configurations to the database 5522 and marking the status as SUCCESS (e.g., at the encircled 7). The RMS CM 5526 also sends the positive acknowledgement to the RMS API 5524 (e.g., the ACK at the encircled 8), which then sends the positive acknowledgement to the RMS UI 5520 for the RMS UI 5520 to display the state of the configuration as SUCCESS (e.g., at the encircled 9).

When the acknowledgement is a negative acknowledgement, FCAPS 5530 sends the negative acknowledgement indicating the configurations have failed to the RMS CM 5526 without storing the configurations in its sysrepo running datastore. The RMS CM 5526 provides the negative acknowledgement to the RMS API 5524 without writing the JSON configurations to the database 5522, and the RMS API 5524 provides the negative acknowledgement to the RMS UI 5520 for display.

FIG. 56 illustrates an example of an XML configuration file 5600 of some embodiments for E2 nodes. Because xApps are automatically provisioned when they are onboarded by RMS, the xApp-related configuration data is removed from the XML configuration file 5600, in some embodiments.

Figure 57:
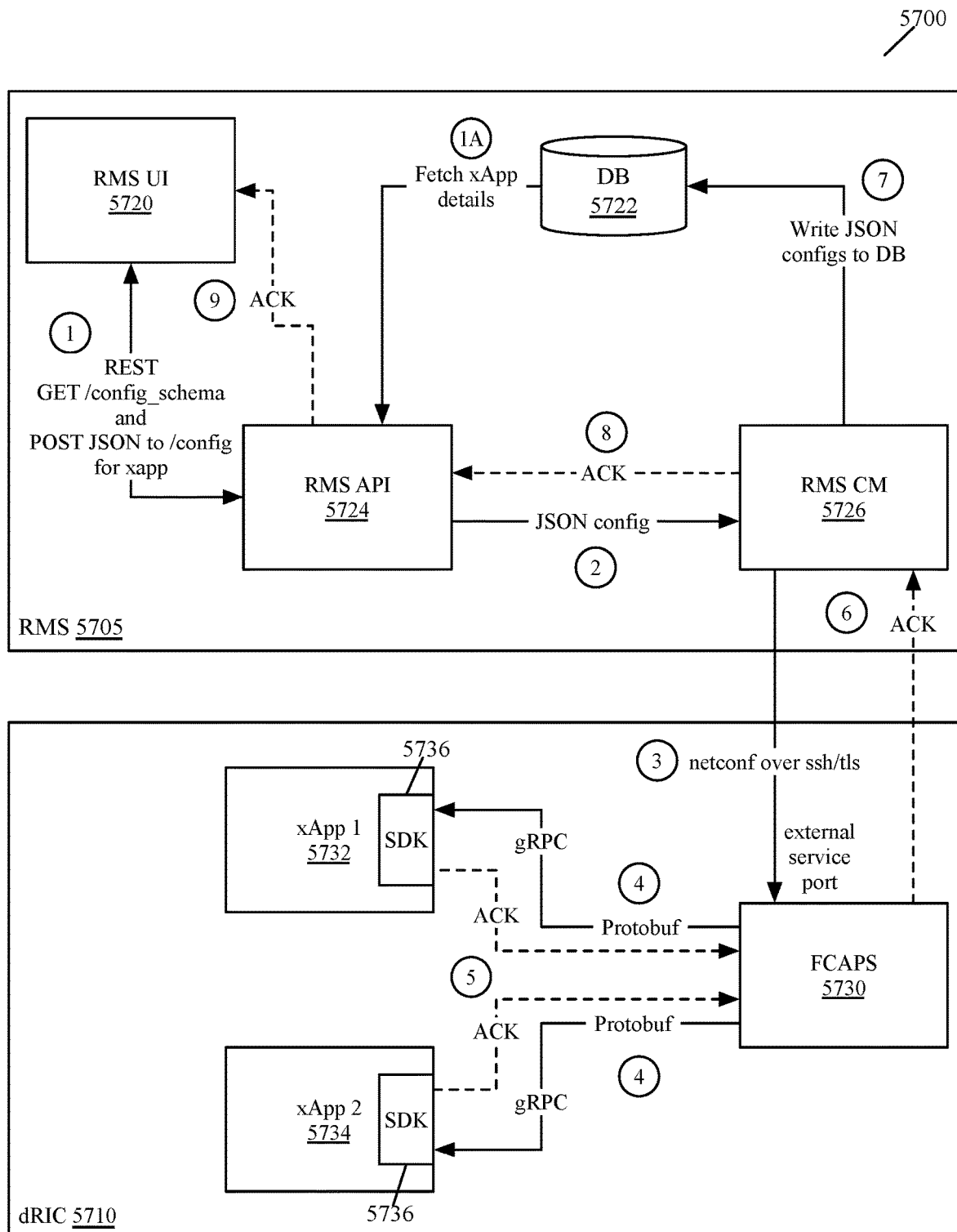
FIG. 57 conceptually illustrates another example of a functional diagram showing workflows during the runtime operation phase of some embodiments.

FIG. 57 conceptually illustrates a functional diagram 5700 for updating an xApp during the runtime operation phase of some embodiments. In some embodiments, the run-time operation phase enables the RMS to configure dRIC instances using the RMS UI, as also mentioned above. While the diagram 5700 is illustrated as an example for updating an xApp during runtime, other RAN components, such as E2 nodes, RICs (e.g., dRICs and cRICs), dric-control/E2T/datapath pods, SDKs, and other modules (e.g., schemas), can also be updated through the RMS UI, in some embodiments.

The diagram 5700 includes an RMS 5705 and a dRIC 5710. The RMS 5705 includes an RMS UI 5720, a database 5722, an RMS API server 5724, and an RMS CM 5726. The dRIC 5710 includes FCAPS 5730 and two xApps 5732 and 5734. Additionally, each xApp 5732-5734 has a respective SDK 5736 to serve as an interface between the xApp and one or more elements of the RAN.

The RMS UI 5720 enables users (e.g., network administrators, network operators, other users, etc.) to update xApps (and other RAN components as mentioned above) during runtime. To do so, a user makes a selection (e.g., a request to display) through the RMS UI 5720 to view data associated with the xApp (e.g., configuration data) and the RMS UI 5720 retrieves the current data via the RMS API 5724 accordingly and displays the current data. For example, at the encircled 1, a GET API is used to get the configuration schema (e.g., the current JSON configuration) for the xApp and the RMS API 5724 fetches (at the encircled 1A) the xApp details from the database 5722. The RMS API 5724 then passes the data to the RMS UI 5720 for display.

When the user makes a modification to the displayed data, the user input (e.g., updated configuration) is provided from the RMS UI 5720 to the RMS API 5724. For example, a POST API to "/config" for the xApp is posted to the RMS API 5724 as shown. The RMS UI 5720, in some embodiments, includes selectable UI items that enable network operators or any other user of the UI to make the modifications in-line. Additionally, the UI of some embodiments includes selectable UI items to enable network operators to import configuration files and/or export configuration files. In some embodiments, the UI also provides selectable UI items to allow network operators to view and, in some embodiments, modify configurations of, other RAN components and modules, such as RICs (i.e., dRIC and cRIC), LCMs, datapath pods, E2 nodes, SDK parameters, configuration schemas, etc.

In some embodiments, the updated configuration includes first and second sets of data tuples, with the first set of data tuples being an updated first set of data tuples and the second set of data tuples being a current second set of data tuples. Additionally, the updated configuration of some embodiments is structured according to the same configuration schema as the current configuration stored by the RMS database 5722 such that the structures of the updated and current configurations are the same, values specified by the updated first set of data tuples differ from values specified by a current third set of data tuples that correspond to the updated first set of data tuples, and values specified by the second set of data tuples are identical in the updated and current configurations.

The RMS API 5724 then passes the updated configuration to the RMS CM 5726 (e.g., at the encircled 2), which converts the updated configuration from JSON to an XML-encoded format and sends the XML-encoded updated configuration using Netconf over SSH/TLS (e.g., at the encircled 3) to FCAPS 5730 to request FCAPS 5730 to update the configuration for the xApp. In some embodiments, the modifications are to multiple components, such as both of the xApps 5732 and 5734. For example, a user of some embodiments selects to modify the log level of both xApps 5732 and 5734 (e.g., change the log level from INFO to DEBUG). The RMS CM 5726 of some embodiments sends the updated configuration to FCAPS 5730 with a command to instruct FCAPS 5730 to perform an update operation. In some embodiments, when the RMS CM 5726 sends the updated configuration (i.e., the entire configuration that includes both the updated data tuples and the current data tuples that have not been updated), the update operation specified is "replace" to instruct FCAPS 5730 to replace the current configuration stored by FCAPS sysrepo running datastore (not shown) with the updated configuration.

Also, before converting the updated configuration, in some embodiments, the RMS CM 5726 retrieves, from the database 5722, the current configuration and performs a differential operation as part of a differential management process to identify differences between the current and updated configurations (e.g., the first set of data tuples that are different from the third set of data tuples in the example above). For example, a current configuration for a particular parameter that is relevant for multiple xApps may only include xApp 5732 and not xApp 5734 and as such, a user may want to update that current configuration to add xApp 5734. In some such embodiments, the differential operation would return a result that includes the update adding xApp 5734. After converting the identified differences (i.e., the addition of xApp 5734) to the XML-encoded format, the RMS CM 5726 of some embodiments then sends the XML-encoded identified differences to FCAPS 5730 with the update operation set to merge. FCAPS 5730, in some such embodiments, would then append the identified differences to the current configuration stored in the FCAPS sysrepo datastore to update the configuration.

FCAPS 5730 validates the updated configuration (or identified changes) against the Yang schema stored by FCAPS 5730. FCAPS 5730 then parses the updated configuration, and converts the updated configuration to protobuf. The two-stage commit process described above is then performed. In some embodiments, the xApps 5732 and 5734 are first instances and updating the configurations of the xApps includes replacing the first instances that are configured based on the current configuration with second instances that are configured based on the updated configuration.

After FCAPS 5730 has received acknowledgements from both xApps 5732 and 5734 indicating the updated configuration has been successfully processed, FCAPS 5730 stores the updated configuration in its sysrepo running datastore (not shown) and sends an acknowledgement to the RMS CM 5726 indicating the update configuration has been successfully implemented for the xApps 5732 and 5734.

Next, the RMS CM 5726 writes the updated configuration to the database 5722 with the state marked as success. In some embodiments, the RMS CM 5726 uses the first set of configuration tuples (i.e., the updated configuration tuples) to update the current configuration stored in the database 5722, while in other embodiments, the RMS CM 5726 replaces the current configuration stored in the database 5722 with the updated configuration. In some embodiments, each configuration stored in the database 5722 is stored with a configuration version identifier. This configuration version identifier, in some embodiments, is a numerical date identifying the data on which the configuration was last updated. The RMS CM 5726 then sends the acknowledgement to the RMS API 5724, which provides the acknowledgement to the RMS UI 5720 for display to notify the user that the updated configuration has been successfully implemented. In some embodiments, while the updated configuration is being processed and implemented, the UI displays an indication that the configuration is in progress, as well as the date that the configuration was last updated. When the updated configuration has been successfully processed and implemented, in some embodiments, the RMS UI 5720 notifies the user by updating the last-updated date for the configuration. In some embodiments, this form of notification is used in lieu of any other notification to the user that the updated configuration has been successfully processed and implemented. Also, in some embodiments, when the updated configuration is not implemented, an error message to the user is displayed through the RMS UI 5720. In some embodiments, the UI also includes an option to reapply the changes (i.e., try again).

Schemas, such as the Yang schemas and JSON schemas mentioned above and further described below, are contracts between two entities, according to some embodiments. The Yang schema, in some embodiments, is a contract between the SMO (e.g., VMware, Inc.'s RMS) and dRIC FCAPS, and the data/configuration is modeled using XML as per WG10 specs. The JSON schema, in some embodiments, is a contract between a user and the RMS UI, and the data/configuration is modeled using JSON.

In some embodiments, two schemas are exposed and preserved for the same configuration file (e.g., generic-key-value@2022-11-04.yang and generic-key-value.json-.schema). An exact mapping of attributes defined in both schemas is maintained, in some embodiments, while in other embodiments, at least a similar mapping of the attributes defined in both schemas is maintained. In some embodiments, a versioning system is also maintained for the schemas in order to make the schemas future-proof.

Three pre-standard Yang schemas are defined, in some embodiments, including dric-admission-control@2022-10-30.yang, generic-key-value@2022-11-04.yang, and vmware-sdk-param@2022-07-23.yang. The dRIC admission control schema of some embodiments is used by dric-control to allow connectivity for xApps and E2 nodes. xApps configurations onboarding is automated from the LCM, in some embodiments, since xApps are managed entities. In some embodiments, information for E2 nodes is uploaded via a file upload method for vChi. The generic key-value schema is a generic configuration/module of some embodiments that exposes simple key-value pairs. In some embodiments, an xApp vendor can use these simple key-value pairs to configure any parameter they want to control. Moreover, the key-value pairs add value to control some of the E2T and SDK parameters, in some embodiments. The VMware SDK parameter schema sets internal SDK parameters, according to some embodiments. It is only accessed by SDK, in some embodiments, and not by xApps.

The generic key-value schema, in some embodiments, is a generic key-value data structure that is included as part of a configuration data schema that is defined by a vendor of the RMS and that also includes multiple schema keys (i.e., pre-defined keys for which the developers/operators only need to provide values for). In some such embodiments, the generic key-value data structure extends the configuration data schema.

Application developers and operators provide values for each schema key, and can also define one or more custom keys that are not available as part of the schema keys using the generic key-value data structure, in some embodiments. Accordingly, in some embodiments, a configuration data schema defined for, e.g., an xApp, includes first and second sets of key-value pairs, with the first set being key-value pairs defined using the schema keys, and the second set of key-value pairs being custom key-value pairs defined by the developer/operator and not defined by reference to any schema keys. In some embodiments, the developer/operator generates a file storing the schema keys (and/or the custom keys). The file, in some embodiments, is a custom resource (CR) defined based on a CRD (custom resource definition). In some embodiments, the generic key-value pairs (i.e., the custom keys) can be updated through the RMS UI (e.g., to modify current values) or through updated CRs (e.g., to add new values) distributed to RAN operators.

In some embodiments, SDK Yang schemas have well-defined attribute and configuration values. The generic-key-value schema of some embodiments provides a model to add more attributes that were not covered previously in SDK schemas. In some embodiments, the UI rendering includes empty key values for generic-key-value CM. A simple uint64-based identifier is used, in some embodiments, to uniquely identify each RIC component at a dRIC instance.

In other embodiments, other identifiers are used. Service-ids is used, in some embodiments, as a means to identify each component uniquely. In some embodiments, E2T (i.e., dric-control) and xApps are managed elements that each have their own global identifier.

The generic-key-value@2022-11-04.yang file provides generic structures for any RIC component parameters, in some embodiments. As also described above, acceptable configurable parameters of some embodiments include key, value, and description. The key parameter field is a string data type that includes programmatically syntax, the value parameter field can include any defined possible Yang types to hold a data, and the description parameter field provides additional information for the key for display purposes. In some embodiments, if any generic configurations belong to an xApp, these configurations are not parsed on the SDK side. For Yang, in some embodiments, member types are placed in a union from most selective to least selective and evaluated in order (i.e., in order from most selective to least selective). Plain "string" is a catch-all, in some embodiments, that will match anything, and as such is placed last.

FIG. 58 illustrates an example of a portion of a generic-key-value Yang schema 5800 of some embodiments. FIG. 59 illustrates an example of a VMware SDK parameter Yang schema 5900 of some embodiments. In some embodiments, JSON schemas are chosen from the UI side. These JSON schemas, in some embodiments, are 1:1 replica schemas for Yang because the UI understands JSON data well, and because of the ease of configuration payload creation and maintenance from the user side. In some embodiments, generic-key-value@2022-11-04.json.schema is a mapping of generic-key-value@2022-11-04.yang intended to be used by the RMS UI without a records block. The records section of some embodiments will be added by RMS CM block. In some embodiments, there are some differences in the data model for JSON (e.g., JavaScript max is 2^53) and the perceived maximum limits on ints for the embodiments described herein. FIG. 60 illustrates an example of a portion of the generic key-value CM JSON schema 6000 of some embodiments.

The vmware-sdk-param@2022-07-23.json.schema is a mapping of vmware-sdk-param@2022-07-23.yang schema for use by the RMS UI without the records block. The records section will be added by an RMS CM block. FIG. 61 illustrates an example of a portion of the VMware SDK parameter JSON schema 6100 of some embodiments. FIG. 62 illustrates an example of a portion of the dRIC admission control JSON schema 6200 of some embodiments. Validators can be found at https://www.jsonschemavalidator.net/.

In some embodiments, on the RMS CM side, the RPC between the RMS API and RMS CM is reused (e.g., rpc ServeConfig (ConfigRequest) returns (ConfigResponse);). In other embodiments, an intent-based approach that utilizes etcd in place of gRPC is implemented. FIG. 63 illustrates an example of code used on the FCAPS side of some embodiments.

The UI of some embodiments provides an easy way for following operations. The UI of some embodiments provides means for bulk uploading of configurations, for using JSON payloads in place of XML for uploading the bulk configurations, for editing configurations to write and/or update from a GUI (graphical user interface) and displaying configurations on the same, for performing multi-module configurations (e.g., changing log level and xApp parameters for the same xApp) in the same call, and for performing version management of configurations.

FIGS. 64-73 illustrate a set of example UIs displayed in some embodiments including example UIs displayed during a first phase for WRITE configurations using upload and READ using a GUI. FIG. 64 illustrates an example UI 6400 of a read-only configuration view page that is found in a configurations tab of each xApp, in some embodiments. FIG. 65 illustrates an example UI 6500 of some embodiments that is displaying xApp provisioning information. In some embodiments, hovering a cursor device over the information icon "i" next to the xApp name causes the UI to display the global identifier of the selected xApp, in some embodiments, as also illustrated by the UI 6600 of FIG. 66.

Figure 69:
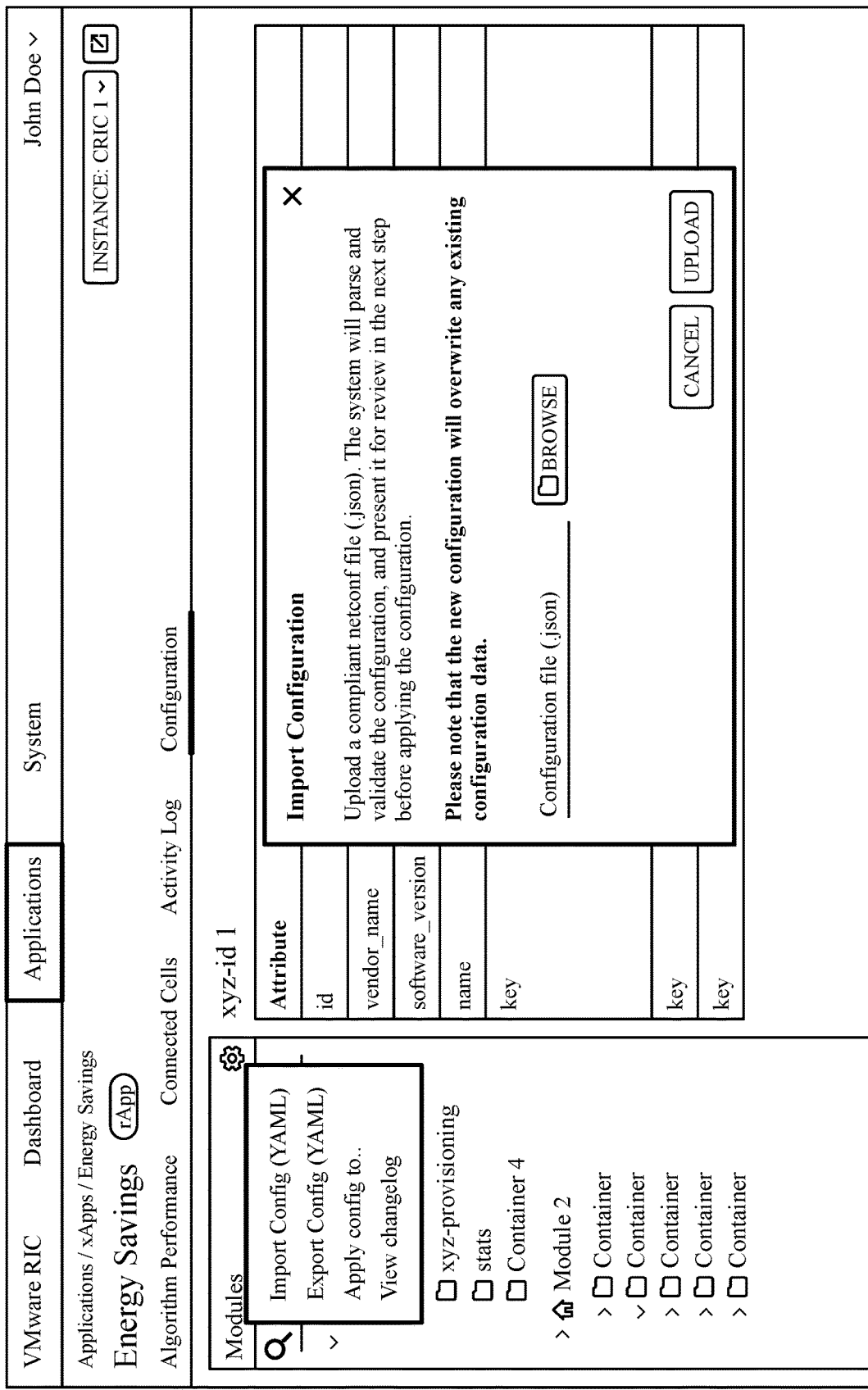
FIG. 69 illustrates a sixth example UI display of some embodiments that includes a pop-up window for importing a configuration after a user has selected the import configuration UI item illustrated by FIG. 68.
Figure 70:
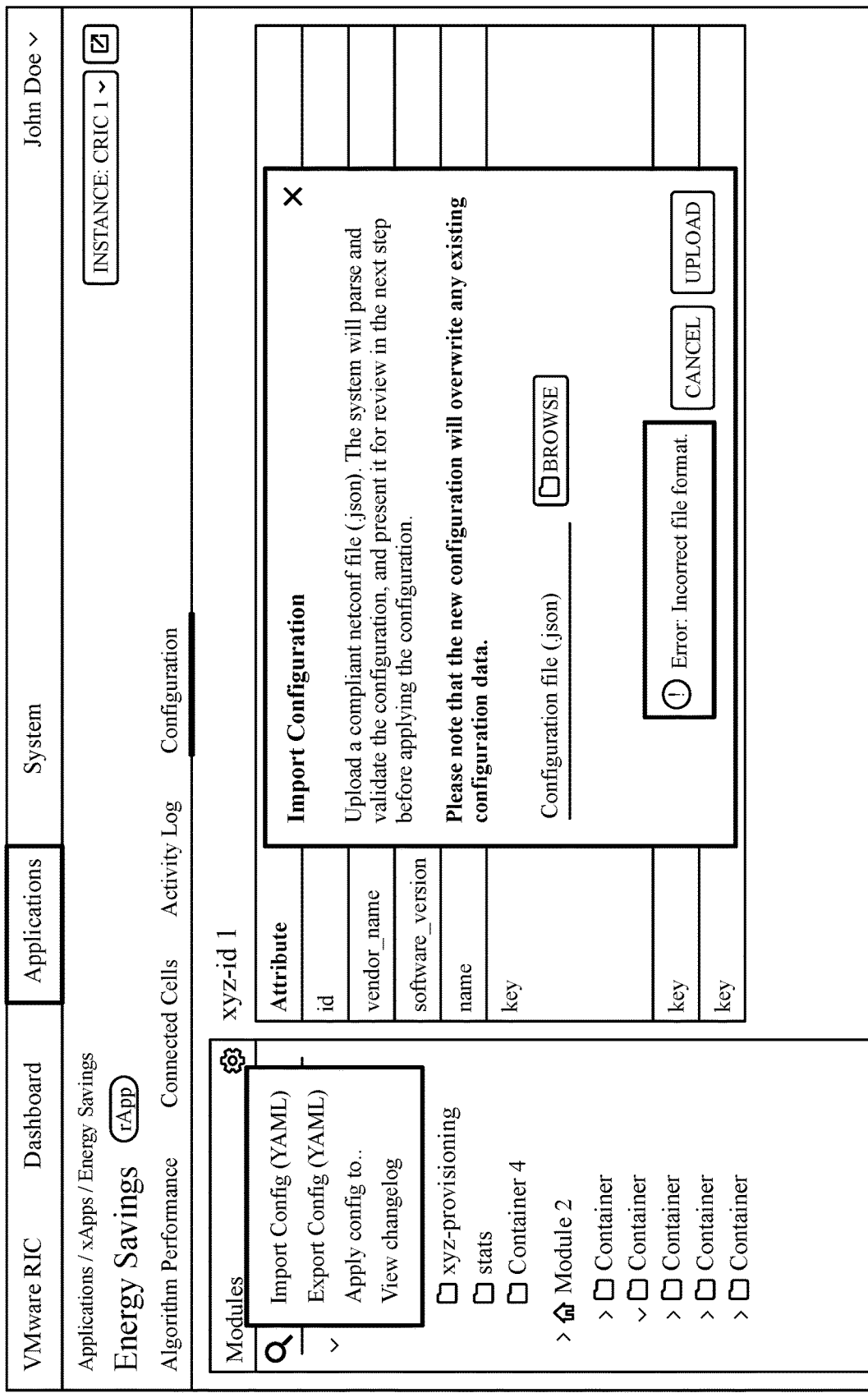
FIG. 70 illustrates a seventh example UI display of some embodiments that includes an error message in the pop-up window illustrated by FIG. 69.

FIG. 67 illustrates an example UI 6700 of a read-only configuration view for dRIC instance configuration that is focused on E2 nodes listing, in some embodiments. FIG. 68 illustrates an example UI 6800 displaying options for importing and exporting the configuration for an E2 node using a JSON, in some embodiments. FIG. 69 illustrates an example UI 6900 of a write operation that is done using a file upload option with JSON configurations payload, in some embodiments. FIG. 70 illustrates an example UI 7000 of some embodiments indicating an attempted file upload had an incorrect format. FIG. 71 illustrates an example UI 7100 for reviewing an uploaded JSON configuration before it is applied, in some embodiments. FIG. 72 illustrates an example UI 7200 of some embodiments indicating an error preventing a configuration from being updated and instructing the user to try again. In some embodiments, when the upload is successful, the same pop-up window is displayed, but indicates success rather than failure. FIG. 73 illustrates an example UI 7300 of an alert that informs users that a configuration update is pending, in some embodiments.

Phase two, in some embodiments, includes an edit capability for write/modify using a GUI as well as version control of configurations. Phase three, in some embodiments, includes treating configurations as first-class citizens to allow multi-component configuration changes.

In order to align with phase two, some embodiments support a dedicated configuration JSON file for a RIC and individual xApp configurations tab. In some embodiments, doing so makes it easy to mimic localized operations for the edit option in phase two. FIG. 74 illustrates an example of a JSON xApp VONR (voice over new radio) configuration file 7400, in some embodiments. The top-level key in the JSON has a name matching the configuration schema, as shown. Additionally, the values mention the configurable value modeled according to the JSON schema. Similarly, if generic-key-value is enabled for other xApps, it will have its own configuration file.

FIG. 75 illustrates an example of a JSON xApp Porto configuration file 7500 of some embodiments. In this example, there is no one true source file for configurations for a RIC instance. At the RMS API, certain considerations are made in some embodiments regarding the configuration API. As a first example, in some embodiments, the configuration data presented is validated using JSON schema. As a second example, the configurations are sent to the RMS CM using a gRPC link between the RMS API and the RMS CM, in some embodiments. As a third example, in some embodiments, a database entry is created in the configuration table and an edge between the xApp, and the configuration table will be present when FCAPS is correctly configured. It should be noted that the examples 7400 and 7500 are not actual configurations and are merely exemplary to demonstrate the hierarchy of modules of some embodiments. In some embodiments, for configuration schema registration, an RMS bootstrapper sends the JSON configuration schema with {name, identifier, schema [json, Yang] . . . } to the config_schemas table in the database (e.g., ArangoDB) mentioned above.

Figure 76:
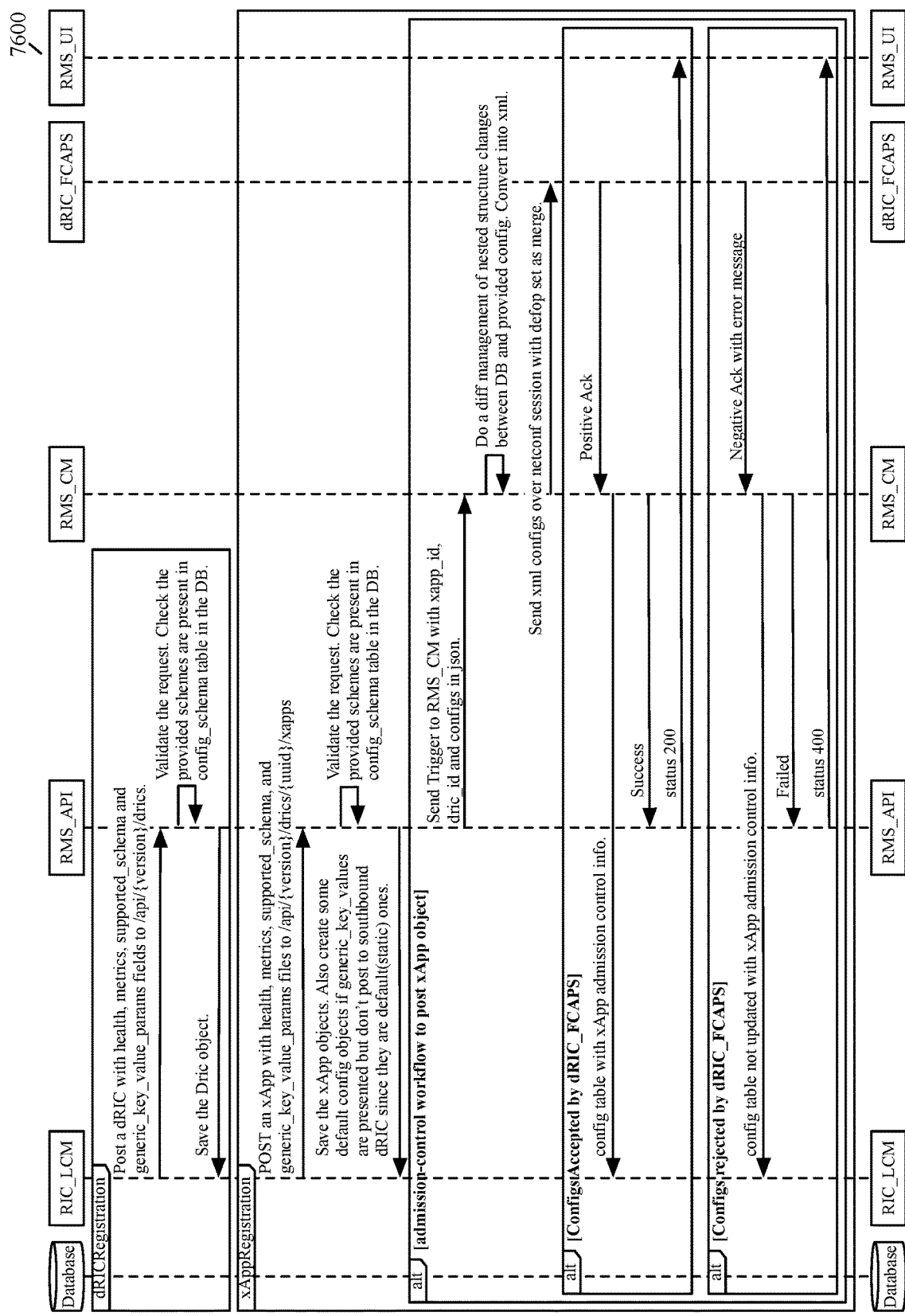
FIG. 76 conceptually illustrates a workflow performed in some embodiments to register xApps and/or RICs with admission-control and generic-key-value.
Figure 77:
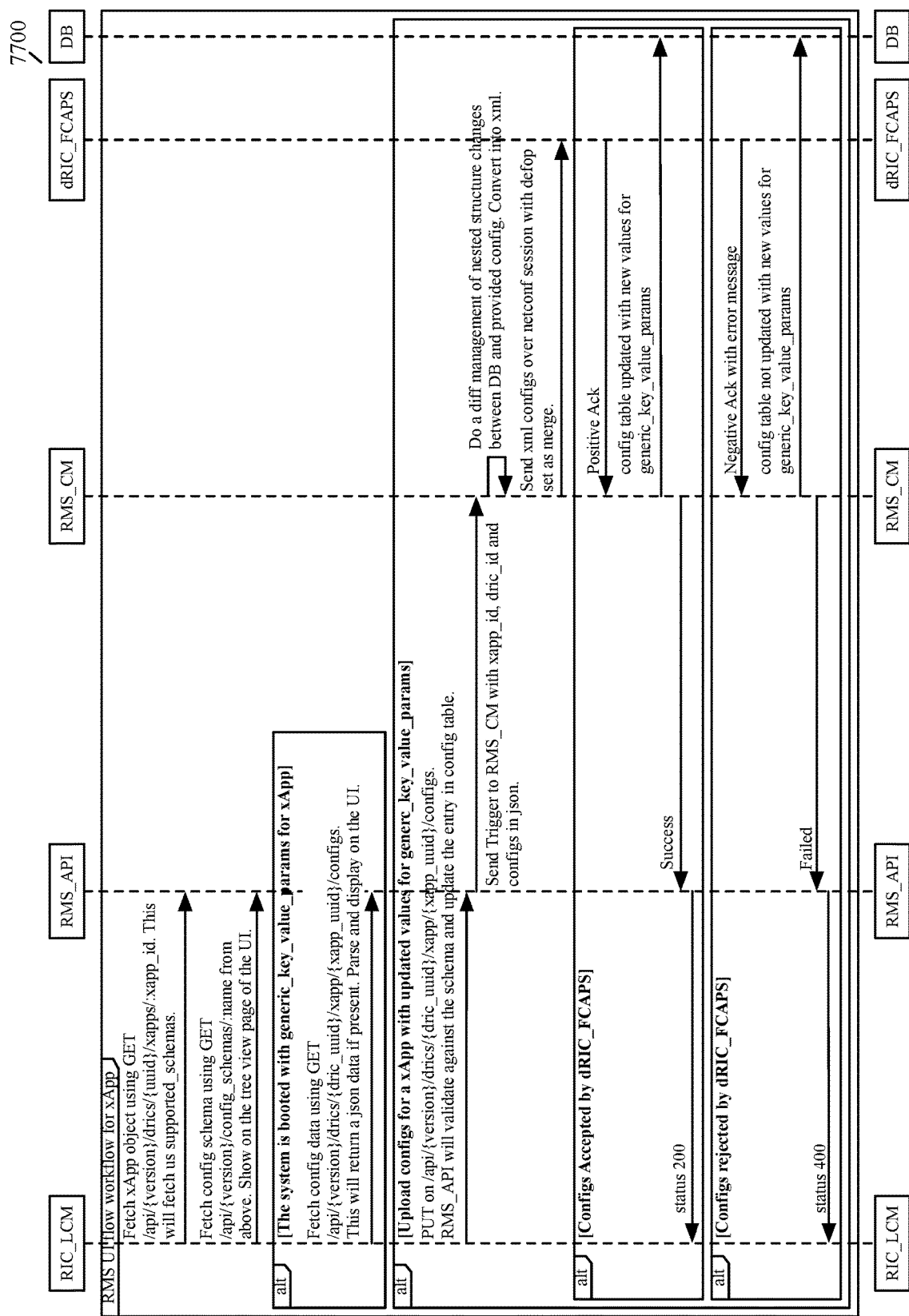
FIG. 77 conceptually illustrates a workflow for editing xApp configurations through UI in some embodiments.
Figure 78A:
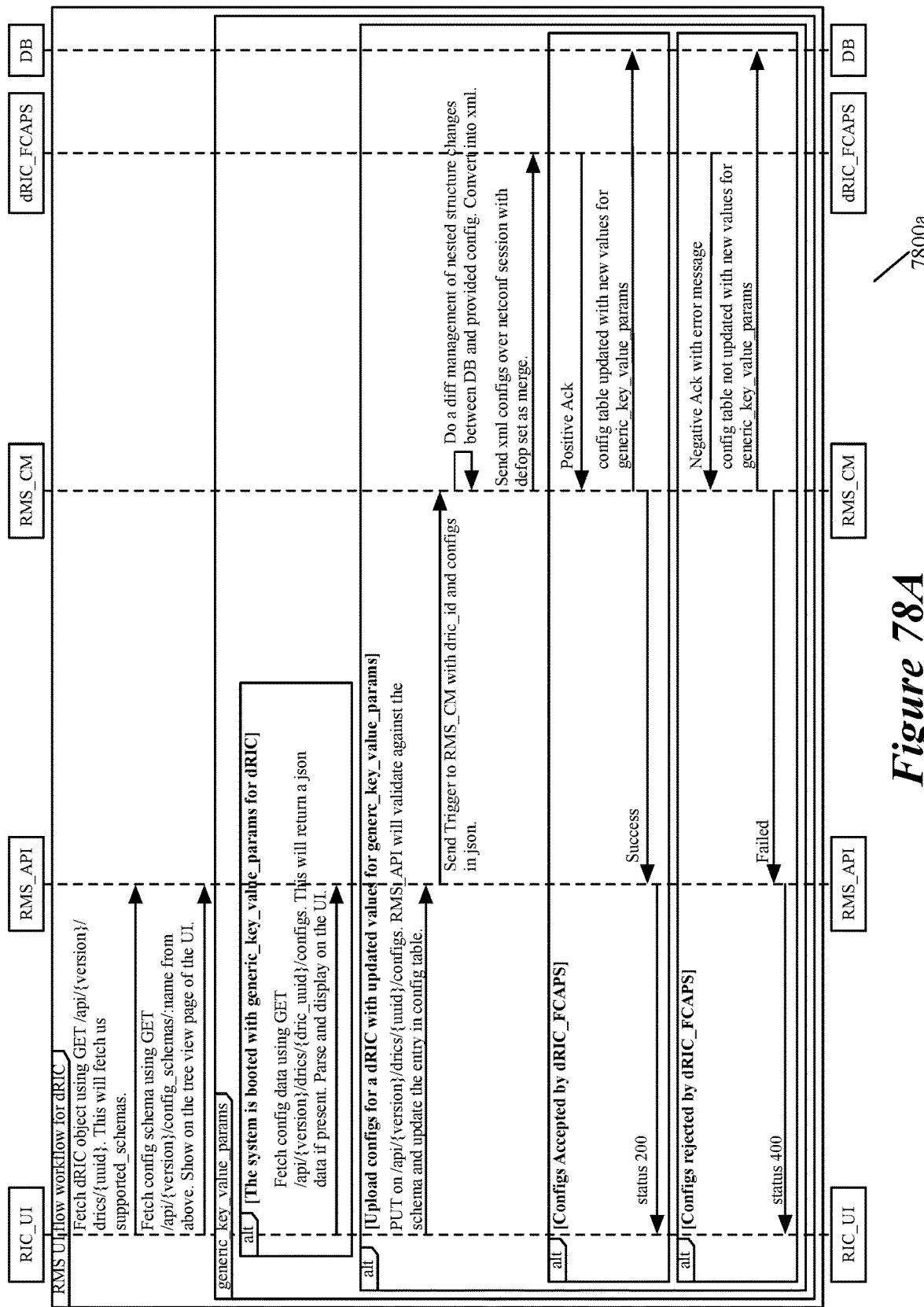
FIGS. 78A-78B conceptually illustrate a workflow for a dRIC, in some embodiments.
Figure 78B:
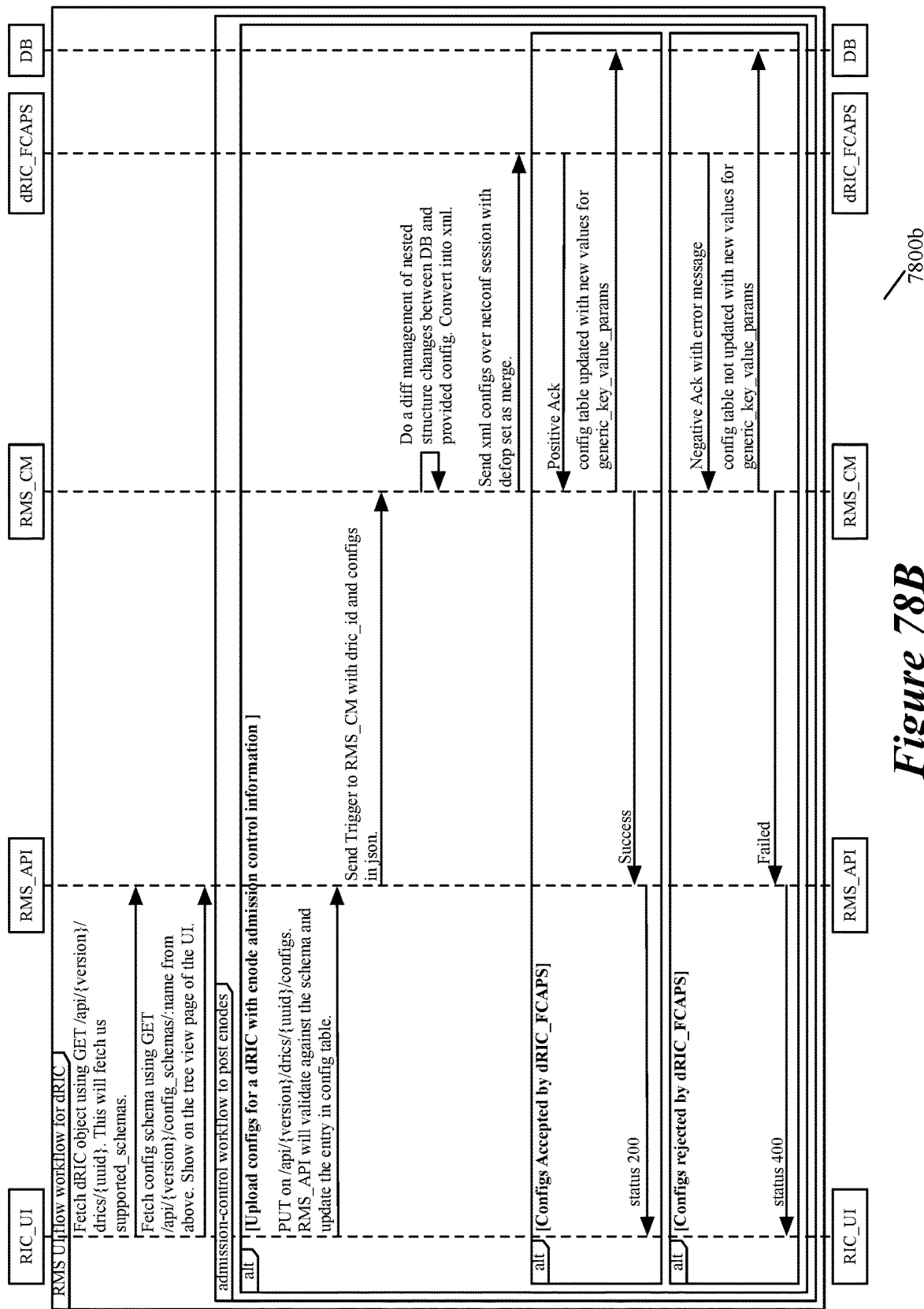

FIG. 76 conceptually illustrates a workflow 7600 performed in some embodiments to register xApps and/or RICs with admission-control and generic-key-value. FIG. 77 conceptually illustrates a workflow 7700 for editing xApp configurations through UI in some embodiments. Lastly, FIGS. 78A-78B conceptually illustrate a workflow 7800a-7800b for a dRIC, in some embodiments.

Figure 79:
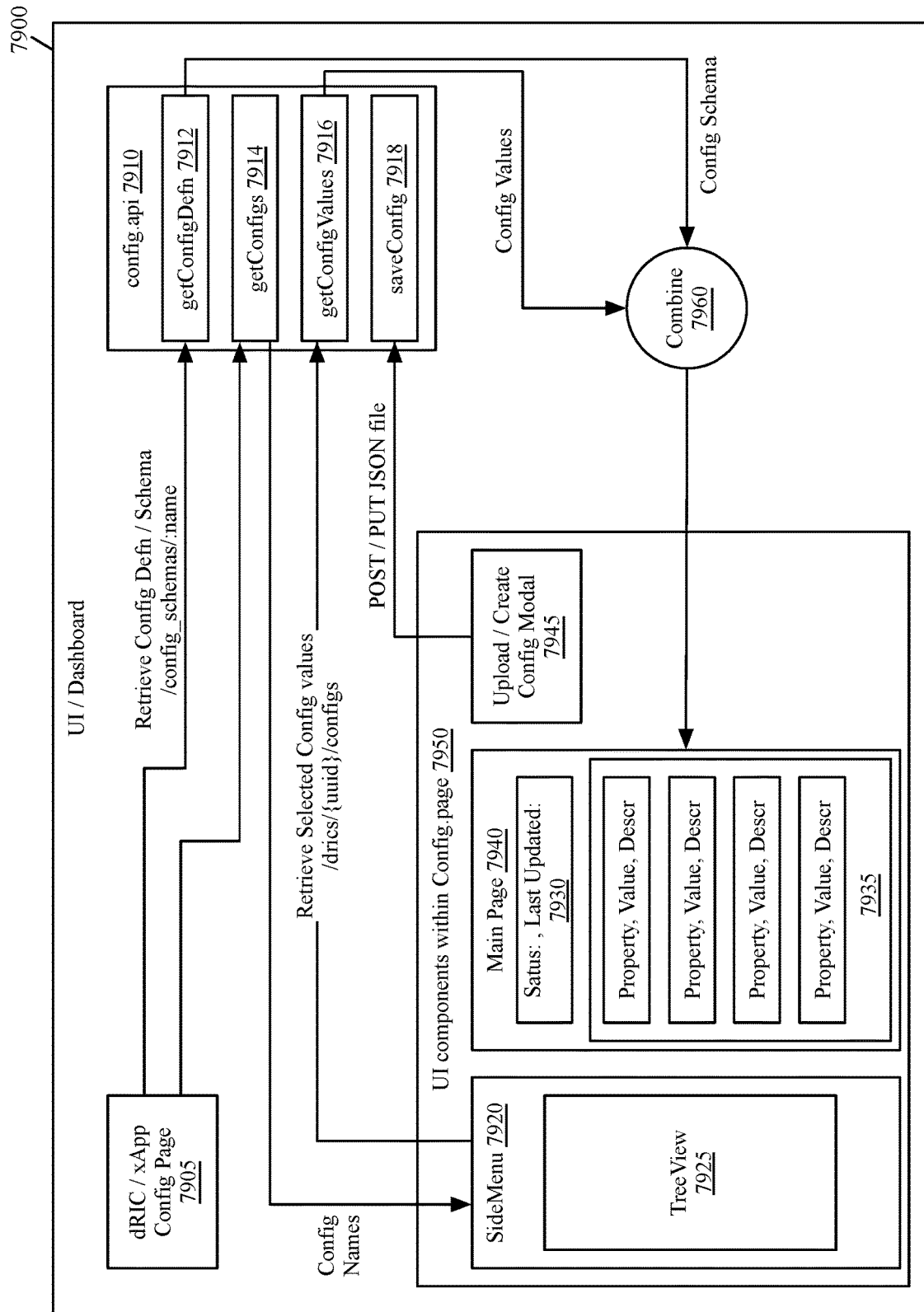
FIG. 79 conceptually illustrates a diagram of a UI/dashboard of some embodiments.

FIG. 79 conceptually illustrates a diagram of a UI/dashboard 7900 of some embodiments. The UI/dashboard 7900 of some embodiments handles various API calls. As shown, the UI/dashboard 7900 includes a dRIC/xApp configuration page 7905, a "config.api" hook 7910, a combiner 7960, and a set of UI components 7950 that are within the configuration page.

The UI/dashboard 7900 provides multiple UI services, including RIC/xApp UI services, in some embodiments. The "config.api" hook 7910, for instance, is a service that is responsible for acquiring configuration objects for any RIC/xApp from the RMS API. The "config.api" hook 7910 exposes react hooks that can be used by the host component to make an API request. For example, the "config.api" hook 7910 includes getConfigDefn 7912, getConfigs 7914, getConfigValues 7916, and saveConfig 7918, as shown. getConfigDefn 7912 is used for getting schema definition, getConfigs 7914 is for getting supported schemas on RIC/xApp, getConfigValues 7916 is for getting actual values that are set for the given RIC/xApp, and saveConfig 7918 is for making PUT/POST calls to save user-provided configurations.

The UI components 7940 include a side menu component 7920, a main page component 7940, and an upload/create configuration modal component 7945. The side menu component 7920 is responsible for rendering different configurations that are available for a given RIC/xApp based on "config.supported_schemas[x]". In some embodiments, the rendered configurations are displayed using a tree view 7925. Clicking on each schema name will display detail on the main sections of the page, in some embodiments.

The main page 7940 displays configuration settings in a tabular format, in some embodiments. The tabular format of the main page 7940 of some embodiments combines schema definitions and schema values. In some embodiments, the UI 7900 has a "DataGrid" component that can render tables in read-only mode. As shown, the main page 7940 of some embodiments displays an indication of the status of the configuration that includes a last-updated timestamp 7930, as well as the multiple schema definitions and values 7935 mentioned above. The multiple schema definitions and values 7935 are provided by the combiner 7960, in some embodiments. As shown, the combiner 7960 receives configuration values from getConfigValues 7916 and configuration schemas from getConfigDefn 7912, combines these received data, and provides the combined data to the main page component 7940.

The upload/create configuration modal 7945 of some embodiments enables a user to make changes to an existing configuration by performing a series of actions, in some embodiments. The series of actions of some embodiments include clicking on a wheel icon located on the top-right section of the side menu to open the Modal dialog, selecting a JSON file that has the desired configuration that needs to be applied to a RIC/xApp, and clicking "SAVE" or "UPLOAD" to make a POST/PUT API call to "/drics/{uuid}/config" for saving the configuration.

Figure 80:
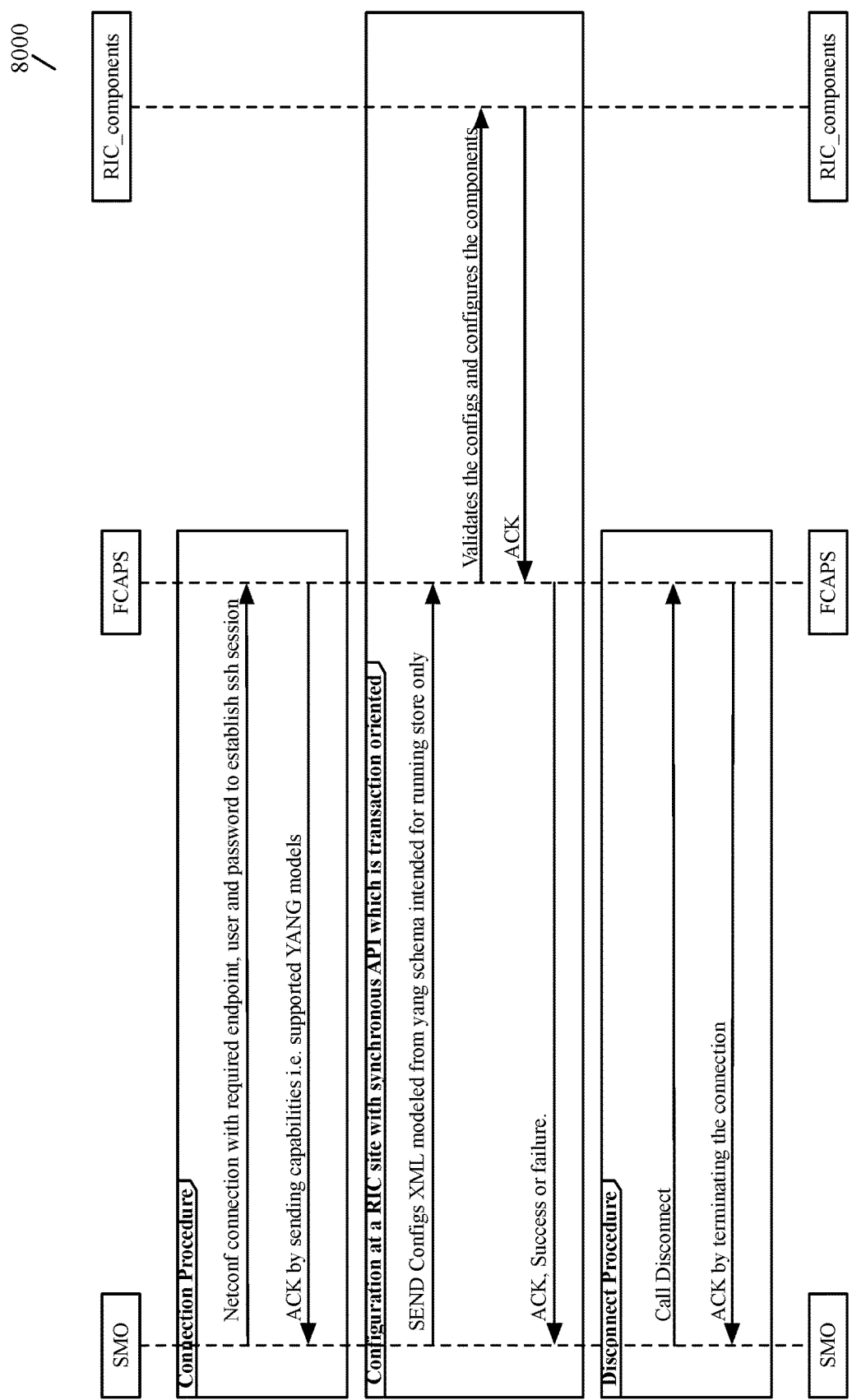
FIG. 80 conceptually illustrates a north-to-south RMS-based workflow of some embodiments.

FIG. 80 conceptually illustrates a north-to-south RMS-based workflow 8000 of some embodiments. FIG. 81 illustrates an example of UML sequence code 8100 of some embodiments that corresponds to the workflow 8000.

In some embodiments, for third-party SMOs, Yang modules are provided (e.g., the Yang modules described in the embodiments above) and users are recommended to maintain a single file with XML configurations modeled using the provided Yang modules. FIG. 82 illustrates an example of a generic key-value XML configuration 8200 in some embodiments using a Yang module. FIG. 83 illustrates an example of an sdk-param XML configuration 8300 using a Yan module, in some embodiments.

Two kinds of APIs are exposed to users, in some embodiments, including REST APIs exposed by RMS for xApps, xApp configurations, and xApp configuration schemas, as well as C/C++ APIs exposed by SDK for application developers. A new schema, "config_schema", is added to the database, in some embodiments. This "config_schema" is a Yang and JSON model that is bootstrapped when RMS is brought up, according to some embodiments. Examples of the REST APIs, in some embodiments, include POST/api/{version}/config_schemas, GET/api/{version}/config_schemas, GET/api/{version}/config_schemas/:uuid, GET/api/{version}/config_schemas/:name, PUT/api/{version}/config_schemas/:uuid, and DELETE/api/[version]/config_schemas/:uuid.

FIG. 84 illustrates examples of requests and responses using the above APIs, in some embodiments. The request 8410 is an example of a POST request in some embodiments. Also, in some embodiments, a PUT request is the same as a POST request 8410, but the identifier and name are not allowed to change, according to some embodiments. For POST requests, the new version of the schema is saved as a new object in the database, and as such, the name acts as a unique identifier. It should be noted that both the JSON and Yang files will be parsed into base64 format and saved as a string in the database, in some embodiments. The response 8415 is an example of both a POST response and a PUT response, according to some embodiments.

The responses 8420 and 8425 are two examples of GET responses, in some embodiments. The API side, in some embodiments, will have an extra check on the passing parameter. If it is in the UUID format, in some embodiments, the API side will check if the UUID is valid and exists. If it is in the name format, the API side will check if the name exists, in some embodiments. A successful DELETE, in some embodiments, will simply return 200.

In some embodiments, xApp registration APIs are used to add new parameters supported_schemas and generic_key_value to the API schemas for xApps. Because the xApp onboarding is automated (e.g., an automated process performs the onboarding) from LCM to RMS, in some embodiments, this field can be populated in the JSON payload. The APIs include POST/api/{version}/drics/{uuid}/xapps, GET/api/{version}/drics/{uuid}/xapps/:xapp_id, PUT/api/{version}/drics/{uuid}/xapps/:xapp_id, and DELETE/api/{version}/drics/{uuid}/xapps/: xapp_id. FIG. 85 illustrates examples of requests and responses associated with these xApp registration APIs, in some embodiments.

The request 8510 is an example of a POST request, in some embodiments. For PUT requests, in some embodiments, all fields can be modified except for the global_id. The response 8515 is an example of a POST response, in some embodiments. The responses for the GET and PUT APIs are the same as the POST response 8515, in some embodiments. As mentioned above, a successful DELETE returns a response of 200, according to some embodiments.

In some embodiments, for xApp configurations, a dedicated drics/{uuid}/xapp/{xapp_uuid}/configs API is used, and drics/{uuid}/config is used for dRIC configuration. These APIs, in some embodiments, include POST/api/{version}/drics/{uuid}/xapps/{xapp_uuid}/configs, GET/api/{version}/drics/{uuid}/xapps/{xapp_uuid}/configs, PUT/api/{version}/drics/{uuid}/xapps/{xapp_uuid}/configs, and DELETE/api/{version}/drics/{uuid}/xapps/{xapp_uuid}/configs. FIG. 86 illustrates examples of requests and responses associated with these APIs, in some embodiments.

The request 8610 is an example of a POST request, in some embodiments, while the response 8615 is an example of a POST response, in some embodiments. The response 8620 is an example in some embodiments of a GET response. The request 8625 and response 8630 are examples of a PUT request and PUT response, according to some embodiments. The response 8635 is an example in some embodiments of a DELETE response.

In some embodiments, the UI looks into a configuration using the schema name as a key to fetch the configuration. The information, in some such embodiments, can be rendered dynamically on the GUI. For xApps, in some embodiments, the UI uses GET/api/{version}/drics/{uuid}/xapps/:xapp_id and GET/api/{version}/config_schemas/:name to populate the GUI for the xApp, and then subsequently uses GET/api/{version}/drics/{uuid}/xapps/{xapp_uuid}/configs for the configuration (i.e., in a read only view). For dRICs, in some embodiments, the UI uses GET/api/{version}/drics/{uuid} and GET/api/{version}/config_schemas/:name to populate the GUI for the dRIC, and then uses GET/api/{version}/drics/{uuid}/configs for the configuration (e.g., also in read only view).

Figure 88:
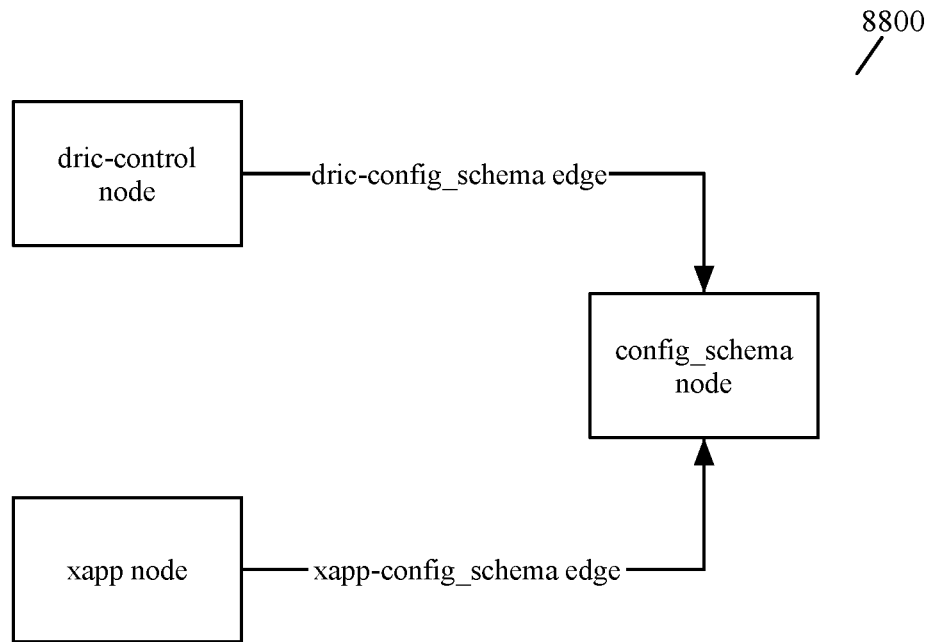
FIG. 88 conceptually illustrates a database representation of a config_schema document and other RIC components of some embodiments.

FIG. 87 illustrates an example of SDK APIs 8700 that are exposed to developers, in some embodiments. Configuration schemas are used by the UI, in some embodiments, to construct a GUI. In some embodiments, the JSON schema is saved in a database such as ArangoDB. FIG. 88 conceptually illustrates a database representation 8800 of a config_schema document and other RIC components of some embodiments. The database, in some embodiments, implements edges including from dRIC platform components (e.g., dric-control and xApp) to the configuration schema, and a node that includes config_schema.

Figure 89:
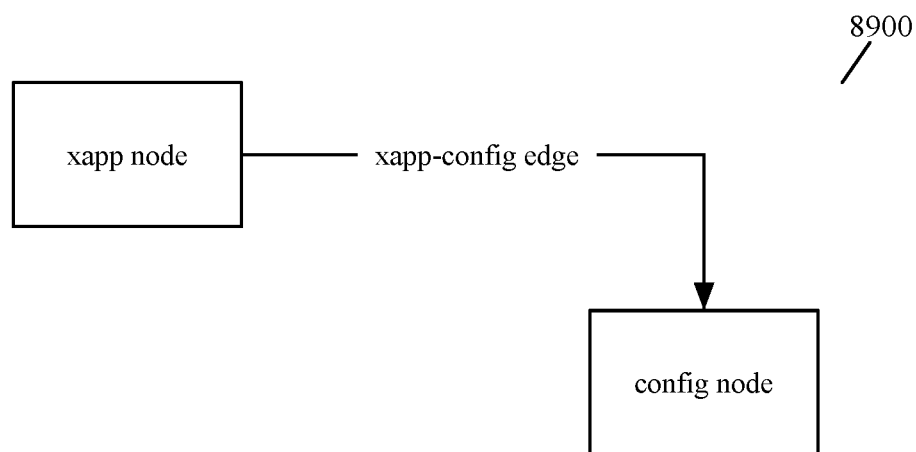
FIG. 89 conceptually illustrates a database representation of some embodiments for xApp configuration.

In some embodiments, the dRIC configuration node that has stored admission control information is reused because xApp configurations are still applied to the dRIC platform and it is easier to manage them from one true source, in some embodiments. FIG. 89 conceptually illustrates a database representation 8900 of some embodiments for xApp configuration.

Upgrading a Yang module in some embodiments is a three step procedure. The first step, in some embodiments, includes deleting the previous version of the Yang module from sysrepo. Doing so also wipes out the configuration data for older versions of the Yang module from the datastore along with the configuration, according to some embodiments. The second step, in some embodiments includes installing the new revision of the Yang module. In some embodiments, as Netconf, Yang, and sysrepo all follow the same principle such that many revisions of a single module can exist, while only one can be implemented, the third step includes fixing the configuration format to the latest revision. In order to avoid disruption of the normal workflow, new modifications or additions in Yang modules are handled as product upgrades, in some embodiments.

In some embodiments, to avoid a broken workflow, one single internal version number for all three schemas in a release are maintained. Because backward compatibility is difficult to maintain on Yang and protobuf if a field is removed or modified, in some embodiments, and even though Yang and JSON schemas are identified based on the revision date, in some embodiments, they are associated with internal release numbers for easy identification, according to some embodiments.

Upgrade procedures, in some embodiments, enable improved performance, add new configuration capabilities, and add new features. As some of the embodiments described herein are associated with three kinds of schemas, it is important in some embodiments to upgrade them as part of the upgrade procedure (i.e., rather than at a different time). Additionally, because of the limitation of the Yang module update, it is important in some embodiments to restore the system to the correct state. In some embodiments, doing so creates a dependency between RICs and the RMS in the upgrade workflow that will be mentioned below. Two scenarios with upgrades will be described below.

In some embodiments, when RMS is deployed and an upgrade is to be performed for, e.g., a RIC, a time window is first selected to do a rollout upgrade. After the time window is selected, in some embodiments, the RMS is upgraded first before any other RIC (e.g., dRIC/cRIC) because the RMS acts as a central vault for all configuration across the RICs. RMS also maintains structures to ensure compatibility, in some embodiments, between versions of the configuration template. In some embodiments, the configuration workflow is disabled during the time window for the RICs that are being upgrade.

Figure 90:
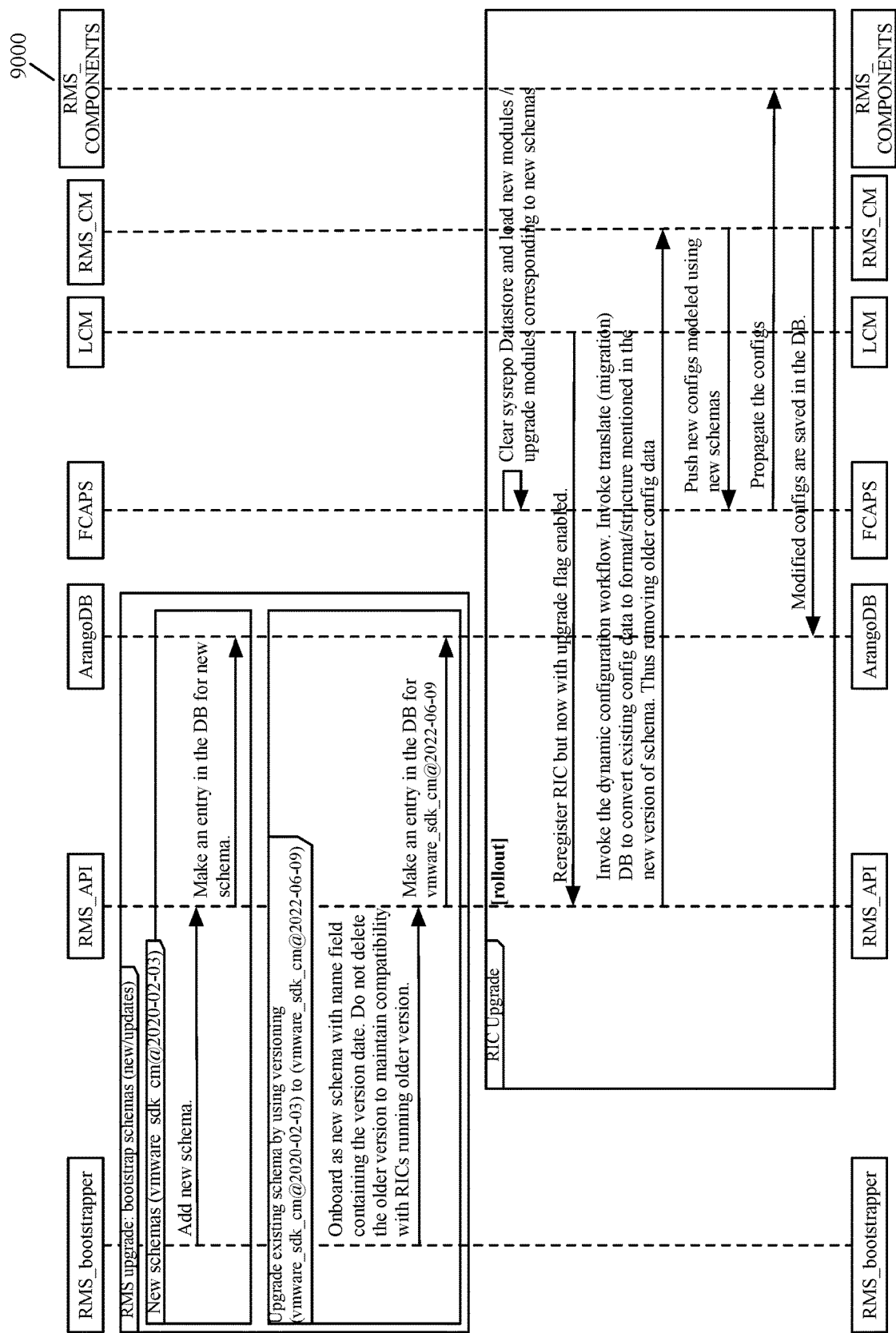
FIG. 90 conceptually illustrates a workflow sequence of some embodiments for RMS upgrade.

Each RIC instance, in some embodiments, is upgraded by implementing the latest version of the configuration template. For instance, in some embodiments, an xApp on a RIC instance will transition from "vmware_sdk_param_cm@2020-03-02" to "vmware_sdk_param_cm@2022-06-09". RICs that do not take part in the rollout upgrade still work with older version of the configuration template and it is the responsibility of the RMS to maintain the compatibility, according to some embodiments. In some embodiments, the latest supported schema can be found for both the upgraded RICs and the non-upgraded RICs can be found in the xApp/rApp and cRIC/dRIC database object. By performing the upgrades using these steps, unnecessary rollbacks caused by upgrade failures can be avoided, in some embodiments, and the complicated upgrade of Yang modules is accounted for. FIG. 90 conceptually illustrates a workflow sequence 9000 of some embodiments for RMS upgrade. FIG. 91 illustrates an example of code 9100 for a UML sequence corresponding to the workflow 9000, in some embodiments.

In some embodiments, SMOs other than the above described RMS follow a different upgrade procedure. Once a time window has been selected for upgrade, and the configuration workflow is disable for the selected time window, the SMO is informed of any new Yang modules and/or any new updates to existing Yang modules, according to some embodiments. The SMO, in some embodiments, then invokes the configuration workflow with XML configurations modeled using the new Yang schema.

Monitoring is performed in some embodiments by exposing some internal metrics for debugging connections and states. In some embodiments, a log collector will scrape the FCAPS pod logs that are directed to "stdout". Netconf server logs are pushed to a file in some embodiments. Also, in some embodiments, the Netconf server logs are pushed to "stdout" along with the FCAPS pod logs.

Upon receiving an API call to create and/or update a configuration, in some embodiments, the RMS API first validates the incoming JSON data against the JSON schema https://github.com/xeipuuv/gojsonschema. Next, the RMS API removes all XML validation code, and calls the RMS CM gRPC to create an xApp configuration on southbound, in some embodiments.

The RMS CM, in some embodiments, converts the configurations from JSON to XML before sending to southbound. For embodiments that use the file-based approach to upload configurations (e.g., true source of information), a user can make bulk change across all the modules (e.g., vmware-sdk-parm, dric-admission-control, and generic-key-value-pair) at once at the start. The Netconf server processes the configuration module(s)/schema(s) by module using sysrepo watcher, in some embodiments. To make it compatible with the current implementation, the RMS CM of some embodiments sends XML configurations in two ways.

For the first way, in some embodiments, the RMS CM sends module-by-module configurations with its own Netconf session. In some such embodiments, the RMS CM sends the configurations for each module with a new session per module and stops at the point where the configuration acknowledgment from FCAPs is negative, hence failing the next in-line configuration for other modules. The RMS CM then throws out errors explaining the context.

For the second way, the RMS CM sends all of the configurations at once, irrespective of module classification, in one Netconf session. In some embodiments, the first way is simpler to implement on the FCAPS side because the sysrepo watcher is designed to process configurations based on each module, whereas for the second way, processing delays occur, in some embodiments, due to the module-based processing that makes the first way simpler. Additionally, in some embodiments, sending XML configurations to the Netconf server module-by-module ensures that the Netconf server is not overwhelmed. In other embodiments, a multi-component configuration algorithm is implemented. Upon receiving an API call to get a configuration, the RMS API of some embodiments retrieves the configuration stored in the database (e.g., ArangoDB). For API calls to delete a configuration, the RMS API calls the RMS CM to delete the configuration and returns the status as pending, in some embodiments.

In some embodiments, there are two kinds of schema used as part of UI rendering. The first is a component-specific schema (e.g., limited to xapp-vonr or dric-control), and the second is all-purpose (e.g., generic-key-value). For the first case, in some embodiments, whenever the UI makes a call to GET configs, it can navigate through the dictionary of configurations (e.g., [GET/api/{version}/drics/{uuid}/configs]). In some embodiments, the key used to look this up is the schema name for fetching the configurations relevant for a particular RIC component. It has well-defined schema to load on the UI.

For the second case, in some embodiments, since this schema is valid across all the components at a dRIC platform, the GUI has to perform additional processing. For instance, if a user modifies a parameter for "xapp-perf" with the generic schema, the look-up and rendering would include "configs['generic-key-value']['config-container']['xapp-configs'][idx]['service_id']=xapp_global_id", according to some embodiments.

Figure 92:
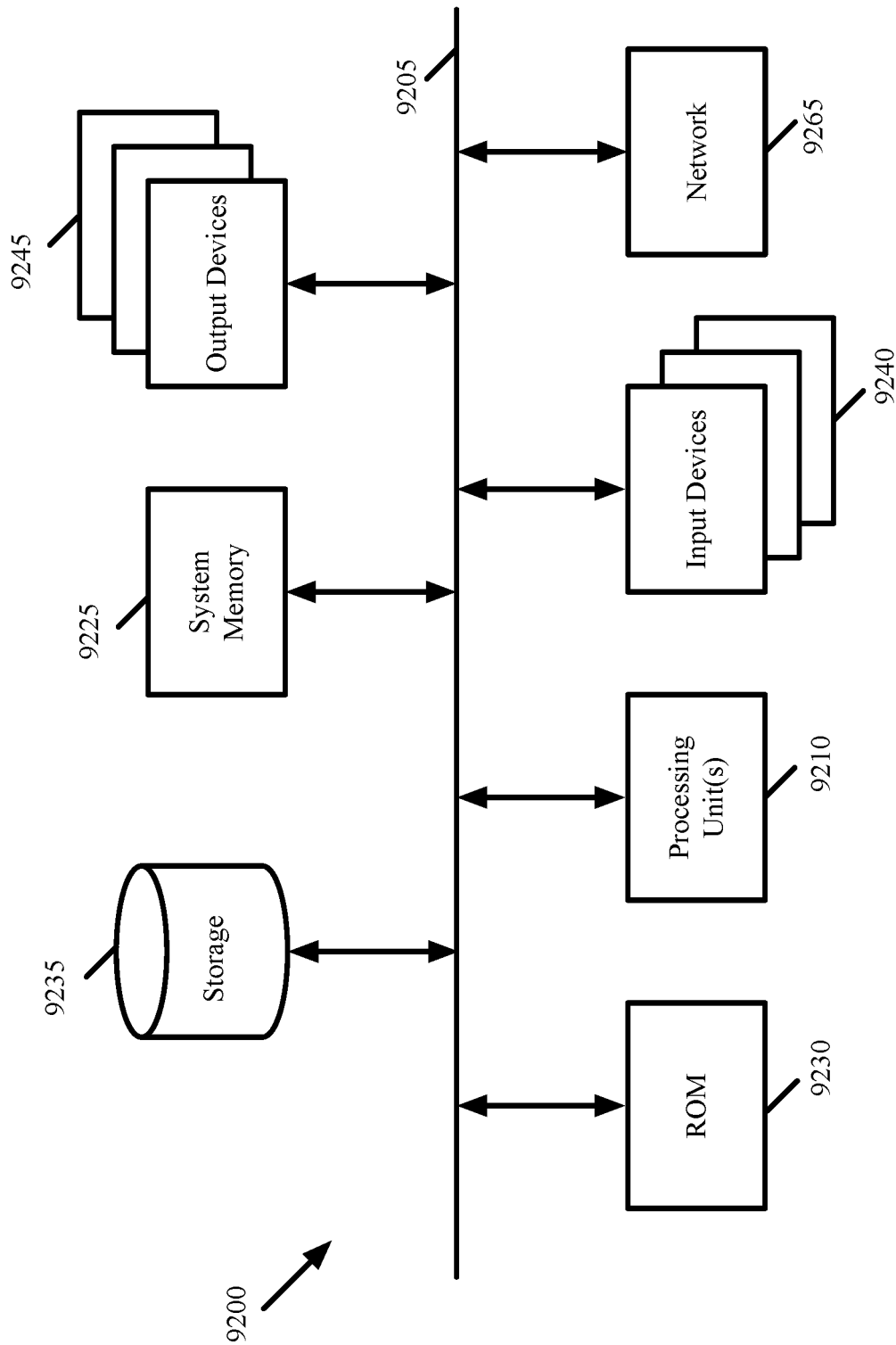

FIG. 92 conceptually illustrates an electronic system 9200 with which some embodiments of the invention are implemented. The electronic system 9200 may be a computer (e.g., a desktop computer, personal computer, tablet computer, server computer, mainframe, a blade computer etc.), or any other sort of electronic device. Such an electronic system 9200 includes various types of computer-readable media and interfaces for various other types of computer-readable media. Electronic system 9200 includes a bus 9205, processing unit(s) 9210, a system memory 9225, a read-only memory 9230, a permanent storage device 9235, input devices 9240, and output devices 9245.

The bus 9205 collectively represents all system, peripheral, and chipset buses that communicatively connect the numerous internal devices of the electronic system 9200. For instance, the bus 9205 communicatively connects the processing unit(s) 9210 with the read-only memory 9230, the system memory 9225, and the permanent storage device 9235.

From these various memory units, the processing unit(s) 9210 retrieve instructions to execute and data to process in order to execute the processes of the invention. The processing unit(s) 9210 may be a single processor or a multi-core processor in different embodiments.

The read-only-memory (ROM) 9230 stores static data and instructions that are needed by the processing unit(s) 9210 and other modules of the electronic system 9200. The permanent storage device 9235, on the other hand, is a read-and-write memory device. This device 9235 is a non-volatile memory unit that stores instructions and data even when the electronic system 9200 is off. Some embodiments of the invention use a mass-storage device (such as a magnetic or optical disk and its corresponding disk drive) as the permanent storage device 9235.

Other embodiments use a removable storage device (such as a floppy disk, flash drive, etc.) as the permanent storage device 9235. Like the permanent storage device 9235, the system memory 9225 is a read-and-write memory device. However, unlike storage device 9235, the system memory 9225 is a volatile read-and-write memory, such as random-access memory. The system memory 9225 stores some of the instructions and data that the processor needs at runtime. In some embodiments, the invention's processes are stored in the system memory 9225, the permanent storage device 9235, and/or the read-only memory 9230. From these various memory units, the processing unit(s) 9210 retrieve instructions to execute and data to process in order to execute the processes of some embodiments.

The bus 9205 also connects to the input and output devices 9240 and 9245. The input devices 9240 enable the user to communicate information and select commands to the electronic system 9200. The input devices 9240 include alphanumeric keyboards and pointing devices (also called "cursor control devices"). The output devices 9245 display images generated by the electronic system 9200. The output devices 9245 include printers and display devices, such as cathode ray tubes (CRT) or liquid crystal displays (LCD). Some embodiments include devices such as a touchscreen that function as both input and output devices.

Finally, as shown in FIG. 92, bus 9205 also couples electronic system 9200 to a network 9265 through a network adapter (not shown). In this manner, the computer can be a part of a network of computers (such as a local area network ("LAN"), a wide area network ("WAN"), or an Intranet, or a network of networks, such as the Internet. Any or all components of electronic system 9200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs), or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In the discussion above, many examples were provided for deploying an xApp, and configuring a dRIC instance for a deployed xApp (e.g., associating the xApp with a datapath of the dRIC instance, adding the xApp to the admission control of the associated datapath, etc.). One of ordinary skill will realize that some embodiments use similar approaches for deploying rApps and configuring cRIC instances for the deployed rApps. Hence, the methodologies described in the specification and figures herein are applicable generally for deploying any RAN app (e.g., xApp, rApp, etc.) to operate with any RIC instance (e.g., dRIC or cRIC).

Also, several embodiments described above only show one hardware accelerator per host computer. However, one of ordinary skill will realize that the methodology and architecture of some embodiments can be used to provide direct, passthrough access to multiple hardware accelerators on one host computer. In addition, several embodiments described above pertain to xApp operations and the near RT RIC communications with xApps. One of ordinary skill will realize that these embodiments are equally applicable to edge applications in a telecommunication network and the near RT RIC communications with the edge applications. Thus, one of ordinary skill in the art would understand that the invention is not to be limited by the foregoing illustrative details, but rather is to be defined by the appended claims.

The invention claimed is:

1. A method of updating configurations for Radio Access Network (RAN) applications deployed in a RAN system, the method comprising: at a RAN Intelligent Controller (RIC) deployed in the RAN system:
   parsing a first Custom Resource (CR) that defines a RAN application to be deployed in the RAN system;
   interacting with a RIC management system (RMS) to deploy a first instance of the RAN application in the RAN system and to define, for the RAN application, at least one datapath through the RIC to base station components; and
   receiving, from the RMS, a first set of one or more updates to a first set of one or more attributes of the RAN application that are defined in the first CR, said RMS receiving from a network administrator the set of updates,
   wherein the RMS receives from the network administrator the first set of updates in a first format, wherein receiving the first set of one or more updates from the RMS comprises receiving, the first set of one or more updates in a second format that is different from the first format.

2. The method of claim 1 further comprising:
   at the RIC:
   before parsing the first CR, receiving the first CR from a network administrator through an interface of the RIC;
   after deploying the RAN application, receiving, from the network administrator through the RIC interface, a second CR that defines a second set updates to the RAN application, the second set of updates adding or removing a second set of one or more attributes to the RAN application; and
   interacting with the RMS to replace the deployed current first instance of the RAN application with a newer second instance of the RAN application that includes the second set of updates.

3. The method of claim 1, wherein the RMS converts the first set of updates from the first format to the second format for sending the first set of updates to the RIC.

4. The method of claim 3, wherein:
   the first format is easier to review by a network operator that uses the UI than the second format; and
   the second format is a format of telephony-based standards body communications sent from the RMS to the RIC via a telephony-based standards body protocol.

5. The method of claim 4, wherein the first format comprises a Java Script Object Notation (JSON) format, the second format comprises an Extensible Markup Language (XML) encoded format, and the telephony-based standards body protocol comprises Network Configuration Protocol (NETCONF).

6. The method of claim 3 further comprising:
   converting the received first set of updates from the second format to a third format that is different from the first and second formats;
   distributing the first set of updates in the third format to the RAN application for processing;
   receiving an acknowledgement from the RAN application that the first set of updates have been successfully processed; and
   sending the acknowledgement to the RMS to notify the RMS that the first set of updates have been successfully processed by the RAN application.

7. The method of claim 6, wherein the RMS updates a configuration of the RAN application stored in a configuration datastore of the RMS using the first set of updates based on receipt of the notification that the first set of updates have been successfully processed.

8. The method of claim 7, wherein the configuration of the RAN application is stored by the RMS in the RMS configuration datastore in the first format for easy display through the RMS UI.

9. The method of claim 7, wherein when the acknowledgement indicates that the first set of updates have not been successfully processed by the RAN application, the RMS displays the acknowledgement through the RMS UI without updating the configuration of the RAN application in the RMS configuration datastore.

10. The method of claim 6, wherein the RMS displays the acknowledgement through the RMS UI to notify the network administrator that the first set of updates have been successfully processed by the RAN application.

11. The method of claim 1, wherein receiving, from the RMS, the first set of one or more updates comprises receiving, from the RMS, a request to update the RAN application with the first set of one or more updates.

12. The method of claim 1, wherein the RAN comprises an Open RAN (O-RAN).

13. A non-transitory machine readable medium storing a program for execution by a set of processing units, the program for a Radio Access Network (RAN) Intelligent Controller (RIC) that updates configurations for RAN applications deployed in a RAN system that includes the RIC, the program comprising sets of instructions for:
   parsing a first Custom Resource (CR) that defines a RAN application to be deployed in the RAN system;
   interacting with a RIC management system (RMS) to deploy a first instance of the RAN application in the RAN system and to define, for the RAN application, at least one datapath through the RIC to base station components; and
   receiving, from the RMS, a first set of one or more updates to a first set of one or more attributes of the RAN application that are defined in the first CR, said RMS receiving from a network administrator the set of updates,
   wherein the RMS receives from the network administrator the first set of updates in a first format, wherein receiving the first set of one or more updates from the RMS comprises receiving, the first set of one or more updates in a second format that is different from the first format.

14. The non-transitory machine readable medium of claim 13, wherein the program further comprises sets of instructions for: at the RIC: before parsing the first CR, receiving the first CR from a network administrator through an interface of the RIC;
   after deploying the RAN application, receiving, from the network administrator through the RIC interface, a second CR that defines a second set updates to the RAN application, the second set of updates adding or removing a second set of one or more attributes to the RAN application; and interacting with the RMS to replace the deployed current first instance of the RAN application with a newer second instance of the RAN application that includes the second set of updates.

15. The non-transitory machine readable medium of claim 13, wherein:

the RMS converts the first set of updates from the first format to the second format for sending the first set of updates to the RIC.

16. The non-transitory machine readable medium of claim 15, wherein:

the first format is easier to review by a network operator that uses the UI than the second format; and the second format is a format of telephony-based standards body communications sent from the RMS to the RIC via a telephony-based standards body protocol.

17. The method of claim 16, wherein the first format comprises a Java Script Object Notation (JSON) format, the second format comprises an Extensible Markup Language (XML) encoded format, and the telephony-based standards body protocol comprises Network Configuration Protocol (NETCONF).

18. The non-transitory machine readable medium of claim 15, wherein the program further comprises sets of instructions for:

converting the received first set of updates from the second format to a third format that is different from the first and second formats;

distributing the first set of updates in the third format to the RAN application for processing;

receiving an acknowledgement from the RAN application that the first set of updates have been successfully processed; and sending the acknowledgement to the RMS to notify the RMS that the first set of updates have been successfully processed by the RAN application.

19. The non-transitory machine readable medium of claim 18, wherein:

the RMS updates a configuration of the RAN application stored in a configuration datastore of the RMS using the first set of updates based on receipt of the notification that the first set of updates have been successfully processed; and the configuration of the RAN application is stored by the RMS in the RMS configuration datastore in the first format for easy display through the RMS UI.

* * * * *